US009898026B2

(12) United States Patent
Ewing et al.

(10) Patent No.: US 9,898,026 B2
(45) Date of Patent: *Feb. 20, 2018

(54) POWER DISTRIBUTION APPARATUS WITH INPUT AND OUTPUT POWER SENSING AND METHOD OF USE

(71) Applicant: Server Technology, Inc., Reno, NV (US)

(72) Inventors: Carrel W. Ewing, Reno, NV (US); James P. Maskaly, Sparks, NV (US); Dennis W. Mcglumphy, Sun Valley, NV (US); Brian P. Auclair, Reno, NV (US); David Massey, Sparks, NV (US); Brandon W. Ewing, Reno, NV (US); Andrew J. Cleveland, Reno, NV (US); Calvin Nicholson, Reno, NV (US); Paul Hunt, Reno, NV (US)

(73) Assignee: Server Technology, Inc., Reno, NV (US)

(*) Notice: Subject to any disclaimer, the term of this patent is extended or adjusted under 35 U.S.C. 154(b) by 895 days.

This patent is subject to a terminal disclaimer.

(21) Appl. No.: 13/670,275

(22) Filed: Nov. 6, 2012

(65) Prior Publication Data
US 2013/0289789 A1    Oct. 31, 2013

Related U.S. Application Data

(62) Division of application No. 12/824,059, filed on Jun. 25, 2010, now Pat. No. 8,305,737.
(Continued)

(51) Int. Cl.
*G06F 3/00* (2006.01)
*G05F 3/00* (2006.01)
(Continued)

(52) U.S. Cl.
CPC .............. *G05F 3/00* (2013.01); *G06F 1/266* (2013.01); *G06F 11/3062* (2013.01);
(Continued)

(58) Field of Classification Search
CPC .... G05F 3/00; G06F 11/3058; G06F 11/3062; G06F 11/3089; G06F 1/266; H02J 3/14;
(Continued)

(56) References Cited

U.S. PATENT DOCUMENTS 4,300,182 A    11/1981   Schweitzer, III
4,700,188 A    10/1987   James
(Continued)

FOREIGN PATENT DOCUMENTS

EP     0528634 A2     2/1993
JP     H05232143 A    9/1993
(Continued)

OTHER PUBLICATIONS

International Search Report and Written Opinion from International Application No. PCT/US10/40098.
(Continued)

*Primary Examiner* — Abdelmonim Elamin
(74) *Attorney, Agent, or Firm* — Perkins Coie LLP

(57) ABSTRACT

Power distribution apparatus with input and output power sensing and a method of use. A power distribution unit includes a sensor that senses power parameters of power outputs and a power input, a processor, and a communication circuit. A power management system includes a power manager, a user interface, and a plurality of power distribution units that may be located in one or more equipment cabinets and data centers. The system may compute apparent power, RMS power, power factor, energy usage over time, power usage history, or environmental history for any or all of the power distribution units. The system may identify an
(Continued)

under-utilized server connected to one of the power distribution units and initiate a shut-down of that server.

43 Claims, 103 Drawing Sheets

Related U.S. Application Data

(60) Provisional application No. 61/220,542, filed on Jun. 25, 2009.

(51) Int. Cl.
- *G06F 1/26* (2006.01)
- *H02J 3/14* (2006.01)
- *G06F 11/30* (2006.01)

(52) U.S. Cl.
CPC ...... *G06F 11/3089* (2013.01); *G06F 11/3058* (2013.01); *H02J 3/14* (2013.01); *Y02B 90/226* (2013.01); *Y04S 20/16* (2013.01); *Y10T 307/469* (2015.04); *Y10T 307/74* (2015.04)

(58) Field of Classification Search
CPC ... Y02B 90/226; Y04S 20/16; Y10T 307/469; Y10T 307/74
See application file for complete search history.

(56) References Cited

U.S. PATENT DOCUMENTS

| | | | |
|---|---|---|---|
| 4,731,549 A | 3/1988 | Hiddleson | |
| 5,179,376 A | 1/1993 | Pomatto | |
| 5,369,356 A | 11/1994 | Kinney et al. | |
| 5,424,903 A | 6/1995 | Schreiber | |
| 5,469,045 A | 11/1995 | Dove et al. | |
| 5,498,956 A | 3/1996 | Kinney et al. | |
| 5,506,573 A | 4/1996 | Ewing et al. | |
| 5,506,790 A | 4/1996 | Nguyen | |
| 5,650,771 A | 7/1997 | Lee | |
| 5,721,934 A | 2/1998 | Scheurich | |
| 5,778,237 A | 7/1998 | Yamamoto et al. | |
| 5,949,974 A | 9/1999 | Ewing et al. | |
| 6,157,527 A | 12/2000 | Spencer et al. | |
| 6,232,675 B1 | 5/2001 | Small | |
| 6,330,516 B1 * | 12/2001 | Kammeter | 702/60 |
| 6,445,087 B1 | 9/2002 | Wang et al. | |
| 6,476,729 B1 | 11/2002 | Liu | |
| 6,501,195 B1 | 12/2002 | Barton | |
| 6,525,435 B2 | 2/2003 | Lau et al. | |
| 6,608,406 B2 | 8/2003 | Bersiek | |
| 6,628,009 B1 | 9/2003 | Chapel | |
| 6,711,613 B1 | 3/2004 | Ewing et al. | |
| 6,714,977 B1 | 3/2004 | Fowler et al. | |
| 6,741,442 B1 | 5/2004 | McNally et al. | |
| 6,759,763 B2 | 7/2004 | Barton | |
| 6,867,958 B2 * | 3/2005 | McClure | H02H 7/266 361/71 |
| 6,967,283 B2 | 11/2005 | Rasmussen et al. | |
| 7,010,589 B2 | 3/2006 | Ewing et al. | |
| 7,043,543 B2 | 5/2006 | Ewing et al. | |
| 7,099,934 B1 | 8/2006 | Ewing et al. | |
| 7,106,044 B1 | 9/2006 | Lee, Jr. et al. | |
| 7,141,891 B2 | 11/2006 | McNally et al. | |
| 7,201,610 B2 | 4/2007 | Chao et al. | |
| 7,209,838 B1 | 4/2007 | Wright et al. | |
| 7,215,535 B2 | 5/2007 | Pereira | |
| 7,268,998 B2 | 9/2007 | Ewing et al. | |
| 7,271,502 B1 | 9/2007 | Remaker | |
| 7,274,303 B2 | 9/2007 | Dresti et al. | |
| 7,312,980 B2 | 12/2007 | Ewing et al. | |
| 7,324,006 B2 | 1/2008 | Godard | |
| 7,369,950 B2 | 5/2008 | Wall et al. | |
| 7,400,062 B2 | 7/2008 | Pincu et al. | |
| 7,414,329 B2 | 8/2008 | Cleveland et al. | |
| 7,522,036 B1 * | 4/2009 | Preuss et al. | 340/531 |
| 7,646,590 B1 | 1/2010 | Corhodzic et al. | |
| 7,653,499 B2 | 1/2010 | Corrado et al. | |
| 7,707,443 B2 | 4/2010 | Chheda et al. | |
| 7,715,716 B2 | 5/2010 | Risbood | |
| 7,795,759 B2 | 9/2010 | DuBose et al. | |
| 7,813,099 B2 | 10/2010 | Chan | |
| 7,843,081 B2 | 11/2010 | Lim | |
| 7,857,214 B2 | 12/2010 | Saliaris | |
| 7,860,955 B2 | 12/2010 | Ratcliff et al. | |
| 7,969,156 B2 * | 6/2011 | Ferguson | 324/522 |
| 7,982,335 B2 * | 7/2011 | Aldag | H01R 25/142 307/11 |
| 7,987,248 B2 | 7/2011 | Ratcliff et al. | |
| 8,039,997 B2 | 10/2011 | Slessman | |
| 8,159,084 B2 | 4/2012 | Gilpatrick | |
| 8,165,832 B1 * | 4/2012 | Low et al. | 702/60 |
| 8,207,627 B2 * | 6/2012 | Aldag | H01R 25/142 307/12 |
| 8,264,099 B2 * | 9/2012 | Aldag | H01R 25/142 307/12 |
| 8,321,163 B2 | 11/2012 | Ewing et al. | |
| 8,489,667 B2 | 7/2013 | Ewing et al. | |
| 8,494,661 B2 | 7/2013 | Ewing et al. | |
| 8,510,424 B2 | 8/2013 | Ewing et al. | |
| 8,560,652 B2 | 10/2013 | Ewing et al. | |
| 8,694,272 B2 | 4/2014 | Ewing et al. | |
| 9,142,971 B2 * | 9/2015 | Ewing | H04L 12/10 |
| 2004/0078153 A1 | 4/2004 | Bartone et al. | |
| 2004/0124713 A1 | 7/2004 | Orr et al. | |
| 2005/0057870 A1 | 3/2005 | Stellato et al. | |
| 2005/0068716 A1 | 3/2005 | Pereira | |
| 2005/0094336 A1 | 5/2005 | Cleveland | |
| 2006/0072269 A1 | 4/2006 | Staples | |
| 2006/0072531 A1 | 4/2006 | Ewing et al. | |
| 2006/0082222 A1 | 4/2006 | Pincu et al. | |
| 2007/0050443 A1 | 3/2007 | Ewing et al. | |
| 2007/0155349 A1 | 7/2007 | Nelson et al. | |
| 2007/0276548 A1 | 11/2007 | Uzunovic et al. | |
| 2007/0291430 A1 | 12/2007 | Spitaels et al. | |
| 2008/0019067 A1 | 1/2008 | Reynolds et al. | |
| 2008/0019068 A1 | 1/2008 | Reynolds et al. | |
| 2008/0086652 A1 | 4/2008 | Krieger et al. | |
| 2008/0094210 A1 | 4/2008 | Paradiso et al. | |
| 2008/0172312 A1 | 7/2008 | Synesiou et al. | |
| 2008/0177424 A1 | 7/2008 | Wheeler | |
| 2008/0238404 A1 | 10/2008 | Ferguson | |
| 2008/0309164 A1 * | 12/2008 | Lim | H01R 13/6641 307/39 |
| 2009/0055031 A1 | 2/2009 | Slota et al. | |
| 2009/0102288 A1 | 4/2009 | Blackmond | |
| 2009/0138732 A1 | 5/2009 | Chang | |
| 2009/0235107 A1 | 9/2009 | Gelonese | |
| 2009/0262138 A1 | 10/2009 | Bradbury et al. | |
| 2009/0307505 A1 | 12/2009 | Robertson et al. | |
| 2010/0090542 A1 | 4/2010 | Johnson et al. | |
| 2010/0145536 A1 | 6/2010 | Masters et al. | |
| 2010/0145542 A1 | 6/2010 | Chapel et al. | |
| 2010/0198535 A1 | 8/2010 | Brown et al. | |
| 2011/0077788 A1 * | 3/2011 | Chan | H02J 13/0075 700/291 |

FOREIGN PATENT DOCUMENTS

| | | |
|---|---|---|
| JP | 2003-216283 A | 7/2003 |
| JP | 2007-259647 A | 10/2007 |
| WO | WO-2008113052 A1 | 9/2008 |

OTHER PUBLICATIONS

Raritan Americas; Full Speed Ahead—Directions 2007: Selling the Dominion (R) PX; 2007; 20 pages.

Extended European Search Report for European Application No. 10792765.9, dated Aug. 5, 2015; 4 pages.

Complaint for Patent Infringement, *Server Technology, Inc.* v. *Raritan Inc. and Raritan Americas, Inc.*, in the U.S. District Court,

(56) References Cited

OTHER PUBLICATIONS

District of Nevada; Case No. 3:15-cv-00330-MMD-WGC; 78 pp.; Jun. 22, 2015.
First Amended Complaint for Patent Infringement, *Server Technology, Inc.* v. *Raritan Inc. and Raritan Americas, Inc.*, in the U.S. District Court for the District of Nevada; Case No. 3:15-cv-00330-MMD-WGC; 13 pp.; Jun. 29, 2015.
Raritan Inc. and Raritan Americas, Inc.'s Answer, Affirmative Defenses, and Counterclaims to First Amended Complaint for Patent Infringement; Case No. 3:15-cv-00330-MMD-WGC; 53 pp.; Sep. 3, 2015.
Server Technology, Inc.'s Answer to Defendants' Counterclaims; Case No. 3:15-cv-00330-MMD-WGC; 53 pp.; Sep. 28, 2015.
Second Amended Complaint for Patent Infringement, *Server Technology, Inc.* v. *American Power Conversion Corporation*, Case No. 3:15-CV-00330—MMD-WGC; In the United States District Court, District of Nevada; 23 pp.; Dec. 15, 2015.

"Existing Metrics, Guidelines and Programs Affecting Data Center and IT Energy Efficiency," The Green Grid, White Paper #5, Jan. 2007, 40 pages.
"Qualitative Analysis of Power Distribution Configurations for Data Centers," The Green Grid, White Paper #4, Jan. 2007, 25 pages.
"The Green Grid Metrics: Data Center Infrastructure Efficiency (DCIE) Detailed Analysis," The Green Grid, White Paper #14, Jan. 2008, 16 pages.
EPA Report on Server and Data Center Energy Efficiency: Energy Star, accessed Dec. 15, 2008, 4 pages.
Report to Congress on Server and Data Center Energy Efficiency by the U.S. Environmental Protection Agency Energy Star Program, Aug. 2, 2007, 133 pages.
Server Technology, Inc. "Manage and Monitor Sentry Cabinet Power Distribution Units (CDU) and other Data Center Infrastructure Devices," Aug. 2006, Server Technology, Inc., Reno, NV, USA.
Stanley, J. R., et al., "Four Metrics Define Data Center "Greenness"," Uptime Institute, Jan. 2007, 21 pages.
Examination Report No. 1 for Australian Patent Application No. 2016203004; dated May 30, 2017; 4 pages.

\* cited by examiner

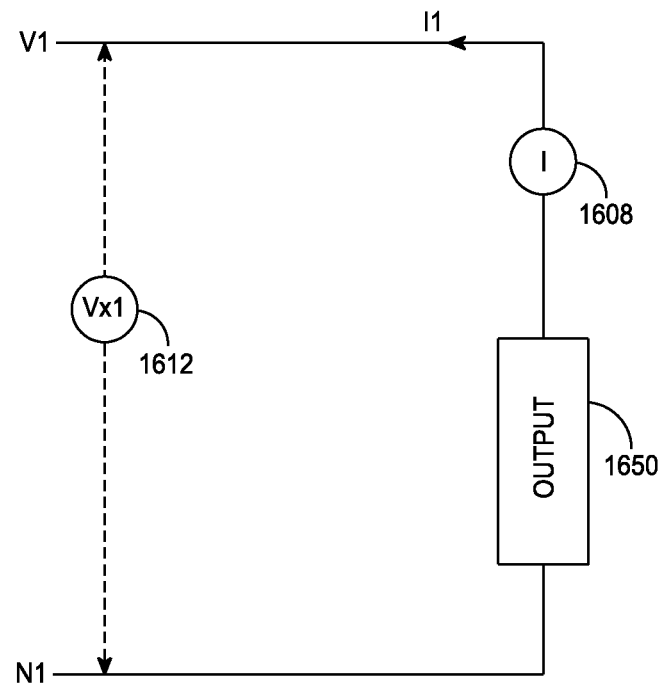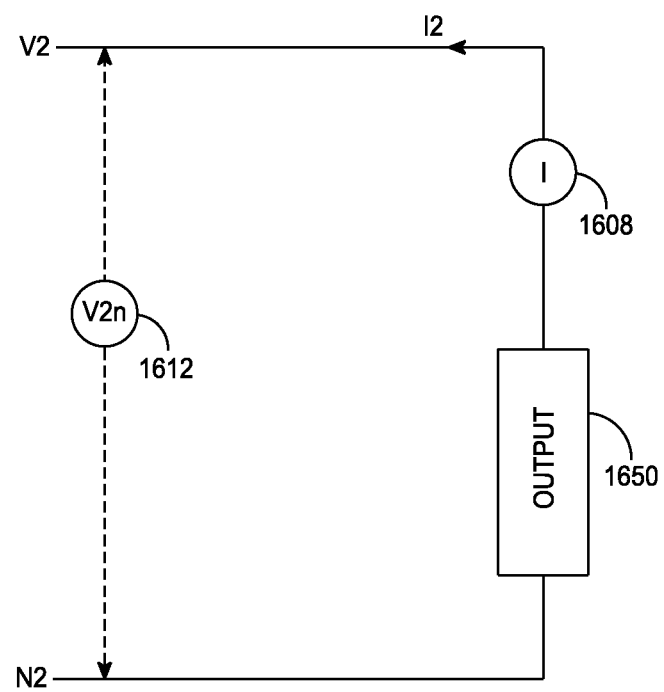
FIG. 21

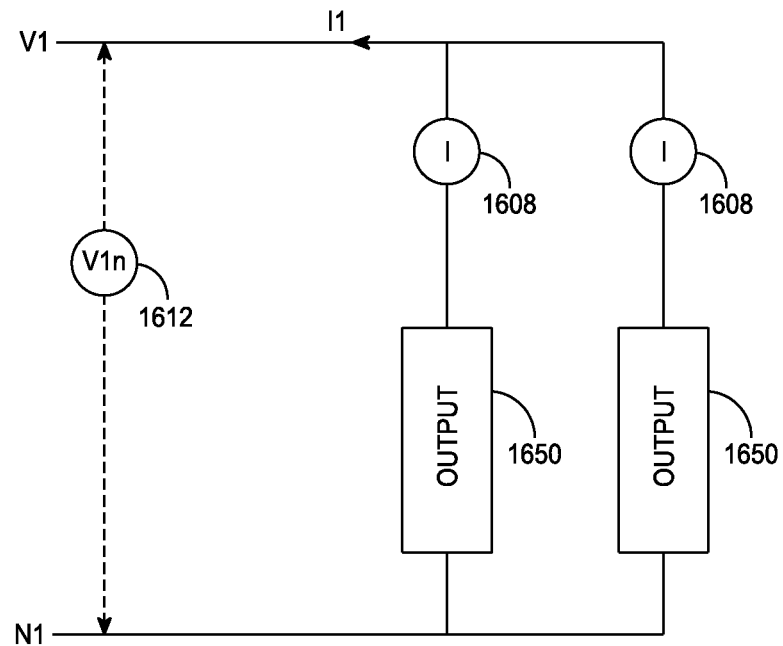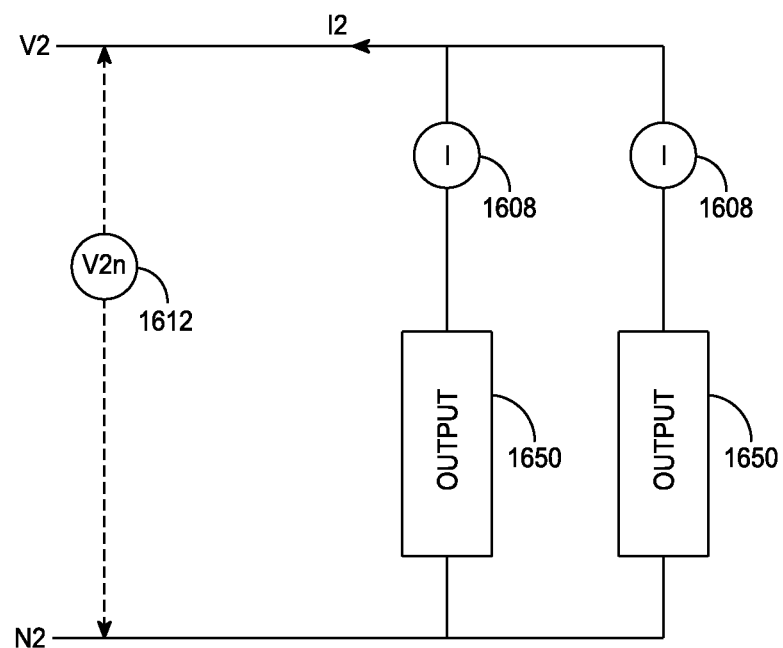
FIG. 22

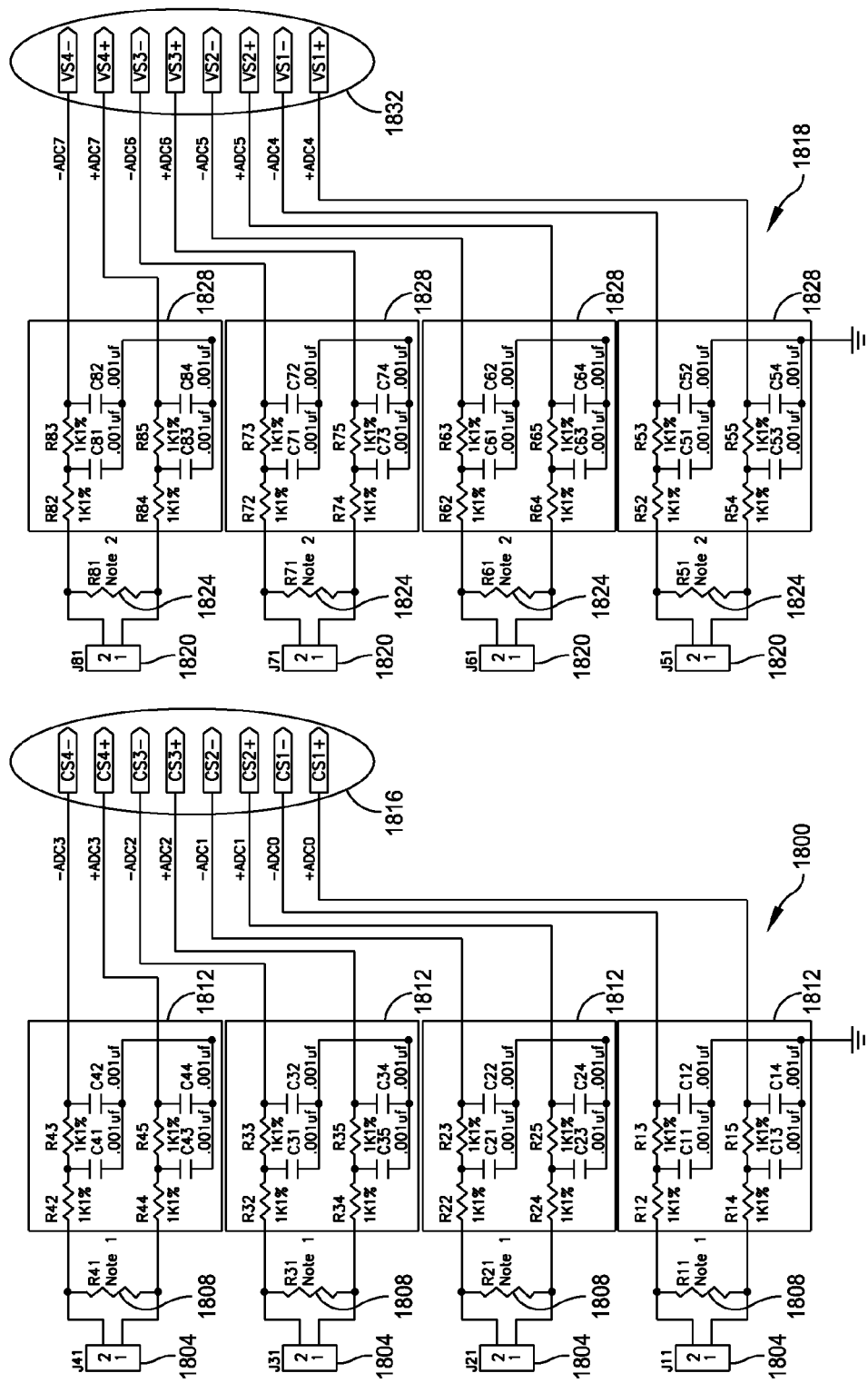

| User: admin | Views | CDU | ▸ Reports | ▸ Config | ▸ Help | ▸ | | Server Technology |
|---|---|---|---|---|---|---|---|---|
| Access Administrator | 66.214.208.132 ▾ | | | | | | | Solutions for the Data Center Equipment Cabinet |

| Status | | Environmental Monitor Name | | | |
|---|---|---|---|---|---|
| ⊗ Critical | 1 | Enviromental_Monitor_A | | | |
| ⚠ Warning | 3 | Sensor Name | Temp Status | Temperature | Humidity Status | Humidity |
| ? Unreachable | 0 | Temp_Humid_Sensor_A1 | Normal | 28.5 C | Humidity High Status | 23 % |
| ☑ Normal | 6 | Temp_Humid_Sensor_A2 | Normal | 27.0 C | Humidity High Status | 27 % |
| ⚙ Maintenance | 0 | | | | | |

Search

[CDU Name  ▾]

[ Search ]

[ Home View ]

[ Logout ]

Copyright 2008 Server Technology, Inc. All Rights Reserved. Patents Pending.     www.servertech.com 1.775.284.2000

| | | | | | |
|---|---|---|---|---|---|
| Enclosure Name | | | | | |
| testetest | | | | | |
| Infeed Name | Status | Load | Power | Voltage | |
| UPS123 | On | 3.38 A | 3.79W | 208.0 V | |
| Outlet Name | Status | Load | Power | Control State | Control Action |
| TowerA_InfeedA_Outlet1 | On | 1.81 A | 0 W | On | None ▼ |
| TowerA_InfeedA_Outlet2 | On | 0.00 A | 0 W | On | None ▼ |
| TowerA_InfeedA_Outlet3 | On | 0.00 A | 0 W | On | None ▼ |
| TowerA_InfeedA_Outlet4 | On | 0.00 A | 0 W | On | None ▼ |
| TowerA_InfeedA_Outlet5 | On | 0.00 A | 0 W | On | None ▼ |
| TowerA_InfeedA_Outlet6 | On | 0.00 A | 0 W | On | None ▼ |
| TowerA_InfeedA_Outlet7 | On | 0.00 A | 0 W | On | None ▼ |
| TowerA_InfeedA_Outlet8 | On | 0.00 A | 0 W | On | None ▼ |
| Infeed Name | Status | Load | Power | Voltage | |
| TESTRJF | On | 3.25 A | 0 W | 208.0 V | Power 390 W |
| Outlet Name | Status | Load | Power | Control State | Control Action |
| TESTRJF | On | 0.00 A | 0 W | On | None ▼ |
| TowerA_InfeedB_Outlet2 | On | 1.72 A | 357 W | On | None On Off Reboot |
| TowerB_InfeedA_Outlet3b | On | 0.00 A | 0 W | On | |

Sentry : POPS Switched CDU
Access, Security and Communications

POPS Switched CDU
Intergral Web Interface
The Sentry POPS CDU is capable of being accessed through either a secure network or serial connection. The secure integral web interface provides a simple and easy way to configure the CDU. Configuration choices include, SNMP traps, email alerts, grouping, and all security and communication settings.

Features
- Simple, secure, integral web interface GUI configuration tool
- Temperature and Humidity Support
- Authentication logging, configuration changes and system events
- Secure Syslog protocol support
- Email notifications of log, event, authentication, power and configuration messages
- Automatic Firmware Updates via FTP server
- Strong Password Support and Pre-Login Banner
- Ability to Ping and IP address to see if the device is reponding
- Grouping of outlets across multiple CDU's
- SNMP: Traps based on Status, Changes, Load, Temperature and Humidity
- Supports 104 user accounts and 18 simultaneous logins with a dedicated SNMP connection

Communication Tools
- Web Interface
- SNMP & RS-232 access
- 10/100 Base T-Ethernet
- SMTP/Email
- Telnet
- SSL
- SSH
- SSLv3/TLSv1
- SNMPv2
- TACACS+
- LDAP
- LDAPS
- RADIUS
- DHCP
- Syslog

Power Information & Management
Internal We Interface

Outlet Control Power Monitoring
- Individual Outlet Control
- Current Load Monitoring
- Power Monitoring
- Additional Details

Grouped Outlets Power Information
- Device (Multiple Outlets)
- Group of Devices (Application)
- Cabinet (single IP address using master-expansion configuration for two CDU)
- Individual CDU

Per CDU Power Information
- Current Load
- Infeed Voltage (VAC)
- Input Feed Watts (W)
- System Total Watts (W)
- System Footprint (SqFt or SqM)
- System Watts (W per SqFt and/or Meter)

Sentry POPS™ (Per Outlet Power Sensing)
- Current Load (A)
- Voltage (V)
- Power (W)
- Apparent Power (VA)
- Crest Factor
- Power Factor

FIG. 72A

Sentry : Pops Switched CDU
Sentry POPS™ (Per Outlet Power Sensing)

Sentry Power Manager
Manage Multiple CDU's Across Multiple Locations
Do you have multiple Sentry CDU's in one or more locations that you would like to across from one central point? Would you like one central location where all alarms can be viewed and logged for reporting, email or SNMP trap notifications? No problem!

Features
> Email notification via the CDU to multiple recipients when an event occurs
> SNMP traps via the CDU when an event occurs
> Auto-discovers each CDU for easy configuration
> Easily create a user interface that mirrors the physical deployment of the data center
> Quickly drill down from a global perspective to the rack's actual physical location if there is a problem (Quickly identify the alarm and the physical location of the CDU)
> Create outlet clusters to group outlets, across linked CDU's or across enterprse locations

Multiple Reporting Options
> Reporting capabilities to produce reports on critical management parameters such a temperature, humidity and current load
> Reports on Current and Power providing the power consumption of each input, total for the rack, and/or per square feet or meters of the rack

On-Demand Accessibility
> Real-time view of active system alarms
> Anytime, anywhere web-based views
> Manage thousands of CDU's from a single console

Compatibility
> Sentry CDU's with firmware 5.3x+

Web Browsers Supported
> Internet Explorer 6.0+
> Firefox 1.5+
> Opera 9.0+
> Safari 2.0+

Supported Databases:
> SQL Server 2005
> SQL Server 2005 Express 5.3+

Home Page
> Multiple Views per Status, Power, Temperature, Humidity and Capacity
> Alarm Status
> Search Box

Views
> Environmental, Power & Capacity Information
> Power Density
> Status

Trends
> Period: 24-hours to 3 years
> Power, Temperature & Humidity
> Select up to 10 items

Alarm Details
> Overview and Detailed Alarm Information
> CDU to Maintenance Mode
> View and Control CDU

FIG. 74A

POWER DISTRIBUTION APPARATUS WITH INPUT AND OUTPUT POWER SENSING AND METHOD OF USE

CROSS-REFERENCE

This application is a divisional of U.S. patent application Ser. No. 12/824,059, filed 25 Jun. 2010, now U.S. Pat. No. 8,305,737, titled POWER DISTRIBUTION APPARATUS WITH INPUT AND OUTPUT POWER SENSING AND METHOD OF USE, which is a non-provisional of U.S. Application Ser. No. 61/220,542, filed 25 Jun. 2009, titled POWER DISTRIBUTION APPARATUS WITH INPUT AND/OR OUTPUT POWER SENSING, AND METHODS OF USE, the entire contents of which are incorporated herein by reference.

FIELD

The present disclosure is directed to power distribution systems and technologies, and in certain more particular applications to a power distribution system for distributing power in a rack or cabinet environment and having a capability to monitor one or more power related metrics.

BACKGROUND

Power monitoring and metering have long been used in some applications to provide any of a number of items of information to different entities that supply, deliver, and consume power. One common use of such information may be used to determine energy consumption for purposes of billing a user for the power received by that user. One area that is continuing to increase in the amount of power consumption is related to computing facilities that are continuing to house more and more equipment, often referred to as server farms or data centers. Such facilities often have numerous individual pieces of computing equipment that are arranged in racks. Power distribution units have long been utilized to supply power to electronic equipment in such facilities (as well as racks and equipment in many other facilities as well). A conventional power-distribution unit (PDU) is an assembly of multiple electrical "outlets" (also called "receptacles") that receive electrical power from a source and distribute the electrical power via the outlets to one or more separate pieces of electronic having respective power cords plugged into respective outlets of the PDU. PDUs can also have power cords hard wired to a power source instead of, or in addition to, outlets. PDUs can be used in any of various applications and settings such as, for example, in or on electronic equipment racks, among other applications. A PDU located in a cabinet may be connected to other PDUs or to other devices such as environmental monitors, for example temperature and humidity sensors, fuse modules, communications modules, and the like. Such a PDU and any other PDUs and other devices to which it is connected are commonly enclosed within an equipment rack or equipment cabinet and may be collectively referred to as a Cabinet Power Distribution Unit (CDU).

As mentioned, computing facilities generally include electronic equipment racks, such as standard RETMA racks, that commonly comprise rectangular or box-shaped housings sometimes referred to as a cabinet or a rack and associated components for mounting equipment, associated communications cables, and associated power distribution cables. Electronic equipment is commonly mountable in such racks so that the various electronic devices are aligned vertically one on top of the other in the rack. Often, multiple such racks are oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

In many cases, computing facilities such as server farms or data centers support large networks, referred to as enterprise networks. Enterprise networks exist to support large world-wide organizations and depend on a combination of technologies, e.g., data communications, inter-networking equipment (frame relay controllers, asynchronous transfer mode (ATM) switches, routers, integrated services digital network (ISDN) controllers, application servers), and network management application software. Such enterprise networks can be used to support a large company's branch offices or campuses throughout the world, and, as such, these networks have become mission critical to the functioning of such organizations. Masses of information are routinely expected to be exchanged, and such information exchanges are necessary to carry on the daily business of modern organizations. For example, some international banks have thousands of branch offices placed throughout Europe, Asia and North America that each critically depend on their ability to communicate banking transactions quickly and efficiently with one another and with their respective headquarters.

A typical enterprise network uses building blocks of router and frame relay network appliances mounted in equipment racks. Such equipment racks are distributed to remote point of presence (POP) locations in the particular network. Each equipment rack can include frame relay controllers, routers, ISDN controllers, servers and modems, etc., each of which are connected to one or more power sources. The value of POP equipment is often very substantial, and the number of individual devices can exceed several thousand.

As mentioned, a relatively large number of equipment racks are commonly located in one or more data centers, and may act as hubs for data communications for an enterprise. Additionally, an increasingly common practice is for multiple enterprises to use a computing facility for all or a part of the enterprise computing requirements, such as through the use of a co-location facility. Conventional network management technologies provide relatively little information related to electrical power consumption in a data center or to status of a data center and of equipment racks within such a data center and of components associated with such equipment racks. Energy consumption of data centers can be a source of significant costs for an enterprise, and increasing energy efficiency of data centers could provide a significant cost savings for an enterprise. Furthermore, the ability to accurately measure power provided to identified racks and components within a data center can enable the operator of a data center to accurately bill costs associated with a particular rack or component.

SUMMARY OF CERTAIN ASPECTS

In various embodiments, systems and methods are provided that sense and output information related to the current and voltage that are present at the power input(s) to a PDU/CDU. The current and voltage information may be used to provide a number of measurements, referred to as power metrics. In some embodiments, these metrics may include one or more among aggregate power consumed components that receive power from the PDU/CDU and power consumed by the PDU/CDU itself, power factor, crest factor, true RMS current and voltage measurements, active power, apparent power, and energy consumption.

One or more such, or other, metrics may be used for any of a number of purposes, among them one or more of the following:
   analysis and actions that enhance the efficiency of an enterprise network, a data center, and components in the data center;
   providing information related to managing assets in a computing network;
   accurately tracking and billing energy used by assets;
   identifying components that are receiving or providing power in an anomalous manner indicative of an actual or potential malfunction;
   locating a server that has become comatose (not doing anything useful); and
   identifying cabinets that are underutilized. A user may elect to idle all components in an underutilized cabinet and any associated cooling equipment as well, cutting energy usage.

Some embodiments of the present disclosure may provide, alone or in combination, one or more advantages over traditional PDUs. In certain embodiments, a PDU can have capability to measure and report various metrics related to power that is supplied to one or more power in-feeds to a PDU and one or more power outputs from the PDU. Such power metrics may be used to determine one or more efficiency calculations to identify efficiency of power usage in a data center, for example.

In some embodiments, power metrics may also be used to provide information for particular groups of equipment, particular cabinets, particular groups of cabinets, and the like. Such information may be used for evaluating equipment configurations, billing for power usage, providing trend information, and providing power efficiency information, to name but a few examples.

Some embodiments of the disclosure may provide a relatively accurate energy accumulation scheme for one or more inputs associated with a single power monitoring and metering circuit. Certain embodiments may sample voltage and current, such as at an ADC for example, for an AC cycle, and in this regard in some embodiments both voltage and current are sampled nearly simultaneously for an output.

In some embodiments, the product of each of the samples can be summed over the AC cycle. An AC cycle may be sampled at a known frequency, such as once every 24 cycles for a particular power output. Such sampled cycles may be scaled and accumulated over a time period to provide an accurate energy measurement (watt-hours) for each input.

Some embodiments may provide an accurate energy accumulation scheme for one or more inputs and one or more outputs. Certain embodiments sample voltage and current from both the input(s) and output(s), such as at an ADC for example, for an AC cycle, and in this regard in some embodiments both voltage and current are sampled nearly simultaneously for an output. In some embodiments, the product of each of the samples can be summed over the AC cycle. An AC cycle may be sampled at a known frequency, such as once every 24 cycles for a particular power output. Such sampled cycles may be scaled and accumulated over a time period to provide an accurate energy measurement (watt-hours) for each input and output. Providing input power information in conjunction with power information for each output of a PDU may provide additional information related to the efficiency of a system, and may provide power information for a group of equipment receiving power from a PDU with enhanced accuracy as compared to simply summing power from each output.

Some embodiments may have switched output capabilities and if desired provide output switching at or near power zero-crossings in the AC power cycle or at least likely below the a power peak in the AC power cycle. In some embodiments, for example, the AC waveforms provided to an output are sampled and at or near the point of current and voltage zero-crossings, outputs may be switched at or near zero-crossings. In embodiments that use relays for switching outputs, such at or near zero-crossing switching can be, in some applications, less stressful on the relay and the relay points. In certain applications, this may result in increased component lifetime and reduced in-rush current into the component that receives power from the respective output to possibly also reduce stress on that component.

Some embodiments of the disclosure provide a modular construction of an outlet assembly with options to provide one or more of: (a) input power monitoring capability; (b) output power monitoring capability; and (c) switched outputs or non-switched outputs. In some embodiments, also provided is a PDU with the ability to determine if lack of power at an outlet is the result of loss of input power or a blown fuse.

In some embodiments, the systems may identify when a power distribution unit, has abnormal current or voltage characteristics. Such identification may provide an indication of a potential failure of some component associated with the PDU. In some embodiments, current and voltage information are collected for a PDU and compared against model or historical information. In the event that an anomalous event is detected, a message may be transmitted indicating the same such that an investigation or corrective action may be taken.

In some embodiments, information provided by PDUs/CDUs may be used by an organization to take action such as, for example, corrective action, improving the efficiency of operations, providing power metrics for specific cabinets or groups of cabinets, providing more accurate billing for energy usage, and identifying equipment that may be a candidate for consolidating operations. In some embodiments, corrective action may be taken such as in the event that a CDU/PDU generates a warning that the current or voltage waveforms of, for example, a power supply have a significant deviation from a historical or model waveform. In some embodiments, such deviations may indicate the power supply is malfunctioning and corrective action can be taken. In some embodiments, power metrics may be used to evaluate the operation of items of equipment and groups of equipment to identify areas where efficiency can be enhanced, for example. Similarly, power metrics may be used to determine energy usage, and provide billing for separate entities that use a data center, for example.

It is to be understood that the foregoing is a brief description of some aspects of some exemplary embodiments. It is therefore also to be understood that the scope of the invention is to be determined by the claims as issued and not by whether given subject matter includes any or all such aspects, features, or advantages or addresses any or all of the issues noted in this Summary or the Background above.

In addition, there are other advantages and varying novel features and aspects of differing embodiments. The foregoing and other features and advantages will become more apparent from the following detailed description, which proceeds with reference to the accompanying figures.

BRIEF DESCRIPTION OF THE DRAWINGS

FIGS. 23-25 are a schematic diagram of a power monitoring circuit.

DETAILED DESCRIPTION

Several embodiments including the preferred embodiments and currently known best mode of the present invention are shown in the following description and accompanying drawings. Exemplary embodiments of power distribution, monitoring, and management systems are described herein. Embodiments of such systems include a power distribution plugstrip, power distribution unit (PDU), and cabinet distribution unit (CDU) with power determination and monitoring capability. The present disclosure provides exemplary embodiments with capability to determine the power being delivered to a power distribution apparatus, and to determine the power being delivered from the power distribution apparatus to one or more electrical loads can enable efficient determination of power usage for various different components that are associated with a facility, and therefore provide ability to manage power to the various different components. In many cases, numerous PDUs and CDUs may be located in a facility, with each supplying power to several different electrical loads. Knowledge of power being delivered to various equipment in a facility may be used to evaluate, improve, and manage power consumption in a facility and across multiple facilities, such as data centers.

Such management of power may improve efficiency of power consumption at data centers as measured by one or more power usage metrics. One available measure of power usage efficiency for data centers is provided through metrics known as Power Usage Effectiveness (PUE) and Data Center Efficiency (DCIE). Such metrics enable data center operators to estimate the energy efficiency of their data centers, compare the results against other data centers, and determine if any energy efficiency improvements may be desirable.

Data center power and cooling are two significant issues facing IT organizations, and many entities desire to control these costs while enabling future expansion. With more energy efficient data centers, enterprises and IT organizations can better manage increased computing, network, and storage demands, lower energy costs, and reduce total cost of ownership (TCO).

Figure 1:
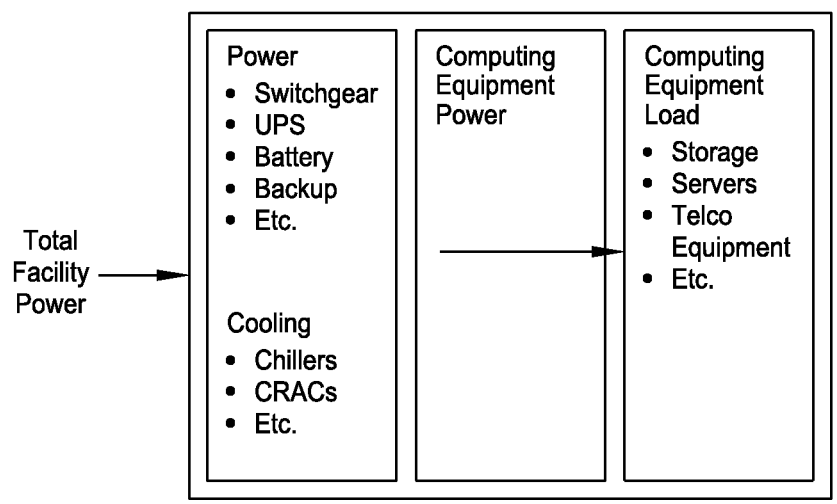
FIG. 1 is a conceptual depiction of power needs in a computing facility.

As mentioned above, metrics may be used to determine information related to data center power usage, including PUE and DCIE. Both of these metrics provide a relationship between equipment power and total facility power. Total facility power is used to refer to the total power that is consumed by a data center. In the event that a data center is housed in a building that houses other functions addition to a data center or that houses more than one data center, the total facility power is the power that is used by the data center that is of interest rather than the power consumed by other uses than the data center of interest. FIG. 1 illustrates computing equipment that may contribute to total facility power. The PUE is defined as follows:

$$PUE = (Total\ Facility\ Power)/(Computing\ Equipment\ Power)$$

The DCIE is the reciprocal of the PUE, and is defines as follows:

$$DCIE = (Computing\ Equipment\ Power)/(Total\ Facility\ Power)$$

With continuing reference to FIG. 1, the computing equipment power is the power required to operate the data center equipment that is used to manage, process, store and route data within a data center. This includes the load associated with equipment, such as computer, storage. and network equipment, along with supplemental equipment such as KVM switches, monitors, and workstations used to monitor or otherwise control the data center. Total facility power is used to refer to everything that supports the data center equipment load such as power delivery components, cooling system components, computer nodes, network nodes, and storage nodes, and other component loads such as data center lighting and other ancillary equipment. Power delivery components include various components, such as UPS, switch gear, generators, PDUs, batteries, and distribution losses external to the IT equipment. Cooling system components can also include various components such as chillers, computer room air conditioning units (CRACs), direct expansion air handler (DX) units, pumps, and cooling towers.

The PUE and DCIE metrics provide a way to determine opportunities to improve data center operational efficiency, how a particular data center compares with other data centers, and opportunities to repurpose energy for additional computing equipment, to name but a few. While both of these metrics are related, they can be used to illustrate the energy allocation in a data center differently. For example, if a PUE is determined to be 3.0, this indicates that the data center demand is three times greater than the energy necessary to power the computing equipment located within the data center. In addition, the ratio can be used as a multiplier for calculating the real impact of power demands. For example, if a server demands 500 watts and the PUE for the datacenter is 3.0, then the power from the utility grid needed to deliver 500 watts to the server is 1500 watts. The DCIE, in comparison, may provide a different aspect of this information, a DCIE value of 0.33 (equivalent to a PUE of 3.0) suggesting that the computing equipment consumes 33% of the power in the data center. As will be readily observed, PUE can range from 1.0 to infinity, with a PUE value of 1.0 indicating 100% efficiency (i.e., all power used by computing equipment only), and a large PUE indicating that computing equipment uses a relatively small amount of the total power entering the data center.

In FIG. 1, total facility power is measured at or near the facility utility meter(s) to accurately reflect the power entering the data center. This represents the total power (for which the utility charges) consumed in the data center. In order to obtain accurate and meaningful power information, the data center power is either measured or otherwise calculated because power not intended to be consumed in the data center would result in inaccurate PUE and DCIE metrics. For example, if a data center resides in an office building, total power drawn from the utility will be the sum of the total facility power for the data center and the total power consumed by the non-data center offices. In some situations, the total facility power for a particular data center is required to be estimated or measured in another manner than through a utility power meter. Computing equipment power should be measured after all power conversion, switching, and conditioning is completed, and before the computing equipment itself, in order to gain meaningful information. In various embodiments disclosed herein, power delivered to computing equipment is measured at the output of the computer room power distribution units (PDUs).

Within a data center, it also may be desirable to measure data center performance. One metric that may be used to measure data center performance is referred to as Data Center Performance Efficiency (DCPE). The DCPE is defined as:

DCPE=(Useful Work)/(Total Facility Power)

This metric effectively defines the data center as a box and a net amount of useful work is done by the box.

Additionally, additional granularity may be desired related to power usage within a data center. For example, a PUE metric may be broken down into the following: PUE=Cooling Load Factor (CLF)+Power-Load Factor (PLF)+1.0. All factors are ratios that are divided by the computing equipment load and 1.0 represents the normalized computing equipment load. Cooling Load Factor (CLF) is the total power consumed by chillers, cooling towers, computer room air conditioners (CRACs), pumps, etc., normalized by the computing equipment load. The Power Load Factor (PLF) is the total power dissipated by switch gear, uninterruptible power supplies (UPSs), power distribution units (PDUs), etc., normalized by the computing equipment Load.

Individual components may be measured in order to determine various information related to power efficiency metrics. In various embodiments described herein, equipment power is determined for various individual components, and this information provided to determine power usage related to that equipment. In various embodiments, a PDU is provided that senses and outputs the power used by various different components, including monitoring both the input power of the PDU and the power output to various components powered by the PDU. For example, to determine total computing equipment power (Power is (Volts×Amperes) or Watts) a PDU may measure Watts for each input cord to the PDU(s), or the input power at various subcomponents that provide power to one or more pieces of computing equipment. The sum of all the power output to pieces of equipment measures the total computing equipment power consumed by the computing equipment assuming all computing equipment assets are plugged into a PDU having the ability to measure power.

In other embodiments, an individual piece of computing equipment efficiency is determined according to MIPS/Watts. MIPS, as is well known, is Million Instructions Per Second, and is a measure of the speed of execution of a processor. Thus, a performance efficiency for a server, for example, may be measured and a cumulative efficiency calculated for all equipment in a data center. In embodiments that provide such metrics, each outlet measures power that is delivered from the outlet. The MIPS value may be read, for example, from the BIOS for the specific asset and provide a measure of performance efficiency. The sum of all the 'per outlet Watts' on a PDU may be used to measure the PDU's efficiency when compared to the input cord power to the PDU. In some embodiments, an individual piece of equipment may receive operating power from multiple power supplies. In such embodiments, the outlets that provide power to the piece of equipment are grouped with power from each outlet summed to provide the corresponding power measurement for the specific asset that is acquiring it power from multiple PDUs or multiple power supplies. Other embodiments provide the ability for an expense charge for the power consumed by each specific asset or assets associated with a particular cabinet, and each outlet, or cabinet power infeed, may record the amount of power used (Watts/hours) in the same manner as a utility meter.

Individual components may be measured in order to determine various types of information related to power efficiency metrics. In embodiments described herein, equipment power and related information is determined for various individual components, and this information provided to determine power usage related to that equipment. In some embodiments, a PDU is provided that senses and outputs the power used by various different components, including monitoring both the input power of the PDU and the power output to various components powered by the PDU. For example, to determine total computing equipment power (Power is (Volts×Amperes) or Watts) a PDU may measure Watts for each input cord to the PDU(s), or the input power at various subcomponents that provide power to one or more pieces of computing equipment. The sum of all the power output to pieces of equipment measures the total computing equipment power consumed by the computing equipment assuming all computing equipment assets are plugged into a PDU having the ability to measure power. In some embodiments, several metrics are calculated for each outlet in a PDU including voltage (true RMS Voltage), current (true RMS Current), active power (Watts), apparent power (VA), energy (Watt-hours), power factor (unitless), and crest factor (unitless). Each of these metrics may be used alone, or in combination with other of the metrics, to provide information related to components that are receiving power from the outputs of the PDU.

In other embodiments, the sum of all the 'per outlet Watts' on a PDU may be used to measure the PDU's efficiency when compared to the input cord power to the PDU. In some embodiments, an individual piece of equipment may receive operating power from multiple power supplies. In such embodiments, the outlets that provide power to the piece of equipment are grouped using an application external to the monitoring circuit, with metrics from each outlet in the group summed to provide the corresponding metrics for the specific asset that is acquiring it power from multiple PDUs/CDUs or multiple power supplies.

Figure 2:
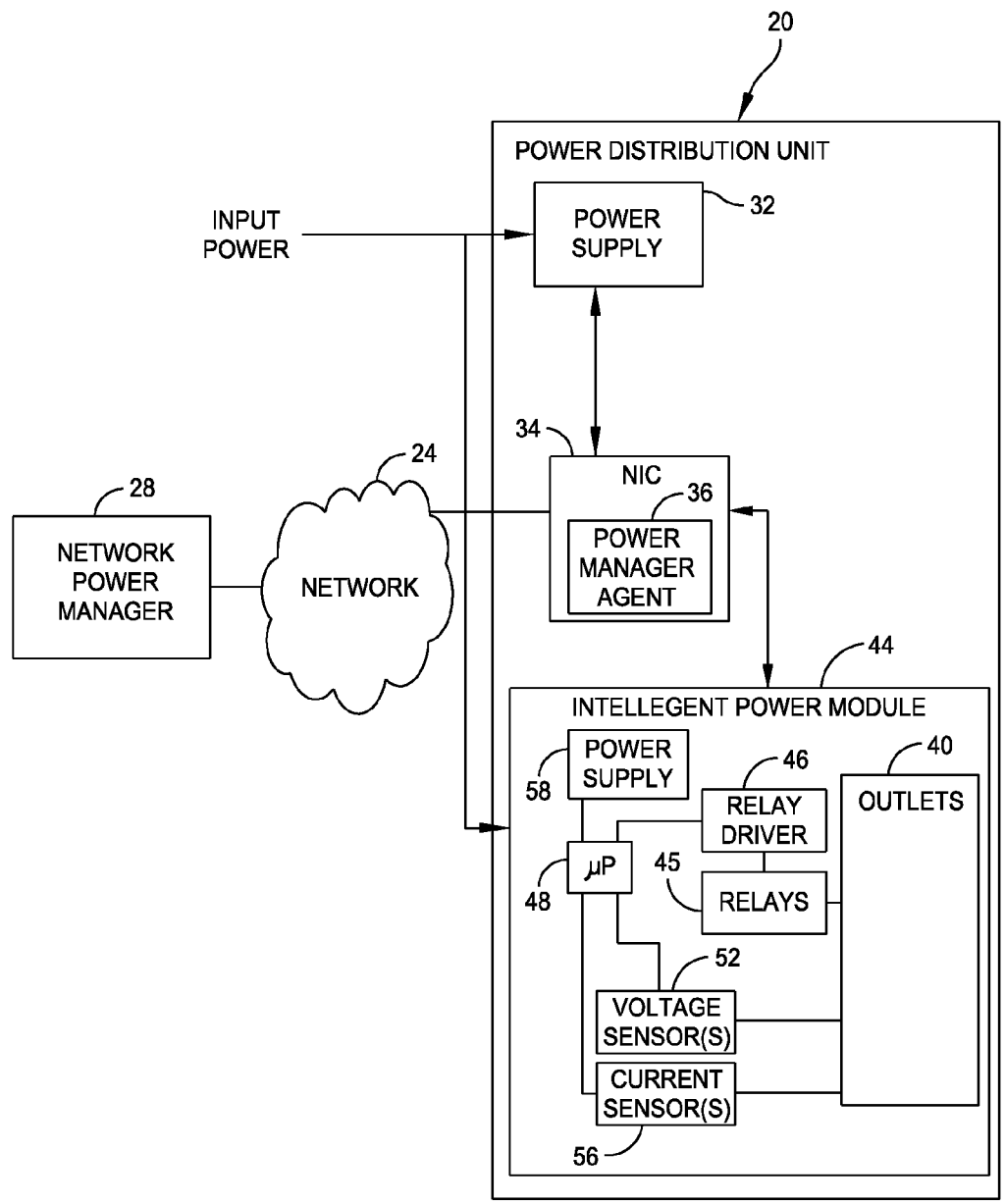
FIG. 2 is a block diagram of an embodiment of a power distribution unit.
Figure 2A:
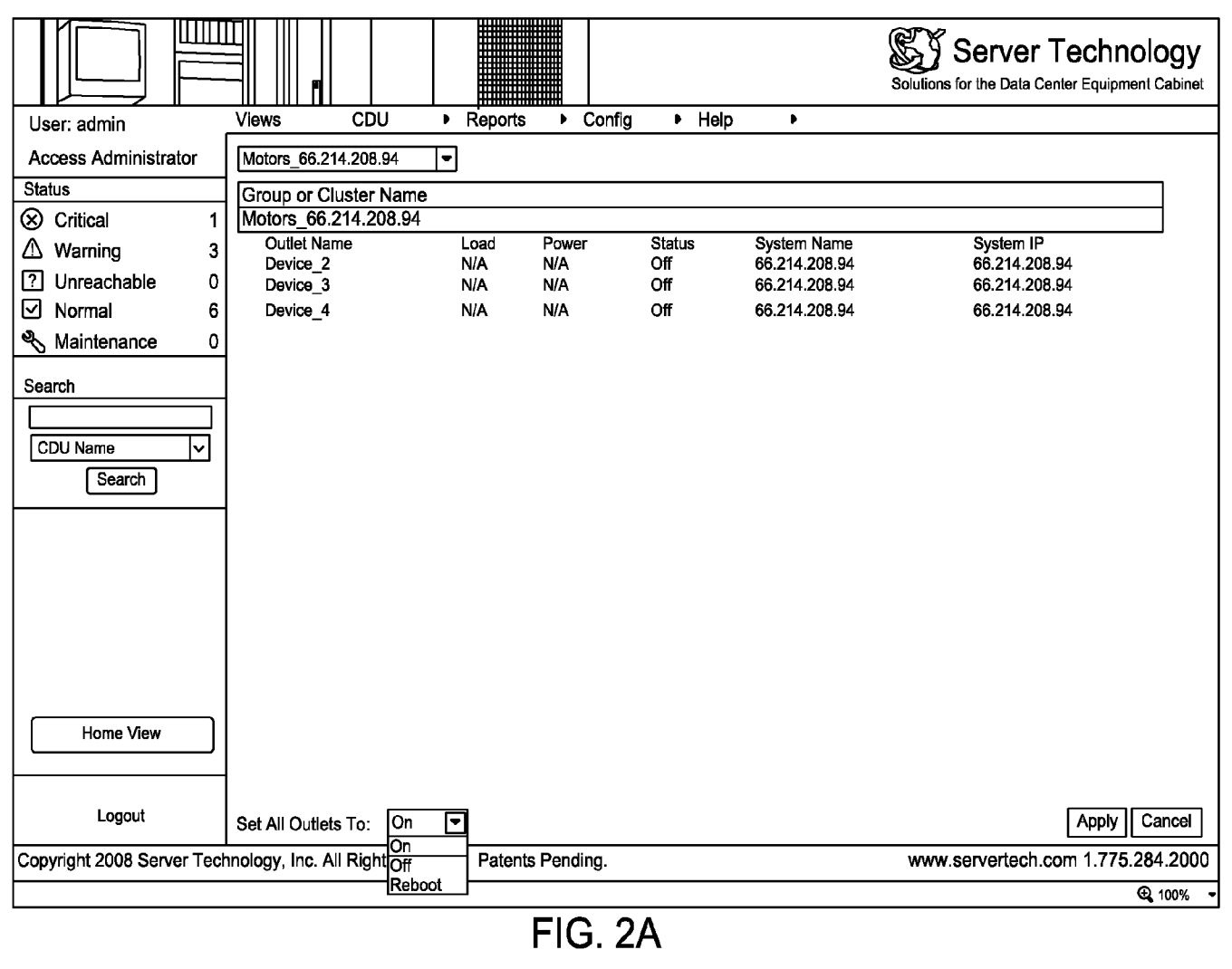

With reference now to FIG. 2, a block diagram of an exemplary system of an embodiment is now described. A power distribution unit (PDU) 20 supplies power to one or more associated computing assets. The PDU 20 may be a stand-alone device or incorporated with other components or modules to form a cabinet distribution unit (CDU) which includes, for example, fuse modules, environmental monitors, communications modules, other PDUs, etc. The PDU is useable in a computer network 24, and may communicate over the computer network 24 with a network power manager application 28. In cases where the PDU 20 is included in a CDU, communication with network power manager 28 is conducted through a communications module within the CDU. The network power manager 28 may reside in a workstation or other device that is used in the management of a data center or other enterprise management, and issues network commands over a network communications connection.

The PDU 20 of this embodiment includes a power supply 32, a network interface card (NIC) 34 that has application firmware and hardware that interfaces to network the PDU 20 with other modules within a CDU, and in this embodiment includes a power manager agent application 36. The PDU 20 includes a plurality of power outlets 40 arranged in a power distribution plugstrip within an intelligent power module (IPM) 44. The NIC 34, and power manager agent 36 are connected to the computer network 24. The intelligent power module 44 controls the application of power from the input power to a corresponding power outlet among the power outlets 40, and is in communication with the power manager agent application 36 to provide power and power cycling on-off for one or more of the corresponding power outlets, which may be accomplished through one or more relays 45 and associated relay driver 46. The IPM 44 receives input power, and provides power to one or more outlets 40 through the relays 45. The IPM 44 may also provide power state sensing and load-sensing with respect to the corresponding power outlet in response to one or more commands The IPM 44 in this embodiment includes a microprocessor 48 used to control the power applied to a corresponding power outlet. The microprocessor also is connected to a voltage sensing device 52 and a current sensing device 56 to sense the voltage and current at corresponding individual power outlet(s). The microprocessor 48 uses this information to determine the power supplied through an outlet, as will be described in more detail below. The microprocessor 48 also receives a power measurement from the input power supply 32 through an input voltage sensing device and an input current sensing device. In this embodiment, the IPM 44 also includes a power supply 58 used to provide DC operating power to components within the IPM 44.

The network power manager 28 of FIG. 2 communicates with the power manager agent 36 and IPM 44. In this embodiment, the network power manager 28 may receive information from, and provide instructions to power manager agent 36 which communicates with IPM 44. The network power manager 28 may also receive related power measurements from the IPM 44 (through power manager agent 36) and report power information related to the PDU 20, and related to one or more individual outlets (and thus power information for individual assets powered by the outlet) of the PDU 20.

Figure 3:
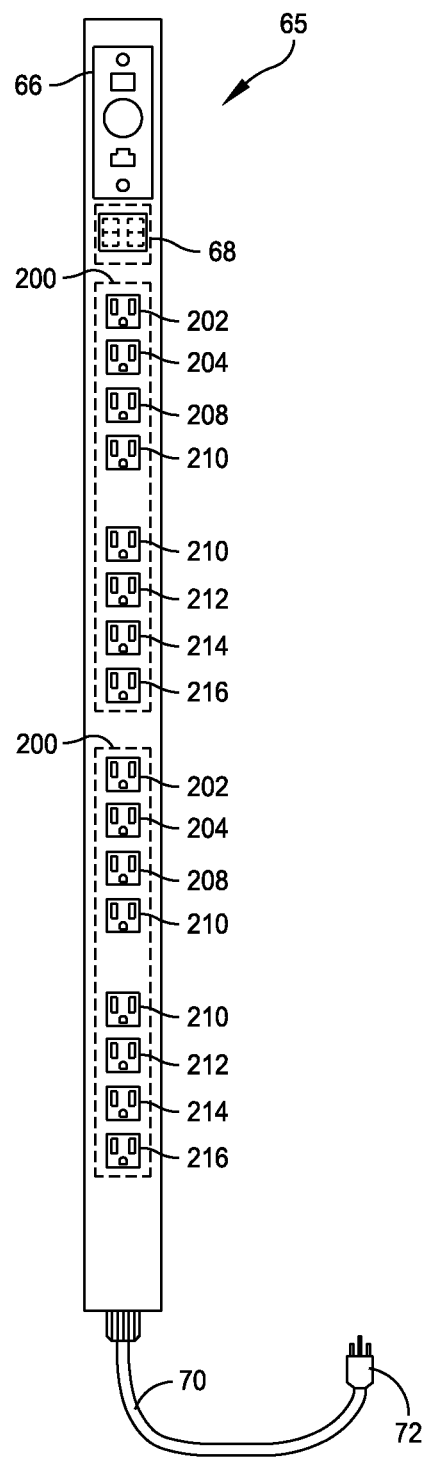
FIG. 3 is a front view of a CDU.
Figure 3A:
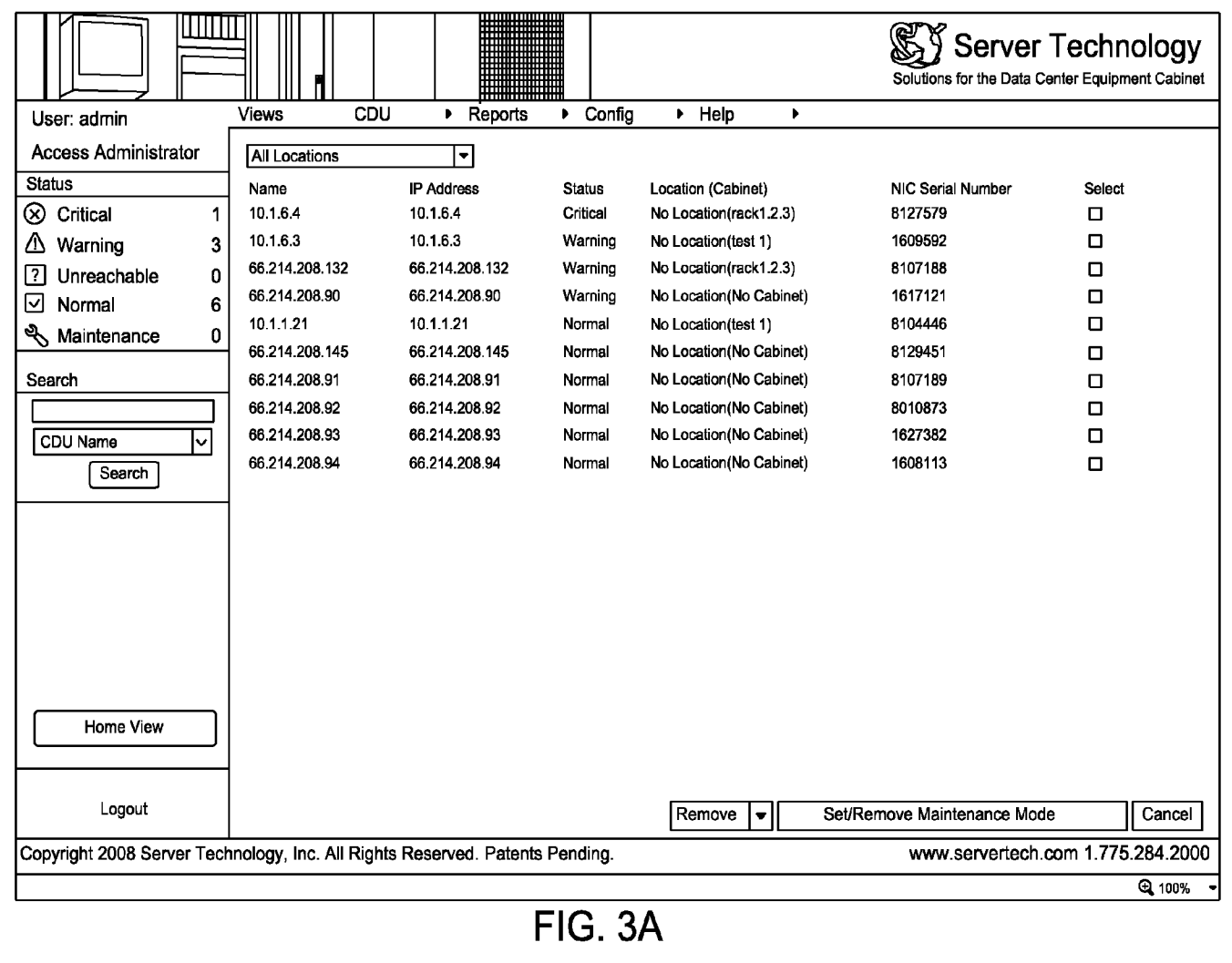

FIG. 3 is an illustration of a CDU 65 that includes plugstrips 200, along with a communications module 66 that provides communications functions, an environmental monitor 68, and an input power cord 70 with associated plug 72. The plugstrips 200 each include eight outlets 202-216 that supply power to assets that may be mounted into an equipment rack. Such equipment racks are well known, and often include several individual assets that are used in operation of a data center. The CDU 65, as illustrated in FIG. 3, is configured to be vertically mounted in an equipment rack, commonly at the rear of the rack adjacent to the rear side of electronic equipment mounted in the rack. As is well known, numerous equipment racks may be included in a data center, and in various embodiments each asset in each equipment rack may be monitored for power usage through one or more associated plugstrips 200.

Figure 4:
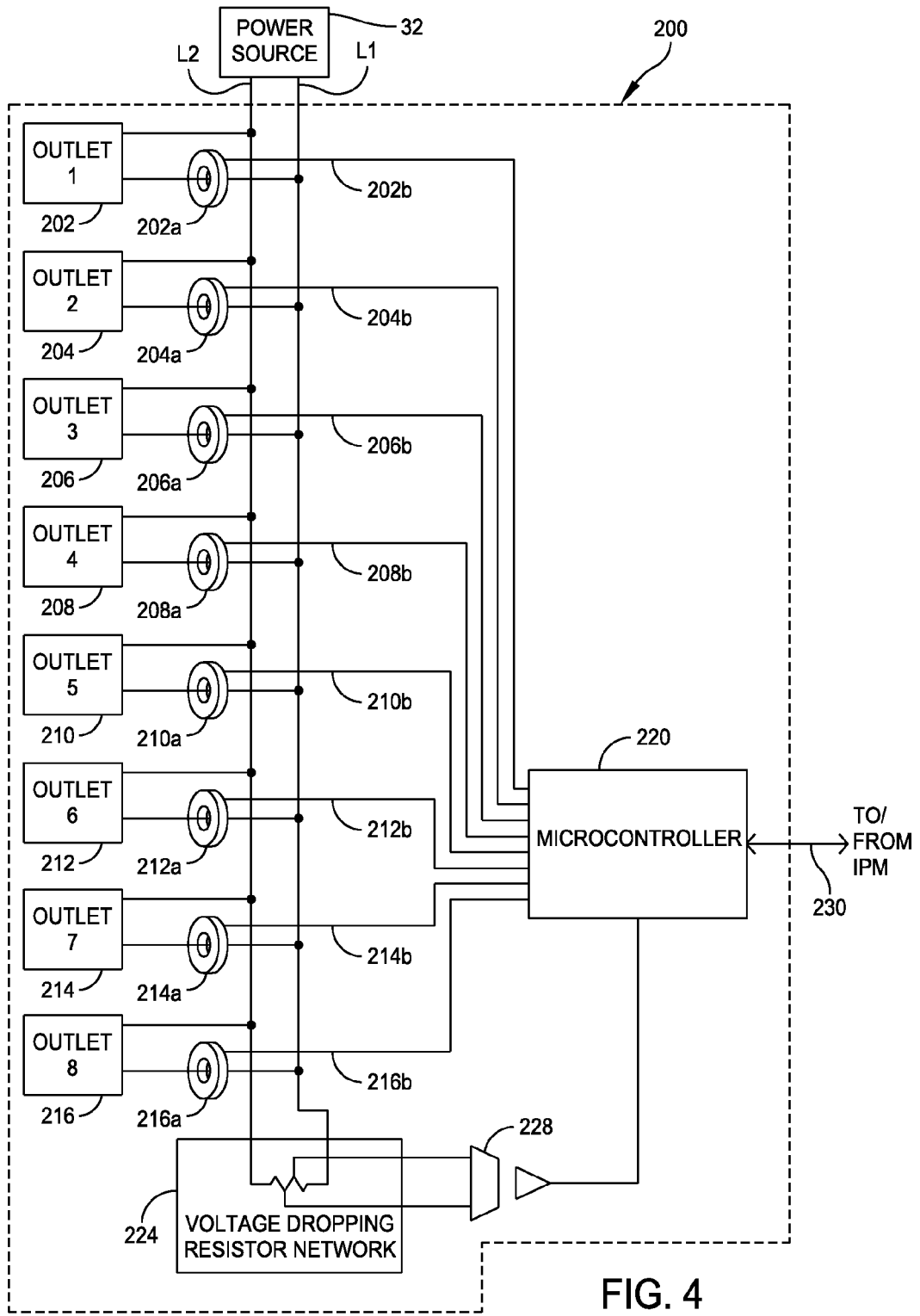
FIG. 4 is a block diagram of power reporting components.

With reference now to FIG. 4, a block diagram illustration of output power reporting components is now described for an exemplary embodiment. In this embodiment, the PDU includes a power outlet plugstrip 200, also referred to as a power outlet module 200, that includes eight power outlets, 202-216. Each outlet 202-216 is connected to power lines L1 and L2 and to power source 32. In this embodiment, the power line L1 is connected to line power in the power source 32, and the power line L2 is connected to neutral in the power source 32. However, in other embodiments the lines L1 and L2 may be interconnected to different phases of a polyphase power source. Each outlet 202-216 is also interconnected to a ground in the power source 32, although this connection from the outlets 202-216 is not illustrated in FIG. 4. In this embodiment, each outlet 202-216 has an associated toroidal current sense transformer 202a-216a that senses current flowing through the line L1 for each respective outlet 202-216. The line L1 interconnected to each outlet 202-216 is wired through the respective toroid 202a-216a. The toroidal transformers 202a-216a each have a current reporting line 202b-216b that provides instantaneous current information related to the respective toroidal transformer 202a-216a to microcontroller 220. Current information may be determined using other configurations, such as through the use of a shunt resistor, hall effect device, or other suitable current sensing device, as will be readily recognized by one of skill in the art. Such other configurations for determining the current provided to an outlet may be used in other embodiments. The microcontroller 220 receives this current information related to each respective outlet 202-216.

The power outlet module 200 also includes one or more line voltage detectors, each including a voltage dropping resistor network 224, and an opto-isolated operational amplifier 228 to provide an indication of instantaneous line voltage for the power source 32. Similarly as described above, the line voltage may be determined through various other configurations as will be readily recognized by one of skill in the art. The line voltage detector, for example, may include a voltage sense transformer that provides isolation and allows voltage to be determined based on the voltage across the transformer and the turns ratio of the transformer. Other embodiments may not provide isolation, instead achieving isolation from high-voltages in other manners. The microcontroller uses the current information related to each of the respective outlets 202-216, along with the line voltage to calculate the power metrics associated with each of the individual outlets 202-216. This information may be communicated to other components through communications link 230 through, for example, a communications bus.

In one embodiment, the power outlet module 200 includes eight outlets (202-216) each of NEMA 5-20R type, contained in a housing. It will be understood that this embodiment, and other embodiments described herein as having NEMA 5-20R type outlets, are exemplary only and that any of various other types of outlets alternatively can be used. For example, the "outlets" can be other NEMA types (e.g., NEMA 5-15R, NEMA 6-20R, NEMA 6-30R or NEMA 6-50R) or any of various IEC types (e.g., IEC C13). It also will be understood that all the "outlets" in a particular power outlet module 200, or other module-outlet described herein, need not be identical. It also will be understood that the "outlets" are not limited to three-prong receptacles; alternatively, one or more of the "outlets" can be configured for two or more than three prongs in the mating male connector. It also will be understood that the "outlets" are not limited to having female prong receptacles. In any "outlet," one or more of the "prong receptacles" can be male instead of female connection elements, as conditions or needs indicate. In general, as used herein, female and male "prong receptacles" are termed "power-connection elements." Furthermore, the principles described herein also are applicable to devices that may be hard-wired into an outlet module. While outlet module 200 of this embodiment includes eight outlets, it will be understood that this is but one example and that an outlet module may include a different number of outlets.

The housing for an outlet module may be any suitable housing for such a device, as is known to one of skill in the art, and may be assembled with other modules in a CDU. Such a housing generally includes a front portion and a rear portion, the front portion is substantially planar, and the rear portion is substantially planar and parallel to the front portion. The housing also includes longitudinally extending side portions and transverse end portions. The front portion, rear portion, side portions, and end portions are generally orthogonal to each other in a generally rectangular or box-type configuration. The housing can be made of any suitable, typically rigid, material, including, for example, a rigid polymeric ("plastic") material. In at least certain embodiments, the front and rear portions are made from an electrically insulative material. The side portions and the end portions may be integrally formed, optionally along with the front portion or the rear portion. Furthermore, while the outlet module described in this embodiment includes a housing, other embodiments may include an outlet module that does not include a housing. For example, an outlet module may include a number of outlets coupled together with no exterior housing that may then be installed into another piece of equipment.

Each outlet 202-216 is interconnected to the power source 32 through any of a number of well known connection schemes, such as spade, lug, plug connectors, screw connectors, or other suitable type of connector. Furthermore, if desired, one or more of these electrical connectors can be located inside the housing or outside the housing, in embodiments where the power outlet module includes a housing.

The microcontroller 220, in this embodiment, receives current information for each outlet 202-216, along with voltage information and calculates various power-related metrics for each outlet, with this information reported through the communications link 230. For example, the power per outlet is determined by multiplying the instantaneous voltage by the instantaneous current for a particular outlet, and integrating this product against time to give energy used (kilowatt hours, etc.) Examples of several metrics will be discussed in more detail below.

With reference now to FIGS. 5-9, schematic diagrams of an exemplary embodiment are now discussed. In this embodiment, various different components of an outlet module may be assembled onto separate circuit boards that are then assembled into a power outlet module of CDU. In such a manner, component boards may be assembled to include features that are ordered by a particular customer or user of a PDU in which the outlet module will be used. Furthermore, a user or customer may desire some, but not all, of the outlets in a PDU to have the capability of reporting power usage related to individual outlets, and thus different outlet modules, or subsets of outlets in a outlet module, may be assembled with the additional component boards to provide such capability. Similarly, in the embodiment of FIGS. 5-9, each outlet in the outlet module may be individually switched on or off through a sentry poer manager. However, other embodiments do not provide such switching capability, and the components described with respect to switching outlets would therefore not be included in such embodiments, replaced instead with simple pass-through components.

Figure 5:
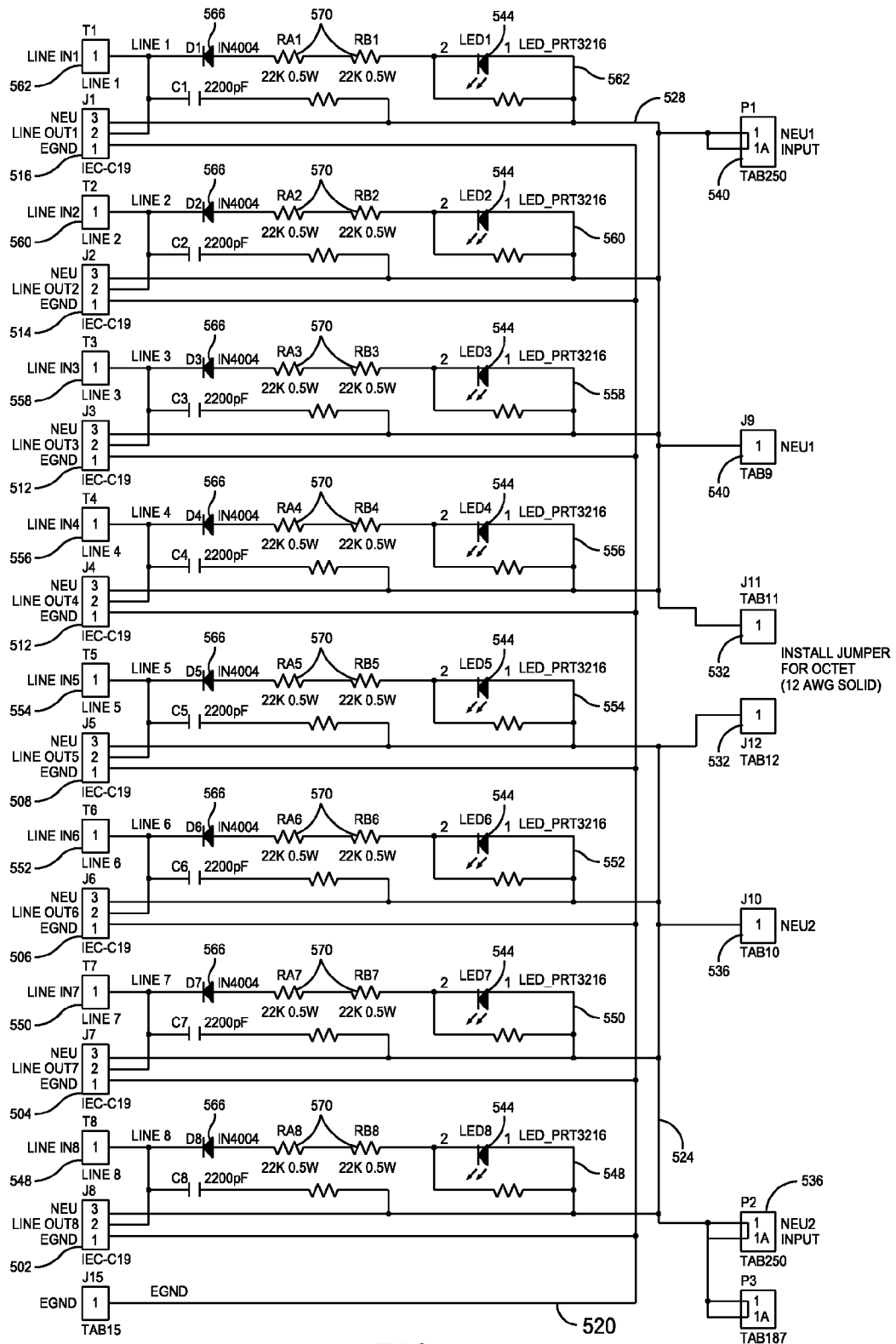
FIG. 5 is a schematic diagram of an outlet circuit.
Figure 5A:
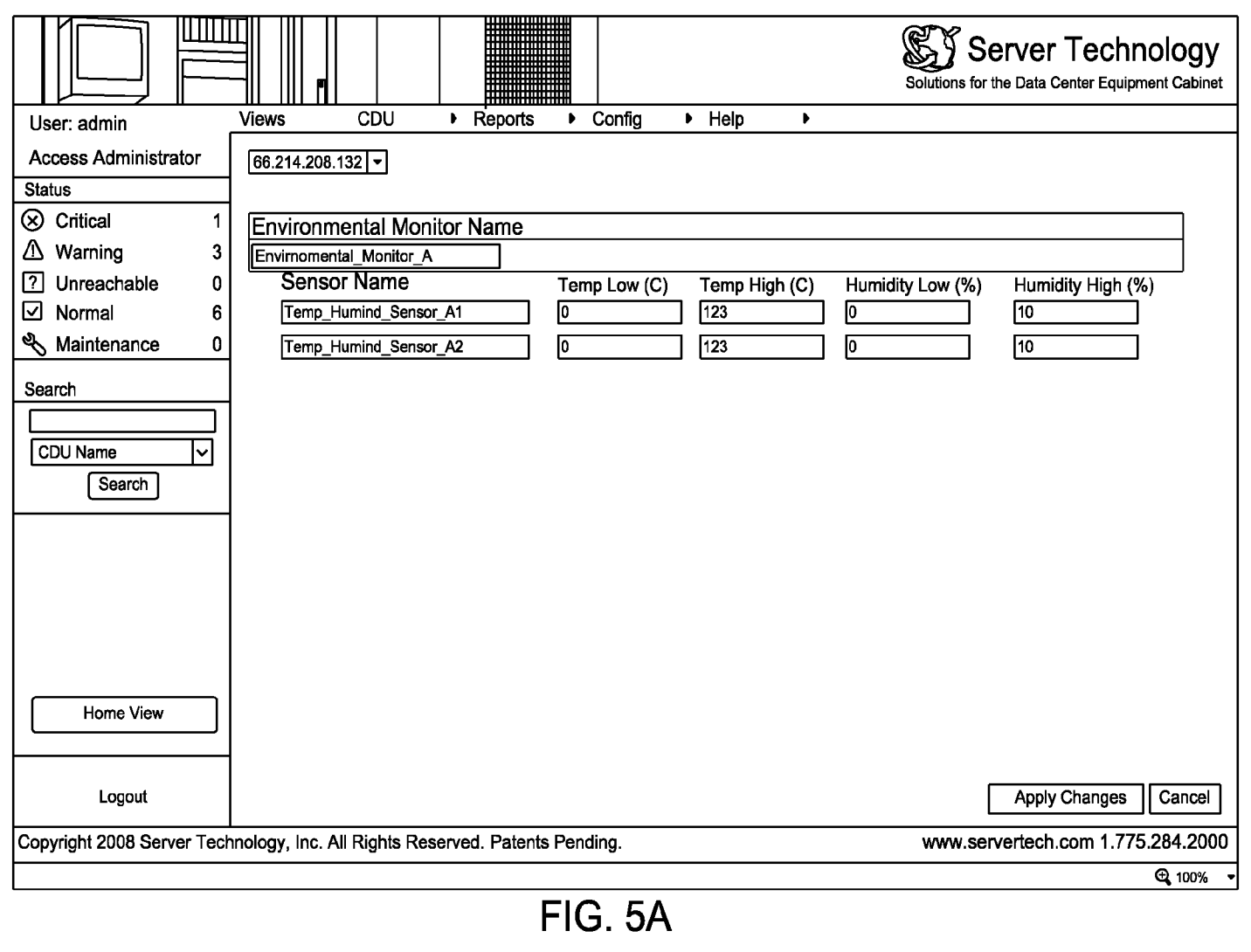

In this embodiment, an outlet module includes eight (8) individual outlets, that are organized into logical groups of four outlets each. Illustrated in FIG. 5 is a schematic illustration of an outlet circuit 500 for such an embodiment. In this embodiment, eight outlets 502-516 are assembled to be included in an outlet module. In this embodiment, outlet 502 and 516 are IEC-C19 type connectors, and outlets 504-514 are each IEC-C13 type connectors, although it will be readily recognized that outlets may be any suitable outlet type as required for a particular application. The outlet circuit 500 includes a ground input 520 that is electrically connected to a ground connection in each respective outlet 502-516. A neutral line may be electrically connected to each outlet 502-508 through a neutral input 524 that is provided for the four outlets 502-508, with a neutral line electrically connected to each outlet 510-516 through a second neutral input 528. Alternatively, if all eight outlets 502-516 are to be connected to a single power source, the neutral line for each set of four outlets may be connected through jumper connection 532, with neutral inputs 536, 540 provided to electrically connect the neutral for each outlet 502-516. As will be readily understood, a line voltage may be provided in place of a neutral connection in applications requiring higher voltages for the outlets 502-516.

With continuing reference to FIG. 5, this embodiment provides a visual indicator at each outlet 502-516 that power is present at the outlet 502-516. The visual indicator is provided through a LED 544 that is interconnected between line power and neutral for each outlet 502-516. Line power for each outlet 502-516, in this embodiment, is provided through line inputs 548-562. Each line input 548-562 may be connected through a switch to line power from a power source, as will be described in more detail below. In such a manner, when a respective switch is configured to supply power to an outlet 502-516, the LED 544 associated with the outlet 502-516 will illuminate, thus providing a true visual indicator that power is being provided to a particular outlet 502-516. The LED 544, in this embodiment, is electrically connected between the line input and neutral through current limiting resistors 570 and diode 566. In other embodiments, such a visual indicator may not be desired, and in such embodiments the components related to the visual indicator may be omitted. As mentioned, line power is provided through separate line inputs 548-562 for each respective outlet 502-516. In some embodiments, the line inputs 548-562 are electrically connected to switches to provide switched electrical outputs 502-516, and in other embodiments some or all of the line inputs 548-562 may be connected in an unswitched configuration to a line power input to provide unswitched outputs.

Figure 6:
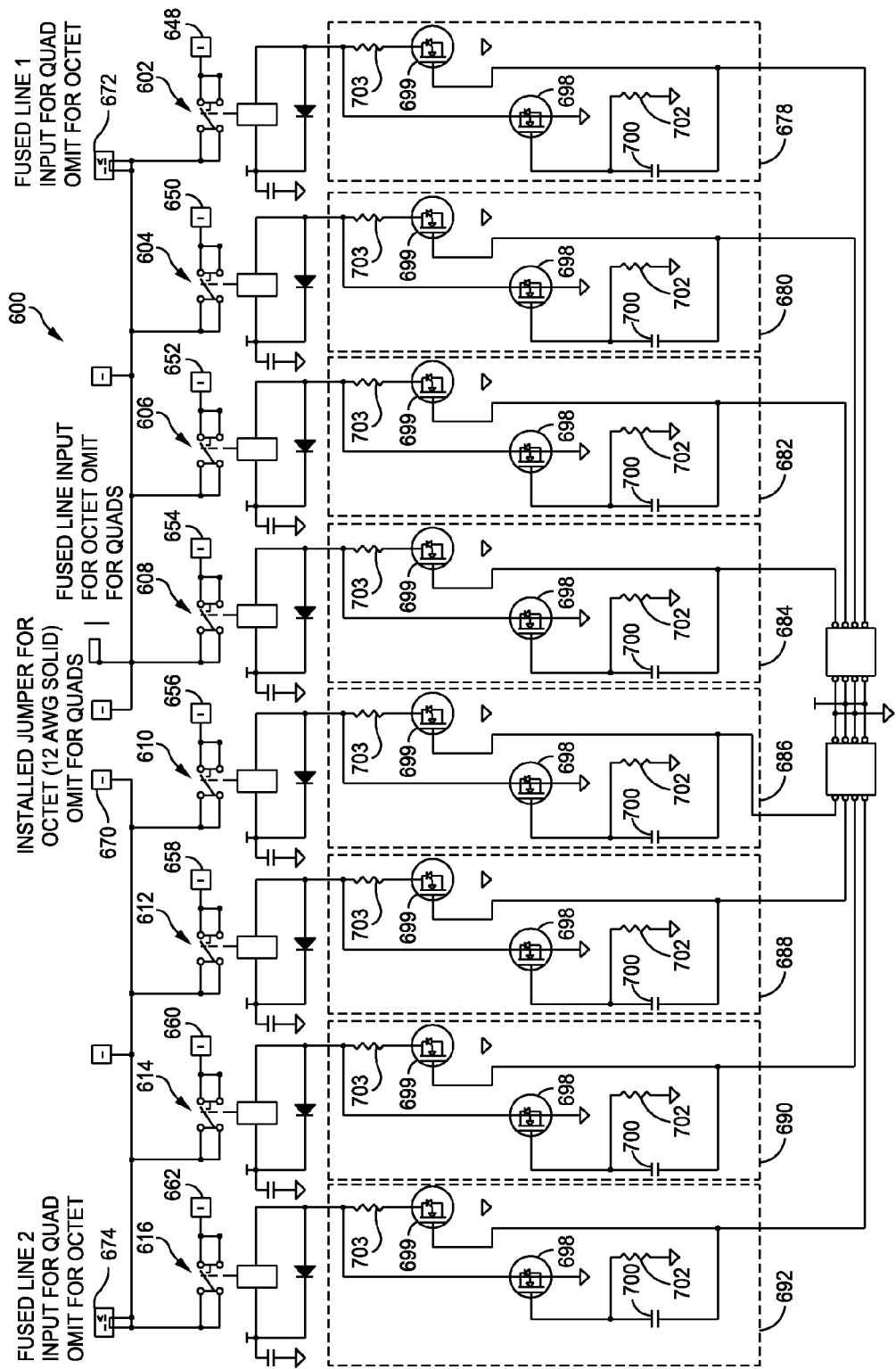
FIG. 6 is a schematic diagram of a relay circuit.

As mentioned, in some embodiments switched outputs are provided. With reference now to FIG. 6, provided in this embodiment is a relay circuit 600. The relay circuit 600 may be provided on a separate printed circuit board that is configured to couple with the outlet circuit 500. In such a manner, if switched outlets are required for an outlet module, the relay circuit may be assembled with the outlet module to provide such functionality. When switched outputs are not provided, this circuit board may be replaced with a simple pass-through circuit board having the same connections to other circuit boards, simplifying assembly and manufacturing of such power outlet modules. The relay circuit 600 includes relays 602-616 that provide line power to each outlet 502-516, respectively. The output of each relay 602-616 is provided to line power outputs 648-662 that, when coupled to outlet circuit 500, are connected to line inputs 548-562, respectively. Line power is provided to the relay circuit 600 through jumpered line power input 670 when all eight outlets 502-516 receive power form one line power input, and through power inputs 672 and 674 (with jumper 670 omitted) when a line power input is provided for each set of four outlets 502-508, and 510-516.

Each relay 602-616 is connected to a relay driver circuit 678-692, respectively, that provide signals to switch the relays 602-616. The relay driver circuits 678-692 are electrically connected through a connection 696 to a microcontroller. In this embodiment, relay driver circuits 678-692 each include a switching transistor 698 and a holding transistor 699. When the relay control circuit provides voltage to switch a particular relay driver circuit 678-692, the voltage is applied directly to the holding transistor 699 and the switching transistor 698 through a capacitor 700 and a resistor 702. In this manner, upon the application of a voltage to the relay circuits, both the switching transistor 698 and the holding transistor 699 receive voltage and act to switch the respective relay 602-616 and connect line power to the respective outlet receptacle. After a short time period, the capacitor 700 charges and reduces current flow through resistor 702 such that the voltage at the switching transistor 698 drops and the switching transistor 698 switches off. The holding transistor 699 continues to provide adequate voltage to hold the respective relay 602-616 closed with reduced current through current limiting resistors 703.

In such a manner, the power required to hold the relays 602-616 is reduced as compared to the power required to initially switch the relays 620-616 from open to closed. In one embodiment, the holding transistor requires about 75% of the power to maintain the relays 602-616 closed than would be present if a single transistor were used to both switch and hold. In embodiments where numerous switched outlets are present in a facility, such power savings can be significant in operating power reduction for the associated CDUs, which in turn reduces heating, allows for increased component density on a circuit board or within a housing, and also increases the lifetime of components. Other embodiments, however, may include different switching components as will be readily apparent to one of skill in the art.

Figure 7:
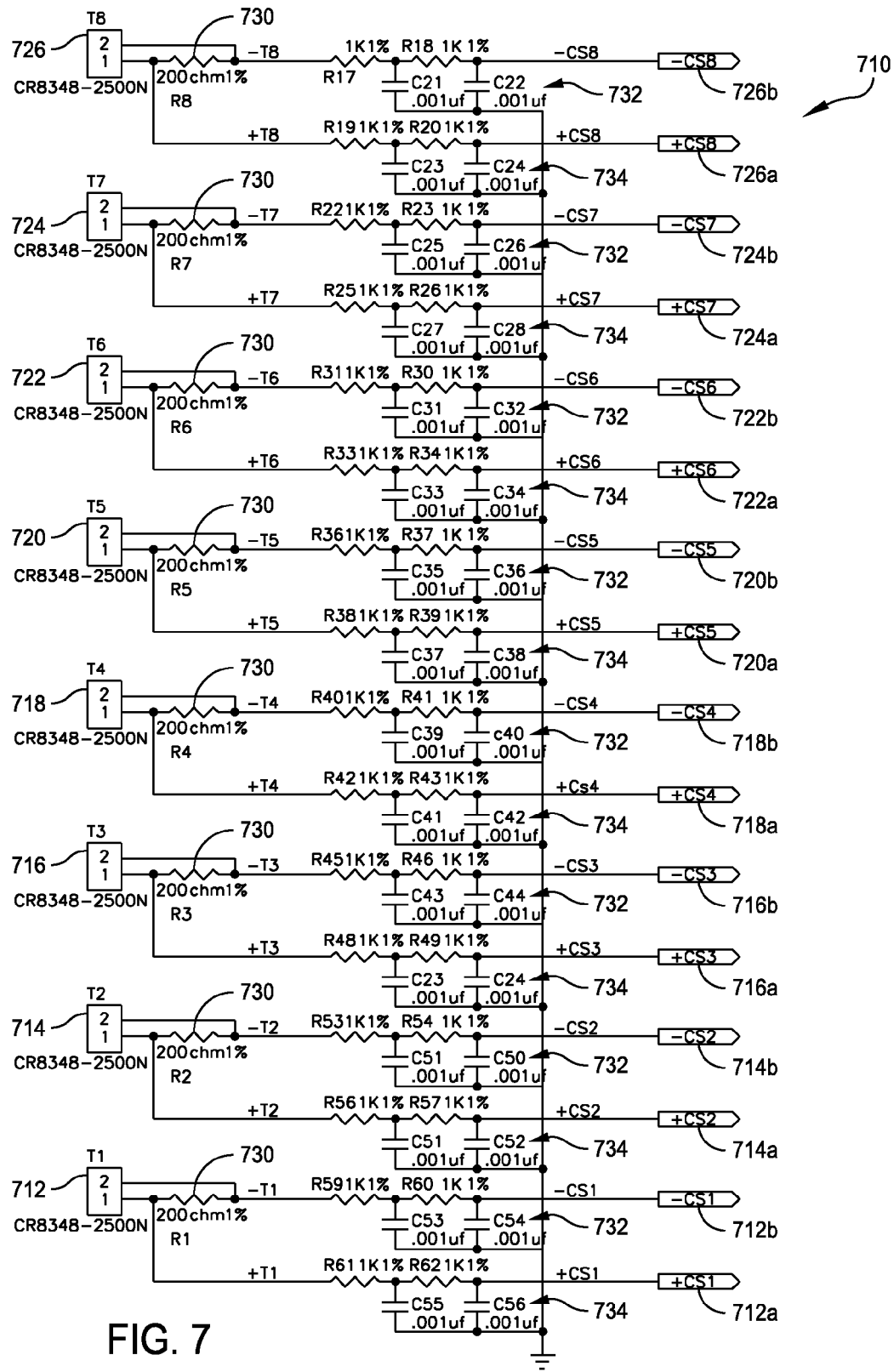
FIG. 7 is a schematic diagram of a current sense circuit.
Figure 8:
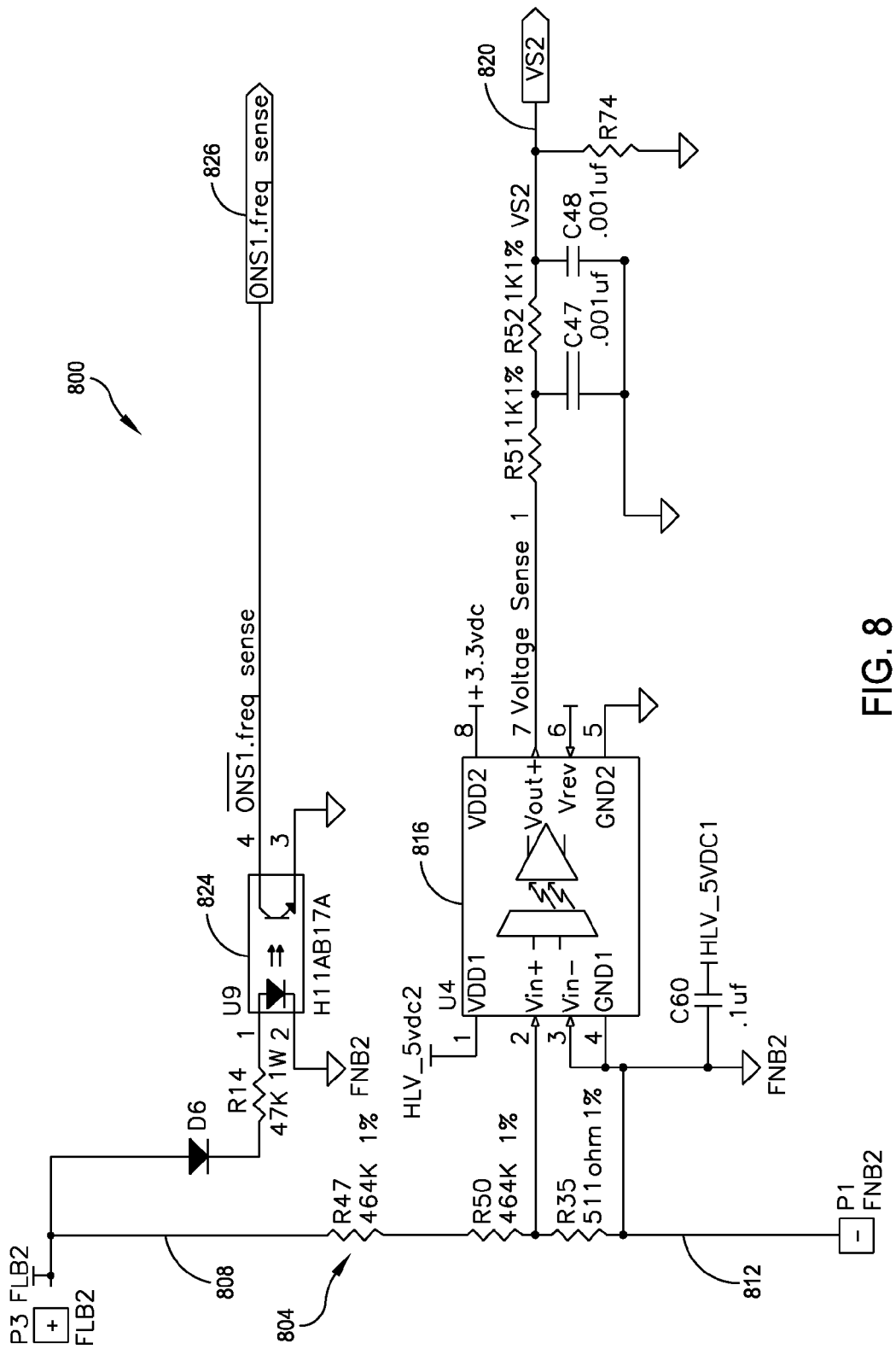
FIG. 8 is a schematic diagram of a voltage sense circuit.
Figure 9:
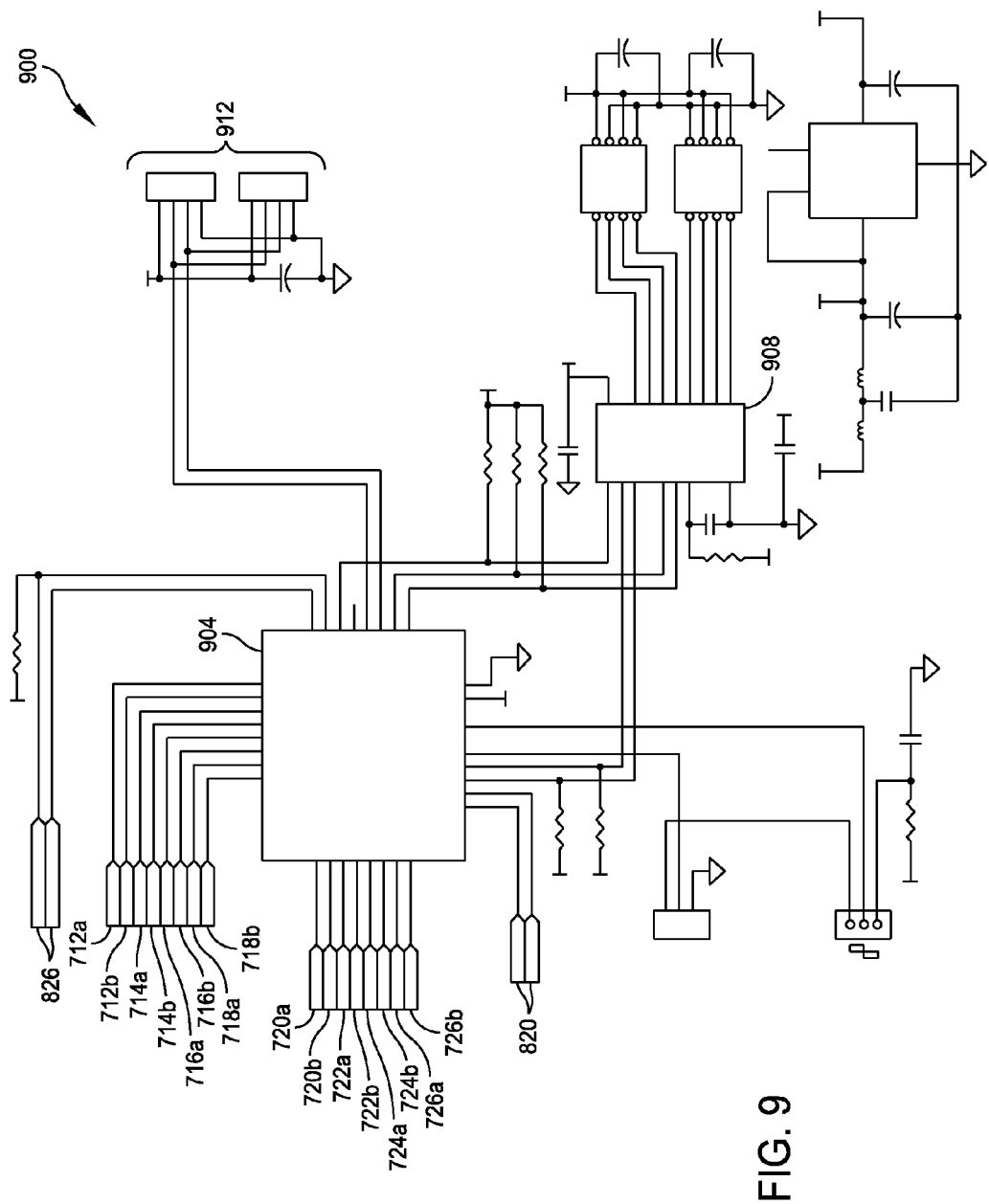
FIG. 9 is a schematic diagram of a power sensor and control circuit.
Figure 12:
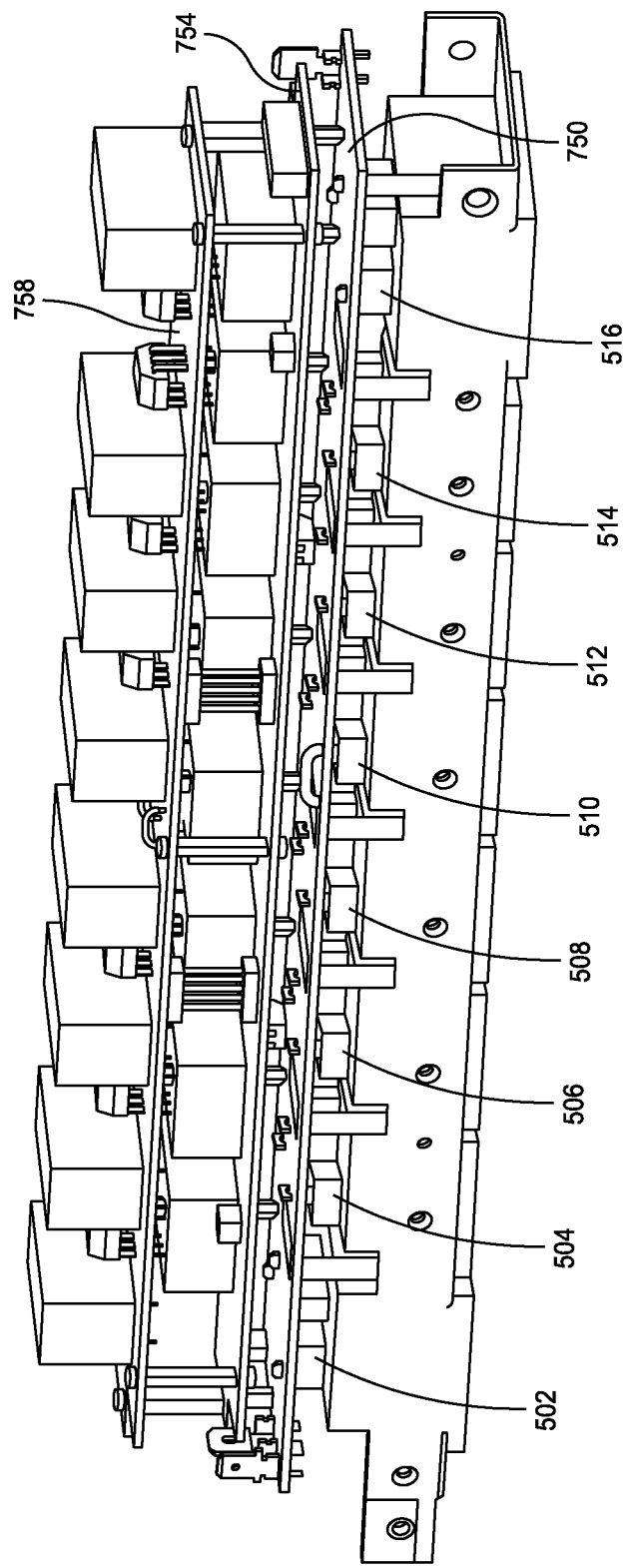
FIG. 12 is a perspective view of components mounted on parallel circuit boards.
Figure 8A:
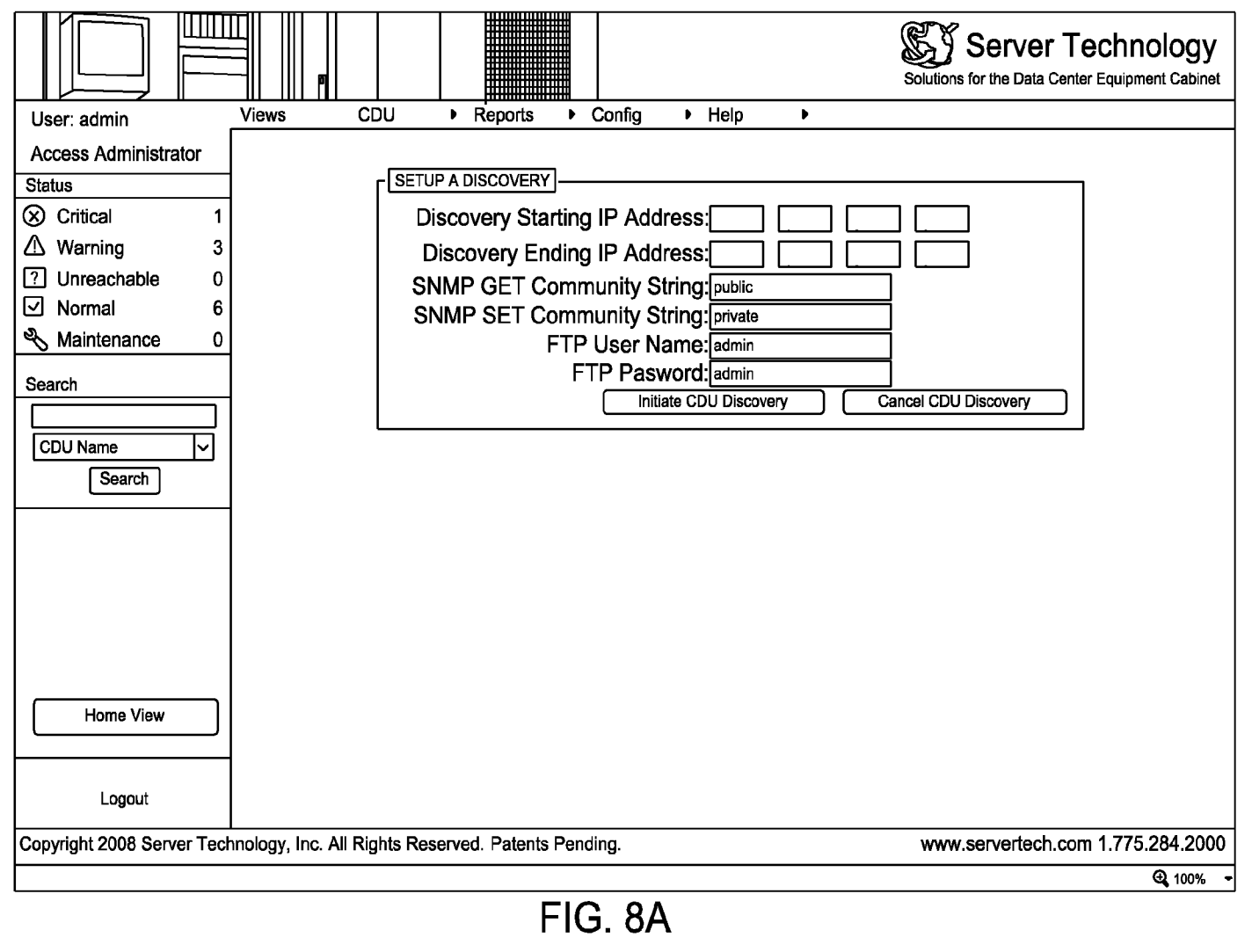
Figure 12A:
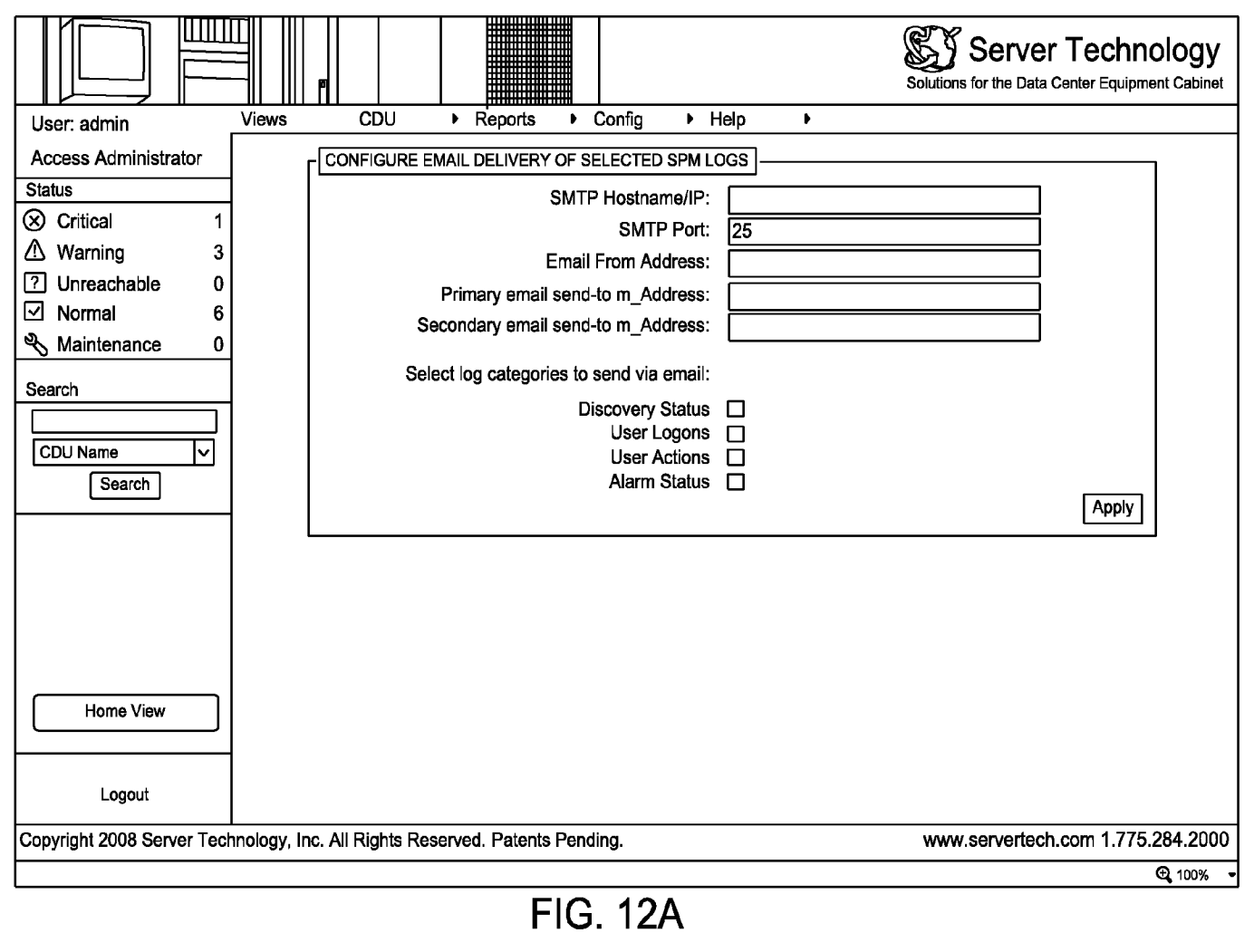

With reference now to FIG. 7, current sensing is described for this embodiment. A current sensing circuit 710, in this embodiment, is included as a separate printed circuit board that can be assembled into a power outlet module when it is desired to have the capability to provide current information related to each individual outlet in an outlet module. Such a circuit board may be used in conjunction with other circuit boards, such as the relay circuit 600 of FIG. 6. Such a configuration is illustrated in FIG. 12, in which the circuitry of FIG. 5 is contained on the middle printed circuit board 754, the circuitry of FIGS. 7-9 are contained on the middle circuit board 754, and the circuitry of FIG. 6 is contained on the upper circuit board 758. The electrical connections of each of the circuit boards may be designed such that the boards may be assembled with related inputs/outputs and connections that are aligned so as to provide for efficient modular assembly of power outlet modules that incorporate some or all of the features described herein through the addition of one or more related printed circuit boards.

As illustrated in FIG. 7, current transformers (CTs) 712-726 are provided that sense current flowing in an associated conductor that is routed through the individual CT 712-726. The current transformers 712-726 in this embodiment are zero-phase toroidal inductors that each have two output lines, the output proportional to the magnitude of the current that is flowing through the conductor associated with the CT. In this embodiment, the line power conductor for each outlet 502-516 is routed through a corresponding CT 712-726. The respective CT 712-726 outputs a signal that corresponds to the magnitude of the current which, in this embodiment, is output on two output leads across a burden resistor 730. This configuration provides the ability to sense output currents up to 16 amperes with a maximum crest factor of 2.5, although it will be readily apparent to one of skill in the art that other configurations are possible.

In the embodiment of FIG. 7, each CT 712-726 output lead includes a related passive two-pole anti-aliasing filter 732, 734 to provide current sense outputs 712a, 712b through 726a, 726b for each outlet. The current sense outputs 712a, 712b-726a, 726b are provided as differential input to a microcontroller differential analog-to-digital input for use in determining the power metrics related to a particular outlet. Also provided to the power sensor is information related to the line voltage that is present on each outlet so as to provide voltage and current information for use in determining power metrics. In this embodiment, as will be described in more detail below, the power sensor is a microcontroller that includes an analog-to-digital converter with inputs for the current sense outputs 712a, 712b through 726a, 726b, as well as voltage sense inputs for line voltage.

Line voltage measurements are provided, in this embodiment, through a voltage sensor circuit 800 that is illustrated in FIG. 8. The voltage sensor circuit 800 includes a voltage dropping resistor circuit 804 that is connected to line power source at a first end 808, and connected to the neutral input at a second end 812. The voltage dropping resistor network 804 is tapped between resistors and at the neutral input with the taps provided to positive and negative voltage inputs to an opto-isolated amplifying circuit 816. Similarly as described above, other voltage sensing circuits may be used, such as a voltage sense transformer may be used instead of a voltage dropping resistor network, for example. Also, in some embodiments voltage sensing may be provided that is not opto-isolated with any required isolation provided by other well known methods. The output of the opto-isolated amplifying circuit 816 is provided as a voltage sense signal 820 through a passive two-pole anti-aliasing filter.

In the embodiment of FIG. 8, an opto-coupler 824 is connected to the line input and provides a frequency sense signal 826 to indicate that AC line voltage is present at the outlet module and also provides an approximately 50% duty cycle output that is based on the line frequency of the input power. Thus, for each AC cycle of the input power, the frequency sense signal 826 will have a logical high signal for approximately one half of the AC cycle. The leading or trailing edge provided by the frequency sense signal 826 provides an accurate measurement of the frequency of the input power frequency that may be used by a processing circuit to synchronize power metrics to an AC cycle.

In embodiments where all of the outlets of an outlet module are powered by a single power source, a single voltage sensor circuit 800 is used, and in embodiments where different outlets in the outlet module are supplied power from different power sources, a second voltage sensor circuit is provided for the second power input to the outlet module. As discussed above, this embodiment may be implemented using printed circuit boards that provide circuitry for various features described. In this embodiment, the voltage sensor circuit(s) are provided on the same printed circuit board as the current sensor circuit 710, although it will be readily recognized that other configurations may be implemented.

Referring now to FIG. 9, a power sensor and control circuit 900 is described for an embodiment. The power sensor and control circuit 900, in this embodiment, is included on the same printed circuit board as the current and voltage sensor circuits 700, 800, although other implementations will be readily recognized. The power sensor and control circuit 900 includes a microcontroller 904 that receives all of the current sense signals 712a, 712b through 726a, 726b, and receives voltage sense signal(s) 820. These signals are received and processed to determine the power metrics related to each outlet 502-516 in the outlet module. The microcontroller 904 is interconnected to an addressable latch 908 that provides control signals to the relay drivers 678-692 and relays 602-616, if present. The microcontroller 904 also includes communications connections 912 that may be coupled to a communications bus to receive and transmit data from/to the bus. In this embodiment, the microcontroller 904 has 16 current input channels, two per outlet, which are electrically connected to the current sense outputs 712a, 712b through 726a, 726b, and two voltage input channels which are electrically connected to voltage sense output(s) 820. The microcontroller includes ADC inputs that digitize the current and voltage sense signals. Relative to the current sense signals, the ADC includes a differential ADC input based on the two inputs from the current sensor associated with each outlet.

In this embodiment, the microcontroller 904 filters the current and voltage sense signals to reduce high-frequency noise that may be present. The digitized current sense signals are scaled for 16 Amps with a 2.5 crest factor, in this embodiment. The voltage sense signals(s) are received on voltage input channels. In embodiments having different power sources for some outlets, one voltage input channel per outlet group is provided. The voltage input channels are provided to a single-ended ADC input and a digitized output scaled for +/−390 volt peaks. The frequency sense signals for each power source are also provided to the microcontroller. The frequency sense signal(s), in some embodiments, is (are) used for frequency determination and timing of cycle sampling to provide accurate correlation of inputs to a particular AC cycle. The timing, in an embodiment, is auto-adjusted every second to compensate for inaccuracies, such as temperature drift, in the internal clock of microcontroller 904.

Use of the frequency sense signal 826 provides for accurate timing in the microcontroller 904 without the use of an external oscillator as an accurate time base. The ability to measure the frequency sense signal 826 provides enhanced accuracy for timing used in calculating power-related metrics for each outlet. In this exemplary embodiment, two signals are digitized by an ADC within the microcontroller, the voltage and current signals. Each cycle of power, as synchronized with the frequency sense signal 826, provides for measurements that are accurately aligned with an AC cycle and provides enhanced accuracy in the power-related measurements. It is well known that internal clocks in microcontrollers such as microcontroller 904 have some variability, such as plus or minus two percent. Such internal clocks are typically subject to frequency shift with changing temperature and variability between different microcontrollers. In this embodiment, the frequency sense input allows cycle timing of any one AC cycle to be measured to within plus or minus 240 nanoseconds of the actual AC cycle. The voltage and current sense inputs on the microcontroller 904 are sampled nearly simultaneously 120 times per any AC cycle. The number of samples per cycle, 120 in this example, provides sampling of frequency content up to the 14th harmonic of a 50 or 60 hertz power input, allowing for measurement of real energy at harmonics present in a non-perfect sinusoid. The ADC, in an embodiment, within the microcontroller is a 10-bit ADC hardware, with four times over-sampling to provide an effective 11-bit ADC.

The computation of several power metrics will now be described, for an exemplary embodiment. In this embodiment, discrete samples are taken for one current and voltage channel for an AC cycle, which produces a digital measurement for each sample. After the samples are taken for a cycle, calculations are performed by the microcontroller, these calculations performed over about the next one-and-a-half AC cycles in this embodiment. After the calculations are performed, the next channel is sampled beginning at the start of the next AC cycle. Thus, in this embodiment, there are three cycles dedicated to the first channel, the next three cycles dedicated to the second channel, and so on. Accordingly, in this embodiment with eight outputs monitored, each channel is sampled once every 24 AC cycles.

Also, voltage and current inputs are calibrated and provided to the microcontroller 904 in some embodiments. The current inputs, in an embodiment, are scaled to 16 amps at 2.5 crest factor and with the voltage input(s) scaled for 390 volts. Variances in the resistors and toroids, in an embodiment, is accounted for through calibration of the input channels. In one embodiment, the voltage and the current are calibrated based on active power and apparent power for each channel, although calibration based on other metrics may be used, such as calibrating the voltage and current individually. In embodiments that calibrate current and voltage individually, any errors that are in opposite directions will tend to cancel, and any errors in the same direction will be multiplied, when doing a power calculation. In embodiments that calibrate based on active and apparent power, the multiplied error may be reduced. The microcontroller 904, in this embodiment, also provides for calibrations to account for system phase error and provide near-zero to near-full-span voltage and near-zero to near-full-span current digitization.

Figure 10:
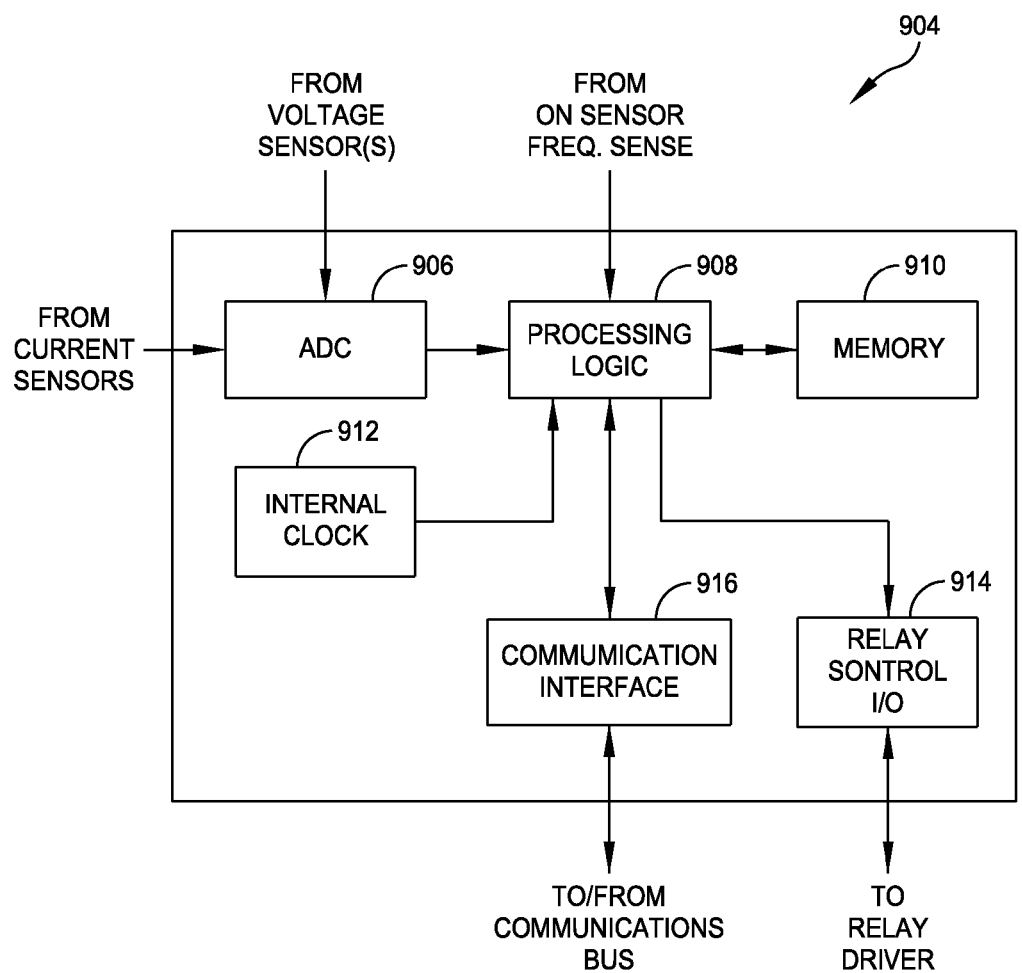
FIG. 10 is a block diagram of a microcontroller configuration.
Figure 10A:
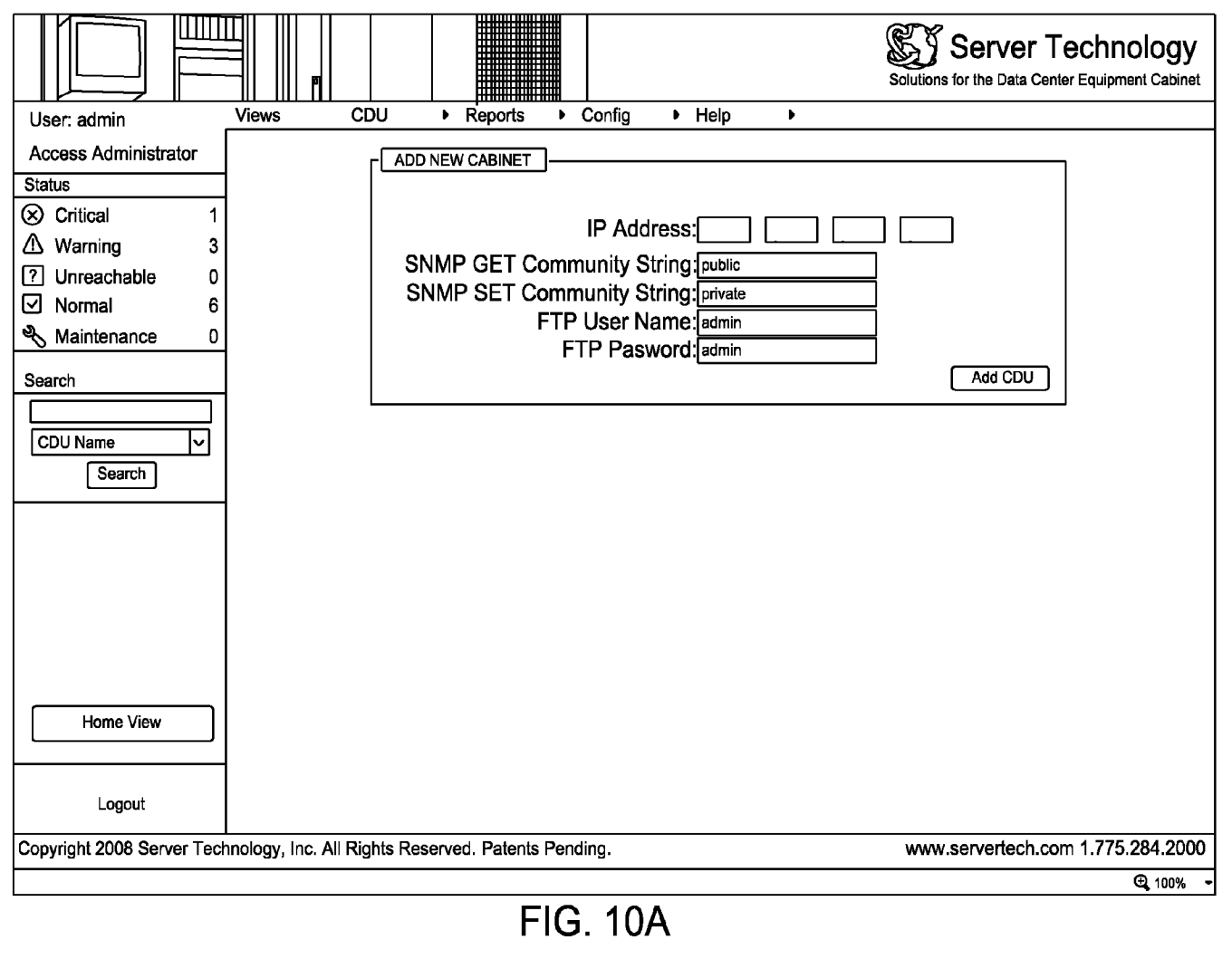

With reference now to FIG. 10, a block diagram illustration of a microcontroller 904 is provided for an exemplary embodiment. The microcontroller 904, as mentioned above, includes an analog-to-digital converter 906 that receives an input from the current sensors and the voltage sensors. Samples from the ADC 906 are provided to processing logic 908. A memory 910 is interconnected to the processing logic 908 and may be used to store information related to power metrics and sampled current and voltage information, as well as any programming used by the processing logic. An internal clock 912 provides an internal time base, and as discussed above the processing logic 908 also receives a frequency sense signal that allows accurate synchronization with an AC cycle. The microcontroller 904 also includes a relay control 914 and a communications interface 916. The communications interface may be used to receive and transmit information from/to a communications bus, such as power metrics computed by the processing logic, control commands to actuate different relays through the relay control 914, etc.

Figure 11:
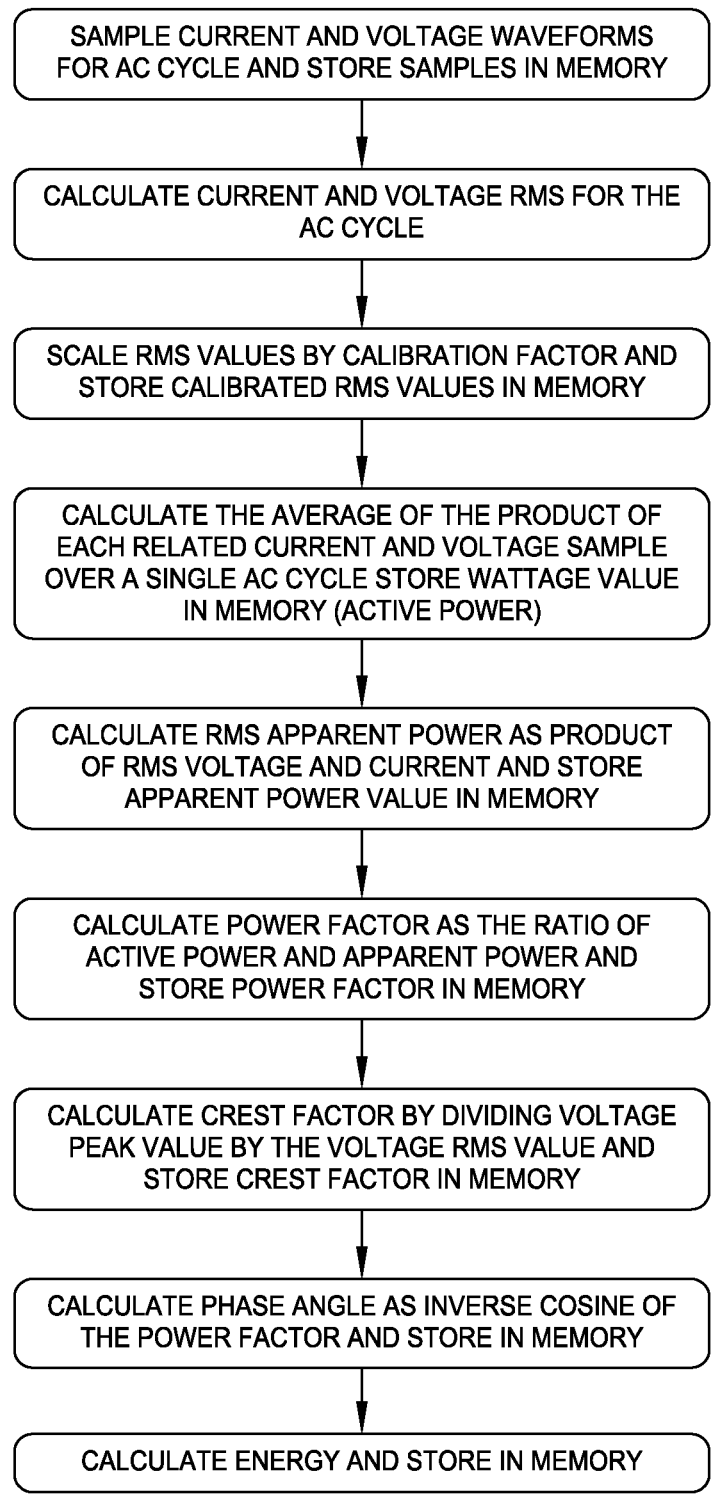
FIG. 11 is a flow chart depicting operational steps of a microcontroller.
Figure 11A:
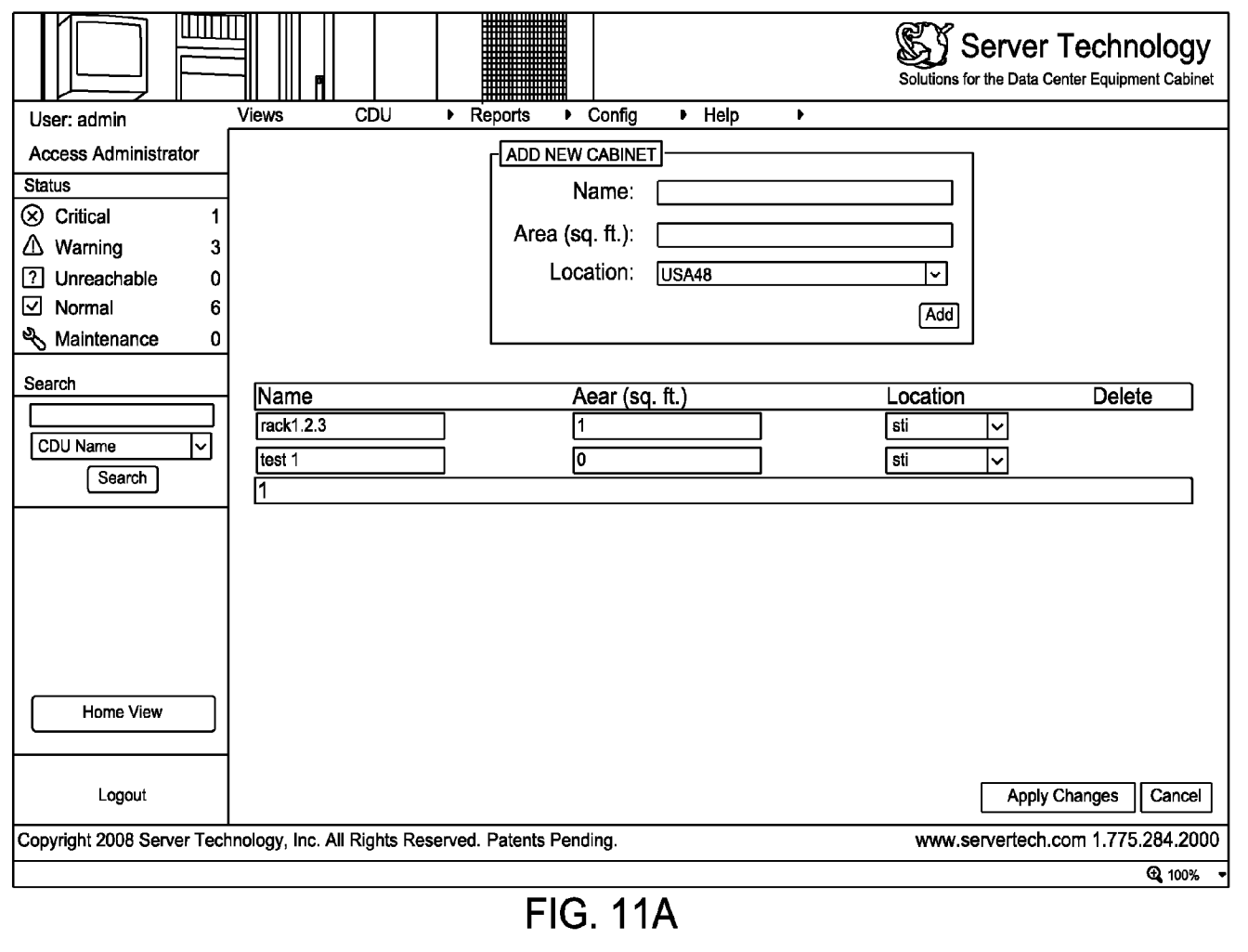

With reference now to FIG. 11, the operational steps of a microcontroller for determining power metric related information are described for an exemplary embodiment. In this embodiment, the ADC 906 is a 10 bit ADC, with both single-ended channels for voltage sense inputs, and differential channels for the current sense inputs. As mentioned above, 120 samples of voltage and current are taken for each cycle in an embodiment. Each of those samples, 120 over the AC cycle, are taken nearly simultaneously for both the current and voltage. In an embodiment, the samples are taken in successive samples by the ADC 906 to provide samples are on the order of microseconds apart for a relatively small error effect on overall calculations.

Each voltage and current sample is stored in memory 910 as an integer value. For each set of current and voltage samples, the processing logic calculates the true RMS voltage and current in several steps. First, each data point in the 120 samples is summed together and then divided by 120 to get the mean of the samples. Then, for each sample, the processing logic calculates the difference of that sample from the mean (floating point values). Each difference from the mean is squared, and the sum of the square of every point's difference from the mean is calculated. This total sum is divided by 120. The raw RMS value is then determined as the square root of the resulting quotient. This number is scaled by the calibrated scale factor to produce a calibrated value, referred to as a true RMS value, which is stored in memory 910 for both the set of the current data points and the set of voltage data points. The result is RMS current and the RMS voltage values. In this manner, an AC RMS value is generated that removes any DC offset present from the sensing circuitry or the signal itself.

In one embodiment, the samples of voltage and current in a waveform are compared against a model waveform or a historical waveform for that particular channel, and any significant deviations from the comparison may be flagged as anomalous indicating that there has been a change related to the associated component. Such a change may indicate the component may not be operating properly, may be about to fail, or may have had a failure. For example, waveforms of the current drawn by a device and the voltage drawn by the device, when compared to historical or reference waveforms, may indicate a fault or other condition that should be investigated. For example, a switched-mode power supply located within a server that receives power from a PDU may be drawing power in a manner that indicates an imminent failure. Embodiments described herein provide the ability to assess the health of such power supplies an installed base of power supplies in data center equipment racks without requiring any modification of the power supplies.

In some embodiments, currently sampled waveform information is only maintained in memory long enough to be utilized to generate and report the noted power metrics. Other waveforms, however, may be maintained in memory for comparison, such as in the form of or representative of one or more sample or reference waveforms or portions of one or more waveforms. In addition, the waveform information might be maintained in memory longer or otherwise stored for later use in, e.g., providing a basis for comparison. For example, when a system is initially set up and tested, the waveform may be stored and used for later comparison.

Referring again to FIG. 11, power for each cycle is determined by first, for each of the 120 data points for current and voltage, calculating products of each respective sample. These 120 products make up the waveform of the wattage that may be compared to model or historical waveforms to identify any potential problems related to the component that is receiving power from the associated outlet. The sum of the products of each current and voltage data point is then divided by 120 to get the average power, referred to as active power. It is noted that, in this embodiment, zero-phase toroidal current transformer are used and the voltage and the current samples are digitized approximately simultaneously, and thus the phase angle created by loads is inherent in this measurement. This phase angle may be determined as the inverse cosine of the power factor, as will be described in more detail below.

Also calculated is apparent power, which is the product of the RMS current and the RMS voltage calculated earlier, having units of volt-amps or VA. Power factor, the ratio of the active power to the apparent power, is calculated, which directly relates to the phase angle difference between the current and voltage. Power factor is calculated by taking the active power calculated from all the data points divided by the apparent power, which was the product of the RMS current voltage. The next item measured in this embodiment is current crest factor. The current crest factor is the ratio of the peak of the current waveform to the RMS of the current waveform.

Finally, energy is calculated. As mentioned above, embodiments are provided in which the microcontroller does not receive a time base from an external oscillator. The timing for such embodiments is based on cycles of the incoming AC waveform. As is well known, frequency of incoming AC power is generally 50 Hz or 60 Hz, depending upon location. Furthermore, most, if not all, industrialized nations have electrical generation and distribution systems that provide a relatively stable frequency of incoming AC power. The stability of incoming AC frequency may be used to provide a relatively accurate timing mechanism for starting and stopping ADC conversions. As described above, one embodiment samples eight channels over the course of 24 AC cycles. The relative accuracy of the incoming AC signal as a time base provides knowledge that there is an accurate measuring every 24th cycle for each channel with very little drift.

In an embodiment, the on-sense signal is sampled to determine if the input power is 50 Hz or 60 Hz. At 60 hertz there are 216,000 cycles in an hour, and at 50 hertz there are 180,000 cycles in an hour. Based in this information, combined with the measurement of one current channel every 24 cycles, energy may be calculated by multiplying the active power times 24, representing the all 24 cycles between measurements on a channel, and dividing by either 180,000 (at 50 hertz) or 216,000 (at 60 hertz). This provides a representation for power consumed by the channel during the 24 cycles. This energy computation is added to an energy accumulator associated with each channel. Each time the power for a channel is computed, the wattage use for the represented 24 cycles is added to the accumulator. In one embodiment, to reduce rounding errors, when the accumulator (a floating point data type in memory) exceeds one, the accumulator is decremented and a double word integer associated with the channel is incremented to provide a number representing whole watt hours that have been measured for the channel. All of the values stored in memory may be reported through the communication interface to power managers or other applications that may then use this information to provide a number of different power-related metrics for components that receive operating power from the PDU.

As discussed above, relatively accurate timing is achieved in embodiments with a relatively high variability internal microcontroller clock though adjustments that compensate for inaccuracies in the internal clock. The compensation is achieved, in an embodiment, through providing the frequency sense input into an external interrupt pin on the microcontroller. The frequency sense signal, as discussed above with respect to the embodiment of FIG. 8, may be generated from a photo-optic diode 824. As the voltage rises on the input power, the LED of the photo-optic diode turns on, and the LED will turn off slightly above the zero crossing of the input waveform, regardless of the duty cycle. As a result, every second edge of the frequency-sense signal is the frequency of the line input. The microcontroller, in this embodiment, is programmed to identify a positive edge of the frequency sense signal.

Once a positive edge is identified, then the first negative edge is identified. The interrupt within interrupt service routines for the external interrupt pin in the microcontroller is set to high priority to have relatively few, if any, interruptions from any other software interrupt service routines. When the first negative edge is detected, the microcontroller starts running a counter that counts every 12 clocks of the internal clock 912. In one embodiment, the internal clock 912 is nominally a 25 megahertz internal clock plus or minus 2%. The timer runs until the next negative edge is detected. Thus, regardless of the timing of the internal clock 912, a number of system clocks is determined that represents the span of time, from the microcontroller's view, of a single AC cycle. This number is converted into entire system clocks for an AC cycle by multiplying by 12, and then divided that by the number of samples collected within a single AC cycle (120 in this embodiment). Thus, a number of clocks is calculated that represents the time span for each sample of an AC cycle. This time is adjusted for expected interrupt latencies in the microprocessor, due to known entry and exit times in the interrupt service routines, etc., to generate a number and system clocks that represents the AC cycle. This value becomes a reload value for the timer that starts off each ADC conversion.

Thus, the timer becomes a time base for the digitizer of the ADC, and continues to be the time base for cycles when digitizing is not performed. Errors in the time base may accumulate over time. In one embodiment, errors are reduced by periodically re-measuring the number of system clocks in an AC cycle, such as once every five seconds. Such re-measuring provides adjustment to account for the actual speed of the internal clock, and also synchronizes the timer to a zero crossing of the voltage waveform. Such timing and synchronization of timers to an AC cycle provides relatively accurate power metrics. For example, if an external crystal time base were used, which is also susceptible to temperature change and variability of the incoming AC signal, errors can be introduced in between the timing of AC cycles and also synchronization to AC cycles. In the embodiments described here, the timer is re-synced to provide greater confidence that the samples used for RMS calculations are within the actual AC cycle. If RMS calculations are based on samples that begin after the cycle begins, or that end after the end of the cycle error can be introduced to report either less or more energy than is being integrated. By re-syncing, sampling is more likely to be within a cycle and not outside the cycle, and thereby improves accuracy.

As mentioned above, to determine energy, an accurate measure of time is needed to provide, for example, a watt-hours number. The above description relies on the assumption of 50 or 60 hertz input signal being accurate. In some embodiments, the time as measured in the microcontroller is compared to time provided by a network controller to verify or adjust energy calculations. In one embodiment, the number of cycles counted in a timeframe of an hour is provided to a network card and compared to an actual real time clock view of an hour. In the event of any significant deviation, the network card may add a simple correction scale in for that. For example, if the microcontroller counts up number of clock cycles in an hour and reports to the network card, which measures 59 minutes, a simple adjustment may be made to the energy value.

In another embodiment, the timing of the AC cycles provides an indication related to when the incoming power waveform is at a zero-crossing. In this embodiment, the switching on and off of the relays (such as in FIG. 6) is performed around the zero-crossings on the voltage AC waveform, or at least at a point less than the peak value of the waveform. Such switching acts to reduce noise from the relays when switching, and may also extend the life of the relays. Reduced noise results, in part, because switching at a zero-crossing results in relatively low, or no, voltage potential at the physical points within the relay, thereby reducing noise when the relay is switched. Furthermore, the point life of such relays may be extended due to lower stress than would be present when switching occurs with a relatively high voltage present at the relay. A further advantage of switching at or near zero-crossings is a reduction in the in-rush currents experienced by a piece of equipment. For example, if the points on a relay are closed as the top of the sine wave, the in-rush current would be significantly higher than present if switching is performed at or near a zero-crossing. Such zero-crossing switching allows the in-rush current build as the sine wave builds from the zero crossing. In this manner, the entire chain of current path is also less stressed.

While described above with respect to a CDU, it will be understood that the power measurement circuitry and portions thereof have many applications beyond the exemplary embodiments described above. For example, a low-cost power metering circuit such as described may be incorporated into other equipment to provide information related to power parameters for the particular equipment. A server may, for example, include a power circuit as described to provide power-related information that may be used to assist in managing efficiency of the server by, for example, identifying that a server is not operating efficiently and that the load being serviced by the server may be a target to be moved to a different server. Similarly, it has been desired to have a switched-mode power supply that provides power-related information, but there is a strong desire to maintain as low a cost for these power supplies as possible. A single-chip solution without an external oscillator time base as described herein may provide a low-cost solution for incorporation into such power supplies. Further, such power metering may be incorporated into residential, commercial and multiple-unit power meters to provide power-related information for billing purposes.

With reference again to FIG. 8, as mentioned above an outlet module may include power outputs that are connected to separate line inputs. In such cases, separate voltage sensor circuits 800 are used for each set of outlets. Separate voltage sense circuits for each branch of outlets may be desired for a number of reasons, such as separate branches protected by different fuses or circuit breakers, and one branch may have a fuse blown or the circuit breaker tripped and it could be off while power is still being supplied to the other outlets. Also, those two branches may be operated at different voltages, like a three-phase 208 volt wye system. Two volt sense circuits 800 allow the two different voltage values in that split branch configuration to be measured and used in power metric calculations. Also, the on-sense may be used to detect an absence of voltage that may result from many different sources, one being a fuse or circuit breaker that has faulted. In cases where the power supply provides an on-sense, this can be used to determine whether the line has failed or a fuse has blown.

As discussed above, the microcontroller 904 is interconnected to a communications bus (such as an I2C bus or SMBus). The microcontroller 904 reports over the bus, for each outlet/channel: (a) Voltage RMS (Vrms)—the pseudo-running-average of the eight most-recent Vrms values reported to a tenth volt; (b) Current RMS (Irms)—the pseudo-running-average of the eight most-recent Irms values reported to a hundredth Ampere; (c) Apparent Power (VA)—the pseudo-running-average of the eight most-recent VA values reported to in volt-amps; (d) Active Power (W)—the pseudo-running-average of the eight most-recent active power values reported in watts; (e) Power Factor (pF)—the pseudo-running-average of the eight most-recent pF values reported to a tenth; and (f) crest factor. This data may be received by an external system that collects the outlet information for which the data is provided, and used to determine metrics or provide information such as described above.

Figure 13:
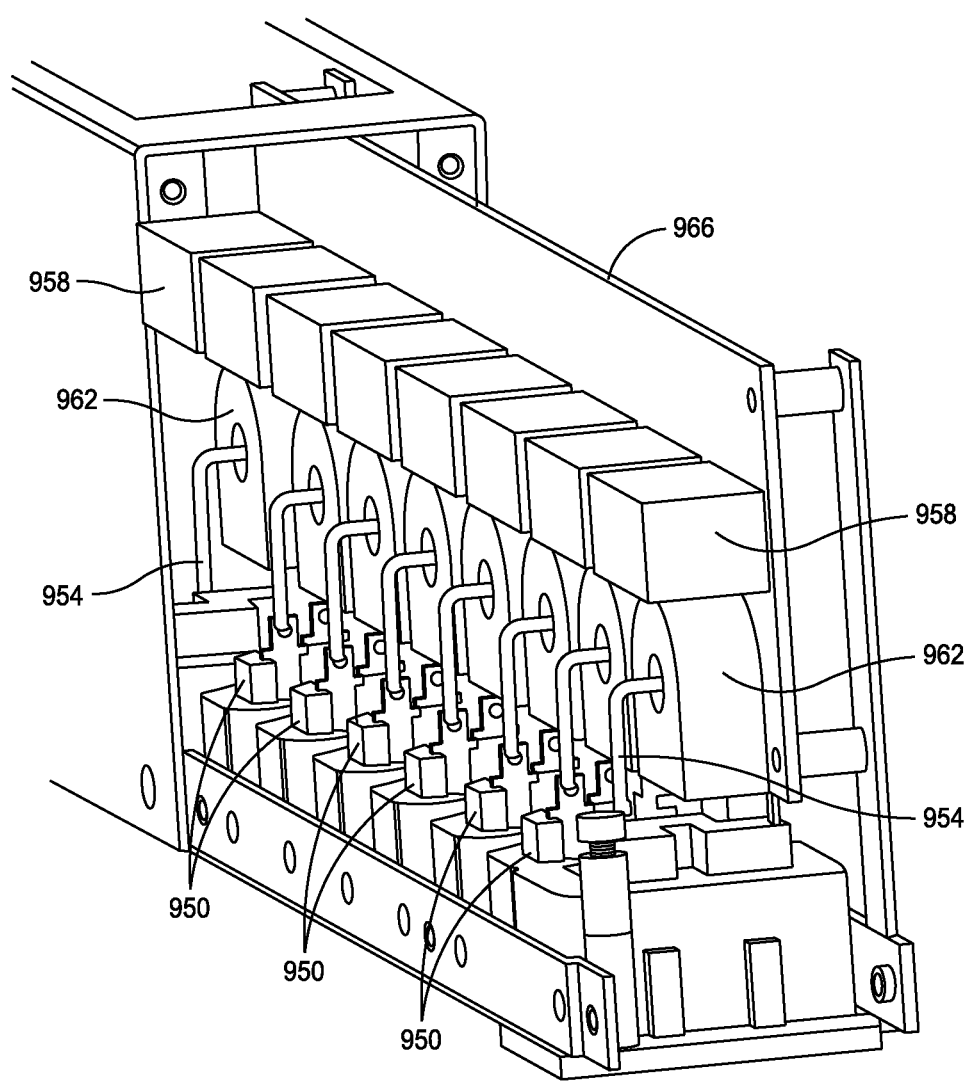
FIG. 13 is a perspective view of components mounted on a circuit board.

With reference now to FIG. 13 is an illustration of a circuit board configuration of an embodiment. In this embodiment, the components described above with respect to the three circuit boards as illustrated in FIGS. 4-8 are provided on a single circuit board. In this embodiment, power outlets 950 are provided that have a neutral line and a ground that are provided by a bus bar (not shown). The line power is provided to outlets 950 through a line connection 954 that is routed through a relay 958 and an associated current transformer 962. The relays 958 and current transformers 962 are interconnected to control and monitoring circuitry such as illustrated in FIGS. 4-8. In this embodiment, the printed circuit board 966 is mounted at a 90 degree angle relative to the plane of the outlets 950. In this manner, the additional surface area required by the circuit board 966 is provided in a plane that is generally perpendicular to the plane of the outlets 950, rather than in a parallel plane as illustrated in the embodiment of FIG. 12. By configuring the circuit board 966 perpendicular to the plane of the outlets 950, this additional surface area can be accommodated simply be making the PDU housing somewhat deeper, with the width of the housing remaining substantially the same as the embodiment of FIG. 12. Using a single printed circuit board 966 allows a reduced manufacturing cost and provides efficiencies in manufacturing due to reduced assembly steps relative to embodiments with more than one printed circuit board.

Those of skill will appreciate that the various illustrative logical blocks, modules, circuits, and algorithm steps described in connection with the embodiments disclosed herein may be implemented as electronic hardware, computer software, firmware, or combinations thereof. To clearly illustrate this interchangeability, various illustrative components, blocks, modules, circuits, and steps have been described above generally in terms of their functionality. Whether such functionality is implemented as hardware, software, or firmware depends upon the particular application and design constraints imposed on the overall system. Skilled artisans may implement the described functionality in varying ways for each particular application, but such implementation decisions should not be interpreted as causing a departure from the scope of the present invention.

For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. For a firmware and/or software implementation, the methodologies may be implemented with modules (e.g., procedures, functions, and so on) that perform the functions described herein.

Figure 14:
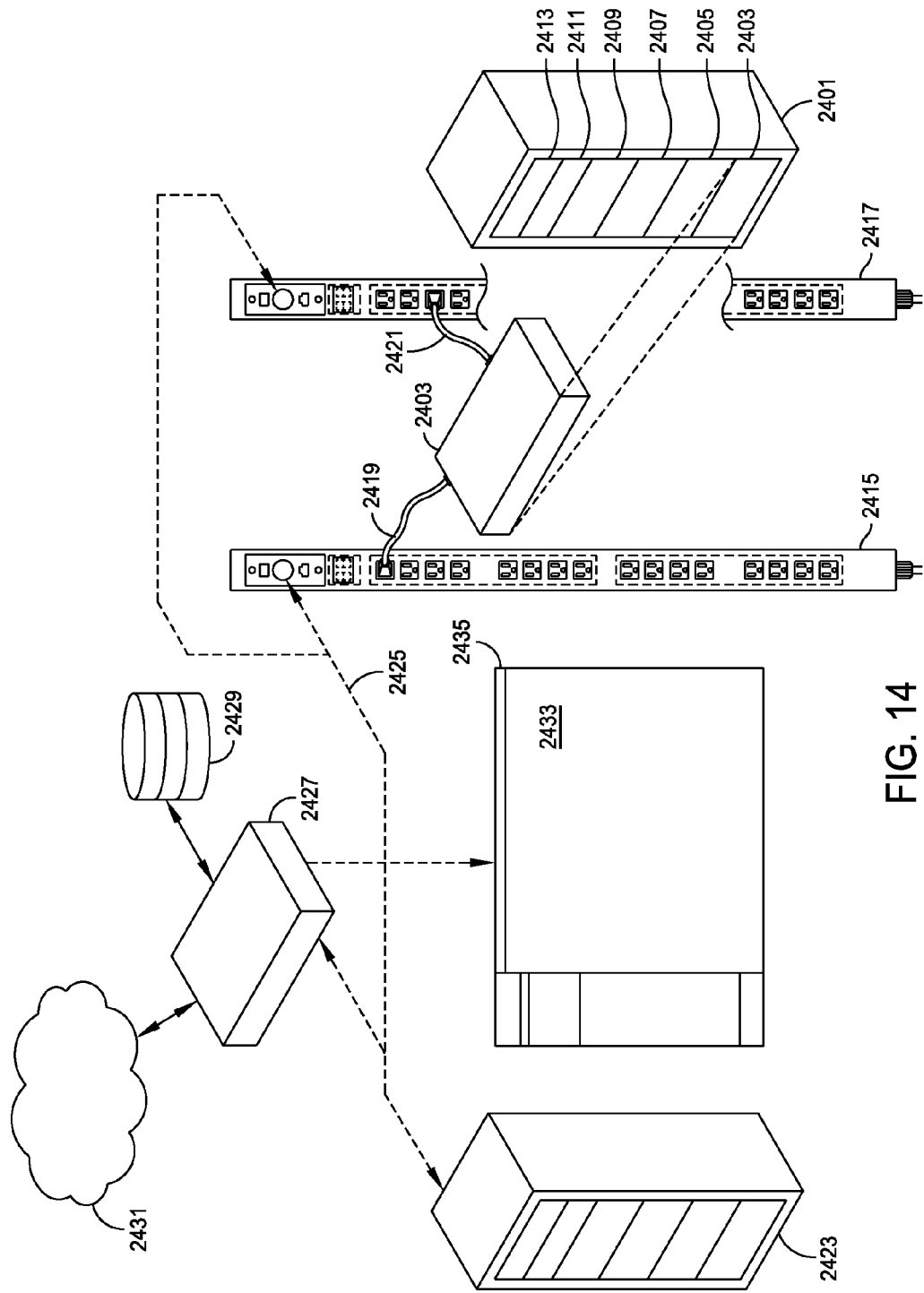
FIG. 14 is a block diagram of a power management system.

A power management system embodying aspects of the invention is illustrated in FIG. 14. A first equipment cabinet 2401 houses components 2403, 2405, 2407, 2409, 2411 and 2413. Also in the cabinet are a first CDU 2415 and a second CDU 2417. The CDUs are shown outside of, and larger than, the cabinet for convenience. Each CDU is similar to the CDU depicted in FIG. 3. The component 2403 is shown both installed within, and outside of, the cabinet. The component 2403 draws power from both CDUs as indicated by a cord 2419 connecting the component 2403 to an outlet in the first CDU 2415 and a cord 2421 connecting the component 2403 to an outlet in the second CDU 2417. Others of the components may be connected to one or both of the CDUs as desired.

Similarly, a second equipment cabinet 2423 houses various components and one or more CDUs that provide power to these components. The system may include other equipment cabinets having more or fewer components or CDUs than depicted in the drawing.

The CDUs in the various cabinets communicate, for example through an Ethernet pipeline 2425 or through the Internet or some other suitable medium, with a server 2427. The server 2427 includes a database 2429 which may be stored in a memory, or on a magnetic disk or other medium. The database 2429 may be located in one place or distributed as desired. In some embodiments the server 2429 communicates with another system such as a Building Management System 2431.

As discussed previously, various electrical parameters respecting one or more of the outlets may be measured and used in managing power throughout the system. Current flow through each outlet, voltage present at the outlets, power factor, phase, power line frequency, and the like may all be measured and the measurements communicated to the server for presentation to a user or for preparing reports, generating messages, providing trends, and the like.

While embodiments discussed above describe exemplary implementations of components within an equipment rack or CDU, one or more of the principles, aspects, or features described above may be used in other applications. For example, generation of power metrics as described above, as well as internal clocking based on an incoming AC signal, may be incorporated in or with a power supply, such as a switched-mode power supply, to provide metrics related to the power supply or to otherwise use them or the underlying operation or information monitoring in association with the power supply or associated components or systems. For example, in this fashion such a power supply may monitor itself, take corrective or other action based on (in whole or in part) internal monitoring, and report out one or more power metrics. Such metrics may be used, for example, to anticipate power supply failure, measure power supply efficiency, and adjust the power supply to be more efficient for a given load.

Figure 15:
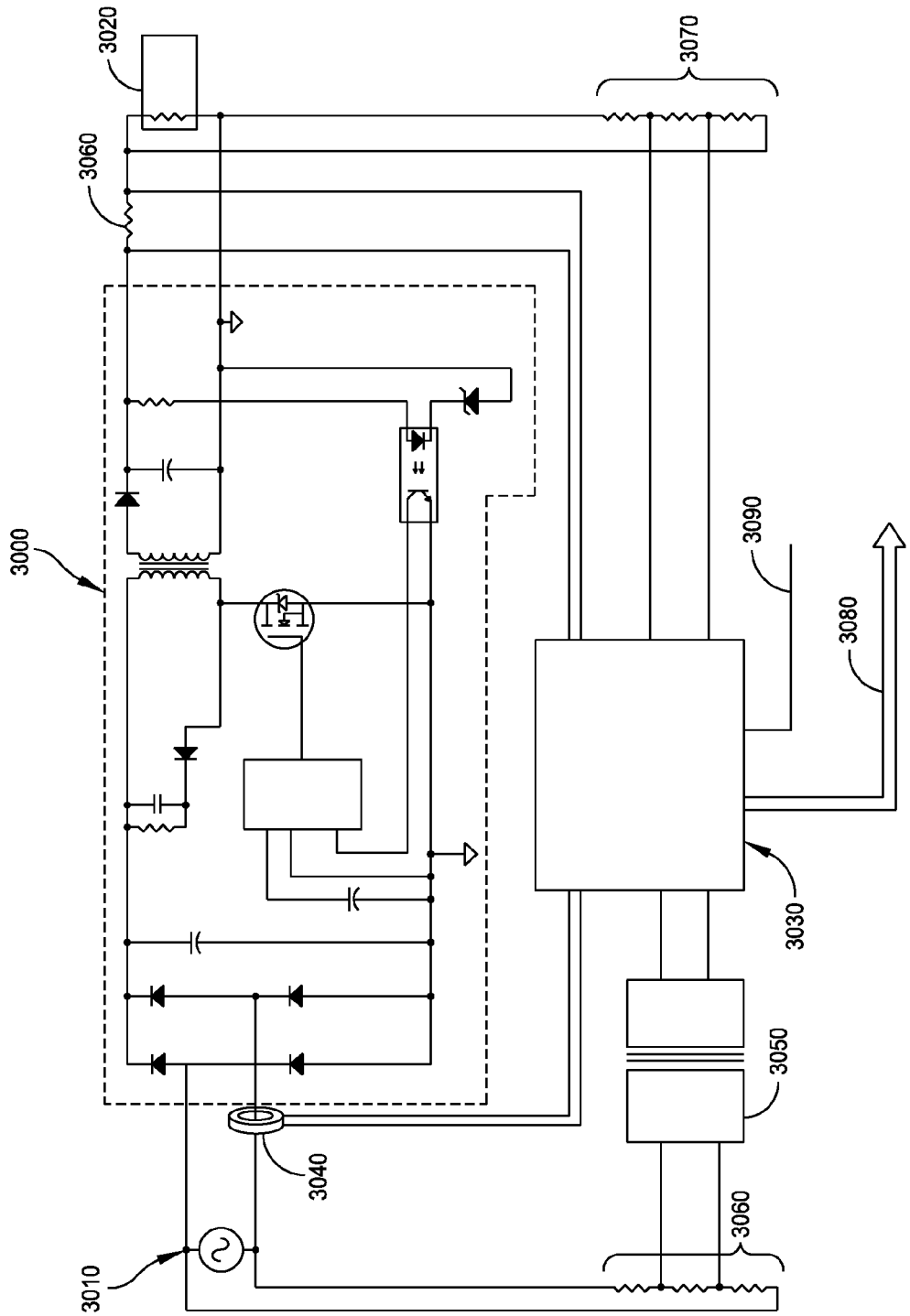
FIG. 15 is a schematic diagram of a power monitoring circuit.
Figure 15A:
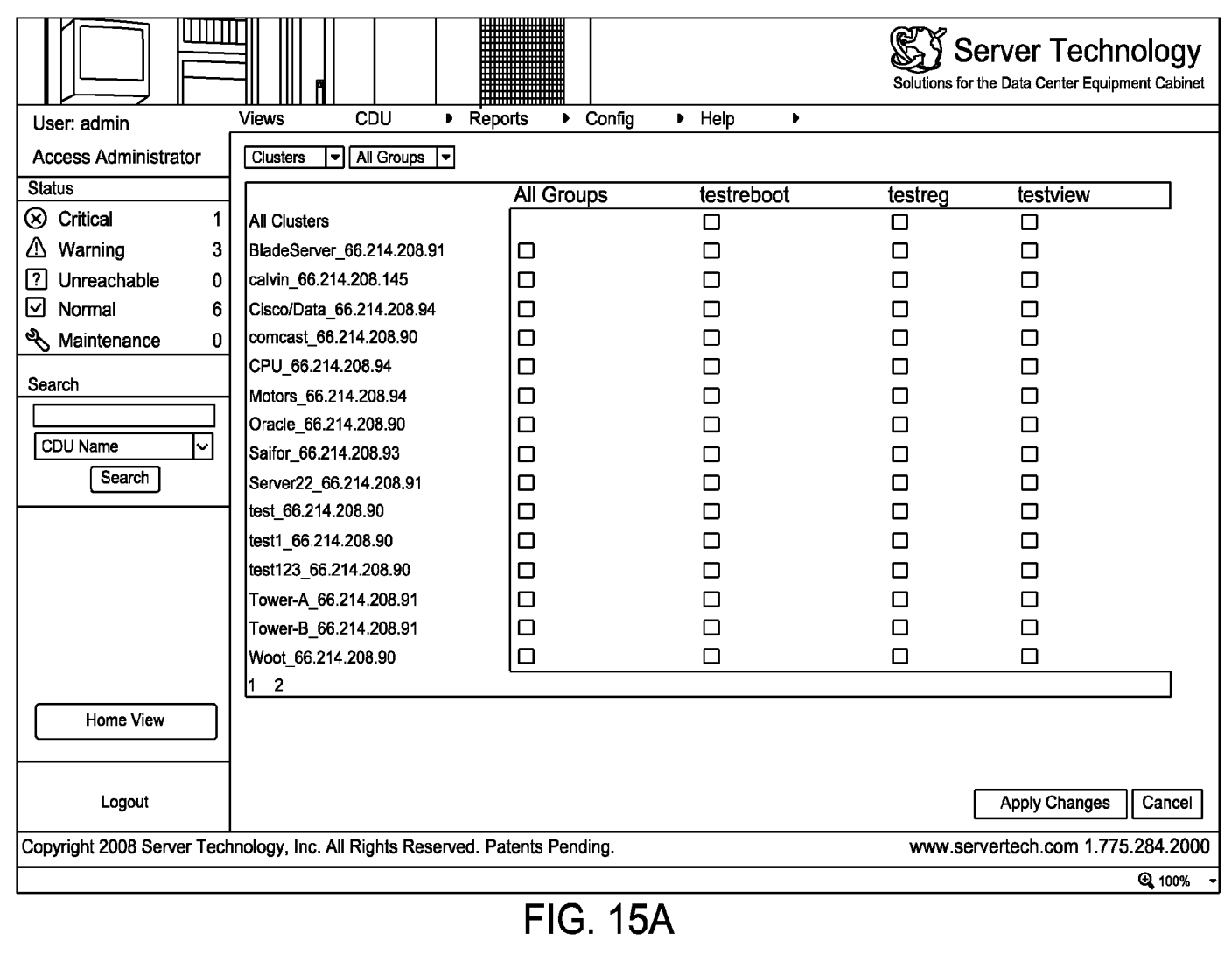

With reference now to FIG. 15, an embodiment illustrating power monitoring incorporated with a switch mode power supply is illustrated. In this embodiment, a switch mode power supply 3000 receives incoming AC power from an AC line source 3010. This embodiment includes voltage and current monitoring for both the high side, that is the high voltage AC input power, and the low side that is the relatively low voltage DC output from the switch mode power supply 3000. The switch mode power supply 3000 is used to provide power to a load 3020, which may be any device or asset that receives power from the switch mode power supply 3000. The load 3020 is modeled as a resistive load in this illustration, although it will be readily recognized that such loads are not necessarily purely resistive loads, and in many cases if the load is operating at less than optimal conditions, the load 3020 may be a reactive load or have a larger reactive component relative to a load operating at optimal conditions.

A microcontroller 3030 receives an input from a toroidal current transformer 3040 associated with the high side AC power source. The output of the current transformer 3040 indicates the instantaneous magnitude of the current that is flowing through the input AC line, and may be configured such at current transformers described above. The output of a voltage sense circuit 3050 is also received at the microcontroller 3030. The voltage sense circuit 3050 may include an isolating amplifier that amplifies voltage from a voltage divider network 3060, and may also include a frequency sense output such as described above.

The microcontroller 3030 of this embodiment also receives input related to low side current and voltage. Current from the low side may be input through a shunt resistor 3060 having a known resistance, the voltage across this shunt resistor 3060 used to calculate the current provided to the load 3020. Low side voltage is provided from a voltage divider network 3070. It is noted that the low side current and voltage sense signals are not isolated signals, as these signals in this embodiment have relatively low voltage levels that do not require isolation. It will be understood that necessary isolation may be achieved according to any suitable isolation. The microcontroller 3030 operates to collect information related to the voltage and current inputs and may process and output information in manners such as described above to provide power metrics related to the switch mode power supply 3000. The output from the microcontroller 3030 may be through a communications buss 3080 as illustrated in FIG. 14, although other communication may be utilized such as wireless communications. The microcontroller 3030 of this embodiment also provides a control output 3090 that may be used to control one or more other components associated with the switch mode power supply 3000.

For example, typical power supplies are most efficient, naturally and when in good operating order, at a load of 80-90% of standard capacity. If a power supply load is only 60% of capacity, and the load appears static, the power supply could "adjust itself" internally, based on the load, to be more efficient. Embodiments such as described above can provide the metrics or underlying measurements (e.g., waveform comparisons) to trigger the adjustment. The power supply can also include a remote reporting capability to report out information.

Figure 16:
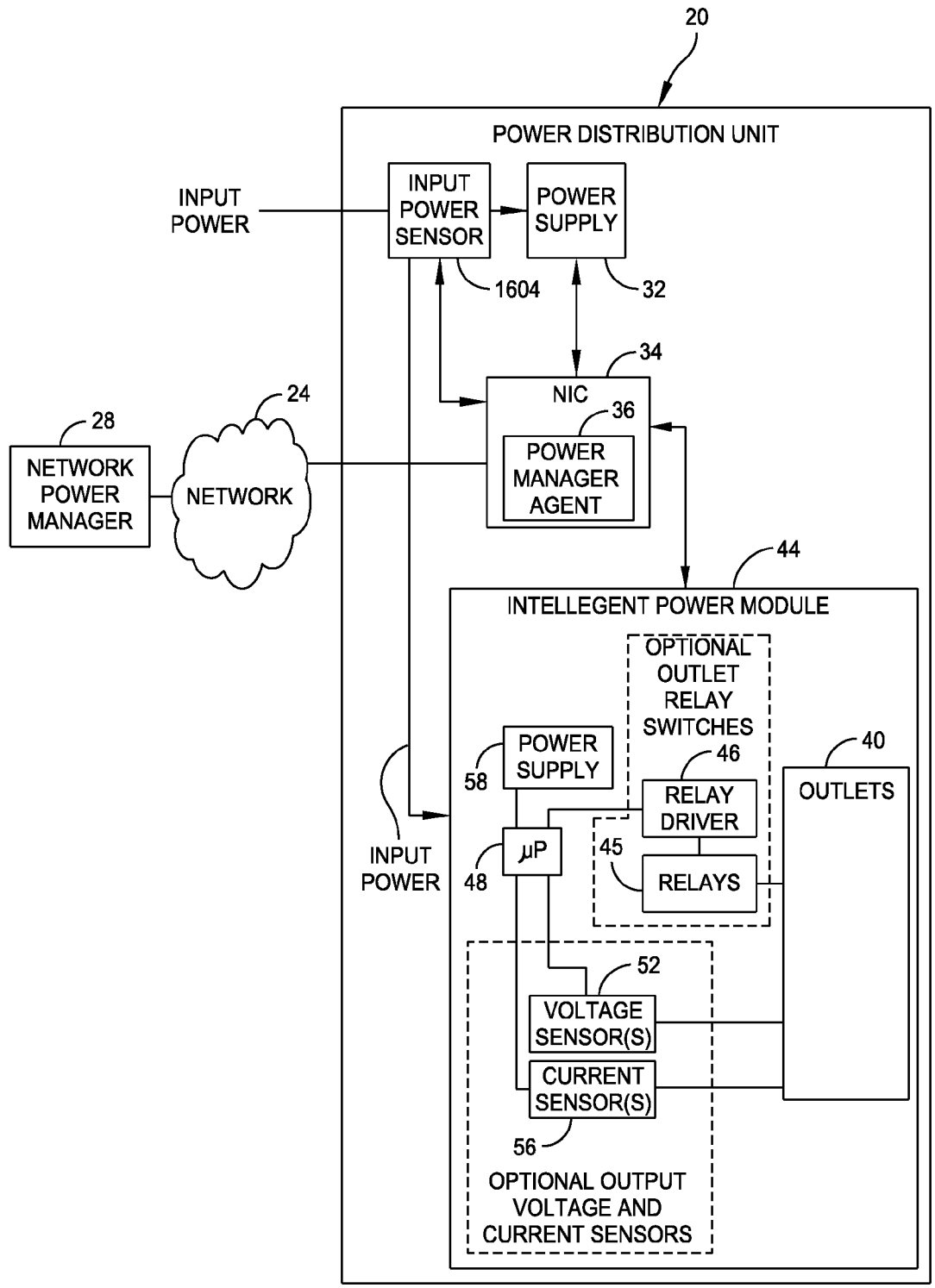
FIG. 16 is a block diagram of an embodiment of a power distribution unit.

With reference now to FIG. 16, a PDU 1600 of another embodiment is described, in which power related metrics are measured at an input power sensor 1604 at the input to the PDU 1600. In the event that a PDU includes more than one input, power may be measured at each input and provided separately, or aggregated, to provide power related metrics for the inputs. Such input power measurement is referred to as Per Inlet Power Sensing, or PIPS. In this embodiment, users may view and understand power information, including total power consumed through a given PDU, by monitoring a given PDU's A.C. power in-feed connections. When referring to "in-feed," or "power input", reference is made to a single power cord containing one or more AC (hot) conductors, and potentially a neutral conductor or an Earth Ground conductor. The PDU 1600 includes various other components and may be interconnected to other network components as described above with respect to FIG. 2. The current and voltage sensors (52, 56) for the outputs of a PDU, as described in FIG. 2, may also be included in some embodiments, thus providing a PDU having both PIPS and POPS capability. Such a PDU may or may not include relays to individually control individual outlets in combination with PIPS and/or POPS.

Figure 17:
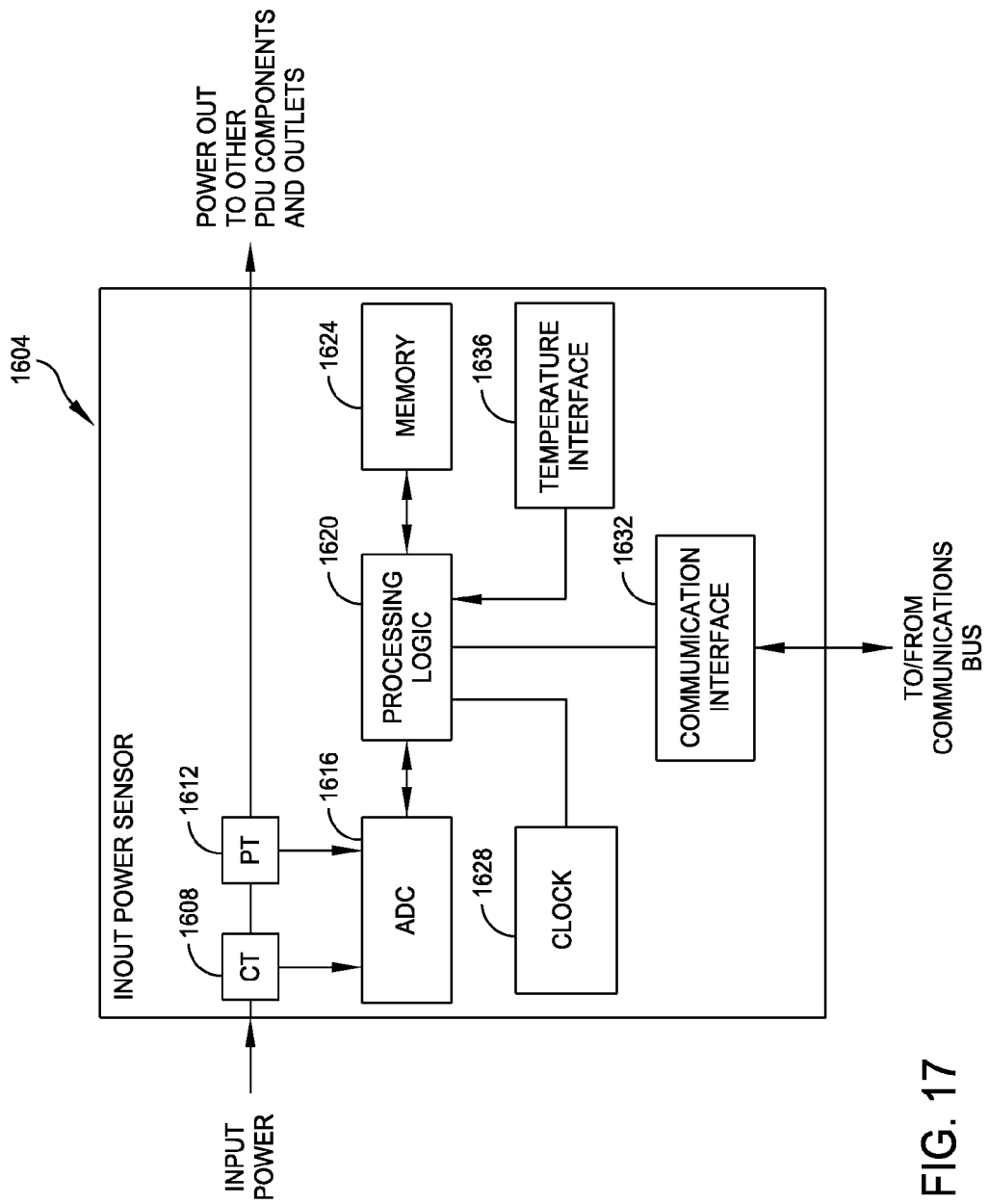
FIG. 17 is a block diagram of an input power sensor.

FIG. 17 is a block diagram illustration of an input power sensor 1604 of an embodiment. In this embodiment, a current sensor 1608 is connected to the input power line and provides an instantaneous output that is proportional to the current that is passing through the input power line. A voltage sensor 1612 is also connected to the input power line and provides an instantaneous output that is proportional to the voltage that is present at the input power line. In one embodiment, the current sensor 1608 includes a current transformer (CT) that senses current flowing in an associated conductor that is routed through the CT. The current transformer, in an embodiment, is a zero-phase toroidal inductor that has two output lines. The output is proportional to the magnitude of the current flowing through the conductor associated with the CT. In this embodiment, the CT outputs a signal that corresponds to the magnitude of the current and is output on two output leads across a burden resistor. This configuration provides the ability to sense output currents up to 63 amperes with a maximum crest factor of 3.0, although it will be readily apparent to one of skill in the art that other configurations are possible. In one embodiment the CT output lead includes a related passive two-pole anti-aliasing filter to provide current sense outputs for the input power line. The current sense outputs are provided as differential input to an analog-to-digital converter 1616 input for use in determining the power metrics related to the power input.

Also provided to the ADC 1616 is information related to the line voltage from voltage sensor 1612. In one embodiment, the line voltage sensor 1612 is a potential transformer (PT) that senses the voltage on the input power line. The PT, in an embodiment, has two output lines, the output proportional to the magnitude of the voltage present between two phases of a polyphase input, or between hot and neutral or ground inputs in a single phase input. In this embodiment, the PT outputs a signal that corresponds to the magnitude of the voltage and is output on two output leads across a burden resistor. This configuration provides the ability to sense output voltages between 85V and 265V for single phase configurations, and 187V to 415V for polyphase configurations, although it will be readily apparent to one of skill in the art that other configurations are possible. In one embodiment the PT output lead includes a related passive two-pole anti-aliasing filter to provide voltage sense outputs for the input power line. The voltage sense outputs are provided as differential inputs to an input of an analog-to-digital converter 1616 for use in determining the power metrics related to the power input. As will be readily apparent to one of skill in the art, other voltage sensing circuits may be used, such as a voltage dropping resistor network, for example.

In the embodiment of FIG. 17, the input power sensor 1604 includes the analog to digital converter 1616, which is a 10 bit ADC with differential channels for the current sense and voltage sense inputs. The voltage and current input signals of this embodiment are differentially filtered through passive RC filters that are two stage (−12 dB/octave; −40 dB/decade) anti-aliasing filters with a cut-off frequency of ~159 KHz. The approximate phase shift (Φ) of these filters is 0.0368 at 50 Hz, and 0.0438 at 60 Hz. Samples from the ADC 1616 are provided to processing logic 1620. A memory 1624 is interconnected to the processing logic 1620 and may be used to store information related to power metrics and sampled current and voltage information, as well as any programming used by the processing logic. An internal clock 1628 provides an internal time base. In one embodiment, the processing logic 1620 also receives a frequency sense signal that allows accurate synchronization with an AC cycle, in a manner similar as described above with respect to FIG. 10.

The power sensor 1604 also includes a communications interface 1632. The communications interface may be used to receive and transmit information from/to a communications bus, such as power metrics computed by the processing logic. In one embodiment, the communications bus is an I2C bus, and electrical parametrics from the power sensor 1604 are communicated to power manager agent 36 via the I2C bus. In the embodiment illustrated in FIG. 17, the power sensor 1604 may include a temperature sensor 1636 that is used to compensate for temperature-related variances in the outputs of the current and voltage sensors 1608, 1612. In one embodiment, the ADC 1616, processing logic 1620, memory 1624, clock 1628, and communications interface 1632 are all implemented in a microcontroller. In an embodiment, such a microcontroller is a Silicon Labs 8051-based F311 microcontroller chip (IC). The power sensor 1604 in an embodiment derives the following electrical parametric measurements and power calculations from information provided by the current sensor 1608 and voltage sensor 1612: AC voltage per phase or branch, AC current per phase or branch, per-phase current sensing, active power in watts, apparent power in volt-amps, power factor (PF), accumulated energy in watt-hours (WHr), and other parameters as desired. In one embodiment, the power related metrics are derived in the manner as described above with respect to FIG. 11.

As described above with respect to sampling and calculations performed when deriving power metrics related to outputs of a PDU, the voltage sensing of the embodiment of FIG. 17 uses a PT rather than a voltage dropping resistor network. In such an embodiment, sensor phase shifts from the CT and the PT are taken into consideration when performing power calculations. In one embodiment, a CT is used in which the output has a phase shift of about 0.25 degrees, and results in differing power calculation errors depending upon the power factor (PF), with a 0.70 PF resulting in a 0.446% Power calculation error and a 0.95 PF resulting in a 0.144% power calculation error. Similarly, a PT used in an embodiment in which the output has a phase shift of about 0.50 degrees, and results in differing power calculation errors depending upon the power factor (PF), with a 0.70 PF resulting in a 0.894% power calculation error and a 0.95 PF resulting in a 0.291% Power calculation error.

In one embodiment, phase shift differences between the CT and PT are compensated, at least partially, through the use of a sampling delay at the ADC, by reading the CT first and then reading the PT. In any event, this embodiment provides a worse case power calculation error of around 0.45%.

Power-parametric accuracies, in an embodiment, are as follows: (a) A.C. Voltage (per Phase)—1.0%; (b) A.C. Current (per Phase)—1.0% (c) Active Power (Watts)—2.0%; (d) Apparent Power (VA)—2.0%; (e) Power Factor (PF)—3.0%; (f) Accumulated Energy (Watt Hours) (WHr)—2.0%; and (g) Crest Factor—10%.

Per input power sensing is accomplished in PDUs having several different input power configurations. For example, a PDU may have a Delta or Wye input configuration. PDUs may have two or more branches of power outputs that may be separately fused. PDUs also may have two or more input power cords, and combinations of input power cords and branches (e.g. dual corded single phase dual branch).

Figure 18:
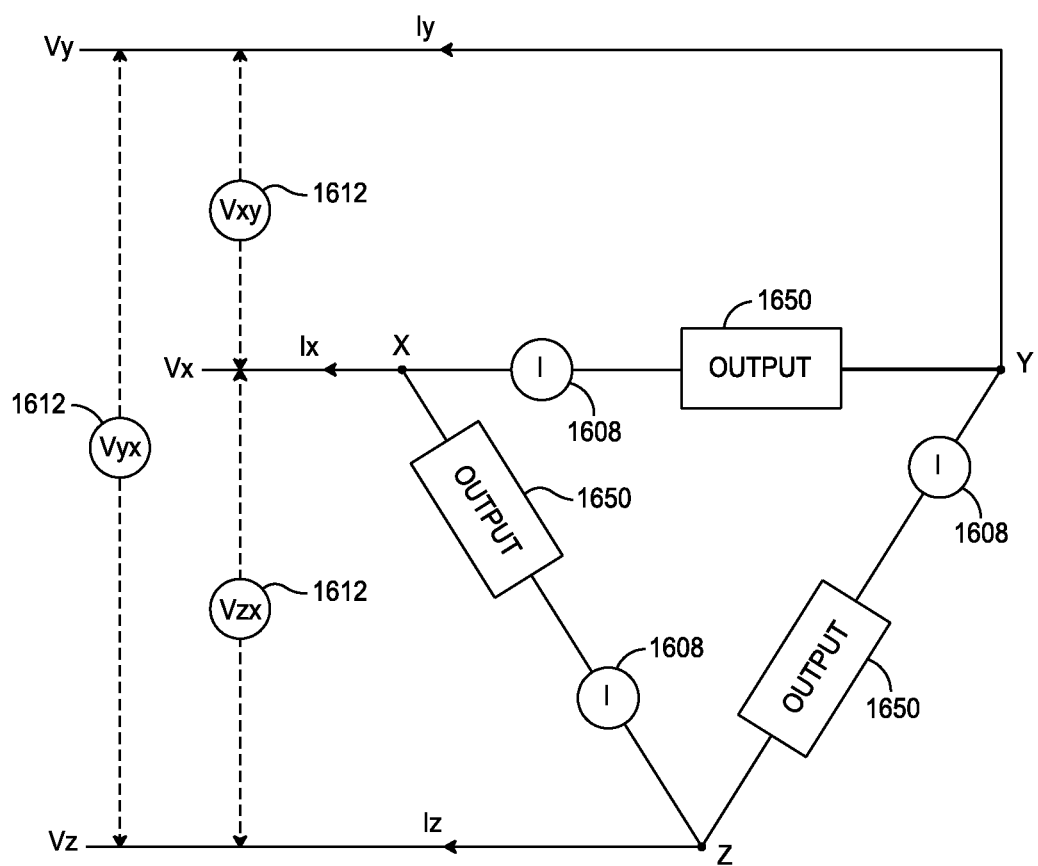
FIG. 18 is a schematic diagram of a delta configuration.
Figure 19:
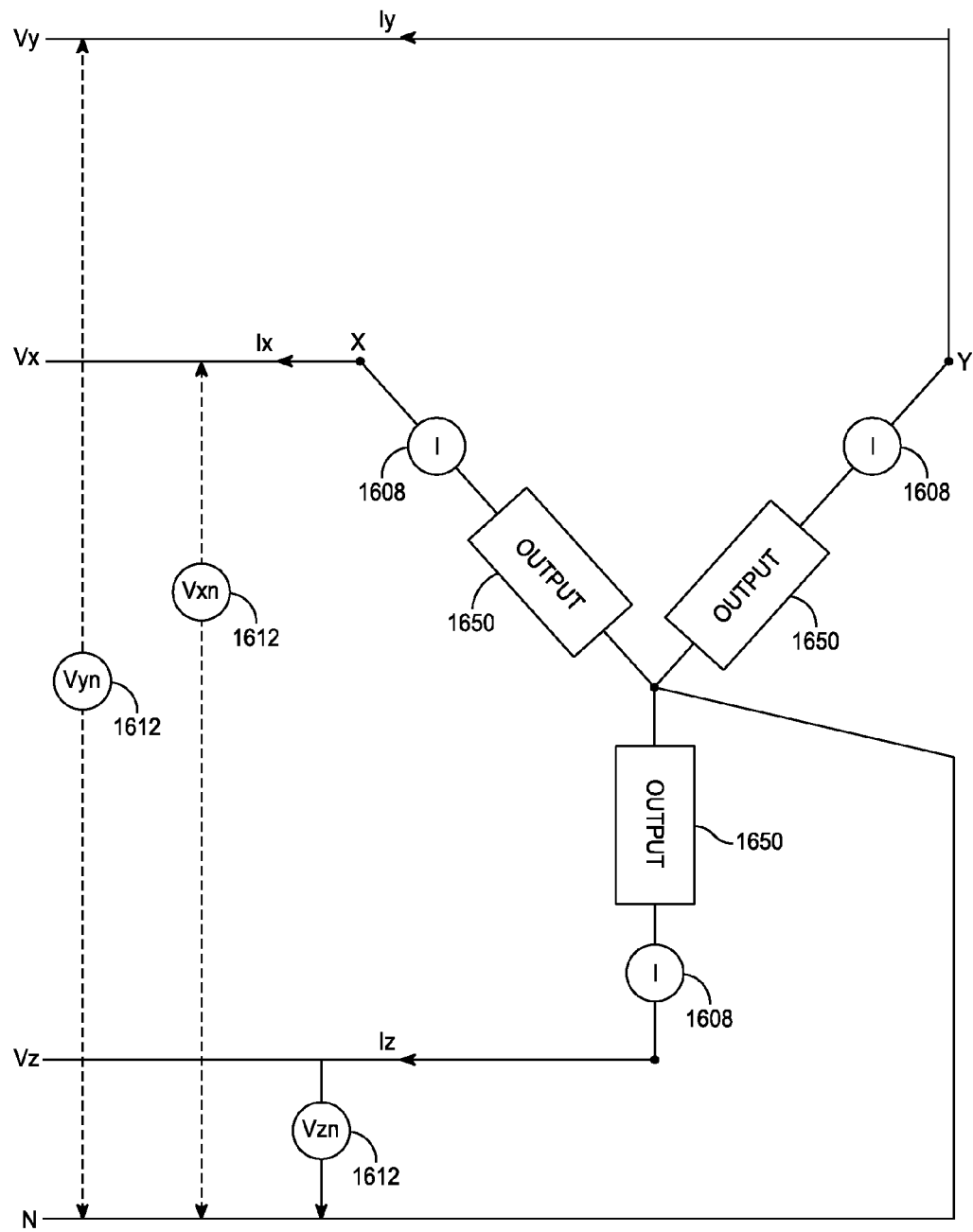
FIG. 19 is a schematic diagram of a wye configuration.
Figure 20:
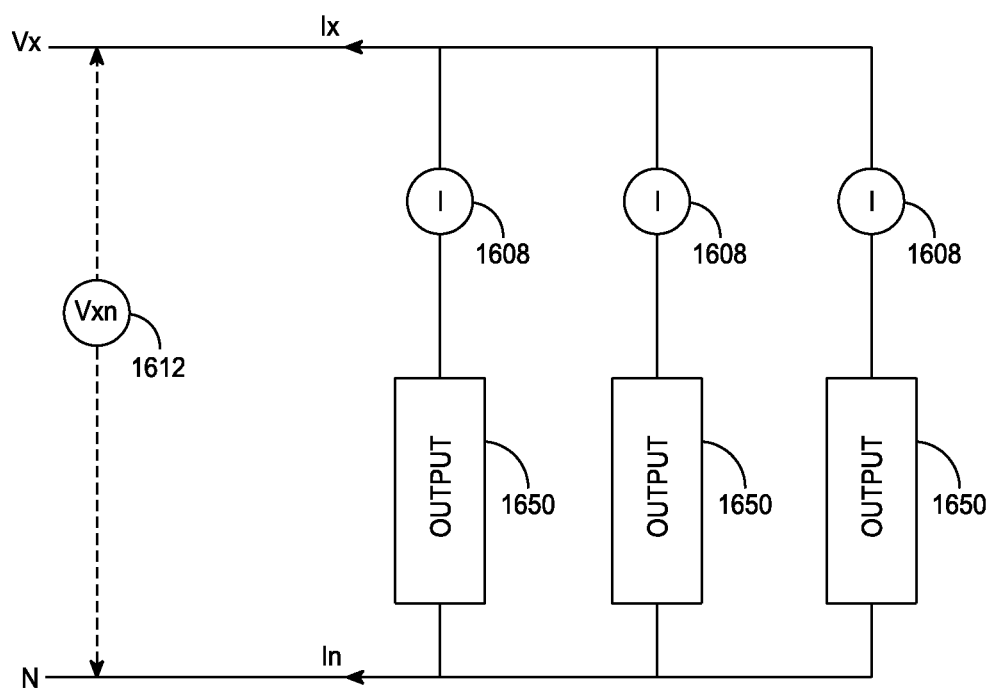
FIG. 20 is schematic diagram of a three-branch configuration.
Figure 19A:
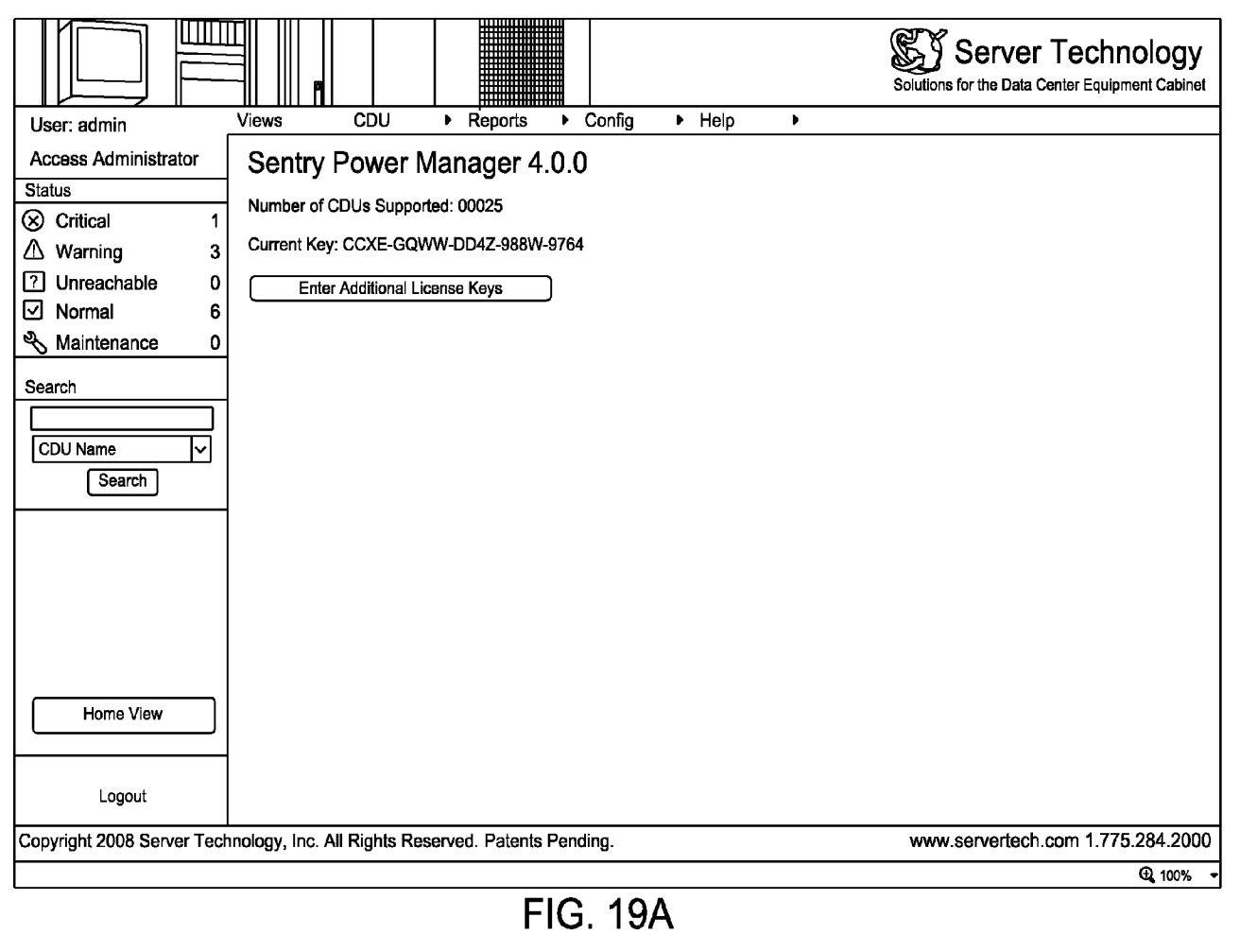
Figure 20A:
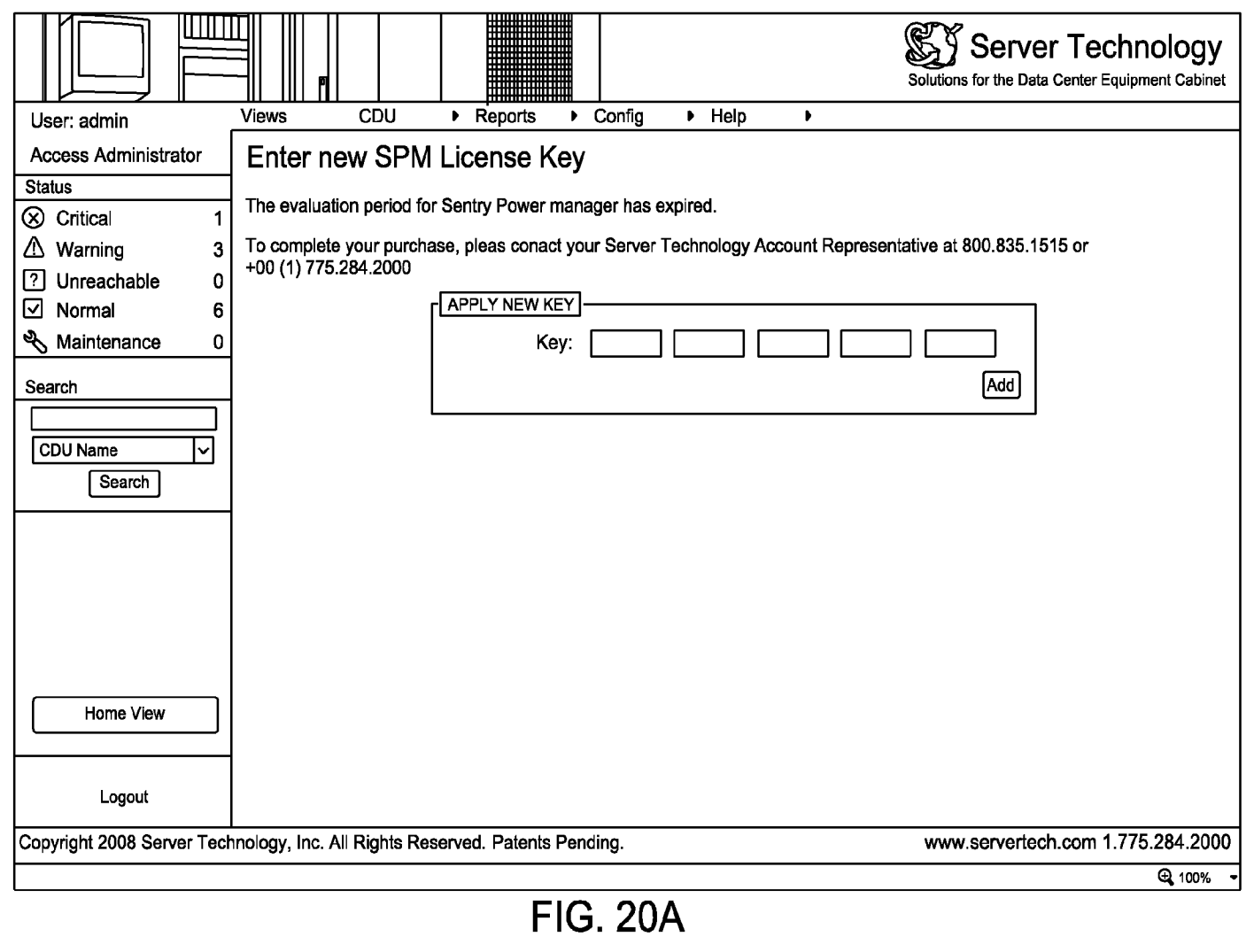
Figure 21A:
FIG. 21 is a schematic diagram of a dual power cord configuration.
Figure 22A:
FIG. 22 is a schematic diagram of a dual power cord, multiple branch configuration.

FIG. 18 illustrates a Delta configuration, in which current sensors 1608 are associated with each phase of the Delta configuration, and voltage sensors 1612 are arranged per phase to provide current and voltage information for the outputs 1650 that are associated with a particular phase. FIG. 19 illustrates a Wye configuration, in which current sensors 1608 are associated with each phase of the Wye configuration, and voltage sensors 1612 are arranged per phase to provide current and voltage information for the outputs 1650 that are associated with a particular phase. FIG. 20 illustrates a single phase three branch configuration, in which outputs 1650 are arranged on three separate branches. Each branch has a separate current sensor 1608, and a single voltage sensor 1612 is provided as the voltage across the parallel branches will be the same. FIG. 21 illustrates a configuration in which two power cords are present, each power cord providing input power for a separate branch of outputs 1650. Current for each branch is measured at respective current sensors 1608, and voltage for each branch is measured at respective voltage sensors 1612. FIG. 22 illustrates a configuration in which two power cords are present, with each power cord providing input power to two separate branches of outputs 1650. In such a configuration, voltage sensors 1612 are provided for each power input, and current sensors 1608 are provided for each branch. In each different configuration of the examples of FIGS. 18-22, outputs from the current and voltage sensors are provided to the ADC and processing logic and power data per phase or branch may be reported separately or aggregated to provide total power information.

Figure 25:
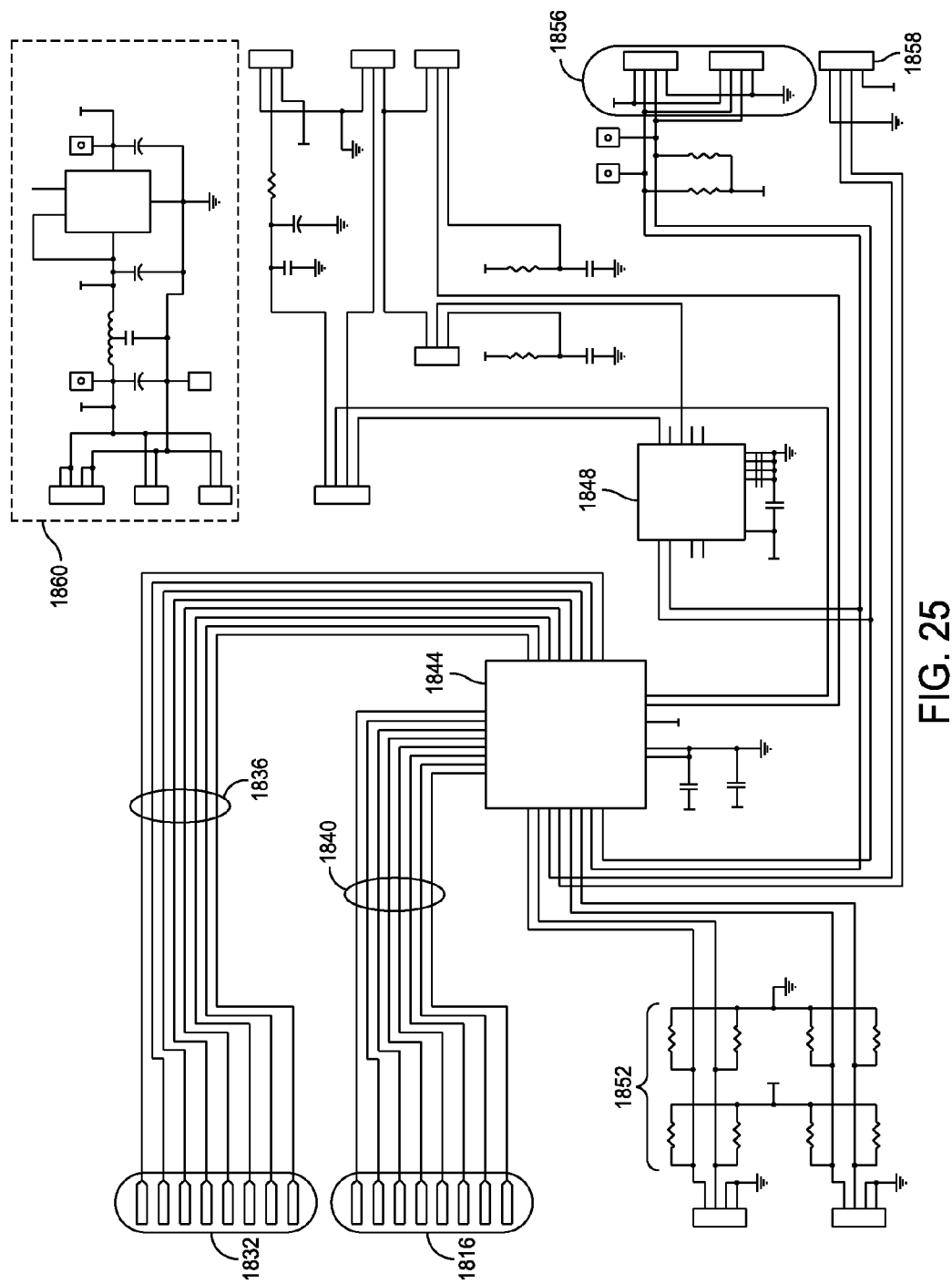
Figure 23A:
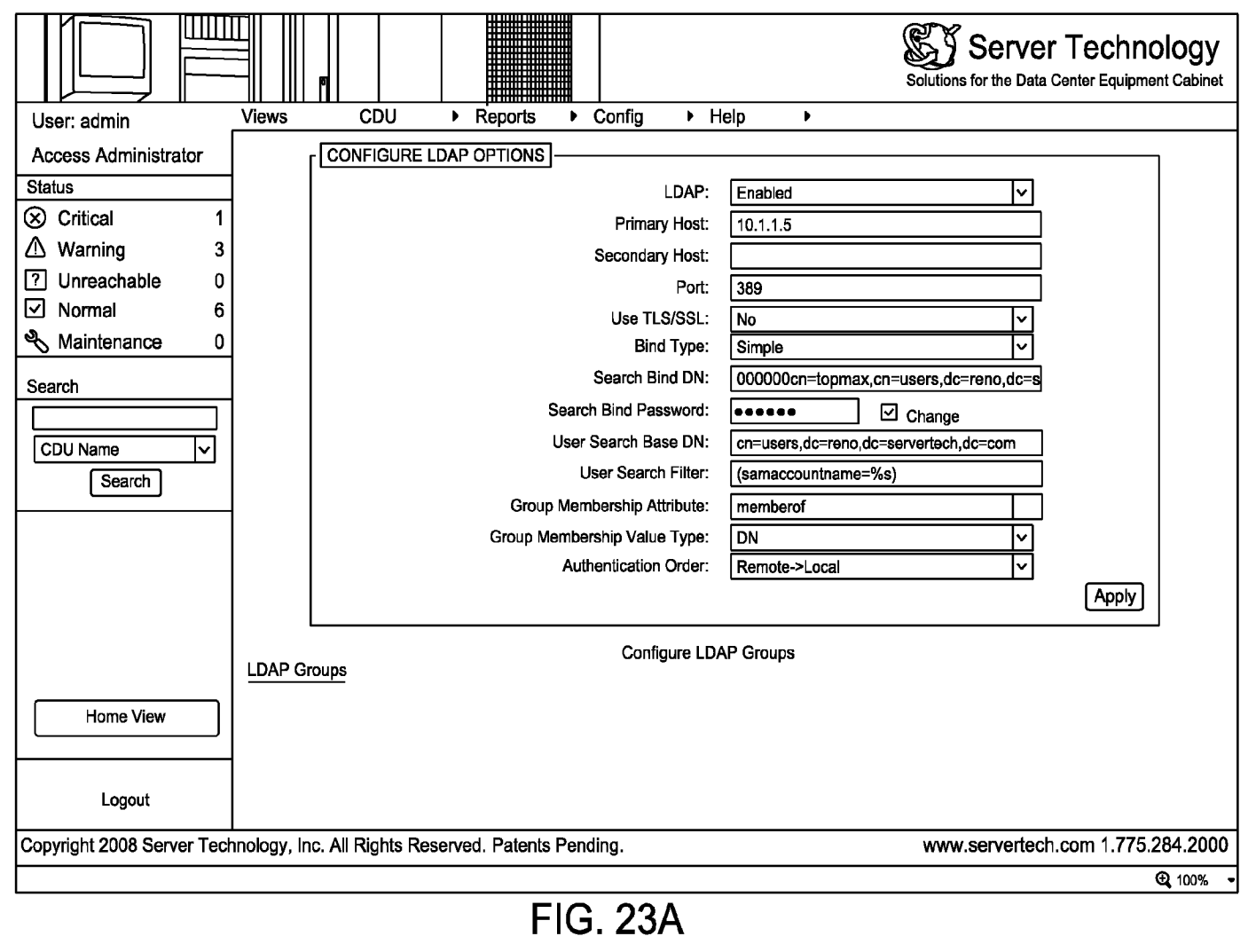
Figure 24A:
Figure 25A:
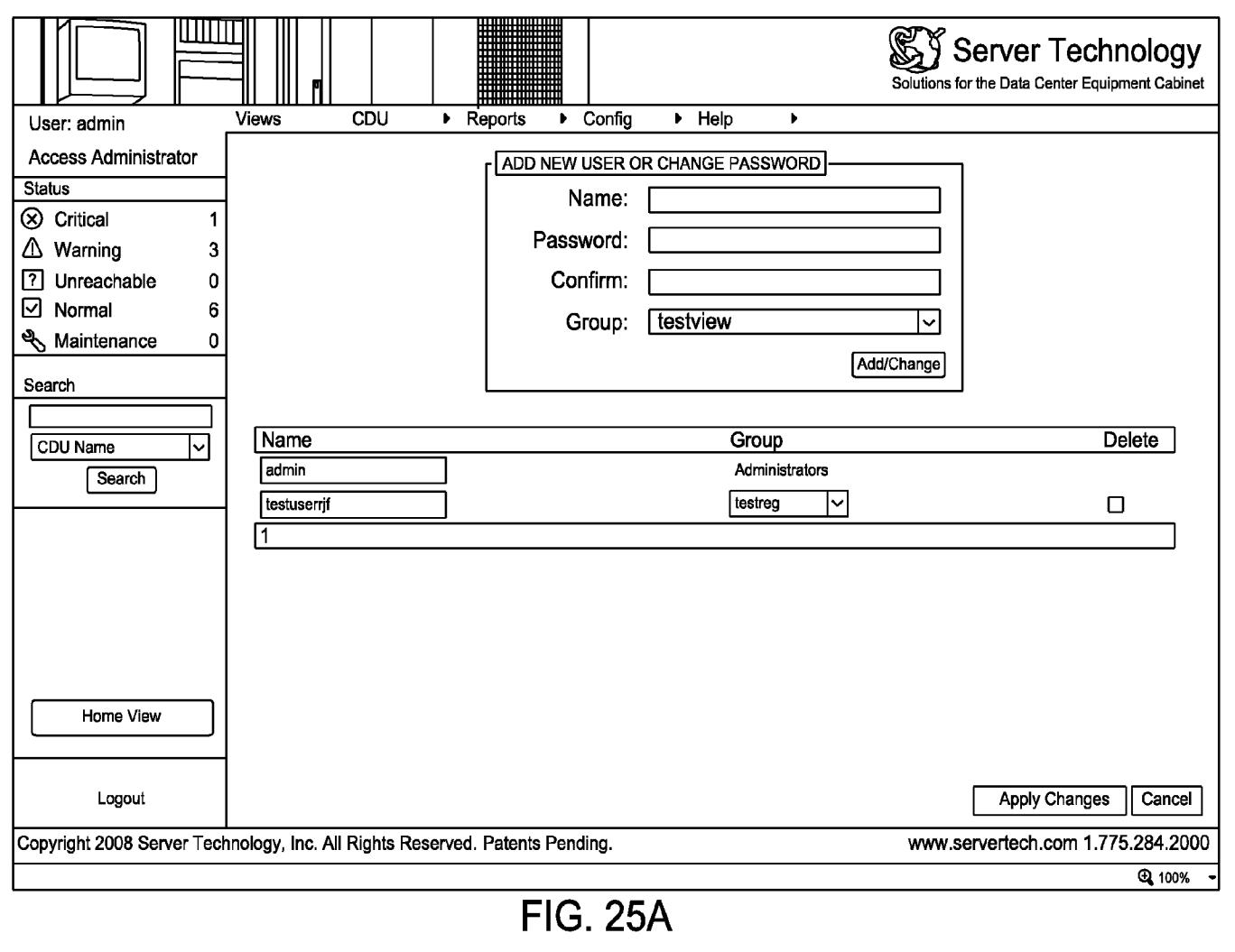
Figure 26A:
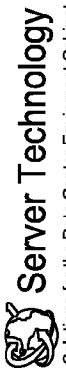
Figure 29A:
Figure 30A:
Figure 31A:
Figure 37A:
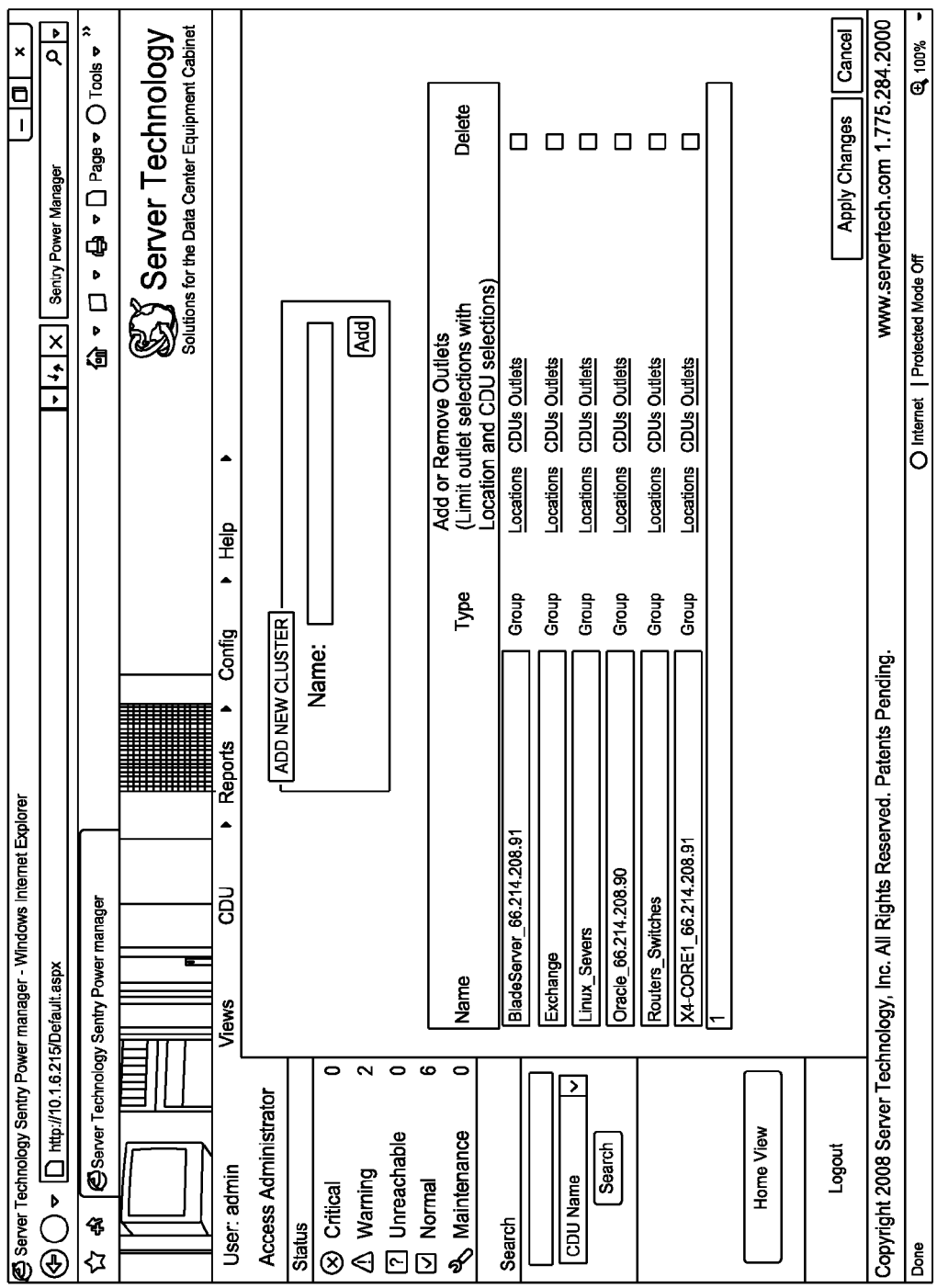
Figure 42A:
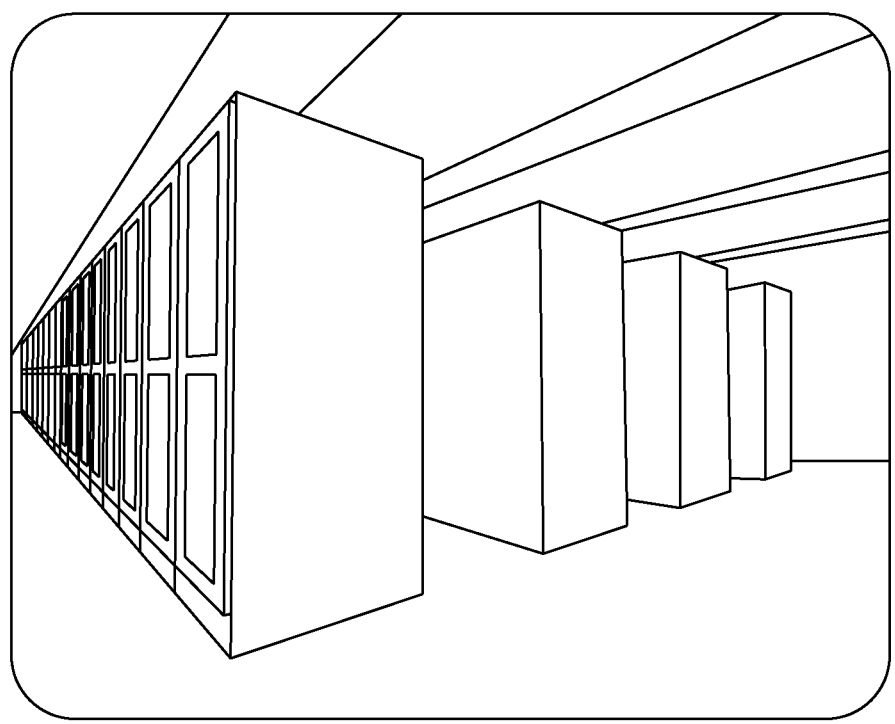
Figure 43A:
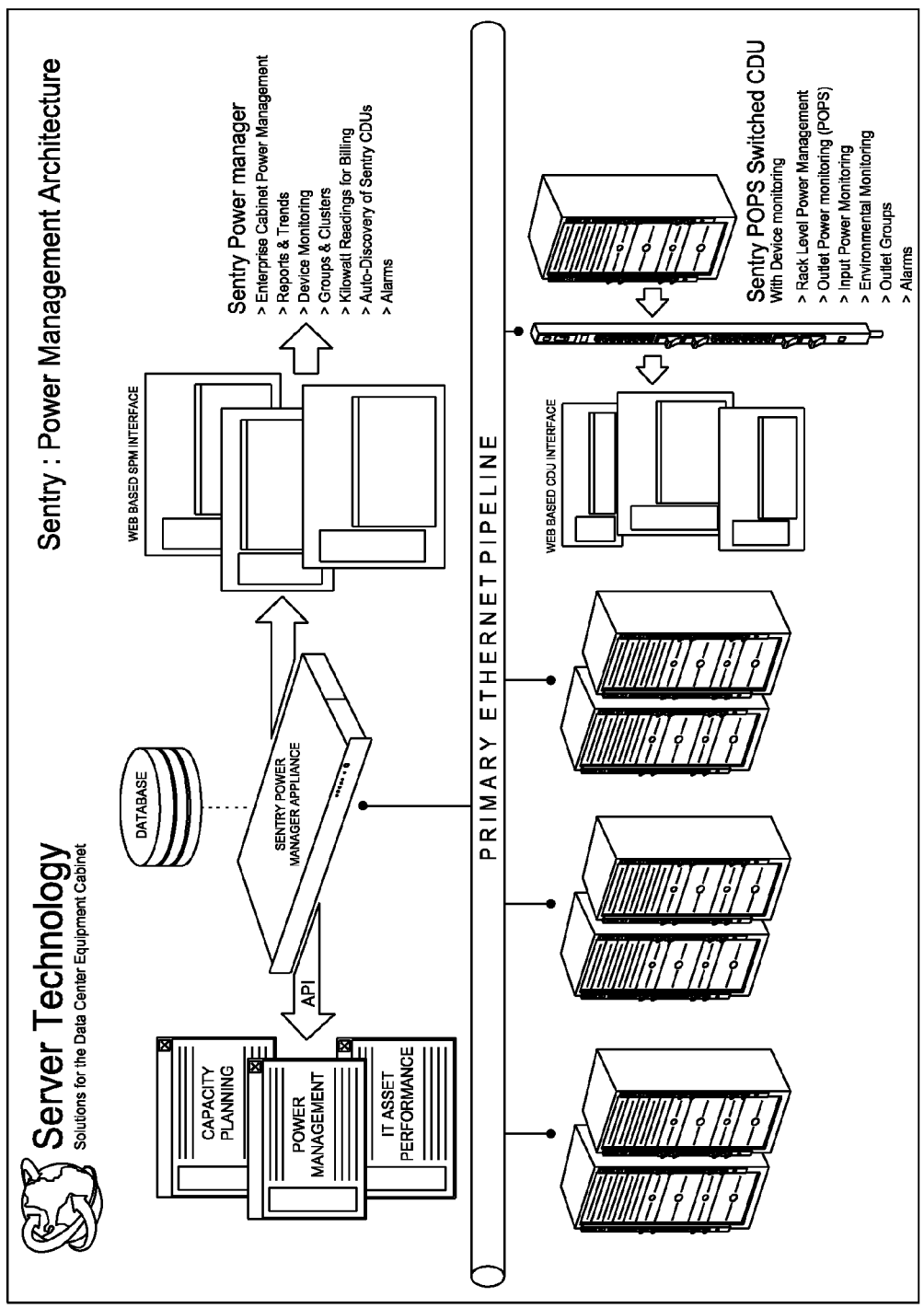
Figure 44A:
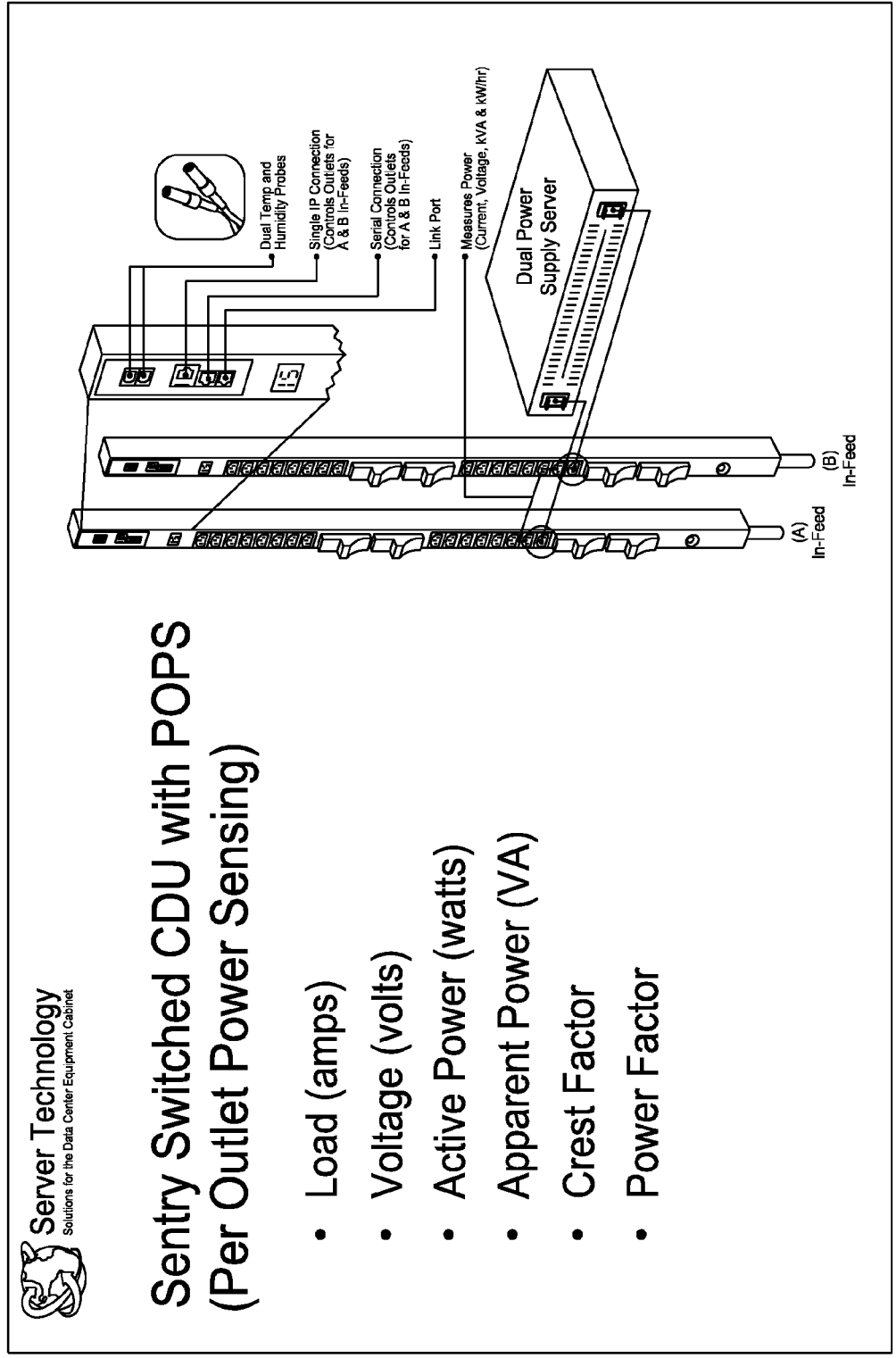
Figure 45A:
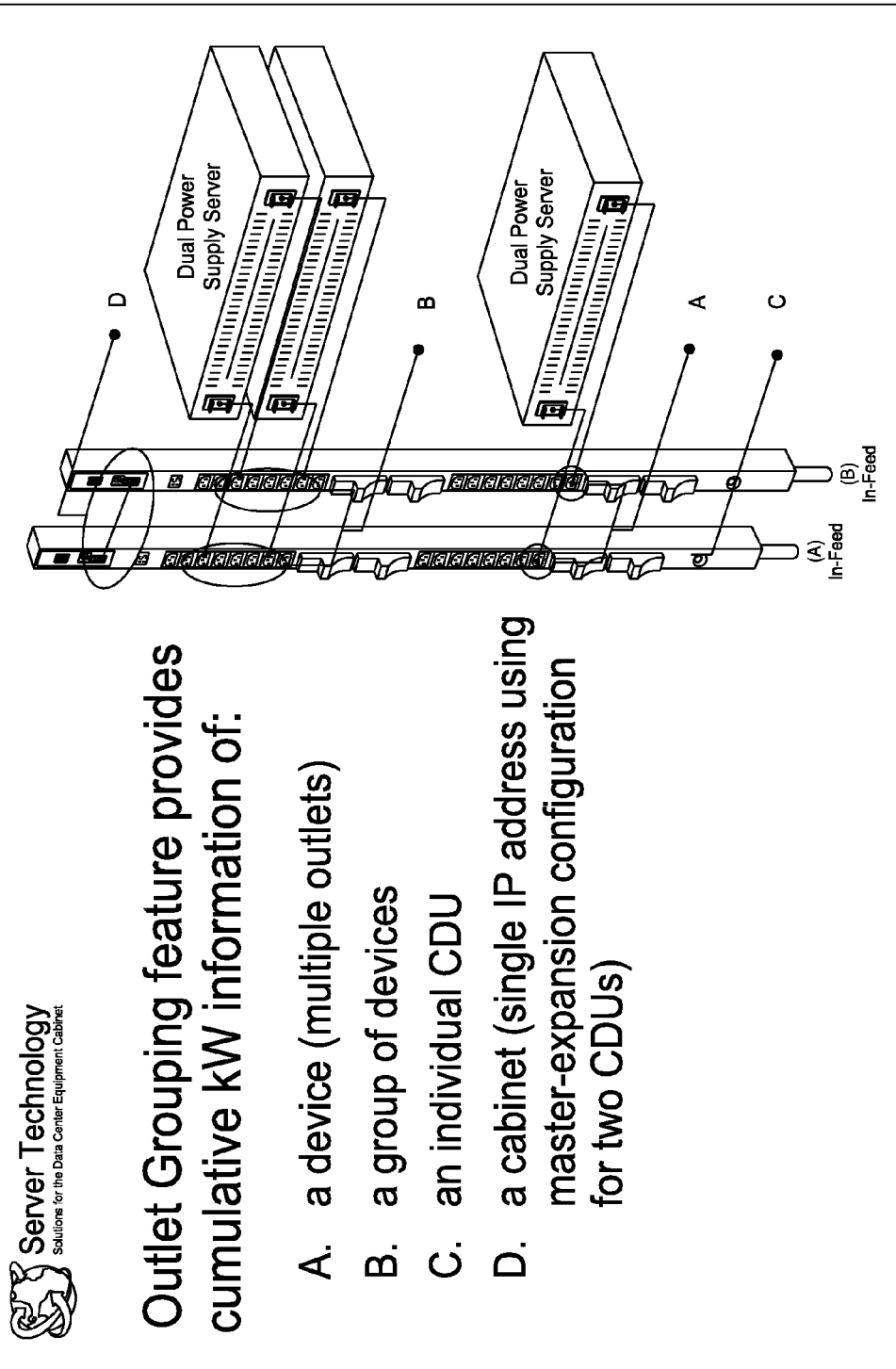
Figure 47A:

With reference now to FIGS. 23-25, schematic diagrams of a specific embodiment are described. In this embodiment, a PDU includes current sense components 1800, and voltage sense components 1818. As described above, current sense may be accomplished through one or more current transformers. In the embodiment of FIG. 23, four current sense channels are provided through inputs 1804 to a printed circuit board. The input from each current transformer is provided across a burden resistor 1808 and a two-pole anti-aliasing filter 1812 to differential current sense inputs 1816 that are provided to a microcontroller. As also described above, voltage sense may be accomplished through one or more potential transformers. In the embodiment of FIG. 24, four voltage sense channels are provided through inputs 1820 to the printed circuit board. The input from each potential transformer is provided across a burden resistor 1824 and a two-pole anti-aliasing filter 1828 to differential voltage sense inputs 1832 that are provided to a microcontroller.

The voltage sense inputs 1832 and the current sense inputs 1816 are provided to differential inputs 1836, 1840, respectively, of a microcontroller 1844. The microcontroller 1844, in this embodiment, is an 8051 microcontroller manufactured by Silicon Laboratories, Inc. In the embodiment of FIG. 25 microcontroller 1844 is used to provide computations for determining power-related parameters. Microcontroller 1848 is used for communications of input current information to associated displays. An on-sense/frequency sense circuit 1852 provides an indication, for each channel, that may be used for frequency determination and also, in some embodiments, for indicates that power is present at the channel. In other embodiments, similarly as described above, frequency sense provided by circuit 1852 may be used as clock information when power-related parameters are computed. The microcontroller 1844 of this embodiment is connected to an I2C bus 1856 for communications to/from the microcontroller 1844. A serial port 1858 is present in this embodiment, and may be used for debugging and troubleshooting purposes. Finally, a power supply 1860 is used to provide DC operating power to components on the board; however, a separate 3.0 volt DC power supply (not shown) may be used to provide a reference signal for analog-to-digital conversion.

Figure 26:
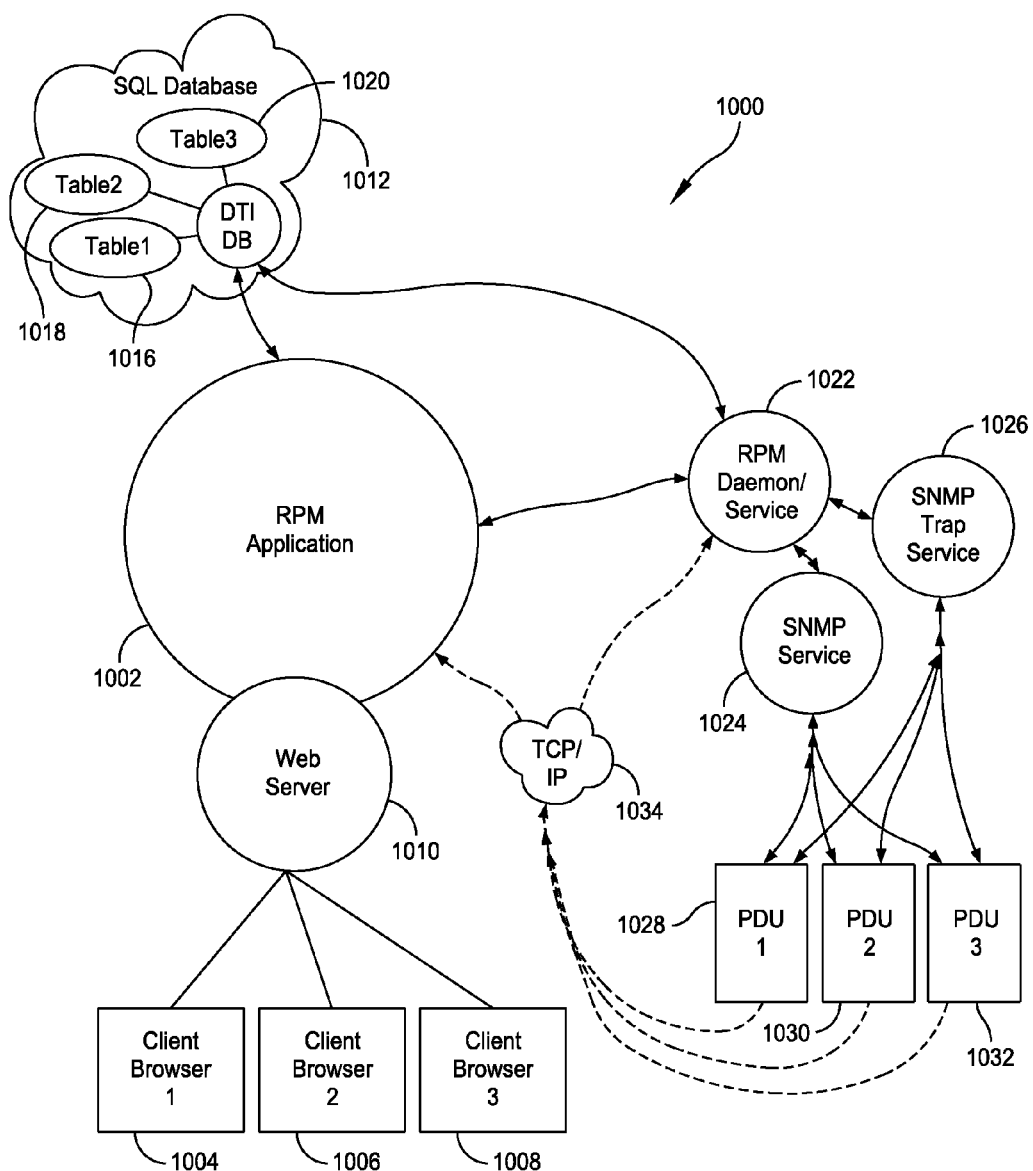
FIG. 26 is a depiction of an environment in which the invention may be practiced.

FIG. 26 shows an exemplary environment generally 1000 in which some embodiments of the invention may be practiced. A sentry power manager (SPM) 1002 may be configured for various kinds of user interactions. In the embodiment shown, the SPM is provided as an Internet-based application that communicates with client web browsers 1004, 1006 and 1008 through a web server 1010. The SPM may create, maintain, access and update a database 1012 of tables 1016, 1018 and 1020 such as the tables to be described below. The database may be a Microsoft SQL Server database. The SPM may access the database directly or through a daemon/service 1022 that eases any processing burden on the SPM and network traffic to and from the SPM.

The daemon/service or the SPM itself may communicate with a simple network management protocol (SNMP) service 1024 and an SNMP trap service 1026. The SNMP service in turn communicates with one or more power distribution units (PDUs) 1028, 1030 and 1032.

The PDUs may comprise, for example, PDUs as described above and distributed by Server Technology, Inc. (STI) of Reno, Nev. A PDU may be monitored and controlled by an electronic control system, of which one example is the Mt. Rose controller board distributed by STI. Each PDU may include one or more electrical outlets and sensors that indicate voltage present at the outlets and current flow through each outlet. Data obtained from the PDUs may be retrieved through the SNMP service and stored in the database. Similarly, data stored in the database may be used to configure or control the PDUs via the SNMP service. Communication protocols other than SNMP, for example XML, could also be used.

Messages spawned proactively or reactively by the PDUs may be sent to the daemon service through the SNMP trap service. Or the PDUs may communicate directly with the RMP by a TCP/IP communication protocol 1034 or another communication channel or protocol.

Figure 27A:
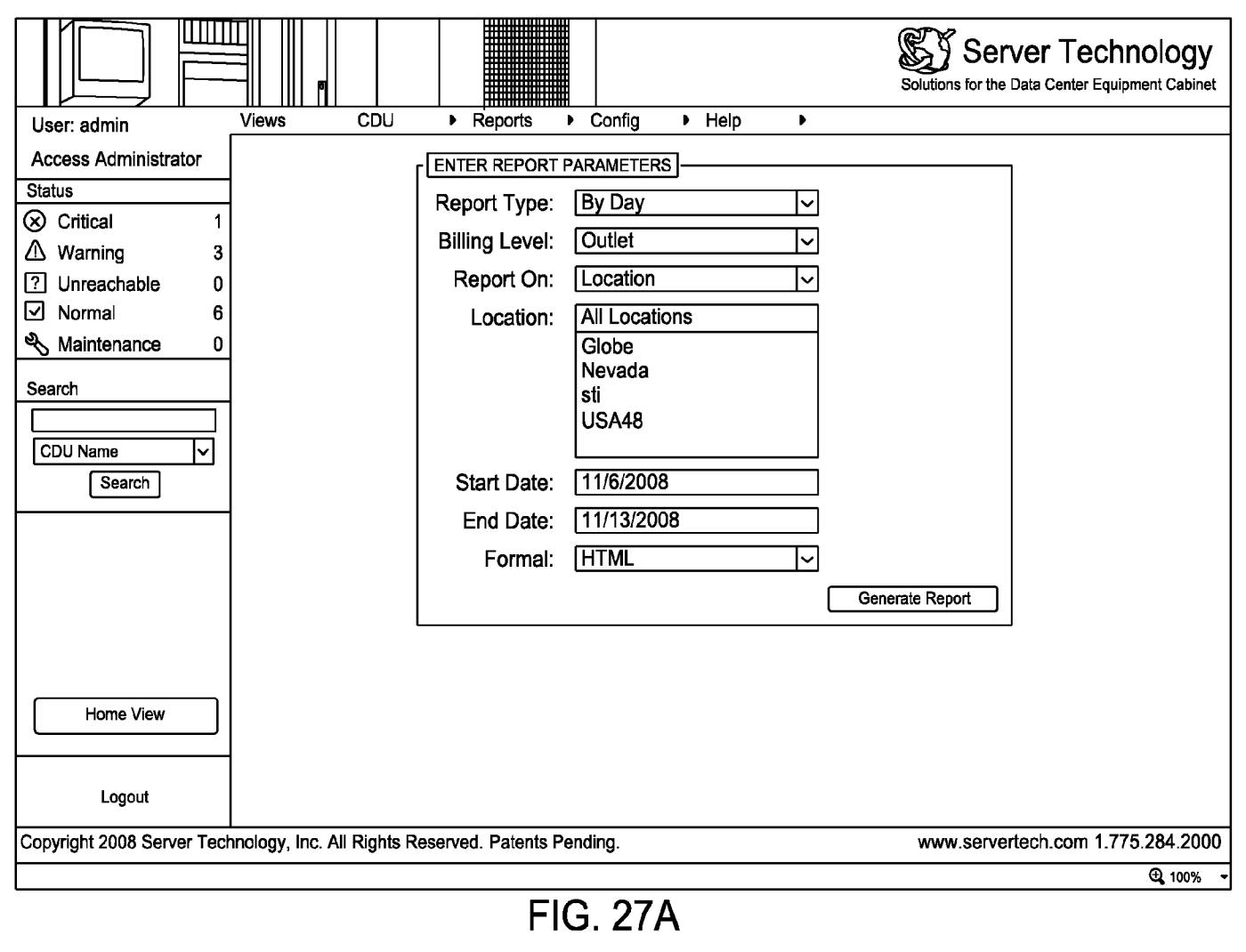
Figure 27:
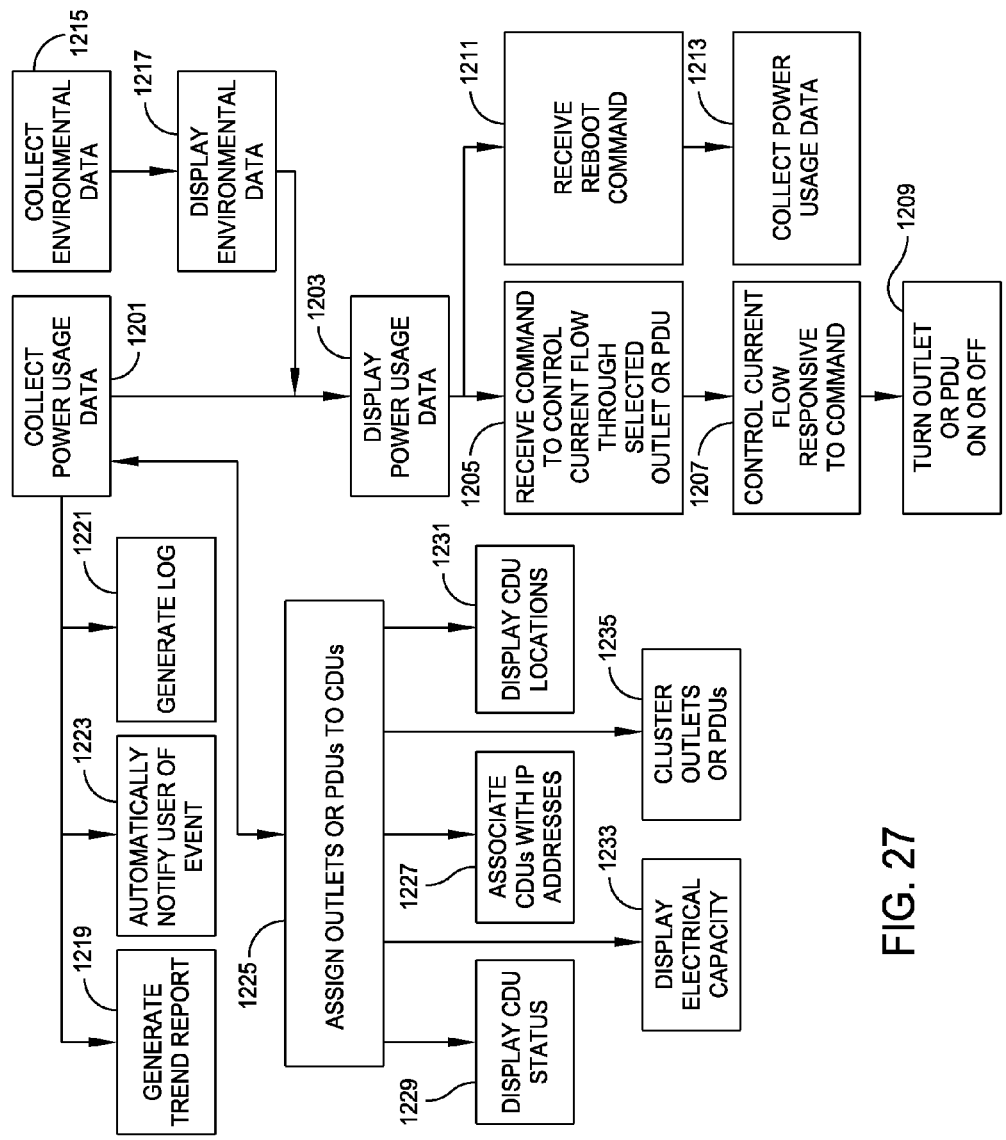
FIG. 27 is a flow chart of a method of managing electrical power usage.

FIG. 27 illustrates a method of managing electrical power usage according to the principles of the invention. The method includes collecting 1201 power usage data indicative of electrical current flow through some or all of a plurality of electrical outlets in a PDU or through one or more PDUs, displaying 1203 the power usage data to a user, receiving 1205 a user-initiated command to control current flow through any outlet or PDU selected by the user, and controlling 1207 current flow through the selected outlet or PDU responsive to the command. Controlling current flow through an outlet may be accomplished by turning the outlet on or off 1209.

The method may include receiving 1211 a user-initiated command to reboot control circuitry associated with one or more of the outlets or PDUs and rebooting 1213 the control circuitry responsive to the command.

The method may include collecting 1215 environmental data indicative of environmental conditions of the electrical outlets or PDUs and displaying 1217 the environmental data to the user. The environmental data may include temperature or humidity (or both) or other environmental factors as desired. A report descriptive of a power usage trend may be generated 1219 automatically or responsive to a user request. A log of events may be generated 1221. A message may be automatically sent 1223 to a user if a user-defined event occurs. Such an event may be, for example, sensing of any of a predetermined temperature, a predetermined humidity, or a predetermined amount of electrical power usage by one or more outlets or PDUs. The user may specify the parameters of an event for a one-time report or a report may be sent automatically each time the event occurs. Or an SNMP trap may be used when an event occurs.

The method may include assigning 1225 one or more outlets or one or more PDUs in any one location to a cabinet distribution unit (CDU) in that location. At least one unique IP address may be associated 1227 with each location having one or more CDUs. If there are several CDUs at a given location, each may get a separate IP address or a single IP address may be used for some or all of the CDUs at that location. Collecting power usage data respecting an outlet or PDU may be accomplished by communicating via the Internet with the IP address associated with the CDU containing that outlet or PDU.

Displaying information to the user may include displaying 1229 the status of one or more CDUs. The status of a CDU may be any of critical, warning, normal, unreachable, or maintenance. "Critical" denotes a condition that may require immediate corrective action. "Warning" denotes a condition that may require attention, for example a parameter has changed since a previous report or display. "Normal" denotes all parameters are within limits that the user may specify or that may have been predetermined at some prior time "Unreachable" indicates a communication failure between the CDU in question and the power manager.

"Maintenance" indicates that the CDU in question is being maintained and will remain in that status until manually changed.

The method may include displaying 1231a graphical representation of locations of CDUs in the power distribution system. This graphical representation may take the form of a world map with indicators such as icons placed over CDU locations. Maps drawn to various scales may be provided; for example, a map of the United States may indicate all CDU locations in that country, a map of Nevada may indicate all CDU locations in Nevada, and a map of Reno may indicate all CDU locations there.

The method may include displaying 1233 an amount of electrical power available to a CDU. This may be, for example, the capacity of the electrical feed at a given location, or into the CDU cabinet or into a particular CDU.

The method may include grouping or clustering 1235 a plurality of outlets or PDUs. This includes assigning a plurality of outlets or PDUs in a CDU having one IP address and a plurality of outlets or PDUs in a CDU having another IP address to a cluster. Once this has been done, various ones of the above-described steps may conveniently be applied to all outlets or PDUs in the cluster. For example, the status of the cluster may be displayed, a user-initiated command to control current flow through any or all outlets or PDUs in a cluster selected by the user may be received, and current flow through any or all outlets or PDUs in the user-selected cluster may be controlled responsive to the command.

Typically, some or all outlets and PDUs have their own current sensor. A voltage sensor is provided for individual outlets or PDUs or banks of outlets and PDUs as needed. Data gathered by these sensors may be used locally, for example to calculate power consumption, which information is thereupon transmitted to the SPM 1002 (see FIG. 1) or the sensor data may be transmitted directly to the SPM.

Tables that may be used in embodiments of the invention will now be described. These tables may include, for example, SYSTEM tables, TOWER tables, INFEED tables, OUTLET tables, ENVMON tables, TEMPHUMID tables, CONTACTCLOSURE tables, STATUS LOOKUP tables, SNMP OID LOOKUP tables, OUTLET CLUSTER tables, TRENDING tables, USERS tables, DISCOVERY tables, GRAPHICAL DISPLAY tables, ALERT tables and REPORT tables. Throughout the following discussion of tables, any reference an outlet may refer instead to a PDU or a group of PDUs, and any table directed to characteristics or parameters of individual outlets may instead be directed to characteristics or parameters of one or more PDUs.

A SYSTEM table may represent the highest level in a hierarchy. This table may contain system-wide information such as the name and IP address of an entire system. Table 1 is an exemplary system table:

TABLE 1

MRSystem Table

| FIELD NAME | Description | How Obtained |
| --- | --- | --- |
| MRSYSTEMID | Primary Key | Generated when added |
| MRSYSTEM_NAME | User Assigned Name | From SNMP GET or from User entry |
| MRSYSTEM_IP_TYPE | IP type - 0 = IPV4, 1 = IPV6 | Defaults to 0 |
| MRSYSTEM_IPADDR | System IP address | From device discovery or from User entry |
| MRSYSTEM_TCPIP_PORT | include for future expansion | Defaults to 161 |
| MRSYSTEM_LOCATION | User defined location string | From SNMP GET or from User entry |
| MRSYSTEM_CONTACT | User specified system contact | From SNMP GET or from User entry |
| MRSYSTEM_DESCR | User specified system description | From SNMP GET or from User entry |
| MRSYSTEM_WATTS_PER_UNIT_AREA | System calculated value | From SNMP Poll |
| MRSYSTEM_AREA | User specified area powered by this system | From SNMP GET or from User entry |
| MRSYSTEM_TOTAL_POWER | Total power being used | From SNMP poll |
| MRSYSTEM_ENV_MON_COUNT | Number of environmental monitors on this system | From SNMP GET |
| MRSYSTEM_TOWER_COUNT | Number of towers on this system | From SNMP GET |
| MRSYSTEM_NIC_SERIALNUMBER | Network interface card serial number | From SNMP GET |
| MRSYSTEM_VERSION | Firmware version on this system | From SNMP GET |
| MRSYSTEM_SNMP_PUBLIC | The SNMP public access string - default to "PUBLIC" | User entered or from discovery tables |

TABLE 1-continued

MRSystem Table

| FIELD NAME | Description | How Obtained |
|---|---|---|
| MRSYSTEM_SNMP_PRIVATE | The SNMP private access string - default to "PRIVATE" | User entered or from discovery tables |
| Icon | Not Used | Not Used |
| DisplayMapID | Not Used | Not Used |
| XLoc_Level1 | Not Used | Not Used |
| YLoc_Level1 | Not Used | Not Used |
| Status_Change_Time | Timestamp of last update to the device | System derived |
| Status_Critical | Number of critical alarms this CDU has | System derived |
| Status_Warning | Number of warning alarms this CDU has | System derived |
| Status_Unreachable | Flag whether this CDU is unreachable or not | System derived |
| Status_Maintenance | Flag whether this CDU is in maintenance mode or not | System derived |
| Current_Val | This systems highest current reading | System derived |
| Power_Val | This systems highest power reading | System derived |
| Temp_Val | This systems highest temperature reading | System derived |
| Humid_Val | This systems highest humidity reading | System derived |
| Snooze_Start | Time this system has gone into maintenance mode | User assigned |
| Snooze_End | Time this system will leave maintenance mode | User assigned |
| RackID | Link to the Racks table | Assigned by an admin on the GUI |
| MRSystem_Cap | System capacity of Watts per area unit | Entered via the Admin on the GUI |
| MRSystem_Area_Unit | Area unit used to derive system capacity | SNMP Get |
| MRSystem_PowerFactor | The power factor used in power calculations performed by the system. | SNMP Get |

Note that most of the fields in this table may be populated via SNMP GETs. For the fields that can be either SNMP specified or user specified, the SPM may attempt to get the value via SNMP when the device is discovered. If unable, no value or a user specified value can be used. When the user specifies a value, an attempt will be made to set the new value on the actual system, but the value in the table is the overriding value if the value on the system differs from the value on the device. Values that are retrieved only via an SNMP GET are not settable by the user, since they are hardware configuration values from the system. The values that are retrieved via an SNMP Poll are dynamic values that may change as the system is used. The polling operations may occur as the data is required by the SPM (e.g., as the data is required by a graphical user interface (GUI) of the SPM), and the polling data may or may not be saved in the database (the labels may remain in the database for OID table lookup reasons). Much of the data retrieved via SNMP Poll operations may be stored in a TREND table for purposes of a trending feature. That is, data may be stored in a TREND table for the purpose of monitoring data trends, viewing or printing reports, or taking appropriate action based on a trend.

The SYSTEM table may have a one-to-many relationship with the TOWER, ENVIRONMENTAL MONITOR, CONTACT CLOSURE, TEMPERATURE/HUMIDITY PROBE, INFEED and OUTLET tables/devices in the system. In one embodiment, all of the children (tables) of a SYSTEM table contain the primary key of their SYSTEM table. This characteristic may be true of the tables in several portions of the database, including the SYSTEM tables, TOWER tables, INFEED tables, OUTLET tables, and ENVMON tables. As a result, the entire system may be described by queries that request the parent's primary key. The SNMP public and private access strings may be included in the system table. These values can be set by the user and may correspond to strings in the controller board firmware. The DISCOVERY tables may contain the strings to use, and these fields may be initially set from these values.

Additional fields may be added to a SYSTEM table to support GUI functions such as the display of custom graphics (e.g., icons, schematics or photos representing managed devices or device groups).

An exemplary TOWER table will now be described. A tower may be a PDU or other device having a processor such as an ARM processor. One or a plurality of towers may exist within a system. Table 2 shows an exemplary TOWER table.

TABLE 2

| | Mt. Rose TOWER table | |
|---|---|---|
| FIELD NAME | Description | How Obtained |
| MRTOWERID | Primary Key | Generated when added |
| MRTOWER_NAME | User Assigned Name | From SNMP GET or from User entry |
| MRTOWER_ABS_NAME | System Generated with the first tower, for example, being A, the second B, etc. All towers have a unique absolute name, which may be the system IP address appended with the absolute name | From SNMP GET |
| MRSYSTEMID | Primary key of the system table to which this tower belongs | Determined when added |
| MRTOWER_CAPABILITIES | A 4 byte bit map with each bit corresponding to a capability | SNMP GET |
| MRTOWERSTATUSID | Primary key into a tower status table which contains strings corresponding to the tower status | SNMP POLL |
| MRTOWER_INFEED_COUNT | Number of INFEEDS associated with this tower | SNMP GET |
| MRTOWER_PRODUCT_SN | Tower serial number | SNMP GET |
| MRTOWER_MODEL_NUMBER | Tower Model number | SNMP GET |
| Icon | Not Used | Not Used |
| DisplayMapID | Not Used | Not Used |
| XLoc_Level1 | Not Used | Not Used |
| YLoc_Level1 | Not Used | Not Used |

The term "Mt Rose" refers to one embodiment of a device embodying portions of the invention. In this embodiment, Mt. Rose refers to the combination of hardware and firmware that are used to implement features described hereon. Such hardware and firmware are included within a PDU, and may provide communications to/from the PDU, perform various calculations, transmit commands to switched outlets, etc. Such functionality may be incorporated in hardware, firmware, software, or any suitable form.

As with the SYSTEM table, most of the fields in the TOWER table may be populated via SNMP. For the fields that can be either SNMP specified or user specified, the SPM may attempt to get the value via SNMP when the device is discovered. If unable, no value or a user specified value may be used. When the user specifies a value, an attempt may be made to set the new value on the actual tower, but the value in the table may override the value if the value in the TOWER table differs from the value on the tower. The values that are only retrieved via an SNMP GET are not settable by the user since they are hardware configuration values from the tower. The values that are retrieved via an SNMP Poll are dynamic values that may change as the system is used. The polling operations will occur as the data is required by the SPM (or its GUI), and the polling data may or may not be saved in the database (the labels may remain in the database for OID table lookup reasons). Much of the data retrieved via SNMP Poll operations may be stored in a TREND table for use with a trending feature.

A TOWER table has a one-to-one relationship with a SYSTEM table. The primary key of the associated SYSTEM table may be held in the TOWER table. A TOWER table may have a one-to-may relationship with INFEED and OUTLET tables/devices. The INFEEDS associated with a TOWER can be retrieved with a query of the INFEED table using the TOWERID primary key as the search key. Additional fields may be added to a TOWER table to support GUI functions such as the display of custom graphics.

An "infeed" is a power input, such as a connection to a power source. A tower may have one or multiple infeeds. Table 3 provides an example of an INFEED table.

TABLE 3

| | Mt. Rose INFEED Table | |
|---|---|---|
| FIELD NAME | Description | How Obtained |
| MRINFEEDID | Primary Key | Generated when added |
| MRINFEED_NAME | User Assigned Name | From SNMP GET or from User entry |
| MRINFEED_ABS_NAME | System Generated - may be a concatenation of the TOWER absolute name and the number of the infeed. The first infeed on the first tower, for example, may be AA, the | From SNMP GET |

TABLE 3-continued

Mt. Rose INFEED Table

| FIELD NAME | Description | How Obtained |
|---|---|---|
| | second may be AB. The first infeed on the second tower may be BA, the second may be BB etc. All infeeds have a unique absolute name that may be the system IP address appended with the absolute name | |
| MRTOWERID | Primary key of the tower table to which this infeed belongs | Determined when added |
| MRSYSTEMID | Primary key of the system table to which this infeed belongs | Determined when added |
| MRINFEED_CAPABILITIES | A 4 byte bit map with each bit corresponding to a capability | SNMP GET |
| MRINFEEDSTATUSID | Primary key into an infeed status table which contains strings corresponding to the infeed status | SNMP POLL |
| MRINFEEDLOADSTATUSID | Primary key into an infeed status table which contains strings corresponding to the infeed load status | SNMP POLL |
| MRINFEED_LOAD_VALUE | Infeed load as determined by the SNMP poll | SNMP POLL |
| MRINFEED_LOAD_HIGH_THRESH | The SNMP load high threshold on the infeed. This value can be set by user input to the SPM using SNMP PUT processing. | SNMP GET |
| MRINFEED_OUTLET_COUNT | Number of outlets associated with this infeed | SNMP GET |
| MRINFEED_VOLTAGE | Voltage on the infeed as of the last SNMP poll | SNMP POLL |
| MRINFEED_POWER | Power at the infeed as of the last SNMP poll | SNMP POLL |
| MRInfeed_Capacity | The load capacity of the input feed. | SNMP POLL |
| Icon | Not Used | Not Used |
| DisplayMapID | Not Used | Not Used |
| XLoc_Level1 | Not Used | Not Used |
| YLoc_Level1 | Not Used | Not Used |
| MRInfeed_ApparentPower | The apparent power consumption of the input feed. | SNMP POLL |
| MRInfeed_PowerFactor | The power factor of the input feed. | SNMP POLL |
| MRInfeed_CrestFactor | The crest factor for the load of the input feed. | SNMP POLL |

As with the previously-described tables, most of the fields in this table may be populated via SNMP. For the fields that can be either SNMP specified or user specified, the RDCM may attempt to get the value via SNMP when the device is discovered. If unable, no value or a user specified value may be used. When the user specifies a value, an attempt may be made to set the new value on the actual infeed. If the value to be set is the MRINFEED_LOAD HIGH THRESH, the value must be successfully set on the infeed in order for it to take affect. This is because this value is an SNMP threshold for traps that are recognized and generated by the device firmware. Other values in the table may override the firmware values if the value in the INFEED table differs from the value on the actual infeed. The values that are only retrieved via an SNMP GET are not settable by the user since they are hardware configuration values from an infeed. The values that are retrieved via an SNMP Poll are dynamic values that may change as the system is used. The polling operations may occur as the data is required by the SPM (or its GUI), and the polling data may or may not be saved in the database (the labels may remain in the database for OID table lookup reasons). Much of the data retrieved via SNMP Poll operations may be stored in a TREND table for use with a trending feature.

An INFEED table has a one-to-one relationship with a SYSTEM table and a TOWER table. The primary keys of the associated SYSTEM table and TOWER table may be held in the INFEED table. An INFEED table may have a one-to-may relationship with OUTLET tables or devices. The OUTLETS associated with an INFEED can be retrieved with a query of the OUTLET table, using the INFEED primary key as the search key. Additional fields may be added to an INFEED table to support GUI functions such as the display of custom graphics. An outlet is a power output, such as a connection to a powered (or unpowered) device. A tower may have one or multiple outlets. Table 4 presents an exemplary description of an OUTLET table.

TABLE 4

| Mt. Rose OUTLET table | | |
|---|---|---|
| FIELD NAME | Description | How Obtained |
| MROUTLETID | Primary Key | Generated when added |
| MROUTLET_NAME | User Assigned Name | From SNMP GET or from User entry |
| MROUTLET_ABS_NAME | System Generated - may be a concatenation of the TOWER absolute name, the INFEED absolute name, and the number of the outlet. The first outlet on the first tower on the first infeed may be AAA, the second may be AAB. The first outlet on the second tower on the second infeed on the second tower may be BBA, the second may be BBB etc. All outlets have a unique absolute name that may be the system IP address appended with the absolute name | From SNMP GET |
| MRINFEEDID | Primary key of the infeed table to which this outlet belongs | Determined when added |
| MRTOWERID | Primary key of the tower table to which this outlet belongs | Determined when added |
| MRSYSTEMID | Primary key of the system table to which this outlet belongs | Determined when added |
| MROUTLET_CAPABILITIES | A 4 byte bit map with each bit corresponding to a capability | SNMP GET |
| MROUTLETSTATUSID | Primary key into an outlet status table which contains strings corresponding to the outlet status | SNMP POLL |
| MROUTLETLOADSTATUSID | Primary key into an outlet status table which contains strings corresponding to the outlet load status | SNMP POLL |
| MROUTLET_LOAD_VALUE | Outlet load as determined by the SNMP poll | SNMP POLL |
| MROUTLET_LOADLOW_THRESH | The SNMP load low threshold on the outlet. This value can be set by user input to the SPM using SNMP PUT processing. | SNMP GET |
| MROUTLET_LOADHIGH_THRESH | The SNMP load high threshold on the outlet. This value can be set by user input to the SPM using SNMP PUT processing. | SNMP GET |
| MROUTLETCONTROLSTATEID | Primary key into an outlet lookup table which contains strings corresponding to the outlet control state | SNMP POLL |
| MROUTLETCONTROLACTIONID | Primary key into an outlet lookup table which contains strings corresponding to the outlet control action. | - SNMP POLL |
| MRASSET | Not used | Not used |
| ICON | Not used | Not used |
| DISPLAYMAPID | Not used | Not used |
| XLOC_LEVEL1 | Not used | Not used |
| YLOC_LEVEL1 | Not used | Not used |

TABLE 4-continued

Mt. Rose OUTLET table

| FIELD NAME | Description | How Obtained |
|---|---|---|
| MROutlet_Power | The active power consumption of the device plugged into the outlet. | SNMP POLL |
| MROutlet_Capacity | The load capacity of the outlet. | SNMP POLL |
| MROutlet_Voltage | The voltage of the outlet. | SNMP POLL |
| MROutlet_ApparentPower | The apparent power consumption of the device plugged into the outlet. | SNMP POLL |
| MROutlet_PowerFactor | The power factor of the device plugged into the outlet. | SNMP POLL |
| MROutlet_CrestFactor | The crest factor for the load of the device plugged into the outlet. | SNMP POLL |

As with the previous tables, most of the fields in the OUTLET table may be populated via SNMP. For the fields that can be either SNMP specified or user specified, the SPM may attempt to get the value via SNMP when the device is discovered. If unable, no value or a user specified value may be used. When the user specifies a value, an attempt may be made to set the new value on the actual outlet device firmware. If the value to be set is the MROUTLET_LOAD HIGH THRESH or MROUTLET_LOADLOW_THRESH, the value must be successfully set on the outlet device firmware in order for it to take effect. This is because these values are SNMP thresholds for traps that are recognized and generated by the device firmware. Other values in the table may override the firmware values if the value in the OUTLET table differs from the value on the actual outlet. The values that are only retrieved via an SNMP GET are not settable by the user since they are hardware configuration values from the OUTLET. The values that are retrieved via an SNMP Poll are dynamic values that may change as the system is used. The polling operations may occur as the data is required by the SPM (or its GUI), and the polling data may or may not be saved in the database (the labels may remain in the database for OID table lookup reasons). Much of the data retrieved via SNMP Poll operations may be stored in a TREND table for use with a trending feature.

An OUTLET table has a one-to-one relationship with a SYSTEM table, a TOWER table, and an INFEED table. The primary keys of the associated SYSTEM table, TOWER table, and INFEED table may be held in the OUTLET table. Additional fields may be added to an OUTLET table to support GUI functions such as the display of custom graphics.

An ENVMON table may be used for monitor and control of environmental monitoring or control devices in a system, such as a temperature sensor, humidity sensor, water sensor, etc. Table 5 is an exemplary ENVMON table.

TABLE 5

ENVMON Table

| FIELD NAME | Description | How Obtained |
|---|---|---|
| MRENVMONID | Primary Key | Generated when added |
| MRENVMON NAME | User Assigned Name | From SNMP GET or from User entry |
| MRENVMON_ABS NAME | System Generated - for example, with the first monitor being A, the second B, etc. All monitors have a unique absolute name that may be the system IP address appended with the absolute name | From SNMP GET |
| MRSYSTEMID | Primary key of the system table to which this tower belongs | Determined when added |
| MRENVMONSTATUSID | Primary key into a monitor status table which contains strings corresponding to the status | SNMP GET |
| MRENVMON WATERSENSOR NAME | User assigned name for the water sensor monitor | SNMP GET or user entered |
| MRENVMONWATERSENSORSTATUSID | Primary key into a water sensor monitor status table which contains strings corresponding to the status | SNMP POLL |

TABLE 5-continued

ENVMON Table

| FIELD NAME | Description | How Obtained |
|---|---|---|
| MRENVMON_ADC NAME | User assigned name for the analog to digital converter | SNMP GET or user entered |
| MRENVMONADCSTATUSID | Primary key into an ADC status table which contains strings corresponding to the status | SNMP POLL |
| MRENVMON_ADC_COUNT | The 8-bit count value from the analog- to-digital converter. A non- negative value may indicate the digital value retrieved from the ADC, and a negative value may indicate that a digital value was not able to be retrieved. | SNMP POLL |
| MRENVMON_ADC_LOWTHRESH | SNMP trap low threshold | SNMP GET |
| MRENVMON_ADC HIGHTHRESH | SNMP trap high threshold | SNMP GET |
| MRENVMONTEMPHUMID_SENSOR_COUNT | The number of temperature/humidity sensors on the environmental monitor. | SNMP GET |
| MRENVMON_CONTACTCLOSURE COUNT | The number of contact closures on the environmental monitor. | SNMP GET |

As with the previous tables, most of the fields in the ENVMON table may be populated via SNMP. For the fields that can be either SNMP specified or user specified, the SPM may attempt to get the value via SNMP when the device is discovered. If unable, no value or a user specified value may be used. When the user specifies a value, an attempt may be made to set the new value on the actual device firmware. If the value to be set is one of the SNMP trap thresholds, the value must be successfully set on the outlet device firmware in order for it to take affect. This is because these values are SNMP thresholds for traps that are recognized and generated by the device firmware. Other values in the table may override the firmware values if the value in the table differs from the value on the actual hardware. The values that are only retrieved via an SNMP GET are not settable by the user since they are hardware configuration values from the Mt. Rose system. The values that are retrieved via an SNMP Poll are dynamic values that may change as the system is used.

The polling operations may occur as the data is required by the SPM (or its GUI), and the polling data may or may not be saved in the database (the labels may remain in the database for OID table lookup reasons). Much of the data retrieved via SNMP Poll operations may be stored in a TREND table for use with a trending feature.

An ENVMON table has a one-to-one relationship with a SYSTEM table. The primary key of the associated SYSTEM table may be held in the ENVMON table. An ENVMON table may have a one-to-may relationship with TEMPHUMID and CONTACTCLOSURE tables/devices in a system. The monitors associated with an ENVMON table can be retrieved with a query of the associated tables using the ENVMONID primary key as the search key. Additional fields may be added to an ENVMON table to support GUI functions such as the display of custom graphics.

Table 6 provides an example of a temperature and humidity monitor (TEMPHUMID) table.

TABLE 6

TEMPHUMID table

| FIELD NAME | Description | How Obtained |
|---|---|---|
| MRTEMPHUMIDID | Primary Key | Generated when added |
| MRTEMPHUMID NAME | User Assigned Name | From SNMP GET or from User entry |
| MRTEMPHUMID_ABS NAME | System Generated - for example, as a concatenation of the ENVMON absolute name and the number of the TEMPHUMID monitor. The first TEMPHUMID monitor on the first ENVMON may be A1, the second may be A2. The first on the second ENVMON may be B I, the, second may be B2 etc. All TEMPHUMID | From SNMP GET |

TABLE 6-continued

TEMPHUMID table

| FIELD NAME | Description | How Obtained |
|---|---|---|
| | monitors have a unique absolute name that may be the system IP address appended with the absolute name | |
| MRENVMONID | Primary key for the ENVMON associated with this TEMPHUMID monitor | Determined when added |
| MRSYSTEMID | Primary key of the system table to which this device belongs | Determined when added |
| MRTEMPHUMIDSTATUSID | Primary key into a monitor status table which contains strings corresponding to the status | SNMP POLL |
| MRTEMPHUMIDTEMPSTATUSID | Primary key into a monitor status table which contains strings corresponding to the status | SNMP POLL |
| MRTEMPHUMID_TEMP_VALUE | Temperature value as of the last SNMP poll in degrees. | SNMP POLL |
| MRTEMPHUMID_TEMP_LOWTHRESH | The temperature low threshold value of the sensor in degrees, using the scale selected by tempHumidSensorTempScale. The default is Celsius. | SNMP GET |
| MRTEMPHUMID_TEMP HIGHTHRESH | The temperature high threshold value of the sensor in degrees, using the scale selected by tempHumidSensorTempScale. The default is Celsius. | SNMP GET |
| MRTEMPHUMIDHUMIDSTATUSID | Primary key into a monitor status table which contains strings corresponding to the status | SNMP POLL |
| MRTEMPHUMID_HUMID VALUE | The humidity measured by the sensor. A non-negative value indicates the measured humidity in percentage relative humidity. A negative value indicates that a humidity value was not able to be measured. | SNMP POLL |
| MRTEMPHU1V1ID_HUMID LOWTHRESH | The humidity SNMP trap low threshold value of the sensor in percentage relative humidity. | SNMP GET |
| MRTEMPHUMID HUMID HIGHTHRESH | The humidity SNMP high threshold value of the sensor in percentage relative humidity. | SNMP GET |
| MRTEMPHUMIDTEMPSCALEID | Primary key into a table which contains strings corresponding to the scale used for temperature values. The default is Celsius. | SNMP GET |

As with the previous tables, most of the fields in a TEMPHUMID table are populated via SNMP. For the fields that can be either SNMP specified or user specified, the SPM may attempt to get the value via SNMP when the device is discovered. If unable, no value or a user specified value may be used. When the user specifies a value, an attempt may be made to set the new value on the actual device firmware. If the value to be set is one of the SNMP trap thresholds, the value must be successfully set on the outlet device firmware in order for it to take effect. Other values in the table may override the firmware values if the value in the table differs from the value on the actual hardware. The values that are only retrieved via an SNMP GET are not settable by the user since they are hardware configuration values from the system. The values that are retrieved via an SNMP Poll are dynamic values that may change as the system is used. The polling operations may occur as the data is required by the SPM (or its GUI), and the polling data may or may not be saved in the database (the labels may remain in the database for OID table lookup reasons). Much of the data retrieved via SNMP POLL operations may be stored in a TREND table for use with a trending feature.

A TEMPHUMID monitor table has a one-to-one relationship with a SYSTEM table and ENVMON table. The primary keys of the associated SYSTEM table and ENVMON table may be held in the TEMPHUMID table. Additional fields may be added to a TEMPHUMID table to support GUI functions such as the display of custom graphics.

Table 7 provides an exemplary CONTACTCLOSURE monitor table, which may be used for the monitor and control of contact closures, such as cabinet closures, water contact sensors, or other devices.

TABLE 7

CONTACTCLOSURE table

| FIELD NAME | Description | How Obtained |
| --- | --- | --- |
| MRCONTACTCLOSUREID | Primary Key | Generated when added |
| MRCONTACTCLOSURE NAME | User Assigned Name | From SNMP GET or from User entry |
| MRCONTACTCLOSRE_ABS NAME | System Generated - for example, a concatenation of the ENVMON absolute name and the number of the CONTACTCLOSURE monitor. The first monitor on the first ENVMON may be A1, the second may be A2. The first on the second ENVMON may be B1, the second may be B2 etc. All monitors have a unique absolute name that may be the system IP address appended with the absolute name | From SNMP GET |
| MRENVMONID | Primary key for the ENVMON associated with this monitor | Determined when added |
| MRSYSTEMID | Primary key of the system table to which this device belongs | Determined when added |
| MRCONTACTCLOSURESTATUSID | Primary key into a monitor status table which contains strings corresponding to the status | SNMP POLL |

A series of database tables may serve as STATUS LOOKUP tables. These tables allow the SPM application to easily determine the meaning of status returned for devices via SNMP polling. These tables use the status value returned as an index into a table, with the corresponding table record containing a text message, icon or other status indicator associated with the obtained status.

To facilitate SNMP processing, an OID LOOKUP TABLE may be created in the SQL SERVER database. This table may have, as one field, the label of the field in a table for which the value is retrieved via SNMP. A second field in the table entry may be the SNMP OID that is used to retrieve the value for the field corresponding to the label. For example, one entry in the MR_SNMP_OID_LOOKUP table may have a DATA LABEL field of MRSYSTEM AREA. That value is a label in the MRSYSTEM table that contains the area controlled by the system. The second field in the MR_SNMP_OID_LOOKUP table (the SNMP_OID field) may contain, for example, the value .1.3.6.1.4.1.1718.3.1.7, which would be the SNMP OID that is used to retrieve this value from the controller board firmware.

An outlet cluster is a group of outlets that can be assigned a name, which name can be used by an administrator to assign a user access to several outlets in one operation. This feature is implemented, in one embodiment, using three tables. The first table is the OUTLET CLUSTER table as shown in Table 8.

TABLE 8

OUTLET CLUSTER table

| FIELD NAME | Description | How Obtained |
| --- | --- | --- |
| OUTLETCLUSERID | Primary Key | Assigned when added |

TABLE 8-continued

OUTLET CLUSTER table

| FIELD NAME | Description | How Obtained |
| --- | --- | --- |
| OUTLET_CLUSER NAME | Text String Cluster Name | User Input (GUI) |

The OUTLET CLUSTER table contains the name(s) of user-defined outlet clusters. Entries to this table are made when an administrator creates an outlet cluster.

The second table is the USER_OUTLETCLUSTER_ACCESS_LINK table as shown in Table 9. This table may be used to determine which users have access to which outlet clusters.

TABLE 9

USER_OUTLETCLUSTER ACCESS LINK table

| FIELD NAME | Description | How Obtained |
| --- | --- | --- |
| USERID | Primary Key of an entry in the USERS table | Assigned when added |
| OUTLETCLUSERID | Primary Key of an entry in the OUTLET CLUSER table | Assigned when added |

The third table is the OUTCLUSTERS table, of which Table 10 is exemplary. This table may be used to determine which outlets are in which clusters.

TABLE 10

OUTLETCLUSTERS table

| FIELD NAME | Description | How Obtained |
|---|---|---|
| OUTLETID | Primary Key of an entry in the OUTLET table | Assigned when added |
| OUTLETCLUSTERID | Primary Key of an entry in the OUTLET CLUSTER table | Assigned when added |

TRENDING tables may be used to log historical SNMP polling data. In this manner, a user may monitor data trends, view or print reports, or take appropriate action based on a trend. A user may provide configuration information (in some cases via an initialization or .ini file) to specify how often SNMP polling should occur.

USERS tables may be used to specify what users have what authorizations to access data in other tables or change device parameters.

DISCOVERY tables may contain specific IP addresses, IP address ranges, or other information that enables an SPM application to discover systems, towers, infeeds, outlets or other devices.

GRAPHICAL DISPLAY tables may contain graphics or formatting information that are used to convey (e.g., display) any or all of the data contained in the tables to a user.

ALERT tables may contain information such as thresholds at which a user should be alerted that a parameter has changed. ALERT tables may also specify actions to be taken when an alert needs to be generated.

REPORT tables may contain formatting information for generating reports. The reports may be based on any or all of the parameters contained in other tables. Some or all of the reports may be configurable.

Additional tables that may be used include the following:

TABLE 11

Discovery_Results table

| FIELD NAME | Description | How Obtained |
|---|---|---|
| RESULTID | An ID assigned by the system | System Identity Column |
| DISCID | Reference to an entry in the discovery work table | System assigned |
| IPTYPE | IP address type | From CDU Discovery process |
| IPADDR | IP address of the CDU | From CDU Discovery process |
| STATUS | Status of the discovery | From CDU Discovery process |
| DISCOVER_TIME | Time of discovery | From CDU Discovery process |
| TOWER_COUNT | Number of towers found on the CDU | From CDU |
| INFEED_COUNT | Number of Infeeds found on the CDU | From CDU |
| OUTLET_COUNT | Number of the total outlets found on the CDU | From CDU |
| ENVMON_COUNT | Number of the Environmental Monitors found on the CDU | From CDU |
| THP_COUNT | Number of the Temperature Humidity Sensors found on the CDU | From CDU |
| CC_COUNT | Number of contact closures found on the CDU | From CDU |

This table stores the information of the CDU as it was during the discovery time.

Discovery_Work table

| FIELD NAME | Description | How Obtained |
|---|---|---|
| DISCID | An ID assigned by the system | System Identity Column |
| INPROGRESS | Status of the progress of the discovery | System assigned |
| STARTTIME | Time the discovery started | System assigned |
| ENDTIME | Time the discovery ended | System assigned |
| IPSTART | First IP address to start disovering on | From Admin user on GUI |
| IPEND | Last IP address to end discovering on | From Admin user on GUI |
| IPTYPE | Type of IP address to use for discovery | From Admin user on GUI |
| COMM_PUBLIC | Public community string to use for discovery | From Admin user on GUI |

Discovery_Work table (continued)

| FIELD NAME | Description | How Obtained |
|---|---|---|
| COMM_PRIVATE | Private community string to use for discovery | From Admin user on GUI |
| FTP_USERNAME | FTP user name to use to download the config binary | From Admin user on GUI |
| FTP_PASSWORD | FTP password to use to download the config binary | From Admin user on GUI |

This table stores each user initiated discovery, time it started, time it ended and a status on its progress.

DisplayMaps table

| FIELD NAME | Description | How Obtained |
|---|---|---|
| DISPLAYMAPID | An ID assigned by the system | System Identity Column |
| MAP_FILE_NAME | Name of the image file on disk | From Admin user on GUI |
| MAP_LEVEL | Not used | Not used |
| MAP_PARENT_DISPLAYMAPID | ID of the parent display map | From Admin user on GUI |
| MAP_NAME | Name of this map or location | From Admin user on GUI |
| MAP_IMAGE | Not used | Not used |
| XLOC1 | X position on parent map | From Admin user on GUI |
| YLOC1 | Y position on parent map | From Admin user on GUI |
| WIDTH | Image width in pixels | From Admin user on GUI |
| HEIGHT | Image height in pixels | From Admin user on GUI |

This table stores all the information of the enabled locations in the system.

DisplayMaps_Unused table

| FIELD NAME | Description | How Obtained |
|---|---|---|
| DISPLAYMAPID | An ID assigned by the system | System Identity Column |
| MAP_FILE_NAME | Name of the image file on disk | From Admin user on GUI |
| MAP_LEVEL | Not used | Not used |
| MAP_PARENT_DISPLAYMAPID | ID of the parent display map | From Admin user on GUI |
| MAP_NAME | Name of this map or location | From Admin user on GUI |
| MAP_IMAGE | Not used | Not used |
| XLOC1 | X position on parent map | From Admin user on GUI |
| YLOC1 | Y position on parent map | From Admin user on GUI |
| WIDTH | Image width in pixels | From Admin user on GUI |
| HEIGHT | Image height in pixels | From Admin user on GUI |

This table stores all the information of the disabled locations in the system.

Location_OutletCluster_Link table

| FIELD NAME | Description | How Obtained |
|---|---|---|
| DisplayMapID | Link to DisplayMaps table | From Admin user on GUI |
| OutletClusterID | Link to OutletCluster table | From Admin user on GUI |

Links all the locations to outletclusters for ease of filtering

MREnvMon_Poll_Data table

| FIELD NAME | Description | How Obtained |
|---|---|---|
| ID | An ID assigned by the system | System Identity Column |
| Poll_DateTime | Last timestamp these values were valid | System assigned |
| MREnvMonID | Link to MREnvMon table | System assigned |
| MREnvMon_ADC_Count | ADC count on the CDU | From CDU |

Stores all of the polling data for Environmental Monitors

| MRInfeed_Poll_Data table ||| 
|---|---|---|
| FIELD NAME | Description | How Obtained |
| ID | An ID assigned by the system | System Identity Column |
| Poll_DateTime | Last timestamp these values were valid | System assigned |
| MRInfeedID | Link to MRInfeed table | System assigned |
| MRInfeed_Load_Value | Infeed Load on the CDU | From CDU |
| MRInfeed_Voltage | Infeed Voltage on the CDU | From CDU |
| MRInfeed_Power | Infeed Power on the CDU | From CDU |
| WattHours | Calculated Watts used for this particular data record | System Assigned |

Stores all the polling data for Infeeds.

| MROutlet_Poll_Data table ||| 
|---|---|---|
| FIELD NAME | Description | How Obtained |
| ID | An ID assigned by the system | System Identity Column |
| Poll_DateTime | Last timestamp these values were valid | System assigned |
| MROutletID | Link to MROutlet table | System assigned |
| MROutlet_Load_Value | Outlet Load on the CDU | From CDU |
| WattHours | Calcuated Watts used for this particular record | System Assigned |
| MROutlet_Power | Outlet Power on the CDU | From CDU |

Stores all the polling data for Outlets.

| MRSystem_Poll_Data table ||| 
|---|---|---|
| FIELD NAME | Description | How Obtained |
| ID | An ID assigned by the system | System Identity Column |
| Poll_DateTime | Last timestamp these values were valid | System assigned |
| MRSystemID | Link to MRSystem table | System assigned |
| MRSystem_Watts_Per_Unit_Area | Watts per unit area on the CDU | From CDU |
| MRSystem_Total_Power | Total power on the CDU | From CDU |

Stores all the polling data for the system table.

| MRTempHumid_Poll_Data table ||| 
|---|---|---|
| FIELD NAME | Description | How Obtained |
| ID | An ID assigned by the system | System Identity Column |
| Poll_DateTime | Last timestamp these values were valid | System assigned |
| MRTempHumidID | Link to MRTempHumid table | System assigned |
| MRTempHumid_Temp_Value | Temperature on the CDU | From CDU |
| MRTempHumid_Humid_Value | Humidity on the CDU | From CDU |

Stores all the polling data for the temperature humidity probes.

| MRTower_Poll_Data table ||| 
|---|---|---|
| FIELD NAME | Description | How Obtained |
| ID | An ID assigned by the system | System Identity Column |
| Poll_DateTime | Last timestamp these values were valid | System assigned |
| MRTowerID | Link to MRTower table | System assigned |
| MRTowerStatusID | Tower Status on the CDU | From CDU |

Stores all the polling data for the towers.

| Racks table ||| 
|---|---|---|
| FIELD NAME | Description | How Obtained |
| RackID | An ID assigned by the system | System Identity Column |
| RackName | Name of the Rack or Cabinet | From Admin user on GUI |
| Rack_Parent_DisplaymapID | Link to the DisplayMaps table | From Admin user on GUI |
| XLoc1 | X Position of cabinet on the parent map | From Admin user on GUI |
| YLoc1 | Y Position of cabinet on the parent map | From Admin user on GUI |

-continued

| Racks table | | |
|---|---|---|
| FIELD NAME | Description | How Obtained |
| Total_Sq_Ft | Total Square feet this cabinet represents | From Admin user on GUI |
| Slots | Number of slots or (Units) this cabinet has | From Admin user on GUI |

Stores all the information about the rack and where it is.

| Settings table | | |
|---|---|---|
| FIELD NAME | Description | How Obtained |
| Setting | Name of setting | From Admin user on GUI |
| Value | Value of the setting | From Admin user on GUI |

Misc system settings stored here

| SysChange table | | |
|---|---|---|
| FIELD NAME | Description | How Obtained |
| Setting | Name of the setting | From Admin user on GUI, telnet or serial connections |
| Value | Value of the setting | From Admin user on GUI, telnet or serial connections |

Misc system settings used by all internal programs stored here.

| T_DisplayView table | | |
|---|---|---|
| FIELD NAME | Description | How Obtained |
| ViewID | ID of a view representation | Configured during install or external setup process |
| Description | Name to be used for the GUI display for the view | Configured during install or external setup process |
| ToolTip | Extra information to be displayed on a tooltip | Configured during install or external setup process |
| Order | Order of display that can override normal sorting | Configured during install or external setup process |

List of system views that are supported by the main view screen.

| T_DisplayViewItems table | | |
|---|---|---|
| FIELD NAME | Description | How Obtained |
| ViewItemID | ID of the View item | Configured during install or external setup process |
| ViewID | Link to the T_DisplayView table | Configured during install or external setup process |
| Description | Text to display on the legend | Configured during install or external setup process |
| Start | Start value of the item category | Configured during install or external setup process |
| End | End value of the item category | Configured during install or external setup process |

| T_DisplayViewItems table | | |
|---|---|---|
| FIELD NAME | Description | How Obtained |
| Color | Color this item will be displayed as | Configured during install or external setup process |
| Order | Order of display that can override normal sorting | Configured during install or external setup process |

The categories each system view will use to determine that view's data measurement will belong to. Each category will indicate a color and text to be displayed to the user.

| T_EnvMonStatus table | | |
|---|---|---|
| FIELD NAME | Description | How Obtained |
| EnvMonStatusID | ID from CDU MIB | CDU MIB |
| StatusText | Text of the status | CDU MIB |
| StatusLevel | Not used yet | Not used yet |

Environmental Monitor Statuses

| T_ManualAdd table | | |
|---|---|---|
| FIELD NAME | Description | How Obtained |
| ManualAddID | An ID assigned by the system | System Identity Column |
| IPAddress | IP Address of the CDU | From Admin user on GUI |
| Comm_Public | Public community string of the CDU | From Admin user on GUI |
| Comm_Private | Private community string of the CDU | From Admin user on GUI |
| FTP_Username | FTP user name to use to get the config binary off the CDU | From Admin user on GUI |
| FTP_Password | FTP password to use to get the config binary off the CDU | From Admin user on GUI |

A temporary holding place for manually added devices. These entries will be repeatedly submitted to the discovery table until the device is successfully managed.

| T_TowerStatus table | | |
|---|---|---|
| FIELD NAME | Description | How Obtained |
| TowerStatusID | ID from CDU MIB | CDU MIB |
| StatusText | Text of the status | CDU MIB |
| StatusLevel | Not used yet | Not used yet |

CDU Tower Status Table

User_Location_Access_Link table

| FIELD NAME | Description | How Obtained |
|---|---|---|
| UserID | A link to the Users table where UserGroupID := UserID | From Admin user on GUI |
| DisplayMapID | Link to the DisplayMaps table | From Admin user on GUI |

UserGroup Access Restriction Table

User_Outlet_Access_Link table

| FIELD NAME | Description | How Obtained |
|---|---|---|
| UserID | A link to the Users table where UserGroupID := UserID | From Admin user on GUI |
| OutletID | Link to the MROutlet table | From Admin user on GUI |

UserGroup Access Restriction Table

User_OutletCluster_Access_Link table

| FIELD NAME | Description | How Obtained |
|---|---|---|
| UserID | A link to the Users table where UserGroupID := UserID | From Admin user on GUI |
| OutletClusterID | Link to the OutletCluster table | From Admin user on GUI |

UserGroup Access Restriction Table

User_Rack_Access_Link table

| FIELD NAME | Description | How Obtained |
|---|---|---|
| UserID | A link to the Users table where UserGroupID := UserID | From Admin user on GUI |
| RackID | Link to the Rack table | From Admin user on GUI |

UserGroup Access Restriction Table

User_System_Access_Link table

| FIELD NAME | Description | How Obtained |
|---|---|---|
| UserID | A link to the Users table where UserGroupID := UserID | From Admin user on GUI |
| SystemID | Link to the MRSystem table | From Admin user on GUI |

Userlogins table

| FIELD NAME | Description | How Obtained |
|---|---|---|
| USERLOGINID | An ID assigned by the system | System Identity Column |
| USERNAME | The logon name | Created by the Admin User via the GUI |
| USERPASSWORD | The logon's encrypted password | Updated by the user via the GUI |
| USERGROUPID | A link to the Users table where UserGroupID := UserID | Created by the Admin User via the GUI |
| HOMEMAPID | A link to the DisplayMaps table | GUI via the User |

All user logons for the system with their preferred home map id and passwords encrypted.

Users table

| FIELD NAME | Description | How Obtained |
|---|---|---|
| USERID | An ID given to the user group | Created by the system |
| USERNAME | Really a user group name | Created by the Admin User via the GUI |
| USERCAPABILITIESID | A field to hold any special capabilities of this user group like permission levels | Created by the Admin User via the GUI |
| HOMEMAPID | A link to the DisplayMaps table | GUI via the user |

This is the Usergroup table as of version 3.1 with all the user groups and the default home map id in it.

ActionLog table

| FIELD NAME | Description | How Obtained |
|---|---|---|
| ALOGID | An ID given to the user group | Created by the system |
| USERNAME | Login name or system name that performed the logged action | System assigned |
| ACTION_TIME | Time of the logged action | System assigned |
| USER_IP | IP address of the user performing the action | System assigned |
| ACTION_TYPE | Type of action | System assigned |
| OBJECT_PK | ID of Object logged | System assigned |
| OBJECT_TYPE | Type of Object logged | System assigned |
| ACTION_MSG | Formatted message of the log | System assigned |

The system and user action logs are stored here.

TABLE 38

Keys table

| FIELD NAME | Description | How Obtained |
|---|---|---|
| KEY | User software activation key | Created by the Admin User via the GUI |
| APPLIED | Timestamp it was applied to the system | Created by the Admin User via the GUI |

A list of all submitted software keys in the system.
A list of views is provided in List 1.

LIST 1

R_CDUByLocation
R_EnvMons
R_Towers

-continued

LIST 1

V_AllDisplayMaps
V_CDUEnvSensors
V_CDUManagedData
V_CDUOutlets
V_CDUOutletsWithSecurity
V_DisplayViewData
V_DisplayViewDataWithSecurity
V_EnvironmentalMonitors
V_EnvironmentalMonitorsWithSecurity
V_InfeedPowerByCDUDetailedPerDay
V_InfeedPowerByCDUDetailedPerMonth
V_InfeedPowerByCDUDetailedPerYear
V_InfeedPowerByCDUPerDau
V_InfeedPowerByCDUPerDay
V_InfeedPowerByCDUPerMonth
V_InfeedPowerByCDUPerYear
V_InfeedPowerByLocationPerDay
V_InfeedPowerByLocationPerMonth
V_InfeedPowerByLocationPerYear
V_InfeedPowerByRackPerDay
V_InfeedPowerByRackPerMonth
V_InfeedPowerByRackPerYear
V_InfeedPowerData
V_InfeedPowerDataByCDUPerMonth
V_Items
V_ItemsWithSecurity
V_OutletPowerByCDUDetailedPerDay
V_OutletPowerByCDUDetailedPerMonth
V_OutletPowerByCDUDetailedPerYear
V_OutletPowerByCDUPerDay
V_OutletPowerByCDUPerMonth
V_OutletPowerByCDUPerYear
V_OutletPowerByClusterDetailedPerDay
V_OutletPowerByClusterDetailedPerMonth
V_OutletPowerByClusterDetailedPerYear
V_OutletPowerByClusterPerDay
V_OutletPowerByClusterPerMonth
V_OutletPowerByClusterPerYear
V_OutletPowerByLocationPerDay
V_OutletPowerByLocationPerMonth
V_OutletPowerByLocationPerYear
V_OutletPowerByRackPerDay
V_OutletPowerByRackPerMonth
V_OutletPowerByRackPerYear
V_OutletPowerData
V_OutletPowerDataByClusterPerDay
V_OutletPowerDataByClusterPerMonth
V_OutletPowerDataByClusterPerYear
V_Outlets
V_Search
V_SearchCriteria
V_SymbolList
V_SystemEditSelect
V_SYSTEMSTATUS As described above, a graphical user interface may include one or more depictions of geographical locations to show the locations of various CDUs in a given power distribution system. The interface may further provide photographs of these various locations in whatever degree of detail may be desired by users of the power management system. Such photographs may depict one or more equipment racks including icons to indicate rack status. Both a geographic location and a depiction of a rack may be color-coded or may include a color-coded icon based on status.

Information from one or more tables, for example the SYSTEM, TOWER, INFEED and OUTLET tables, may be used to provide a listing of towers or other PDUs, infeeds and outlets associated with a selected rack. For each infeed, outlet, or PDU, a status is provided. Load, voltage and power readings are provided for an infeed. Hyperlinks for turning each outlet ON or OFF, and for REBOOTing, are also provided. The tower, infeed, outlets and PDUs may each be configured with a custom name as specified by a user.

A user may view a summary of statuses of various devices in a system. For example, an "alarms" listing may be generated from the tables to show which elements of the system are not in a normal status and to describe the nature of the abnormality. In similar fashion, a user may be provided with a listing of environmental conditions at various ones of the CDUs.

A user may also view a listing of clusters together with any desired information about each cluster. As with other listings, a cluster listing may give the user various command options such as "Turn On all outlets in the cluster", "Turn Off all outlets in the cluster", "Turn On [or Off] a specified PDU or PDUs" or "Reboot".

Information from the tables, for example the TREND table, may be used to illustrate trends between starting and ending dates and times of interest. The user may select the type of trend data to be viewed, such as temperature, humidity, infeed load, infeed voltage, infeed power, system watts per unit area of a location or a cabinet, or total system power usage.

The embodiments described above may be implemented using various software and hardware resources. Typically, however, a power manager such as the SPM 102 and database 112 will be implemented by means of computer-readable program code stored on computer-readable media. The computer-readable media may include, for example, any number or mixture of fixed or removable media (such as one or more fixed disks, random access memories (RAMS), read-only memories (ROMs), or compact discs), at either a single location or distributed over a network. The computer readable code will typically comprise software, but could also comprise firmware or a programmed circuit.

Figure 28A:
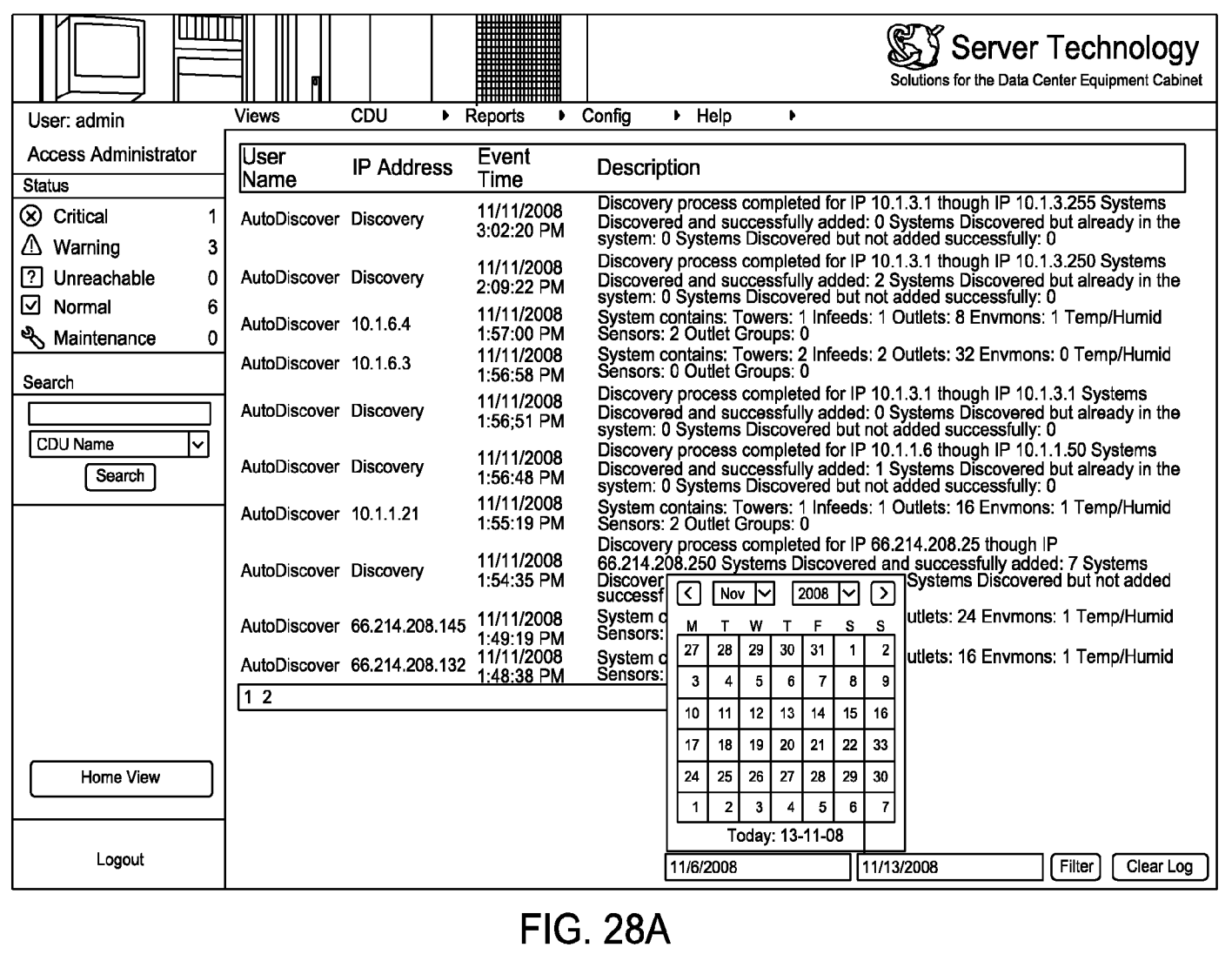
Figure 28:
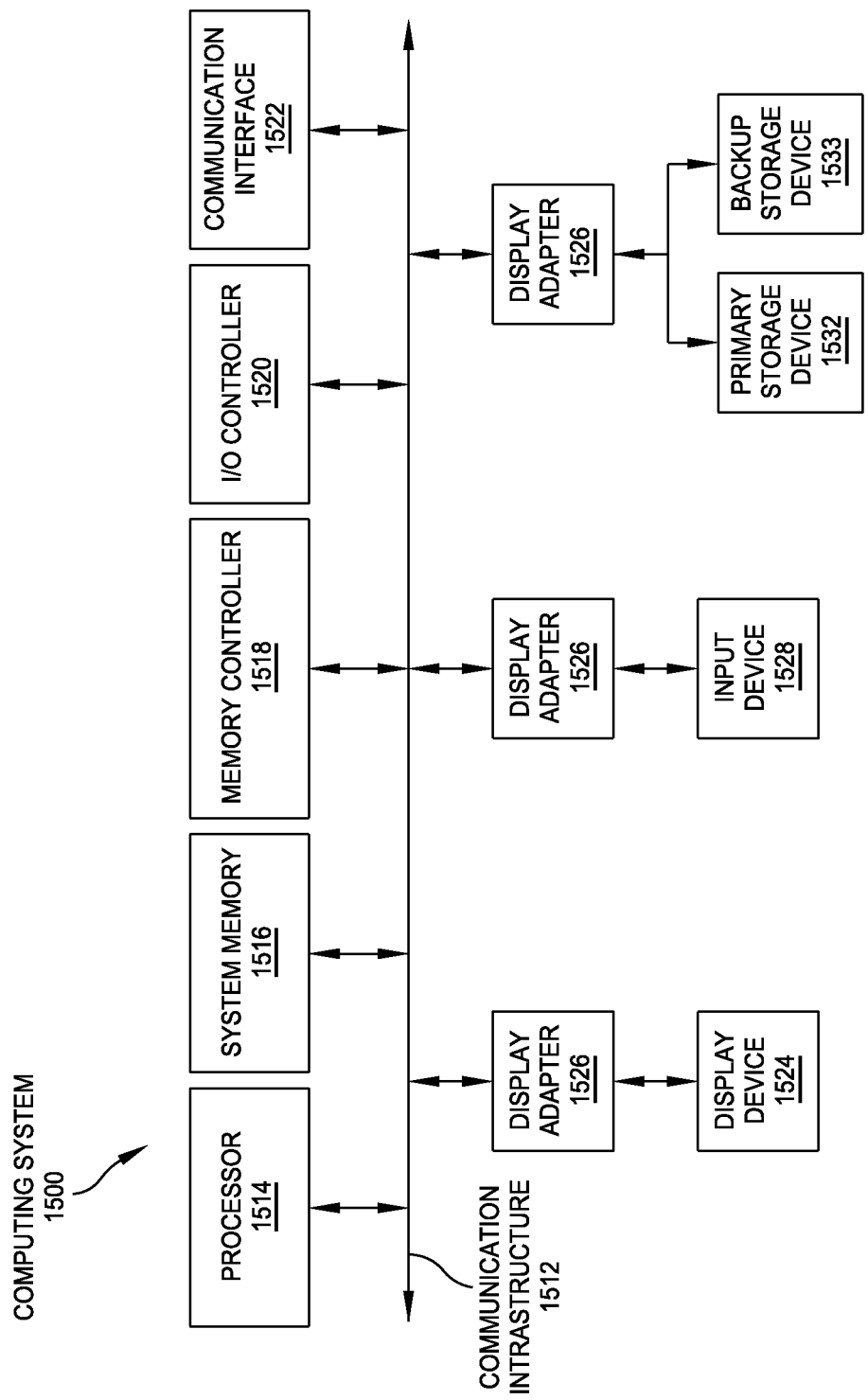
FIG. 28 is a block diagram of a computing system in which embodiments can be implemented.

FIG. 28 is a block diagram of an exemplary computing system 1500 capable of implementing one or more of the embodiments described and illustrated herein. Computing system 1500 broadly represents any single or multi-processor computing device or system capable of executing computer-readable instructions. Examples of computing system 1500 include, without limitation, workstations, laptops, client-side terminals, servers, distributed computing systems, handheld devices, or any other computing system or device. In its most basic configuration, computing system 1500 may comprise at least one processor 1514 and a system memory 1516.

Processor 1514 generally represents any type or form of processing unit capable of processing data or interpreting and executing instructions. In certain embodiments, processor 1514 may receive instructions from a software application or module. These instructions may cause processor 1514 to perform the functions of one or more of the exemplary embodiments described and illustrated herein. For example, processor 1514 may perform, or be a means for performing, either alone or in combination with other elements, one or more of the identifying, transmitting, receiving, determining, selecting, and using steps described herein. Processor 1514 may also perform, or be a means for performing any other steps, methods, or processes described and illustrated herein.

System memory 1516 generally represents any type or form of volatile or non-volatile storage device or medium capable of storing data or other computer-readable instructions. Examples of system memory 1516 include, without limitation, random access memory (RAM), read only memory (ROM), flash memory, or any other suitable memory device. Although not required, in certain embodiments computing system 1500 may comprise both a volatile memory unit (such as, for example, system memory 1516) and a non-volatile storage device (such as, for example, primary storage device 1532, as described in detail below).

In certain embodiments, exemplary computing system 1500 may also comprise one or more components or elements in addition to processor 1514 and system memory 1516. For example, computing system 1500 may comprise a memory controller 1518, an Input/Output (I/O) controller 1520, and a communication interface 1522, each of which may be interconnected via a communication infrastructure 1512. Communication infrastructure 1512 generally represents any type or form of infrastructure capable of facilitating communication between one or more components of a computing device. Examples of communication infrastructure 1512 include, without limitation, a communication bus (such as an ISA, PCI, PCIe, or similar bus) and a network.

Memory controller 1518 generally represents any type or form of device capable of handling memory or data or controlling communication between one or more components of computing system 1500. For example, in certain embodiments memory controller 1518 may control communication between processor 1514, system memory 1516, and I/O controller 1520 via communication infrastructure 1512. In certain embodiments, memory controller may perform, or be a means for performing, either alone or in combination with other elements, one or more of the steps or features described and illustrated herein, such as identifying, transmitting, receiving, determining, selecting, and using.

I/O controller 1520 generally represents any type or form of module capable of coordinating or controlling the input and output functions of a computing device. For example, in certain embodiments I/O controller may control or facilitate transfer of data between one or more elements of computing system 1500, such as processor 1514, system memory 1516, communication interface 1522, display adapter 1526, input interface 1530, and storage interface 1534. I/O controller 1520 may be used, for example, to perform, or be a means for performing, either alone or in combination with other elements, one or more of the identifying, transmitting, receiving, determining, selecting, and using steps described herein. I/O controller 1520 may also be used to perform, or be a means for performing other steps and features set forth in the instant disclosure.

Communication interface 1522 broadly represents any type or form of communication device or adapter capable of facilitating communication between exemplary computing system 1510 and one or more additional devices. For example, in certain embodiments communication interface 1522 may facilitate communication between computing system 1510 and a private or public network comprising additional computing systems. Examples of communication interface 1522 include, without limitation, a wired network interface (such as a network interface card), a wireless network interface (such as a wireless network interface card), a modem, and any other suitable interface. In at least one embodiment, communication interface 1522 may provide a direct connection to a remote server via a direct link to a network, such as the Internet. Communication interface 1522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1522 may also represent a host adapter configured to facilitate communication between computing system 1500 and one or more additional network or storage devices via an external bus or communications channel. Examples of host adapters include, without limitation, SCSI host adapters, USB host adapters, IEEE 1694 host adapters, SATA and eSATA host adapters, ATA and PATA host adapters, Fibre Channel interface adapters, Ethernet adapters, or the like. Communication interface 1522 may also allow computing system 1500 to engage in distributed or remote computing. For example, communication interface 1522 may receive instructions from a remote device or send instructions to a remote device for execution. In certain embodiments, communication interface 1522 may perform, or be a means for performing, either alone or in combination with other elements, one or more of the identifying, transmitting, receiving, determining, selecting, and using steps disclosed herein. Communication interface 1522 may also be used to perform, or be a means for performing other steps and features set forth in the instant disclosure.

Computing system 1500 may also comprise at least one display device 1524 coupled to communication infrastructure 1512 via a display adapter 1526. Display device 1524 generally represents any type or form of device capable of visually displaying information forwarded by display adapter 1526. Similarly, display adapter 1526 generally represents any type or form of device configured to forward graphics, text, and other data from communication infrastructure 1512 (or from a frame buffer, as known in the art) for display on display device 1524.

Exemplary computing system 1500 may also comprise at least one input device 1528 coupled to communication infrastructure 1512 via an input interface 1530. Input device 1528 generally represents any type or form of input device capable of providing input, either computer or human generated, to exemplary computing system 1510. Examples of input device 1528 include, without limitation, a keyboard, a pointing device, a speech recognition device, or any other input device. In at least one embodiment, input device 1528 may perform, or be a means for performing, either alone or in combination with other elements, one or more of the identifying, transmitting, receiving, determining, selecting, and using steps disclosed herein. Input device 1528 may also be used to perform, or be a means for performing other steps and features set forth in the instant disclosure.

Exemplary computing system 1500 may also comprise a primary storage device 1532 and a backup storage device 1533 coupled to communication infrastructure 1512 via a storage interface 1534. Storage devices 1532 and 1533 generally represent any type or form of storage device or medium capable of storing data or other computer-readable instructions. For example, storage devices 1532 and 1533 may be a magnetic disk drive (e.g., a so-called hard drive), a floppy disk drive, a magnetic tape drive, an optical disk drive, a flash drive, or the like. Storage interface 1534 generally represents any type or form of interface or device for transferring data between storage devices 1532 and 1533 and other components of computing system 1510.

In certain embodiments, storage devices 1532 and 1533 may be configured to read from and write to a removable storage unit configured to store computer software, data, or other computer-readable information. Examples of suitable removable storage units include, without limitation, a floppy disk, a magnetic tape, an optical disk, a flash memory device, or the like. Storage devices 1532 and 1533 may also comprise other similar structures or devices for allowing computer software, data, or other computer-readable instructions to be loaded into computing system 1510. For example, storage devices 1532 and 1533 may be configured to read and write software, data, or other computer-readable information. Storage devices 1532 and 1533 may also be a part of computing system 1510 or may be a separate device accessed through other interface systems.

In certain embodiments, the exemplary file systems disclosed herein may be stored on primary storage device 1532, while the exemplary file-system backups disclosed herein may be stored on backup storage device 1533. Storage devices 1532 and 1533 may also be used, for example, to perform, or be a means for performing, either alone or in combination with other elements, one or more of the identifying, transmitting, receiving, determining, selecting, and using steps disclosed herein. Storage devices 1532 and 1533 may also be used to perform, or be a means for performing other steps and features set forth in the instant disclosure.

Many other devices or subsystems may be connected to computing system 1500. Conversely, all of the components and devices illustrated need not be present to practice the embodiments described and illustrated herein. The devices and subsystems referenced above may also be interconnected in different ways from that shown. Computing system 1500 may also employ any number of software, firmware, and hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1500. All or a portion of the computer program stored on the computer-readable medium may then be stored in system memory 1516 or in various portions of storage devices 1532 and 1533. When executed by processor 1514, a computer program loaded into computing system 1500 may cause processor 1514 to perform, or be a means for performing the functions of one or more of the exemplary embodiments described and illustrated herein. Additionally or alternatively, one or more of the exemplary embodiments described and illustrated herein may be implemented in firmware or hardware. For example, computing system 1500 may be configured as an application specific integrated circuit (ASIC) adapted to implement one or more of the exemplary embodiments disclosed herein.

Figure 29:
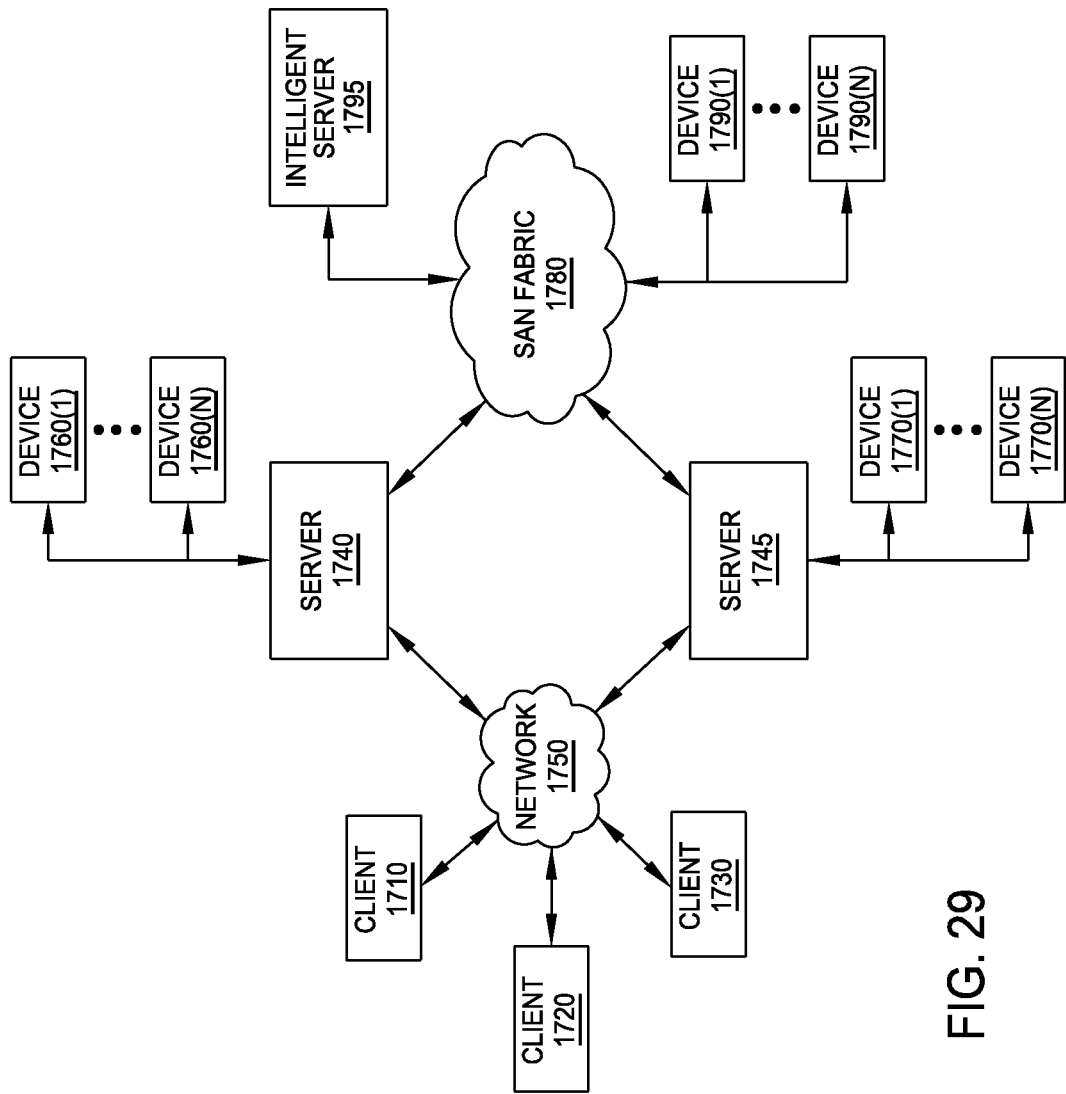
FIG. 29 is a block diagram of a computer network.

FIG. 29 is a block diagram of an exemplary network architecture 1700 in which client systems 1710, 1720, and 1730 and servers 1740 and 1745 may be coupled to a network 1750. Client systems 1710, 1720, and 1730 generally represent any type or form of computing device or system, such as exemplary computing system 1610. Similarly, servers 1740 and 1745 generally represent computing devices or systems, such as application servers or database servers, configured to provide various database services or to run certain software applications. Network 1750 generally represents any telecommunication or computer network; including, for example, an intranet, a wide area network (WAN), a local area network (LAN), a personal area network (PAN), or the Internet.

As illustrated, one or more storage devices 1760(1)-(N) may be directly attached to server 1740. Similarly, one or more storage devices 1770(1)-(N) may be directly attached to server 1745. Storage devices 1760(1)-(N) and storage devices 1770(1)-(N) generally represent any type or form of storage device or medium capable of storing data or other computer-readable instructions. In certain embodiments, storage devices 1760(1)-(N) and storage devices 1770(1)-(N) may represent network-attached storage (NAS) devices configured to communicate with servers 1740 and 1745 using various protocols, such as NFS, SMB, or CIFS.

Servers 1740 and 1745 may also be connected to a storage area network (SAN) fabric 1780. SAN fabric 1780 generally represents any type or form of computer network or architecture capable of facilitating communication between a plurality of storage devices. SAN fabric 1780 may facilitate communication between servers 1740 and 1745 and a plurality of storage devices 1790(1)-(N) or an intelligent storage array 1795. SAN fabric 1780 may also facilitate, via network 1750 and servers 1740 and 1745, communication between client systems 1710, 1720, and 1730 and storage devices 1790(1)-(N) or intelligent storage array 1795 in such a manner that devices 1790(1)-(N) and array 1795 appear as locally attached devices to client systems 1710, 1720, and 1730. As with storage devices 1760(1)-(N) and storage devices 1770(1)-(N), storage devices 1790(1)-(N) and intelligent storage array 1795 generally represent any type or form of storage device or medium capable of storing data and/or other computer-readable instructions.

In certain embodiments, and with reference to exemplary computing system 1617, a communication interface, such as the communication interface 1632 of FIG. 17, may be used to provide connectivity between each client system 1710, 1720, and 1730 and network 1750. Client systems 1710, 1720, and 1730 may be able to access information on server 1740 or 1745 using, for example, a web browser or other client software. Such software may allow client systems 1710, 1720, and 1730 to access data hosted by server 1740, server 1745, storage devices 1760(1)-(N), storage devices 1770(1)-(N), storage devices 1790(1)-(N), or intelligent storage array 1795. Although the figure depicts the use of a network (such as the Internet) for exchanging data, the embodiments described and illustrated herein are not limited to the Internet or any particular network-based environment.

In at least one embodiment, all or a portion of one or more of the exemplary embodiments disclosed herein may be encoded as a computer program and loaded onto and executed by server 1740, server 1745, storage devices 1760(1)-(N), storage devices 1770(1)-(N), storage devices 1790(1)-(N), intelligent storage array 1795, or any combination thereof. All or a portion of one or more of the exemplary embodiments disclosed herein may also be encoded as a computer program, stored in server 1740, run by server 1745, and distributed to client systems 1710, 1720, and 1730 over network 1750. Accordingly, network architecture 1700 may perform, or be a means for performing, either alone or in combination with other elements, one or more of the identifying, transmitting, receiving, determining, selecting, and using steps disclosed herein. Network architecture 1700 may also be used to perform, or be a means for performing other steps and features set forth in the instant disclosure.

As detailed above, computing system 1610 or one or more of the components of network architecture 1700 may perform, or be a means for performing, either alone or in combination with other elements, one or more steps of the exemplary methods described and illustrated herein. For example, a computer-implemented method for determining a file set may comprise identifying a file set. The method may also comprise identifying a key file for the file set. A first computing system may comprise the file set. The method may further comprise transmitting a key-file identifier to a second computing system, the key-file identifier identifying the key file. The first computing system may receive the first and second file identifiers from the second computing system. The first file identifier may be associated with a first file-identifier set. The second file identifier may be associated with a second file-identifier set. The key-file identifier may be associated with both the first file-identifier set and the second file-identifier set. The method may comprise determining whether the file set comprises a file identified by the first file identifier, and whether the file set comprises a file identified by the second file identifier. The first computing system may transmit a result of the determination to the second computing system.

In certain embodiments, identifying a file set may comprise selecting a file directory, selecting a group of files within a directory, selecting files associated with a computer program, and selecting a plurality of files contained on a file storage device. In an additional embodiment, the key file may be a randomly selected file within the file set.

In at least one embodiment, determining a file set may further comprise identifying a set of key files from the file set. The first computing system may comprise the file set. Determining a file set may further comprise transmitting a set of key-file identifiers to the second computing system, wherein each key-file identifier in the set of key-file identifiers identifies a file in the set of key files. The method may also comprise receiving a plurality of file identifiers from the second computing system, wherein each file identifier in the plurality of file identifiers is associated with a different file-identifier set. The first computing system may determine which files identified by the plurality of file identifiers are contained within the file set.

In certain embodiments, the key-file identifier may comprise at least one of a file name of the key file, a version number of the key file, and a hash of the key file. The key-file identifier may also comprise a file size of the key file, a name of a directory where the key file is stored on the first computing system, and a system identifier for the first computing system.

In additional embodiments, wherein each of receiving the first and second file identifiers, determining whether the file set comprises the files identified by the first and second identifiers, and transmitting the result of the determination may be repeated. The aforementioned steps are repeated until the result provides the second computing system with enough information to identify the file set or the first computing system receives an unknown-file-set indication. In a further embodiment the result of the determination may comprise a system identifier for the first computing system, the key-file identifier, the first file identifier, or the second file identifier.

A computer implemented method for determining a file set may comprise receiving a key file identifier from a first computing system, the key file identifier identifying a key file associated with the file set. The second computing system may also identify first and second file-identifier sets associated with the key file. The method further comprises identifying a first file identifier in the first file-identifier set, and identifying a second file identifier in the second file-identifier set. The second computing system may transmit the first and second file identifiers to the first computing system. The method also comprises receiving a result from the first computing system, the result being based on a comparison of the first and second file identifiers with the file set. The second computing system may use the result to identify the file set.

In an additional embodiment, a computer implemented method for determining a file set may comprise a file-set database. The file-set database may comprise at least one of a table of file names, a table of file versions, a table of file hashes, a table of file directories, a table of file sets, a table of associations of files to file sets. In certain embodiments, identifying a first and second file identifier for the first and second file identifier set may comprise determining that the first file identifier is not in the second file-identifier set and determining that the second file identifier is not in the first file-identifier set.

In certain embodiments, a computer implemented method for determining a file set may further comprise receiving a set of key-file identifiers from the first computing system. The method may also comprise identifying a plurality of file-identifier sets associated with the set of key files, and identifying file identifiers associated with the plurality of file-sets. In a further embodiment, an identifier for the key file may comprise at least one of a file name of the key file, a version number of the key file, a hash of the key file, a file size of the key file, a name of a directory where the key file is stored on the first computing system. In an additional embodiment, the result may comprise a system identifier for the first computing system, the key-file identifier, the first file identifier, the second file identifier.

In certain embodiments, wherein identifying the first and second file identifiers for the first and second file set, transmitting the first and second file to the first computing system, and receiving a result is repeated. The aforementioned method is repeated until the result contains enough information to identify the file set or the result contains data that exceeds a file-set-identifier threshold. In a further embodiment the file-set-identifier threshold may comprise a ratio of the number of total file identifiers transmitted to the first computing system. The file-set-identifier threshold may also comprise the number of file sets associated with the key file and a number of transmissions between the first computing system and the second computing system, where the transmissions contain information to identify the file set. In an additional embodiment, an unknown-file-set indication is transmitted to the first computing system.

In an additional embodiment, the key-file identifier is transmitted to the first computing system. In a further embodiment, identifying the file set from the result may comprise identifying a file-identifier set containing the identifier for the key file and identifying a file-identifier set containing a file identifier transmitted in the result.

In certain embodiments, a computer-readable medium may comprise one or more computer executable instructions that, when executed by a computing system, cause the computing system to identify a file set; identify a key file for the file set, a first computing system comprising the file set; transmit a key-file identifier to a second computing system, the key-file identifier identifying the key file; receive first and second file identifiers from the second computing system, a first file identifier being associated with a first file-identifier set, a second file identifier being associated with a second file-identifier set, and the key-file identifier being associated with both the first file-identifier set and the second file-identifier set; determine at least one of whether the file set comprises a file identified by the first file identifier and whether the file set comprises a file identified by the second file identifier; and transmit a result of the determination to the second computing system.

In an additional embodiment, one or more computer-executable instructions, when executed by the computing device, further cause the computing device to identify a set of key files from the file set, the first computing system comprising the file set, transmit a set of key-file identifiers to the second computing system, wherein each key-file identifier in the set of key-file identifiers identifies a file in the set of key files, receive a plurality of file identifiers from the second computing system, wherein each file identifier in the plurality of file identifiers is associated with a different file-identifier set, determine which files identified by the plurality of file identifiers are contained within the file set.

Figure 1A:
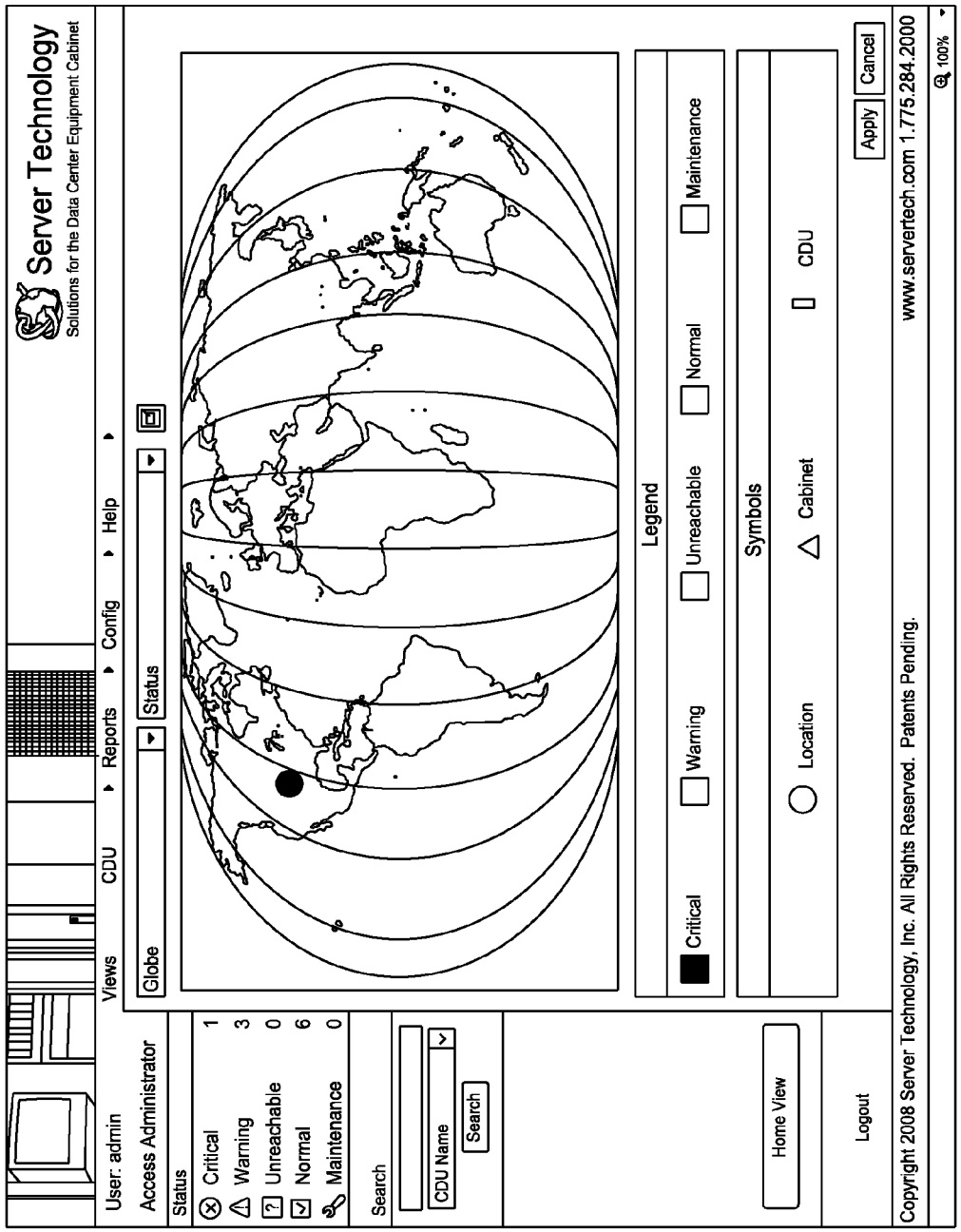
FIGS. 1A-75A are screen shots and perspective views showing various aspects of embodiments.
Figure 6A:
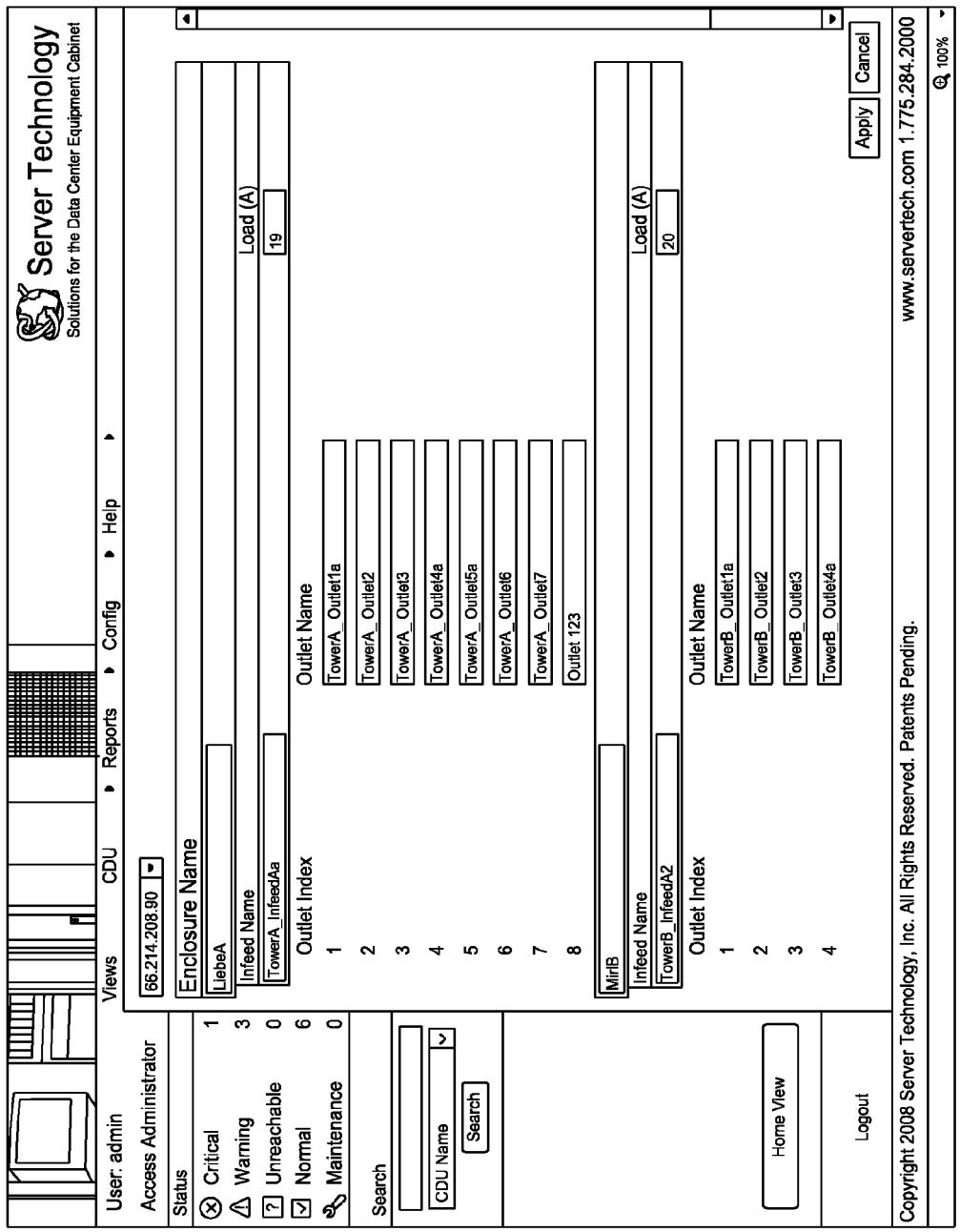
Figure 7A:
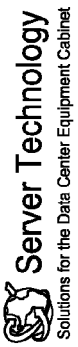
Figure 9A:
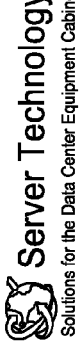
Figure 13A:
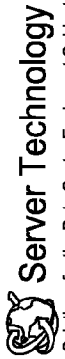
Figure 14A:
Figure 16A:
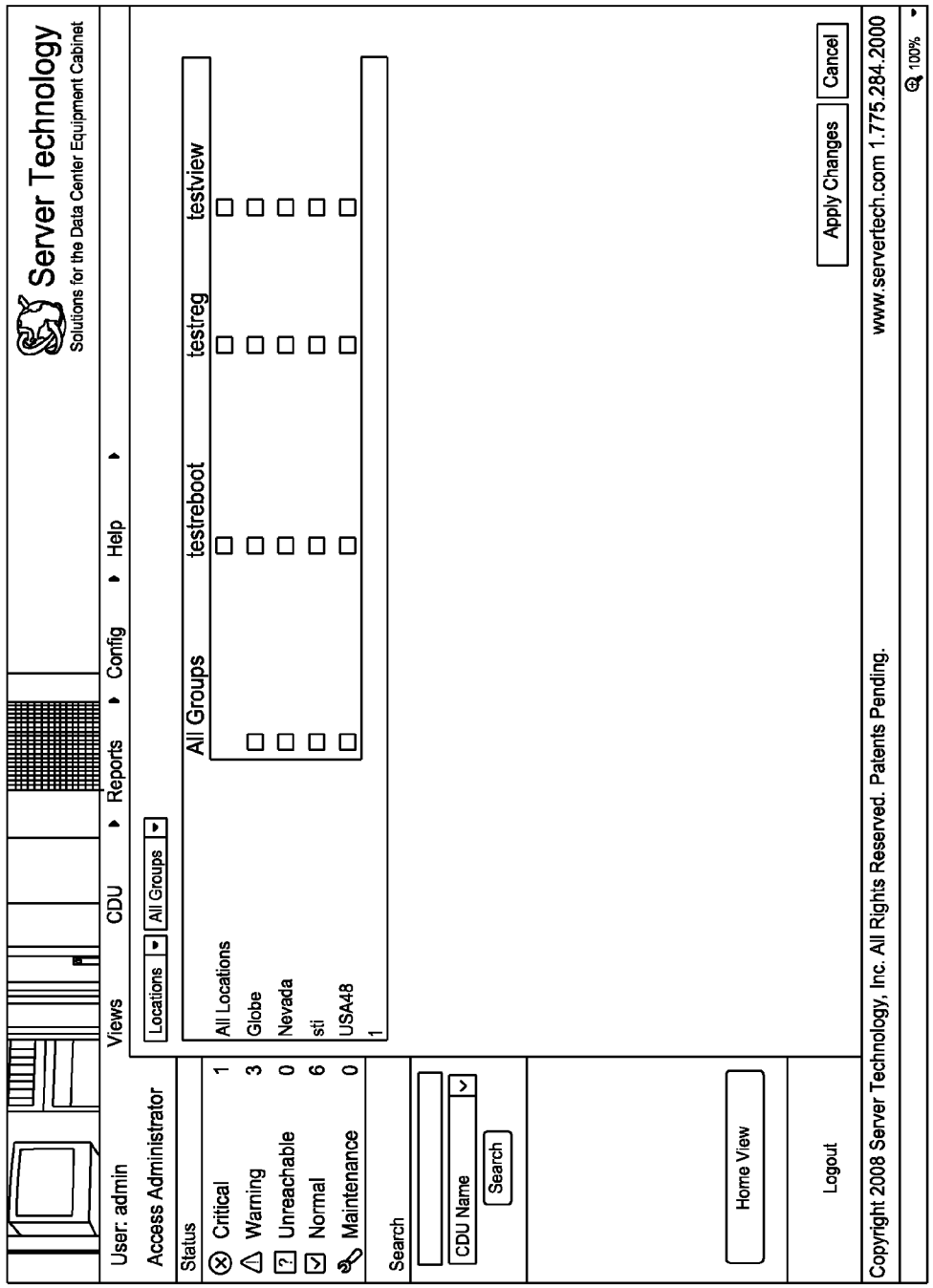
Figure 17A:
Figure 18A:
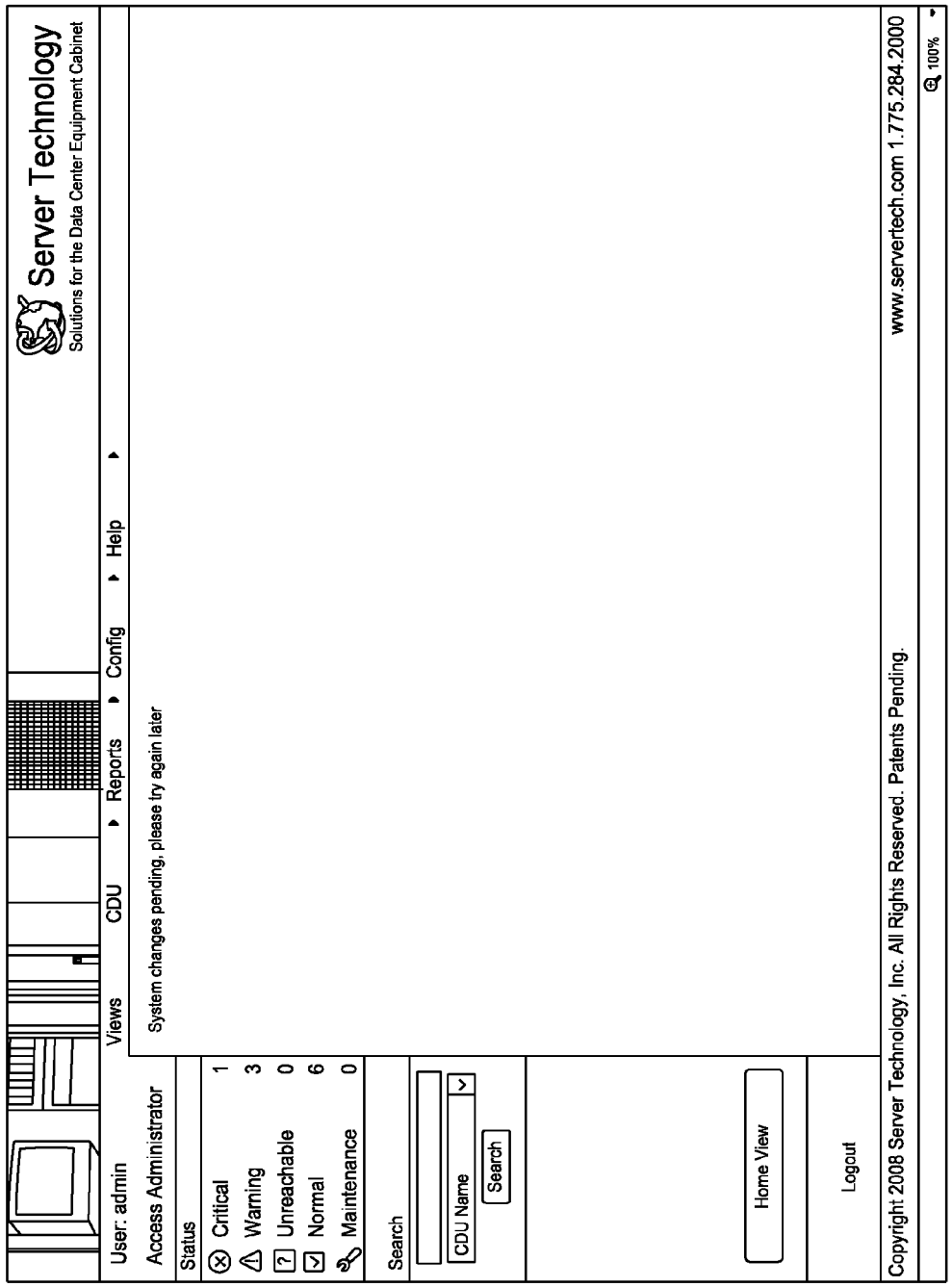
Figure 48A:
Figure 50A:
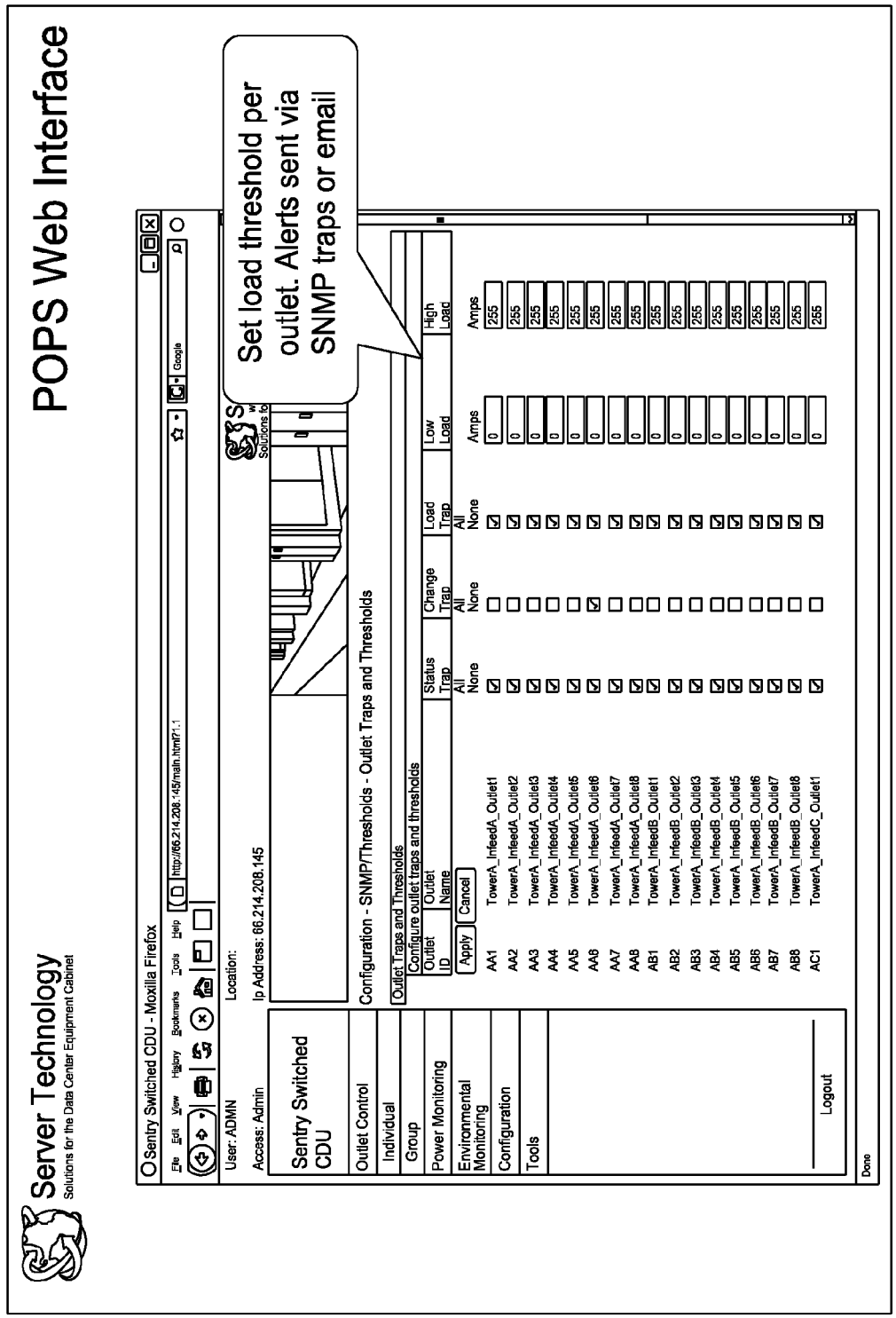
Figure 51A:
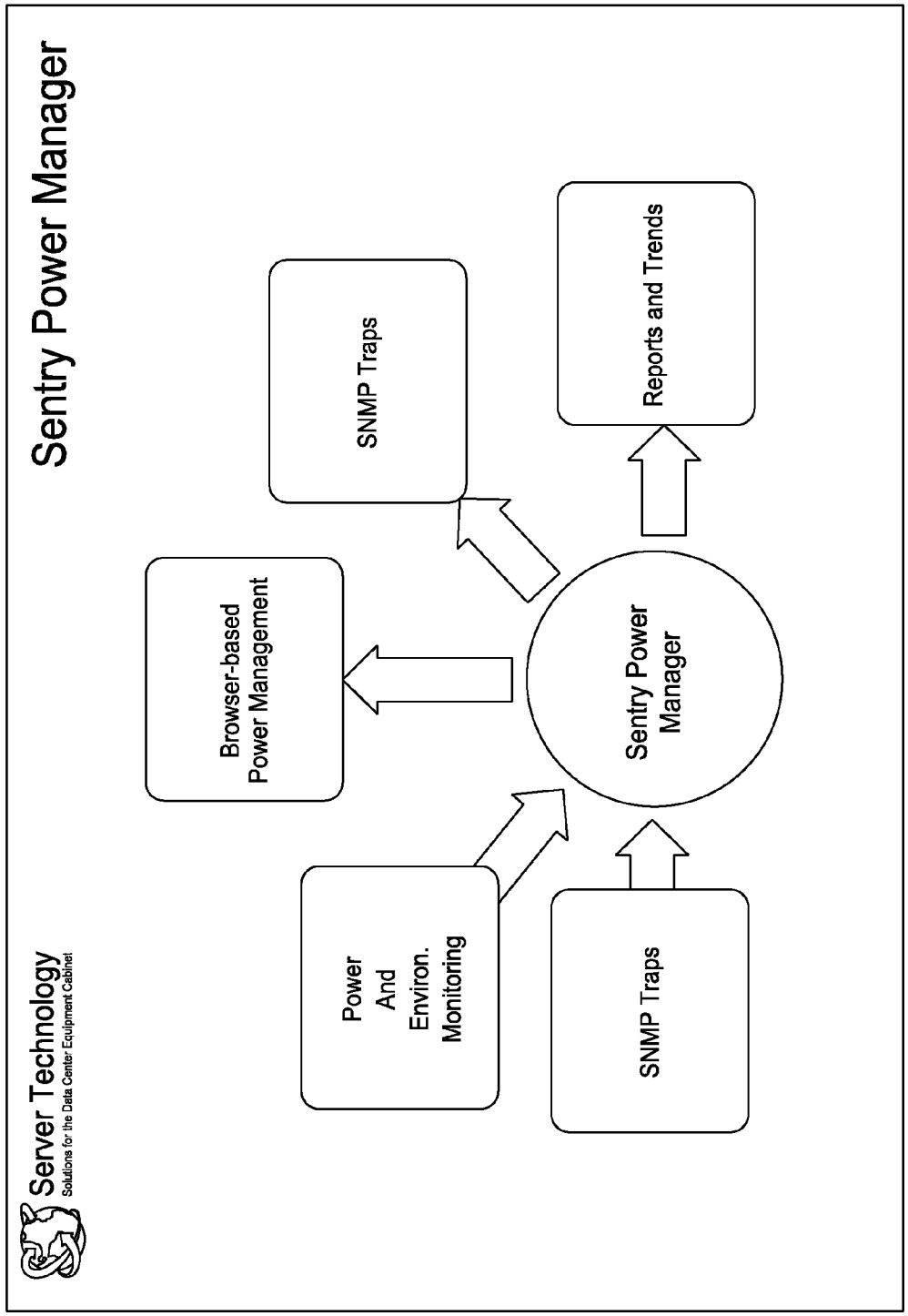
Figure 52A:
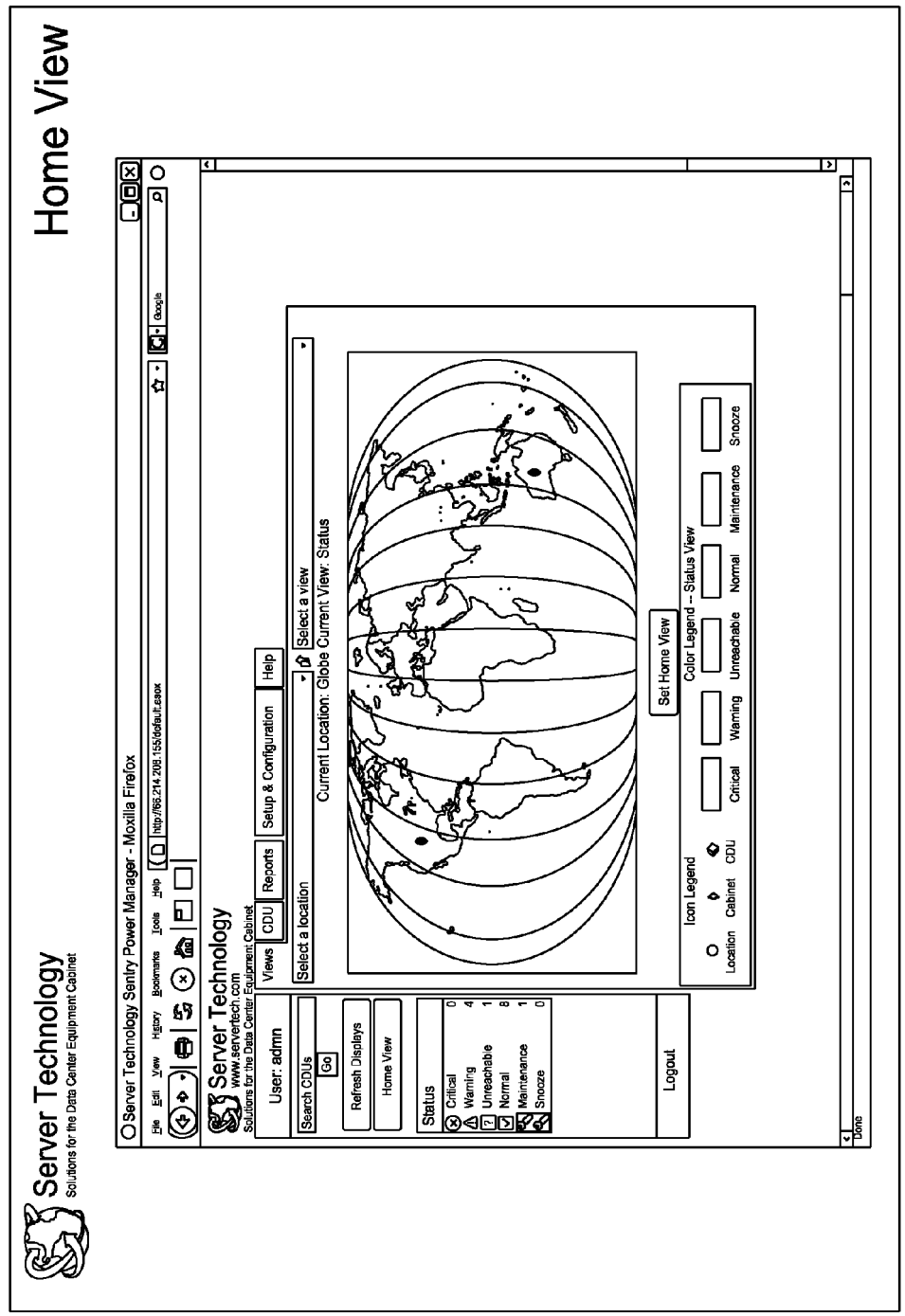
Figure 53A:
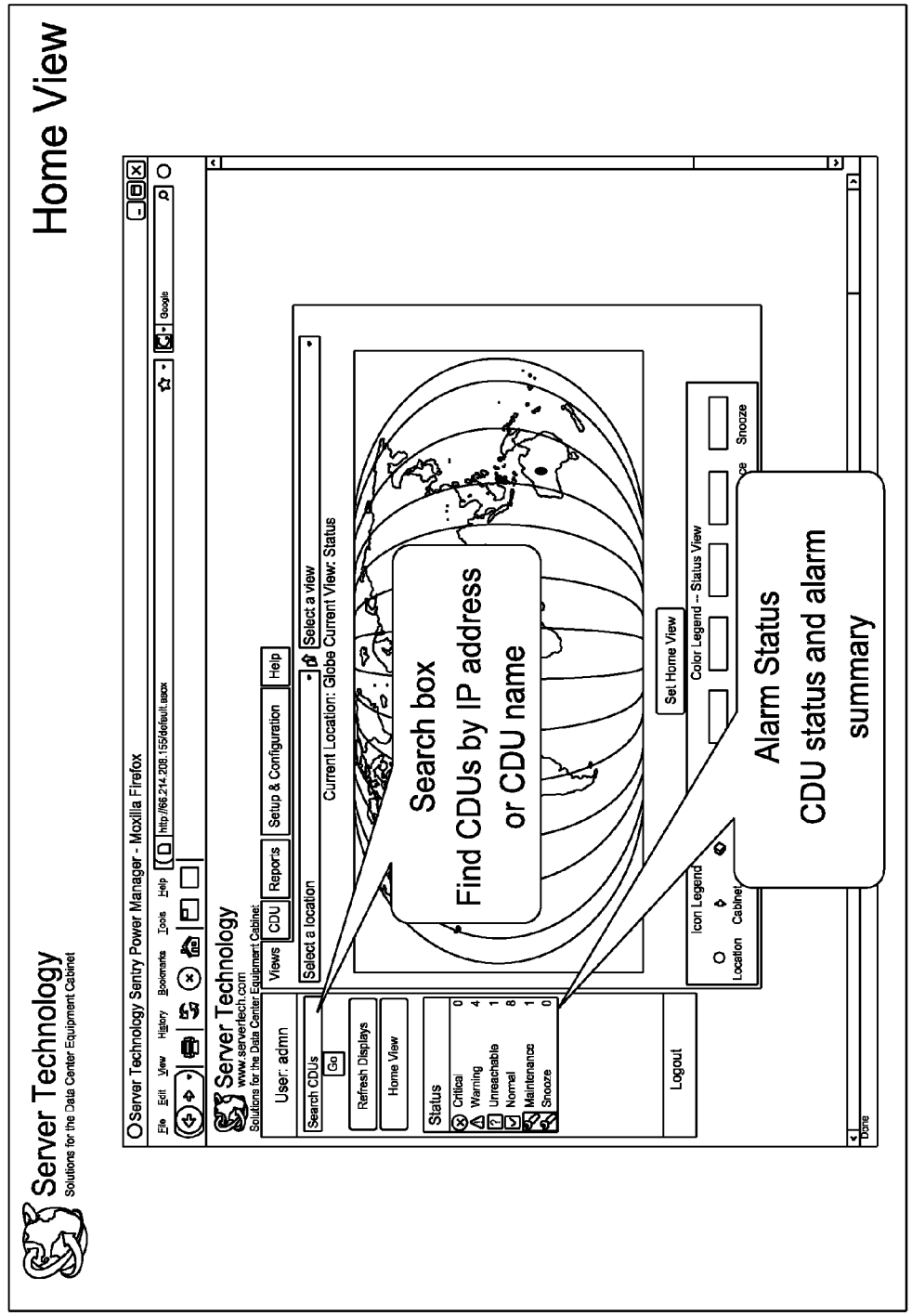
Figure 54A:
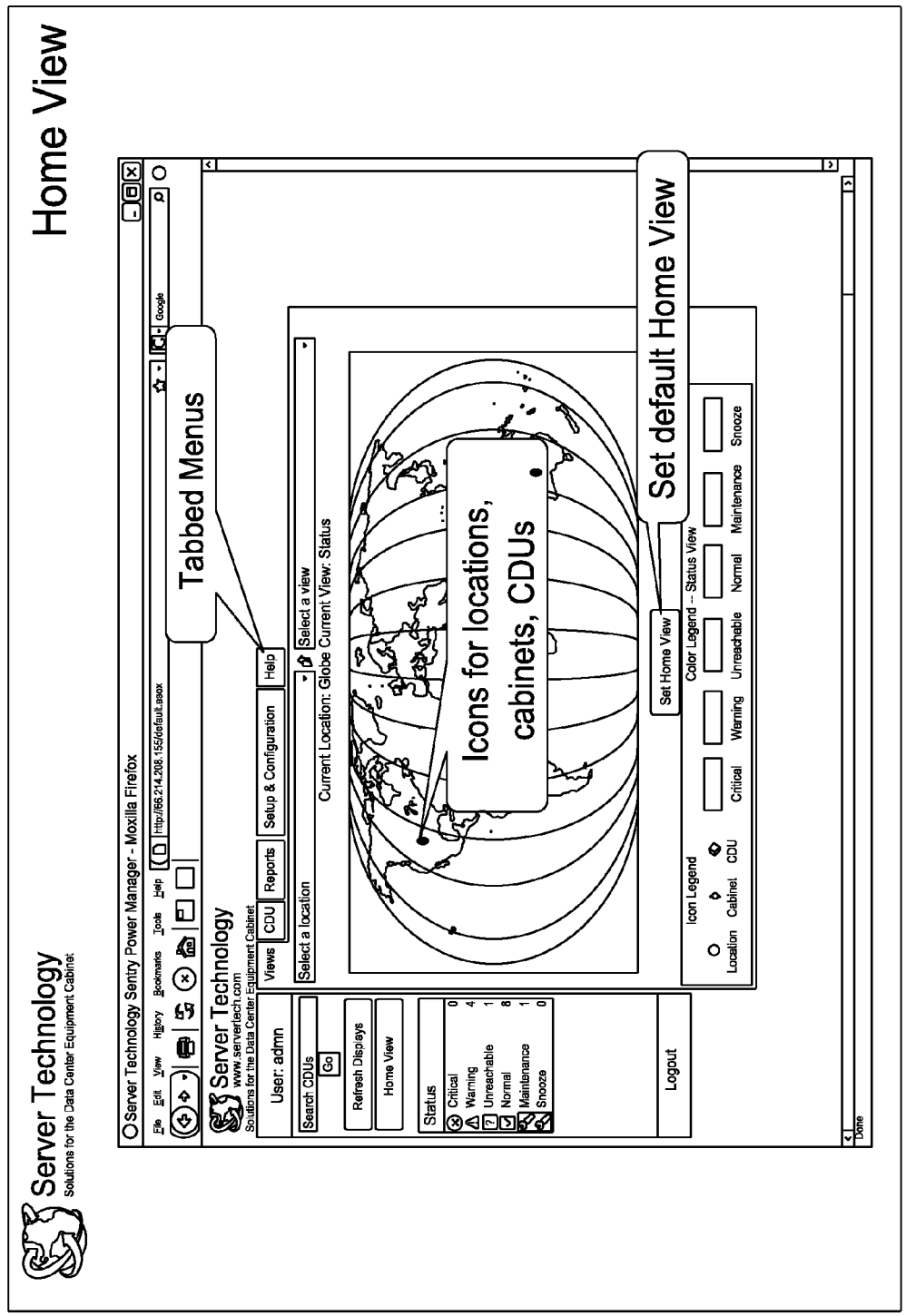
Figure 55A:
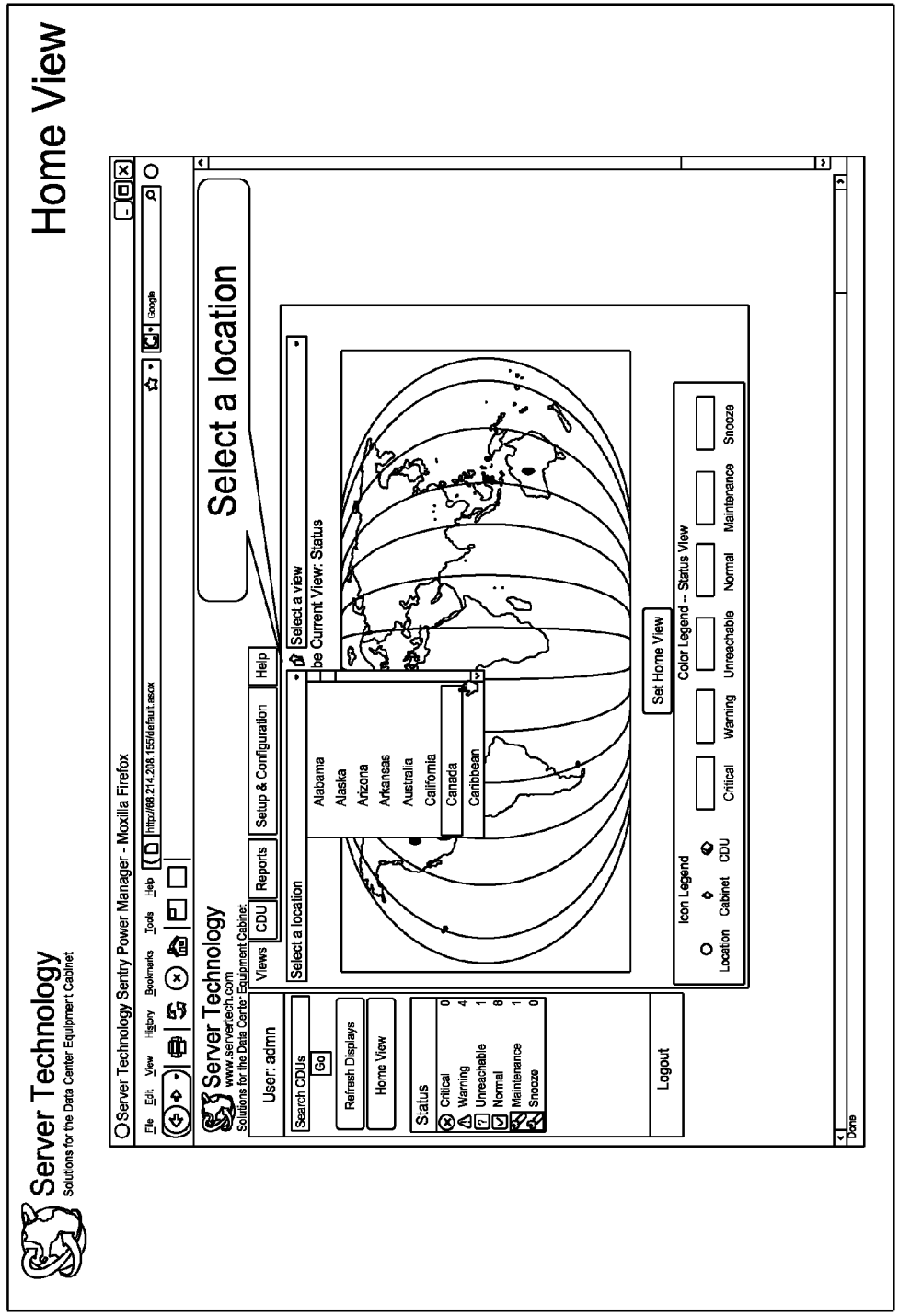
Figure 56A:
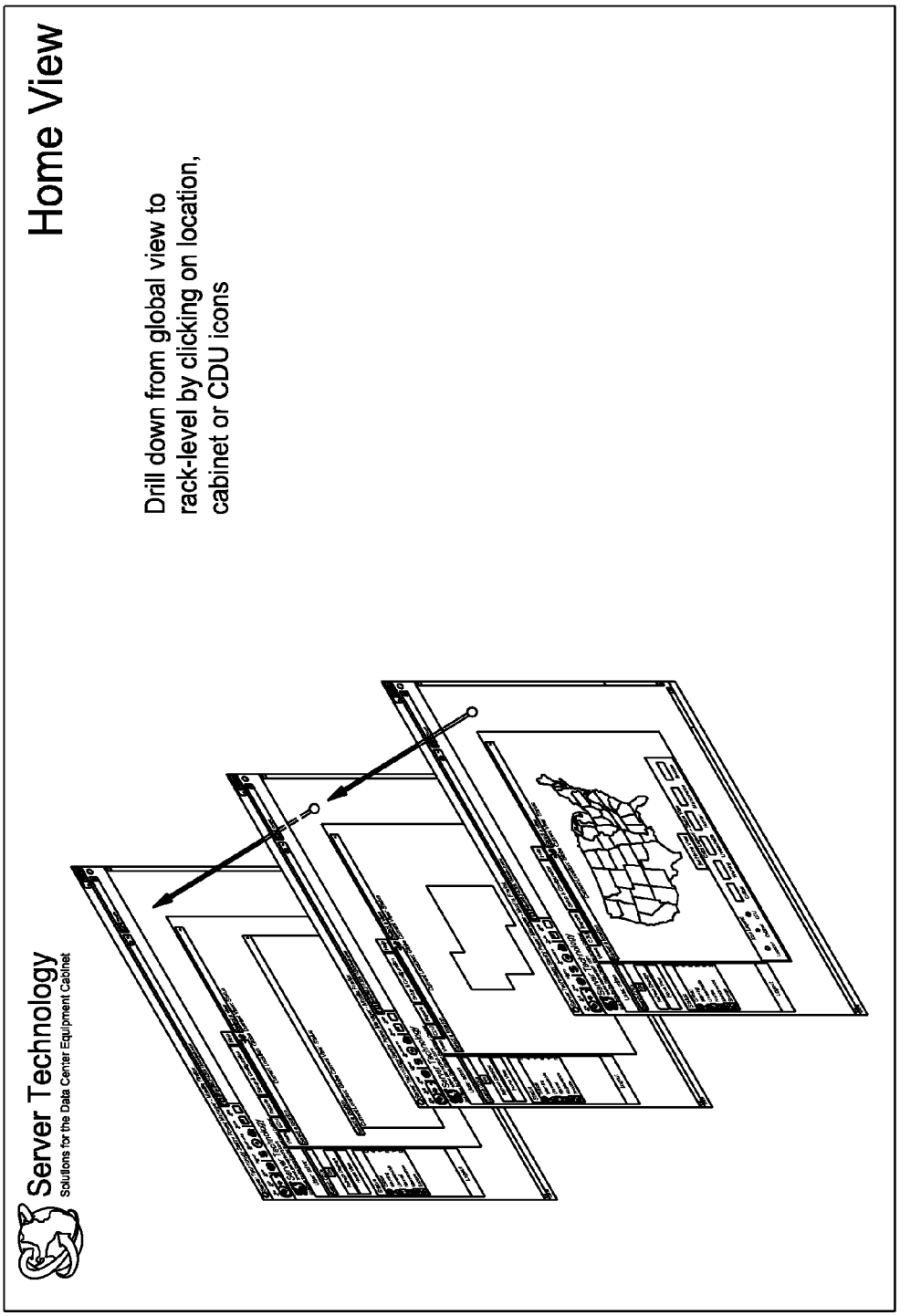
Figure 57A:
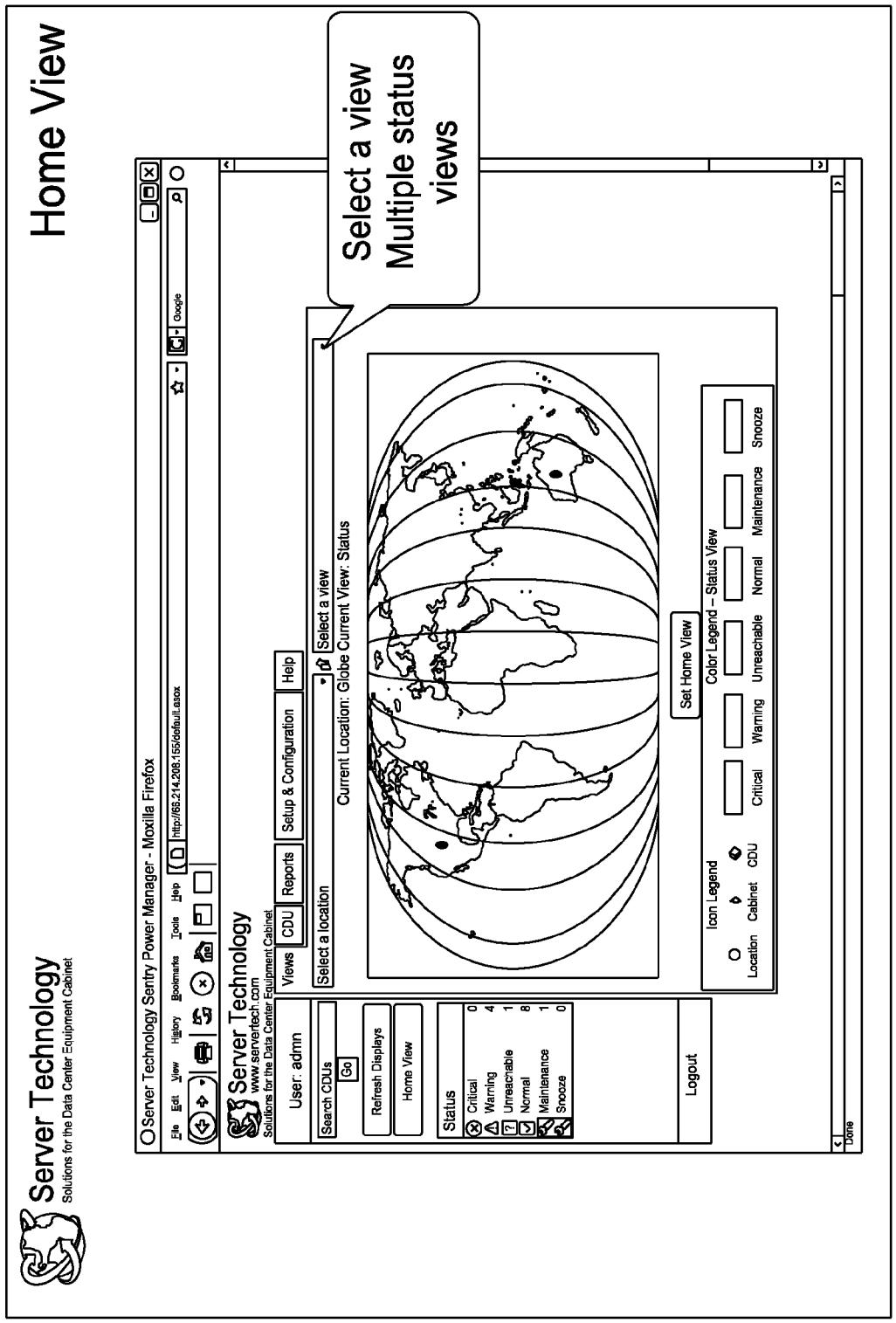
Figure 58A:
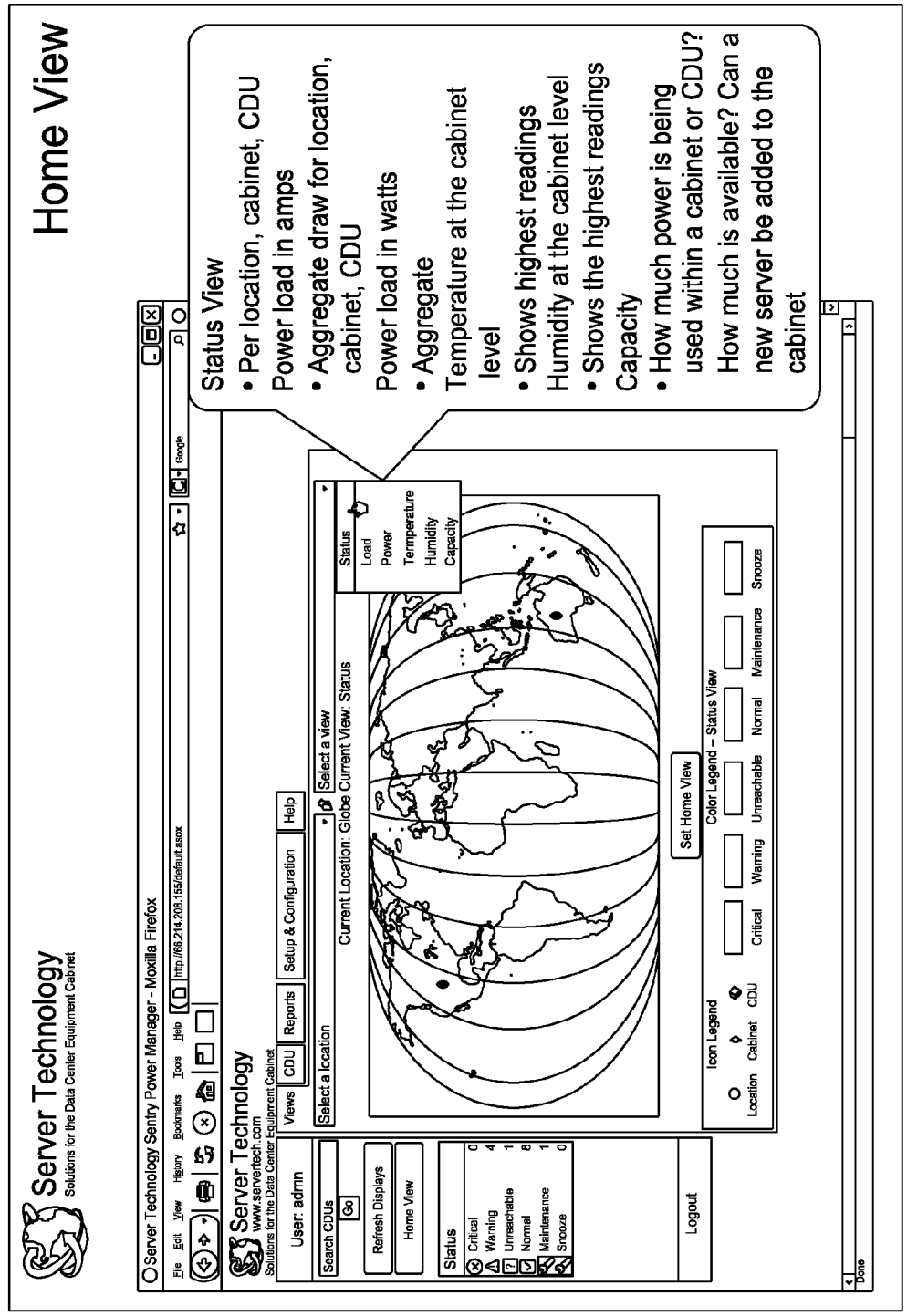
Figure 59A:
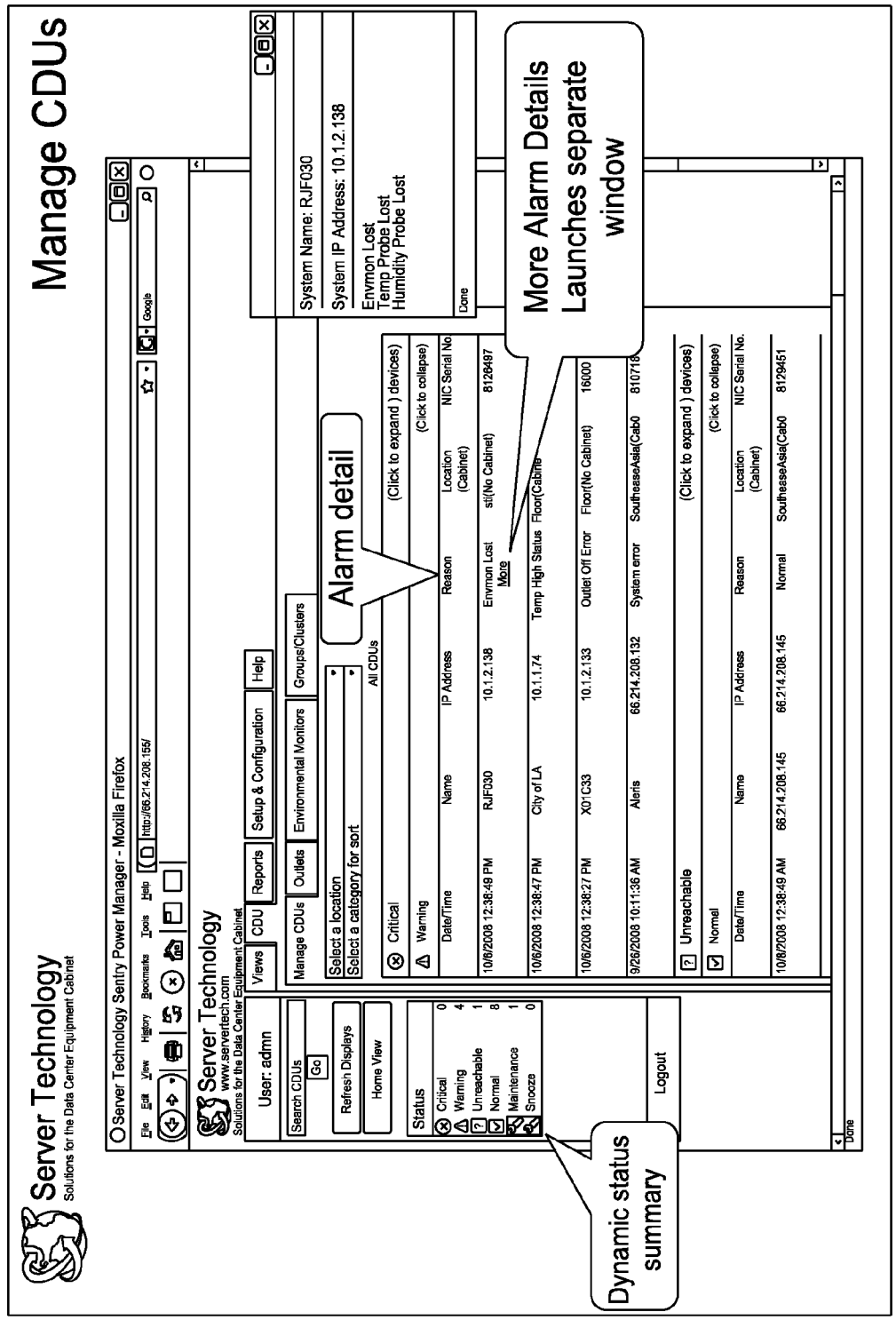
Figure 60A:
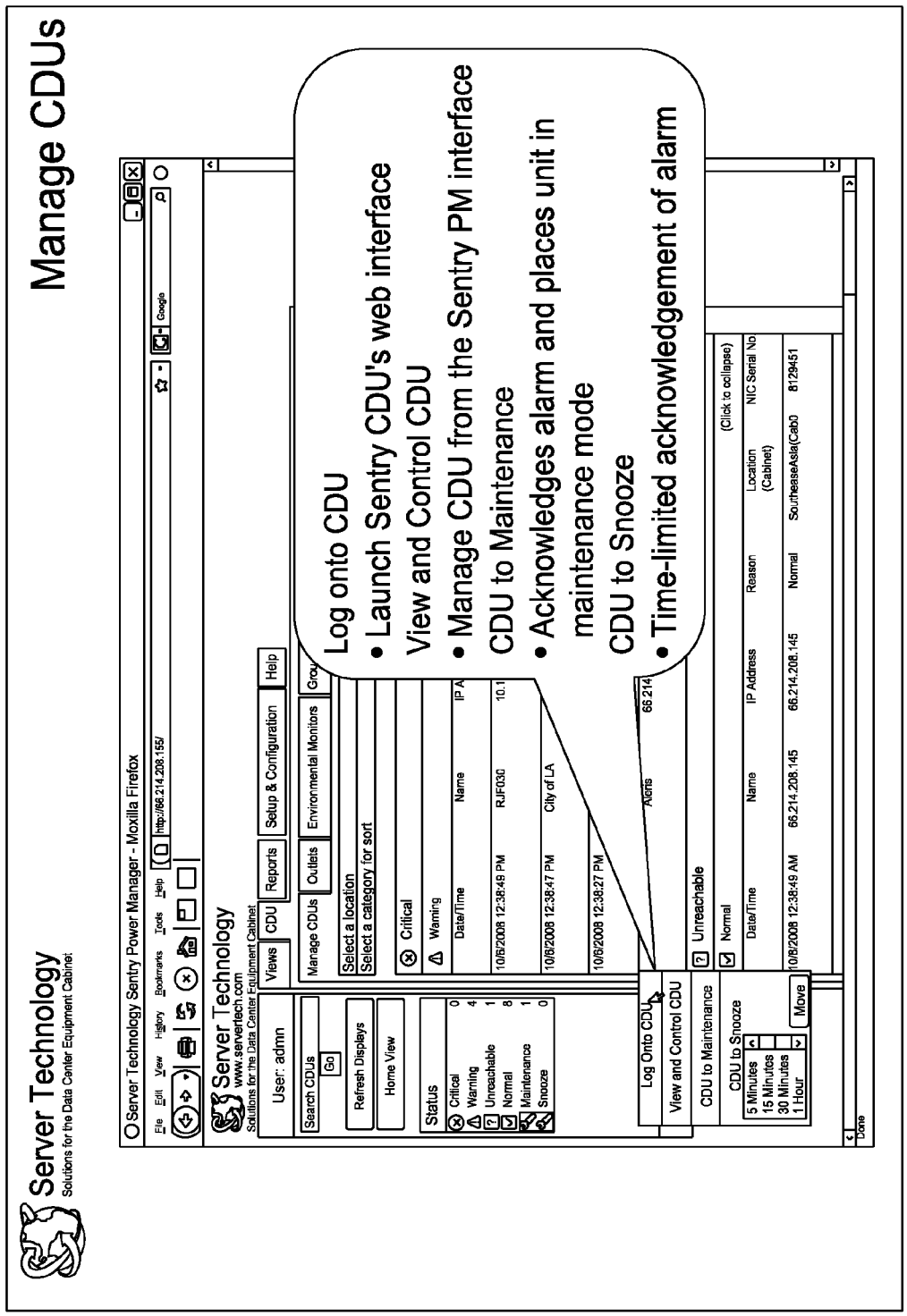
Figure 61A:
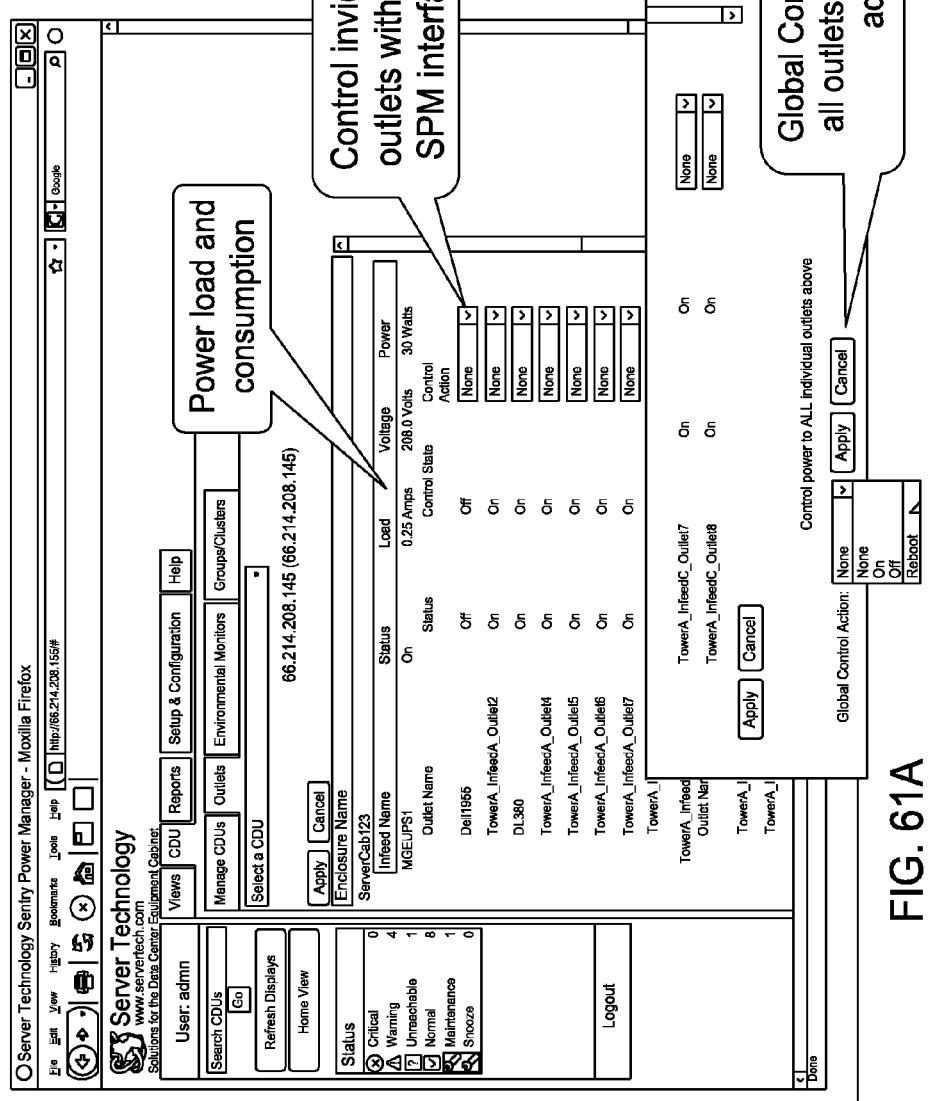
Figure 63A:
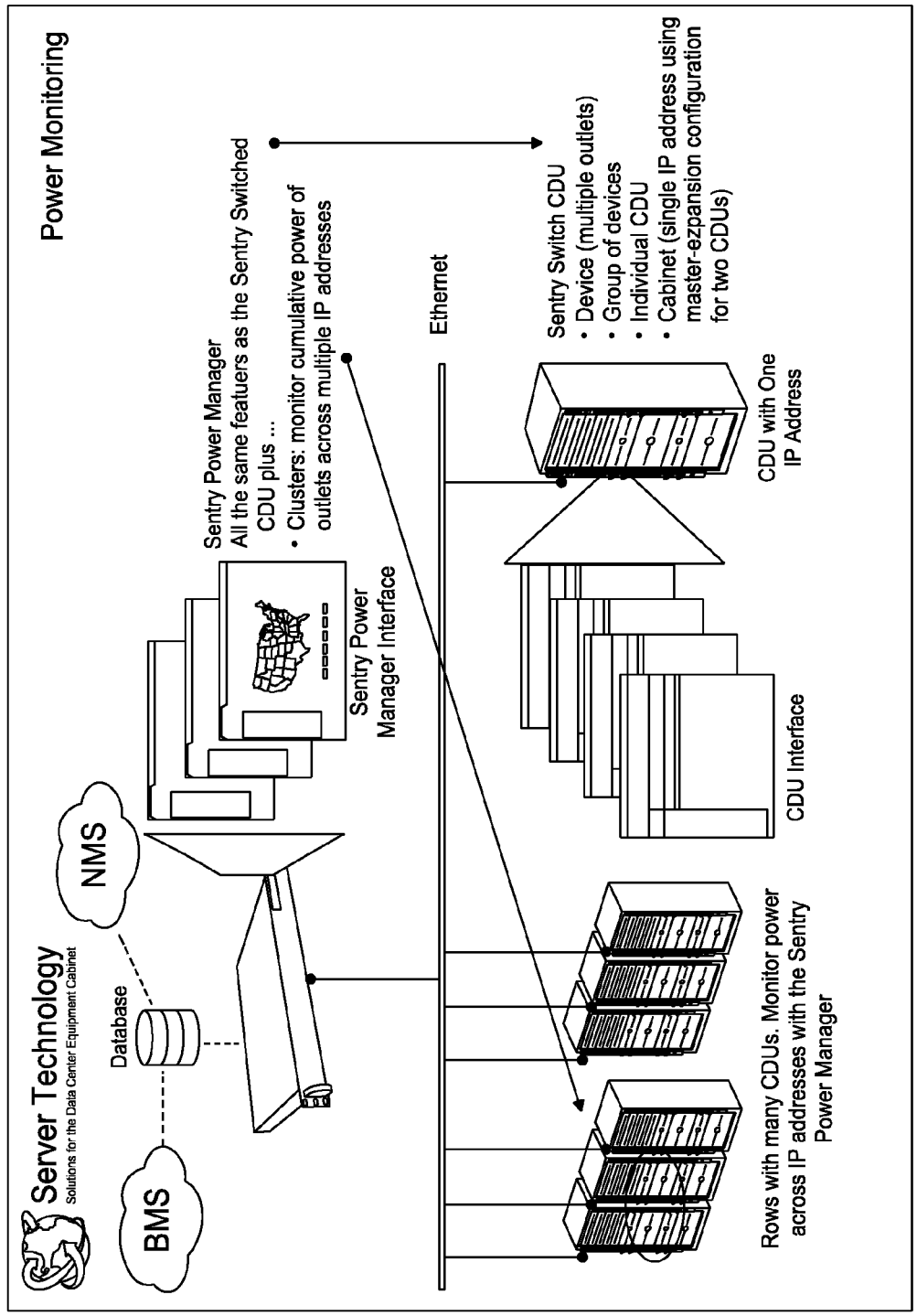
Figure 64A:
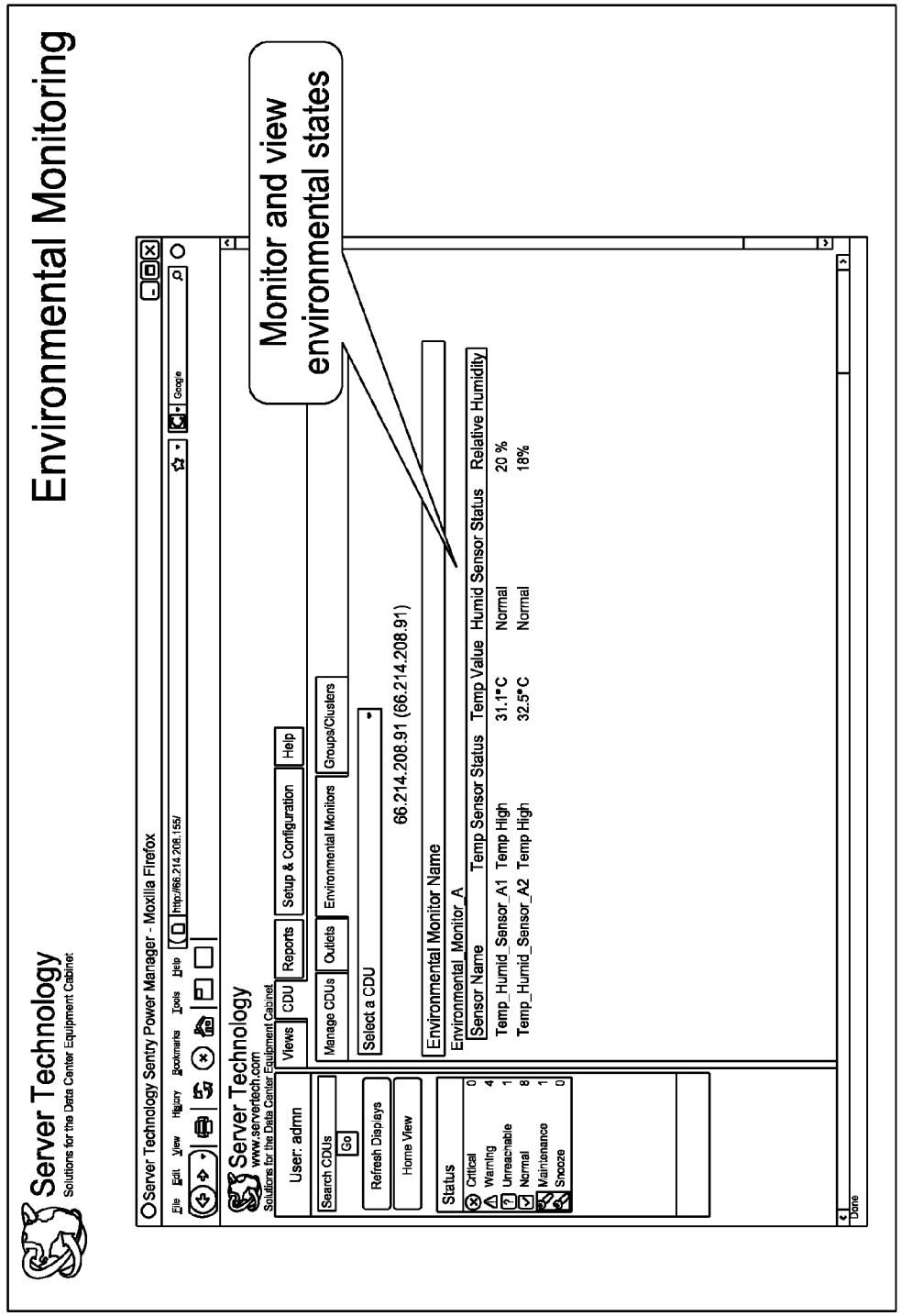
Figure 65A:
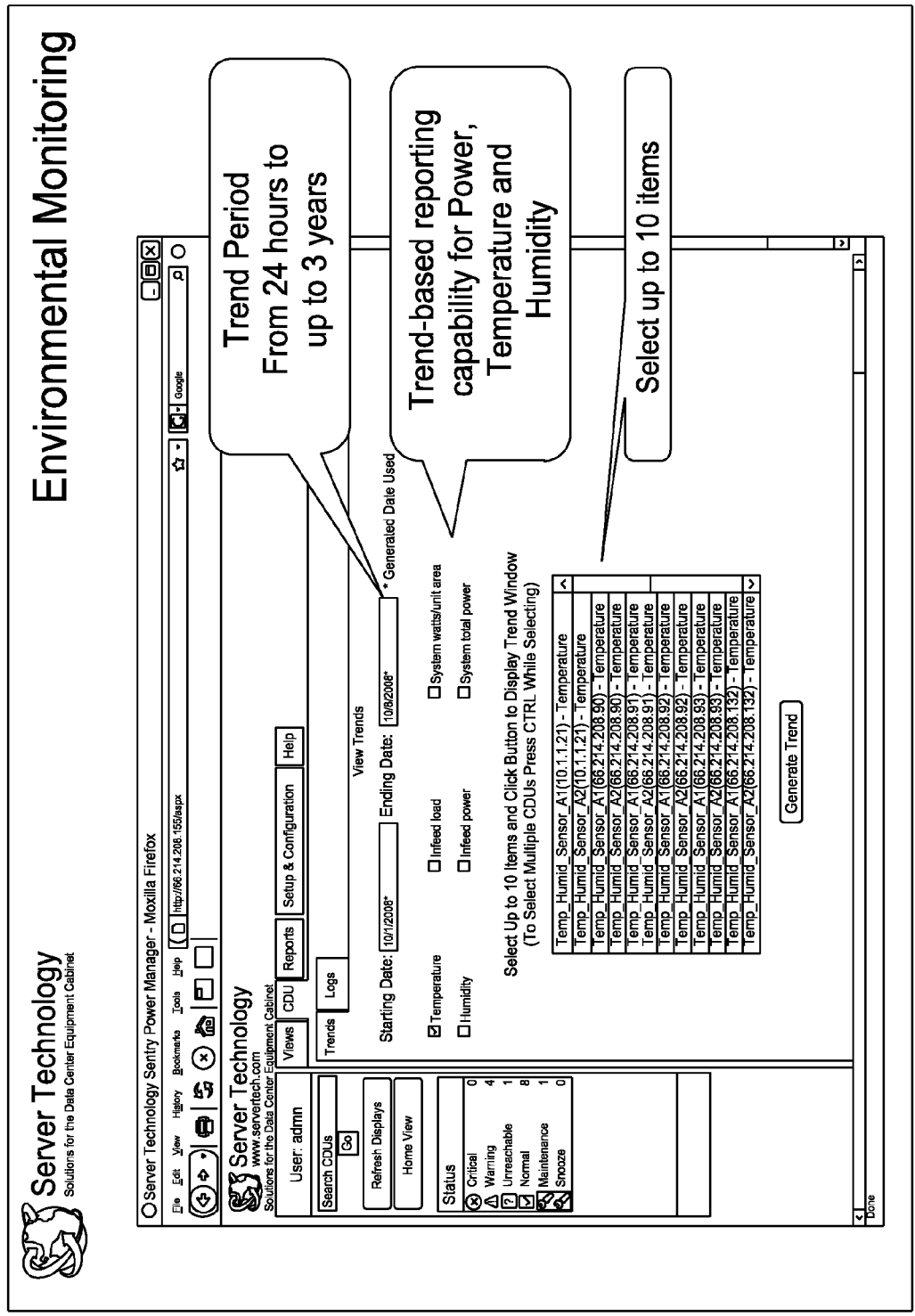
Figure 66A:
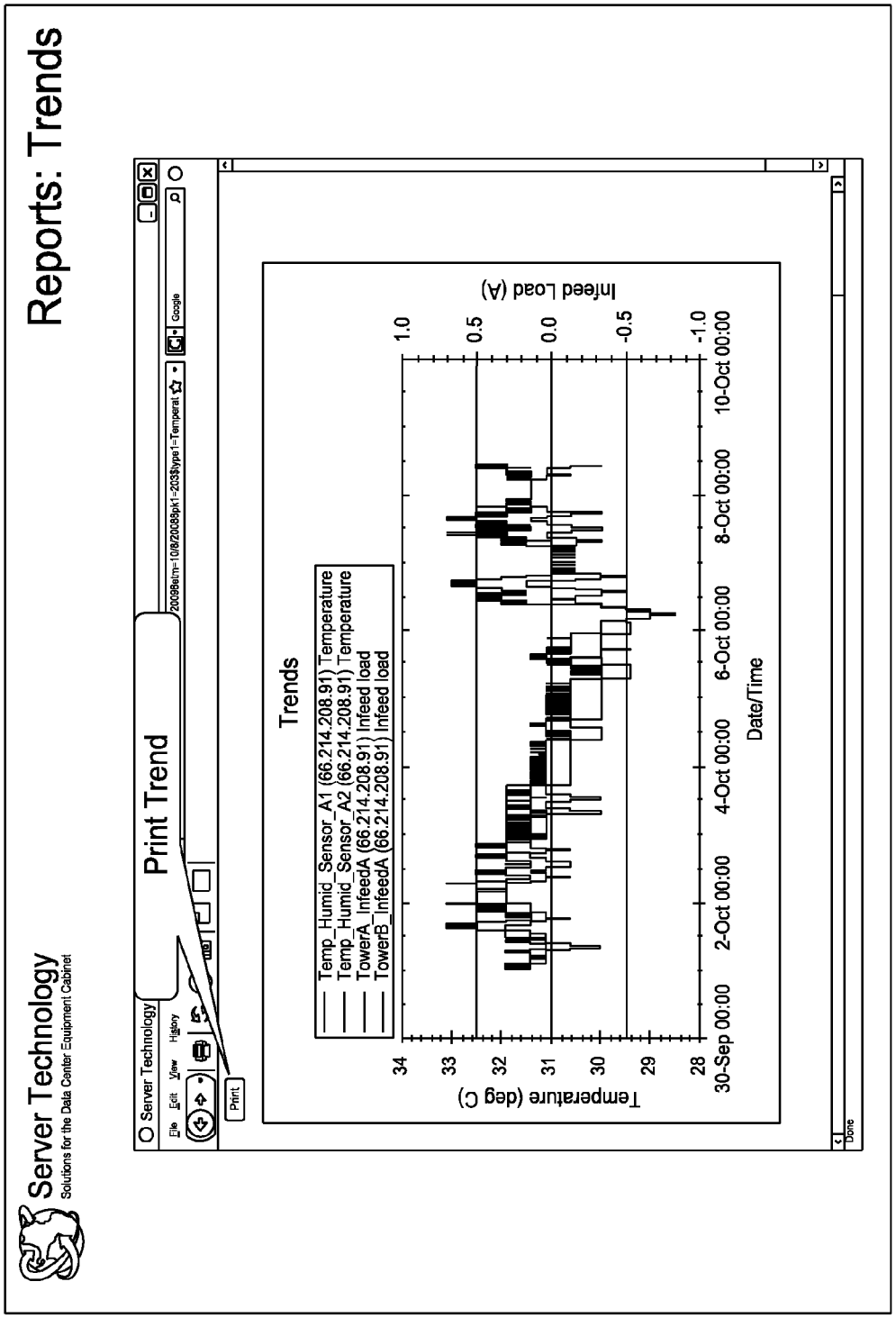
Figure 67A:
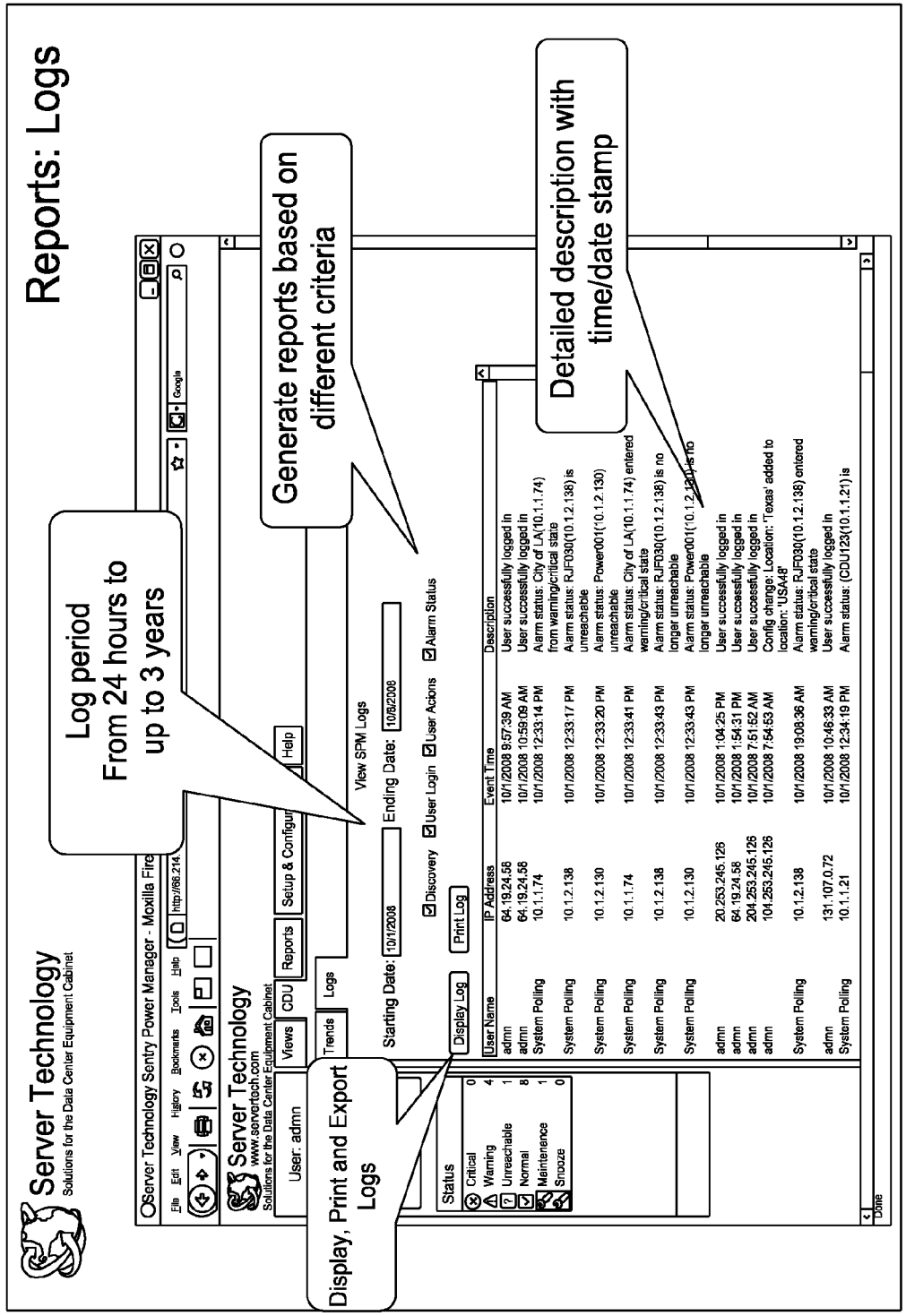
Figure 68A:
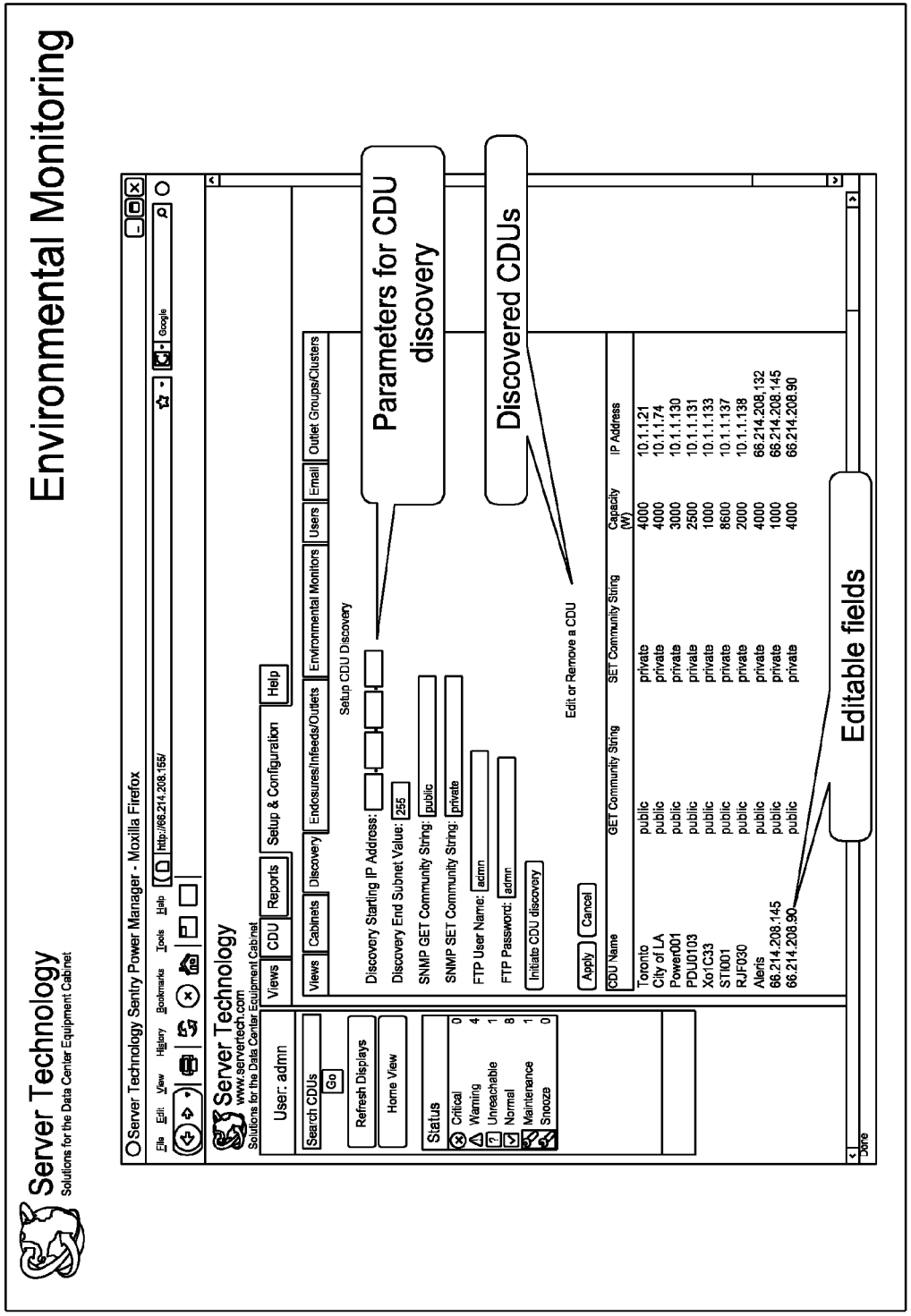
Figure 69A:
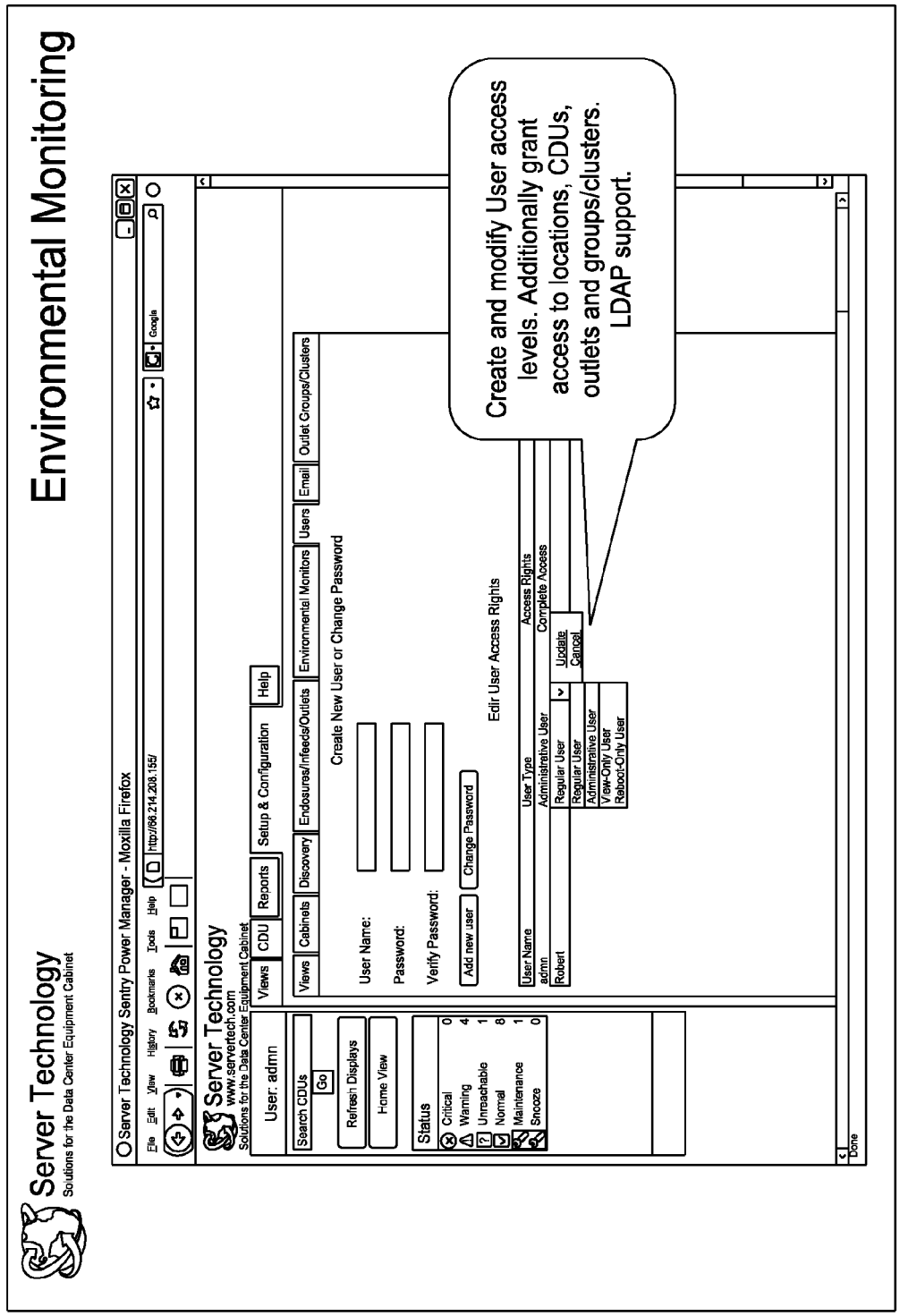
Figure 70A:
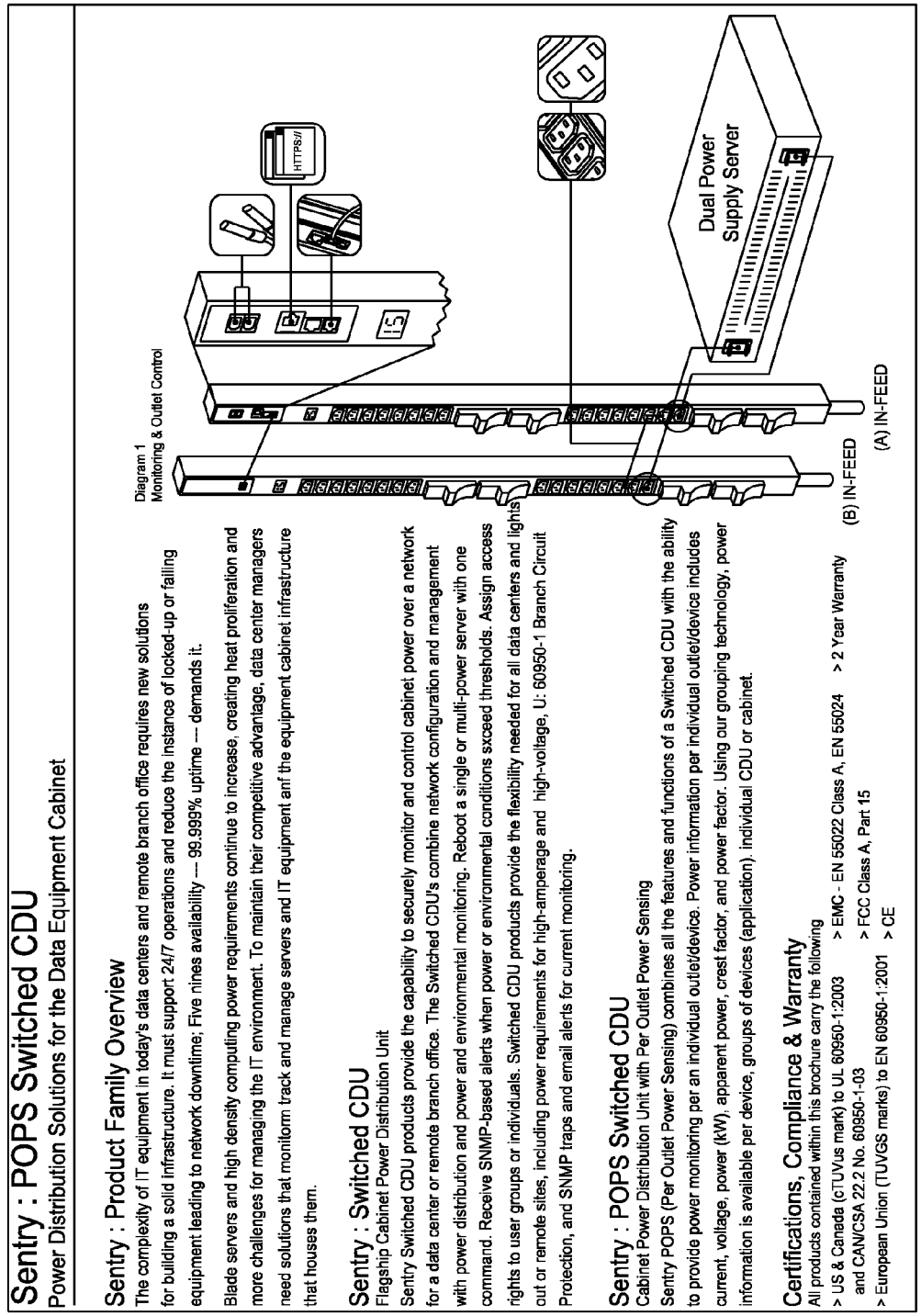
Figure 73A:
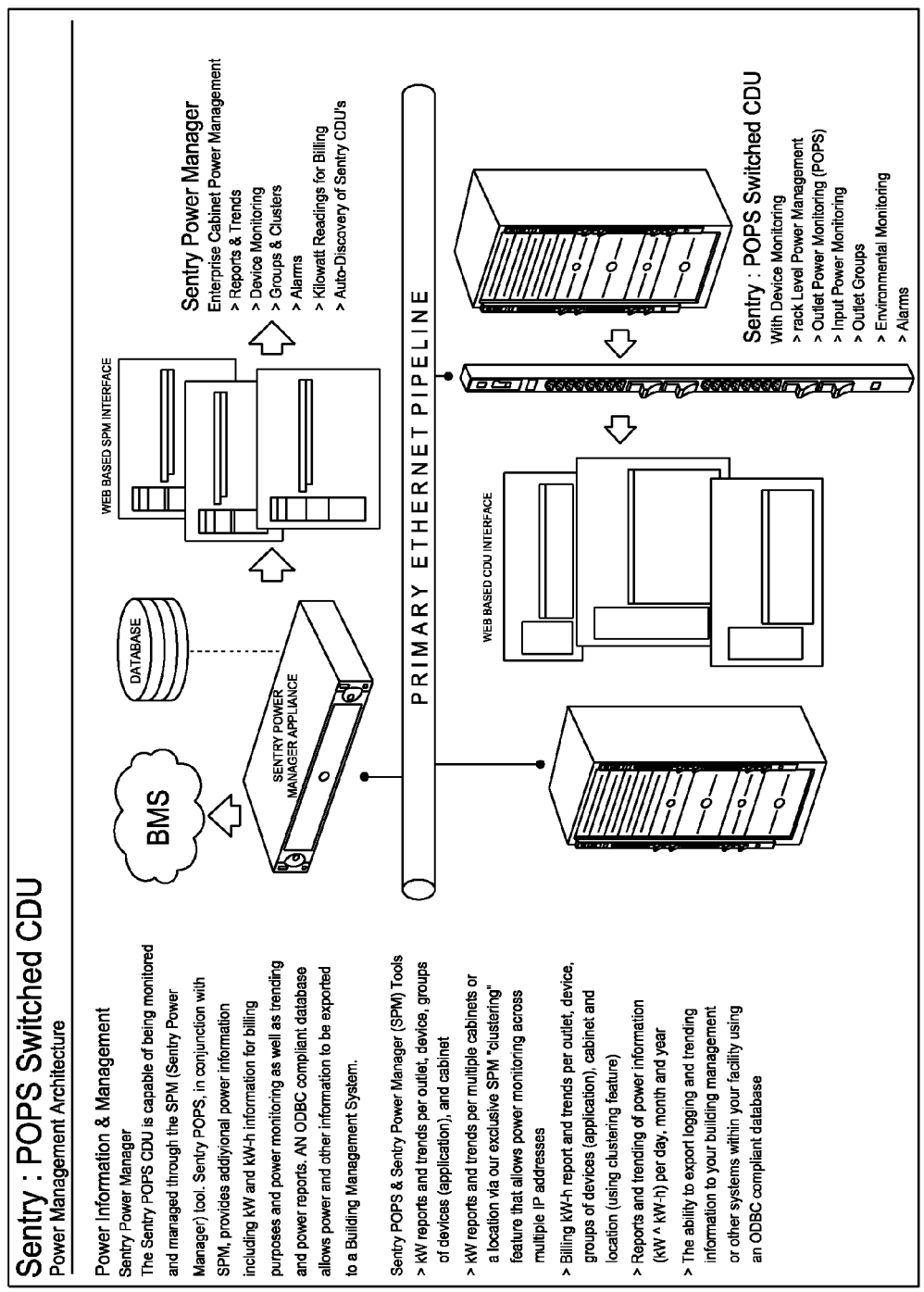
Figure 75A:

FIGS. 1A through 75A are screen shots and perspective views illustrating by way of example various aspects and features that may be included in different embodiments. Not everything shown in any or all of these screen shots need be present in any particular embodiment. For example, FIG. 48A shows a measure of reactance, and this can be either capacitive as shown or inductive, indicating lead or lag of current respecting voltage, and this feature is present in some embodiments but not others.

A system architecture that embodies the principles of the invention makes possible the collection of power information at the individual outlet, PDU, CDU, group and cluster level and the placing of this information into a database.

Power (for example in kilowatts) and power consumption (for example in kilowatt-hours) can be provided in many different ways, including for example per cabinet, per row of cabinets, per multiple rows of cabinets, per data center or multiple data centers, per device or application, per PDU, or even per outlet. This information is collected over a network and stored within a database, for example as described above. The collection period may be defined by a user. The information can made the subject of a trend analysis, a log, a report, a billing invoice, or the like. The information can be exported to a building management system (BMS) or any other system in a data center environment.

The information and control provided by embodiments of the invention can be used, for example, by a data center operator to associate and allocate or trend power data to individual users, departments or applications. Billing can be accomplished per data center, per server owner, per application or even according to the time of day. In an enterprise data center an individual department (for example, the accounting department) can be billed for the cost of their application running within their own datacenter. In a co-location facility, customers call be billed for the power usage of just their devices within a shared rack. An enterprise data center can schedule work according to the cost per kW depending on the time of day.

A business entity can measure energy efficiency to meet requirements that may be imposed by government agencies, for example as discussed in Appendices B through G.

Monitoring and logging outlet and PDU power data can identify abnormal power supply behavior, so the affected IT assets can be identified for preventive maintenance actions to reduce downtime. For example, a large spike in current draw could be used to inform a user that a power supply has failed or is about to fail.

It has been estimated that as many as 20% of all installed servers are under-utilized or not performing active work; embodiments of the invention enables a user to identify these IT assets and turn them off, improving data center utilization and reducing energy costs. Also, the ability to reclaim under-utilized assets has the potential to defer the requirement to construct new data center facilities, significantly reducing capital expenditures. Virtualization applications such as VMWare allow applications to be moved to under-utilized servers, allowing servers to be powered-off in off-peak hours.

Efficiency can also be improved by using power consumption data to operate each server at its optimal efficiency (this is sometimes called the "sweet spot"). Current drawn by a server can also indicate that a reboot is required.

IT asset information (power, environmental, etc.) can be exported to a building manager, building management system, or third party management software. In a typical data center there are two primary consumers of power: the infrastructure that provides cooling, generators, uninterruptible power, and the like; and the IT assets such as servers, routers, network storage, and the like. To achieve maximum efficiency power data are needed respecting both of these consumers. By collecting and logging all outlet or PDU power data and writing this information to the power manager database, this information can be exported to the building management system or third party management software using an API or communicating directly with BMS via MODBUS, BACnet, or the like.

The foregoing subject matter, including the content of some of the appendices, addresses the concept of Power Usage measurements for a data center as a whole. There may be granularity divided between 'cooling' and 'power load'. However, these broad metrics do not allow the data center operator to dig below the surface.

The data center operator requires an ability to collect power data (Power Usage measurement) in a very granular manner. For example: by equipment cabinet, by application, by user department, by business unit, and so on. Once this data is available in a granular form, the data center operator can provide reports that may change behavior within department, within business units, etc.

Power Usage measurements have been provided by equipment cabinet. Grouping of this data written to the SPM Database as set forth above allows Power Usage report to be generated by groups of servers within a cabinet. Clustering allows this Power Usage data to consolidated by groups of servers across multiple cabinets. And it allows Power Usage to be measured by groups of servers installed in multiple data centers. For example an email service of a large enterprise may embody multiple servers, installed in multiple data centers across the United States or even across the world.

The ability to group or cluster Power Usage measurements in the SPM data base provides the data center operator a new level of granularity to measure the Department that owns the email service and to point out through trending and logging how Power Usage can be reduced.

PIPS, POPs and SPM are the instrumentation, monitoring tools and recording tools that will permit a data center operator to improve effectiveness at the cabinet level, at the dedicated client server level, at the organization level and at the business unit level.

FIGS. 1A through 41A are screen shots of various aspects and features of embodiments of the invention.

FIGS. 42A through 69A are screen shots and illustrations of various aspects of the invention. These FIGS. 42A through 69A depict aspects of managing and consolidating information from CDUs within a large data center or across a plurality of locations. A centralized location to view power and environmental status and a centralized SNMP trap destination are indicated. The phrase "Per Outlet Power Sensing" ("POPS") refers to the concept of monitoring power consumption at each outlet as discussed above. With an Internet interface, monitoring power consumption at each outlet provides detailed power information and allows grouping of outlets to determine kilowatt consumption per device, group of devices, CDU, or cabinet. Power consumption can also be determined per PDU, rack, rows of racks, an entire data center, or the like by clustering outlet information across multiple IP addresses and CDUs, as discussed above. This can provide consolidated CDU information within a data center or across multiple locations, a centralized location to view power and environmental status, capacity planning, reports and trends, multiple views, auto discovery of all CDU devices, alarm details, an ability to manage CDUs, global or individual outlet control, and logging.

Figure 71A:
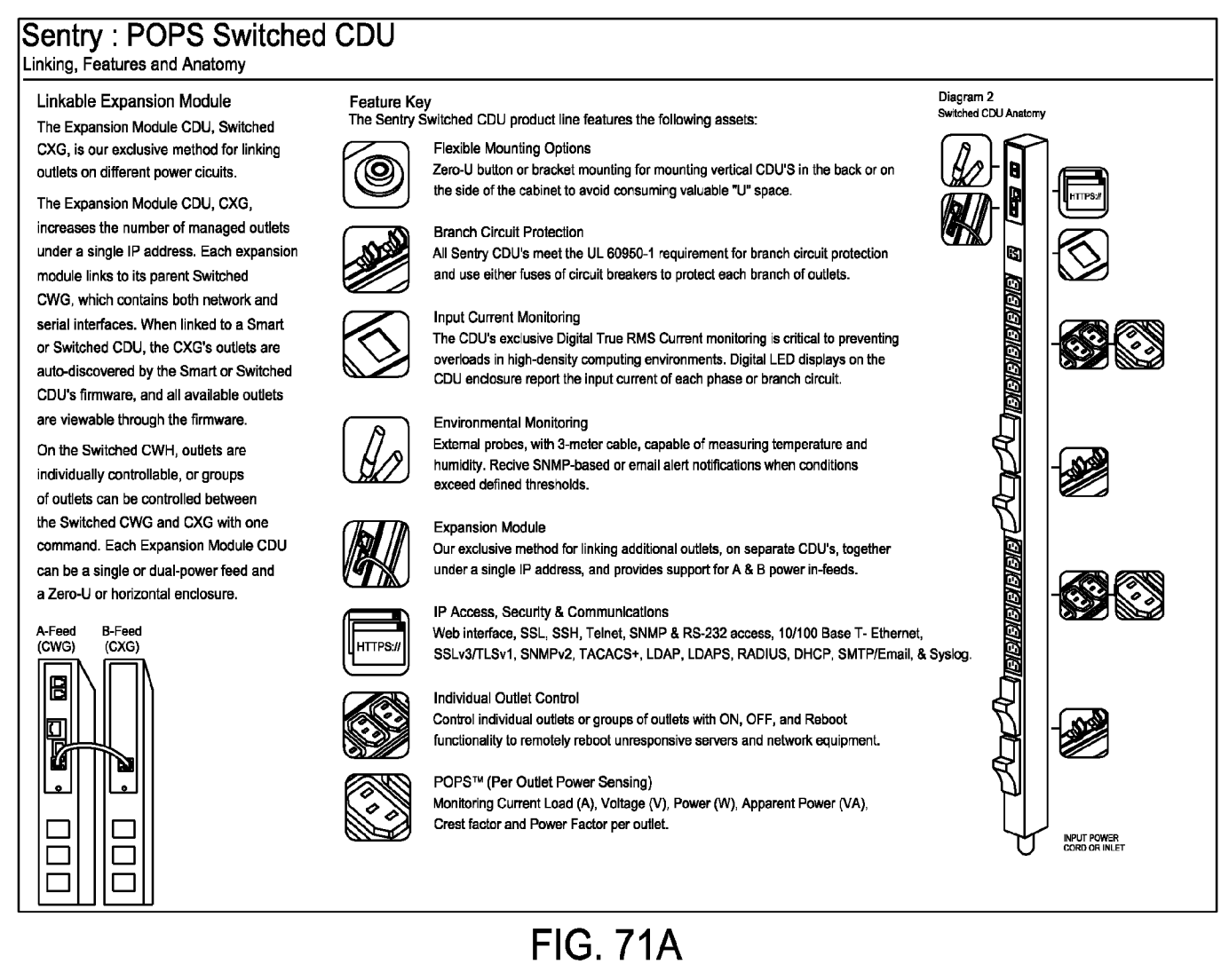

FIGS. 70A through 75A are illustrations of various aspects of the invention.

Additionally, in certain other embodiments, generation of power metrics as described above, and internal clocking based on an incoming AC signal, are incorporated into other types of appliances other than computing-related equipment, such as household computer, TV, stereo, or other appliances. Such appliances may use the information to adjust internally based on load or report out problems, power metrics, etc. Such communications may be through a wired or wireless communications interface to a sentry poer manager interconnected, for example, to the smart grid. In some embodiments, the a power supply calculates only some, or none of the above noted metrics, but uses this type of monitoring to take action.

In certain embodiments, assets that receive power from a PDU include power supplies having such power measurement and reporting circuitry. The PDU includes a communication interface (wired or wireless) and receives power supply metrics from each unit of supported electronics equipment through the communications link. The PDU can use the metrics or report them to other remote entities.

The phrase "Per Outlet Power Sensing" ("POPS") refers to the concept of monitoring power consumption at each outlet as discussed above. The phrase "Per Input Power Sensing" ("PIPS") refers to the concept of monitoring power delivered to an input of a PDU as discussed above. With an Internet interface, monitoring power consumption at each input/outlet provides detailed power information and allows the determination of power consumption and other power related metrics per device, group of devices, PDU, or cabinet. Power consumption can also be determined per rack, rows of racks, an entire data center, or the like by clustering power information across multiple IP addresses and PDUs, as discussed above. This can provide consolidated PDU information within a data center or across multiple locations, a centralized location to view power and environmental status, capacity planning, reports and trends, multiple views, auto discovery of all PDU devices, alarm details, an ability to manage PDUs, global or individual outlet control, and logging.

In can thus be seen that the preferred and other embodiments in other aspects, provided are a number novel features and advantages including, for example: (a) sensing and output of information related to the current and voltage output to various different components and/or applications; (b) a single chip AC input clock solution, in which a power monitoring circuit or a power meter does not require an external oscillator for a time base; (c) predictive failure of various power components; (d) flagging of anomalous current, voltage, or power usage for a component or a PDU; (e) an accurate energy accumulation scheme for one or more outputs associated with a single power monitoring and metering circuit; (f) output switching capability with relatively low power requirements using switching versus holding transistors in relay circuits used to switch the outputs; (g) output switching at power zero-crossings in the AC power cycle; (h) modular construction of an outlet assembly with options to provide switched outputs or non-switched outputs; (i) the ability to determine is lack of power at an outlet is the result of loss of input power or a blown fuse; and (j) the ability to assess the health of power supplies an installed base of power supplies in data center equipment racks without requiring any modification of the power supplies.

Various modifications to the described embodiments will be apparent to those skilled in the art, and the generic principles defined herein may be applied to other embodiments without departing from the scope of the invention. It can thus be seen, however, that one or more embodiments described herein may provide one or more among the following features or advantages 1) Sensing and outputting information related to the current and voltage input to a PDU or to various different components and applications.

2) A single chip AC input clock solution, in which a power monitoring circuit or a power meter does not require an external oscillator for a time base.

3) Predictive failure of various power components.

4) Flagging of anomalous current, voltage, or power usage for a component or a PDU.

5) An accurate energy accumulation scheme for one or more outputs associated with a single power monitoring and metering circuit.

6) Output switching capability with relatively low power requirements using switching versus holding transistors in relay circuits used to switch the outputs.

7) Output switching at power zero-crossings in the AC power cycle.

8) Modular construction of an outlet assembly with options to provide switched outputs or non-switched outputs.

9) An ability to determine if lack of power at an outlet is the result of loss of input power or a blown fuse.

10) An ability to assess the health of power supplies an installed base of power supplies in data center equipment racks without requiring any modification of the power supplies.

11) A PDU with (a) power sensing circuitry that reports one or more of voltage, current or power usage by the PDU or one or more outlets in the PDU and (b) one or more processors that use this information to compute apparent power, RMS power, power factor, and other power related information.

12) A PDU having an intelligent power module with a microprocessor and a circuit that senses line frequency of the power input. Clock drift in the microprocessor clock due to temperature fluctuations is corrected using the input power frequency sense.

13) A system comprising a power manager and a power distribution unit (PDU), the PDU comprising a plurality of outputs, voltage and current sense circuits, and a power reporting circuit that provides power related information for inputs and outputs of the PDU to the power manager, the power manager receiving the power related information and adjusting the power consumption of the PDU or of one or more components that receive power from the PDU.

14) A system comprising a power manager and a PDU, the PDU comprising one or more power reporting circuits that provide power related information for each input and output of the PDU to the power manager, the power manager receiving power related information from two or more PDUs related to an application that is running on two or more components that receive power from the PDUs and compiling this information to determine power-related information for the application.

15) A power management system that provides assigning outlets or PDUs in any one location to a cabinet distribution unit in that location. At least one unique IP address may be associated with each location having one or more CDUs. If there are several CDUs at a given location, each may get a separate IP address or a single IP address may be used for some or all of the CDUs at that location. Collecting power usage data respecting an outlet or a PDU may be accomplished by communicating via the Internet with the IP address associated with the CDU containing that outlet.

16) A power management system with the ability to collect and provide trends related to PDUs, CDUs, cabinets, and components that receive power from one or in a data center, trends including power, temperature, humidity, and the ability to set triggers if limit thresholds are exceeded.

17) A system that provides billing for power consumption for one or more discreet power consuming components, PDUs, CDUs, and cabinets within a data center.

18) A power management system that identifies low utilization or non-utilized servers and initiates the shut-down of these servers.

19) A power management system that identifies an optimal operating condition for a cabinet, PDU, CDU, or discrete component, such as a server, or a set of components, that receives power from a PDU, and identifies one or more components that are less than optimal.

20) A method of managing electrical power including collecting power usage data indicative of electrical current flow through each of a plurality of electrical outlets or PDUs, displaying the power usage data to a user, receiving a user-initiated command to control current flow through any outlet or PDU selected by the user, and controlling current flow through the selected outlet or PDU responsive to the command Controlling current flow through an outlet or PDU may mean turning the outlet or PDU on or off. The user may initiate a command to reboot control circuitry associated with one or more of the outlets or PDUs. Data indicative of environmental conditions, such as temperature and humidity, of the electrical outlets or PDUs may be collected and displayed. A log of events and a report descriptive of a power usage trend may be generated. Outlets and PDUs may be assigned to CDUs and an IP address may be associated with one or more CDUs. A CDU status, for example critical, changed, normal, no data, maintenance, or snooze may be displayed, as may a graphical depiction of locations of CDUs. Available infeed power may be displayed. A message may be sent automatically if a defined event, for example a temperature or humidity level is reached, a set amount of electrical power is used at a location or by one or more CDUs or even a single outlet.

21) Outlets or PDUs in different CDUs having different IP addresses may be clustered, thereby allowing a user to view the status of, and to control, all outlets or PDUs in the cluster.

22) A power management database structure having one or more of the tables listed above.

23) A power and power consumption data can be provided per cabinet, per row of cabinets, per multiple rows of cabinets, per data center or multiple data centers, per device or application, per PDU, per outlet or in any other desired manner. This information can be used for trend analyses, logs, reports, billing invoices, or the like. The information can be exported to a building management system (BMS) or any other system in a data center environment.

24) A data center operator can associate and allocate or trend power data to individual users, departments or applications. Billing can be accomplished per data center, per server owner, per application or time of day. An individual department can be billed for the cost of their application. Customers call be billed for the power usage of just their devices within a shared rack. Work can be scheduled according to the cost per kW depending on the time of day.

25) A business entity can measure energy efficiency to meet requirements that may be imposed by government agencies.

26) Abnormal power supply behavior can be identified. This facilitates preventive maintenance.

27) Applications can be moved to under-utilized servers. Virtualization applications such as VM-Ware allow servers to be powered-off in off-peak hours. IT assets not being used can be identified and turned off. The ability to reclaim under-utilized assets can avoid or defer construction of new data center facilities.

28) Power consumption data can also be used to help operate each PDU or component at its optimal efficiency and reboot if needed.

29) IT asset information (power, environmental, etc.) can be exported to a building manager or building management system, enabling assets to be managed.

30) An ability to communicate with other devices (e.g. servers) using tools such as SNMP, XML, iLo or other proprietary protocols to collect power and environmental information from these devices.

31) Grouping and clustering information via an IP, across IPs, or across the world to monitor, and manage power and environmental information.

We claim:
1. A power management system comprising:
 a plurality of power distribution units (PDUs) each having:
  a housing;
  at least one power input;
  a plurality of power outputs;
  a plurality of sensors, comprising:
   at least one input sensor connected to sense at least one input power parameter of the at least one power input; and
   at least one output sensor connected to sense at least one output power parameter of an associated one of the plurality of power outputs;
  a power manager agent configured to receive said at least one input power parameter and said at least one output parameter, wherein the power manager agent comprises at least one PDU processor and a PDU data storage unit to cause the at least one PDU processor to compute energy consumption over time for at least the associated one of said power outputs; and
 a network power manager in communication with each power manager agent, said network power manager configured to receive information corresponding to the computed energy consumption, wherein the network power manager comprises at least one network processor and a network data storage unit, said network data storage unit comprising instructions operative to cause the at least one network processor to:
  communicate, to a user, the computed energy consumption; and in response to receiving a user-initiated command correlated to the computed energy consumption, convey said user-initiated command to the associated power manager agent.

2. A power management system as in claim 1 wherein the user interface comprises a browser-based visual display.

3. A power management system as in claim 1 wherein the plurality of sensors comprises at least one of: a power line frequency sensor, a voltage sensor, a current sensor, a temperature sensor, and a humidity sensor.

4. A power management system as in claim 1, wherein the network processor comprises at least one microprocessor.

5. A power management system as in claim 1, wherein the network processor comprises at least one computation unit remotely located from the power distribution units.

6. A power management system as in claim 1, wherein each of the plurality of power distribution units is configured to compute at least one of apparent power, RMS power, and power factor for one or more of its associated plurality of power outputs.

7. A power management system as in claim 1, further comprising instructions in the network data storage unit operative to cause the network processor to identify a load that comprises an under-utilized server.

8. A power management system as in claim 7, further comprising instructions in the network data storage unit operative to cause the network processor to initiate a shutdown of under-utilized servers.

9. A power management system as in claim 1, further comprising instructions in the network data storage unit operative to cause the network processor to compute over time at least one of a power usage history and an environmental history.

10. A power management system as in claim 1 wherein the communication circuit of each power distribution unit is assigned a unique communication address.

11. A power distribution unit, comprising:
a housing;
at least one power input;
a plurality of power outputs;
at least one voltage sensor connected to sense at least one voltage parameter associated with a subset of the plurality of power outputs; and
at least one current sensor connected to sense at least one current parameter associated with at least one of the plurality of power outputs;
a power manager agent configured to receive at least one said voltage parameter and at least one said current parameter, wherein the power manager agent comprises at least one PDU processor and a PDU data storage unit to cause the at least one PDU processor to compute energy consumption over time for at least the associated one of said power outputs; and
a network power manager in communication with each power manager agent, said network power manager configured to receive information corresponding to the computed energy consumption, wherein the network power manager comprises at least one network processor and a network data storage unit, said network data storage unit comprising instructions operative to cause the at least one network processor to:
communicate, to a user, the computed energy consumption; and
in response to receiving a user-initiated command correlated to the computed energy consumption, convey said user-initiated command to the associated power manager agent.

12. A power distribution unit as in claim 11, wherein the energy consumption over time is computed for each of the plurality of power outputs.

13. A power distribution unit as in claim 11, wherein the subset of the plurality of power outputs is associated with a branch of power from the at least one power input.

14. A power distribution unit as in claim 13, wherein the at least one current sensor is connected to sense at least one current parameter associated with the branch of power from the at least one power input.

15. A power distribution unit as in claim 13, wherein the at least one current sensor comprises a plurality of current sensors connected to sense current parameters of associated ones of the plurality of power outputs.

16. A power distribution unit as in claim 11, wherein the at least one power input comprises two or more power phases, and wherein the subset of the plurality of power outputs are associated with a first power phase from the at least one power input.

17. A power distribution unit as in claim 16, wherein the at least one current sensor is connected to sense at least one current parameter associated with the first power phase from the at least one power input.

18. A power distribution unit as in claim 16, wherein the at least one current sensor comprises a plurality of current sensors connected to sense current parameters of associated ones of the plurality of power outputs.

19. A power distribution unit as in claim 11, wherein the at least one PDU processor is configured to receive one or more of the at least one voltage parameter and the at least one current parameter to compute at least one power value.

20. A power distribution unit as in claim 19, further comprising:
a communication circuit in communication with the at least one PDU processor.

21. A power distribution unit as in claim 20, wherein the communication circuit is configured to transmit the at least one power value to the network power manager, wherein the network power manager is external to the power distribution unit.

22. A power distribution unit as in claim 21, wherein the communication circuit comprises:
a network interface card (NIC) configured to transmit the at least one power value to the network power manager.

23. A power distribution unit as in claim 19, further comprising:
an intelligent power module (IPM) associated with the plurality of power outputs, wherein one or more of the at least one PDU processor, the at least one voltage sensor, and the at least one current sensor are components of the IPM.

24. A power distribution unit (PDU), comprising:
a housing;
at least one power input;
a first set of power outputs associated with a first power branch from the at least one power input;
a second set of power outputs associated with a second power branch from the at least one power input;
at least one voltage sensor connected to sense at least one voltage parameter of the at least one power input;
one or more first current sensors connected to sense one or more first current parameters associated with the first power branch;
one or more second current sensors connected to sense one or more second current parameters associated with the second power branch;

a power manager agent configured to receive at least one said voltage parameter, at least one of said first current parameters, and at least one of said second current parameters, wherein the power manager agent comprises at least one PDU processor and a PDU data storage unit to cause the at least one PDU processor to compute energy consumption over time for at least an associated one of said first set of power outputs or said second set of power outputs; and a network power manager in communication with each power manager agent, said network power manager configured to receive information corresponding to the energy consumption, wherein the network power manager comprises at least one network processor and a network data storage unit, said network data storage unit comprising instructions operative to cause the at least one network processor to:

communicate, to a user, the computed energy consumption; and in response to receiving a user-initiated command correlated to the computed energy consumption, convey said user-initiated command to the associated power manager agent.

25. A power distribution unit as in claim 24, wherein the energy consumption over time is computed for each power output in the first set of power outputs and each power output in the second set of power outputs.

26. A power distribution unit as in claim 24,
wherein the one or more first current sensors are connected to sense current parameters of associated ones of the first set of power outputs, and
wherein the one or more second current sensors are connected to sense current parameters of associated ones of the second set of power outputs.

27. A power distribution unit as in claim 24, wherein the at least one PDU processor is configured to receive one or more of the at least one voltage parameter, the one or more first current parameters, and the one or more second current parameters to compute at least one power value.

28. A power distribution unit as in claim 27, further comprising:
a communication circuit in communication with the at least one PDU processor.

29. A power distribution unit as in claim 28, wherein the communication circuit is configured to transmit the at least one power value to the network power manager, wherein the network power manager is external to the power distribution unit.

30. A power distribution unit as in claim 29, wherein the communication circuit comprises:
a network interface card (NIC) configured to transmit the at least one power value to the network power manager.

31. A power distribution unit as in claim 27, further comprising:
a first intelligent power module (IPM) associated with the first set of power outputs, wherein the one or more first current sensors are components of the first IPM;
a second intelligent power module (IPM) associated with the second set of power outputs, wherein the one or more second current sensors are components of the second IPM.

32. A power distribution unit (PDU), comprising:
a housing;
at least one power input comprising two or more power phases;
a first set of power outputs associated with a first power phase from the at least one power input;
a second set of power outputs associated with a second power phase from the at least one power input;
at least one voltage sensor connected to sense at least one voltage parameter of the at least one power input;
one or more first current sensors connected to sense one or more first current parameters associated with the first set of power outputs; and
one or more second current sensors connected to sense one or more second current parameters associated with the second set of power outputs;
a power manager agent configured to receive at least one said voltage parameter, at least one of said first current parameters, and at least one of said second current parameters, wherein the power manager agent comprises at least one PDU processor and a PDU data storage unit to cause the at least one PDU processor to compute energy consumption over time for at least an associated one of said first set of power outputs or said second set of power outputs; and
a network power manager in communication with each power manager agent, said power network manager configured to receive information corresponding to the computed energy consumption, wherein the network power manager comprises at least one network processor and a network data storage unit, said network data storage unit comprising instructions operative to cause the at least one network processor to:

communicate, to a user, the computed energy consumption; and in response to receiving a user-initiated command correlated to the computed energy consumption, convey said user-initiated command to the associated power manager agent.

33. A power distribution unit as in claim 32, wherein the energy consumption over time is computed for each power output in the first set of power outputs and each power output in the second set of power outputs.

34. A power distribution unit as in claim 32,
wherein the one or more first current sensors are connected to sense current parameters of each of the first set of power outputs, and
wherein the one or more second current sensors are connected to sense current parameters of each of the second set of power outputs.

35. A power distribution unit as in claim 32, wherein the at least one PDU processor is configured to receive one or more of the at least one voltage parameter, the one or more first current parameters, and the one or more second current parameters to compute at least one power value.

36. A power distribution unit as in claim 35, further comprising:
a communication circuit in communication with the at least one PDU processor.

37. A power distribution unit as in claim 36, wherein the communication circuit is configured to transmit the at least one power value to the network power manager, wherein the network power manager is external to the power distribution unit.

38. A power distribution unit as in claim 37, wherein the communication circuit comprises:
a network interface card (NIC) configured to transmit the at least one power value to the network power manager.

39. A power distribution unit as in claim 35, further comprising:
a first intelligent power module (IPM) associated with the first set of power outputs, wherein the one or more first current sensors are components of the first IPM;

a second intelligent power module (IPM) associated with the second set of power outputs, wherein the one or more second current sensors are components of the second IPM.

40. A power management system as in claim 1, wherein the energy consumption over time is computed for each of the plurality of power outputs.

41. A power management system as in claim 1, each power distribution unit comprising:
   a plurality of power control switches, each in power-control communication with the power output in the plurality of power outputs; and
   a communication circuit in communication with the plurality of sensors and the plurality of power-control switches.

42. A power management system as in claim 1, wherein computing the energy consumption over time includes:
   accumulating, at the PDU data storage unit, the at least one input power parameter and the at least one output power parameter;
   extracting timing information from the at least one input power parameter; and
   computing energy consumption over time by multiplying the extracted timing information with the at least one output power parameter.

43. A power management system as in claim 1, further comprising:
   a user interface in communication with the network power manager to receive the user-initiated command.

* * * * *

UNITED STATES PATENT AND TRADEMARK OFFICE
CERTIFICATE OF CORRECTION

PATENT NO.         : 9,898,026 B2
APPLICATION NO.    : 13/670275
DATED              : February 20, 2018
INVENTOR(S)        : Carrel W. Ewing et al.

It is certified that error appears in the above-identified patent and that said Letters Patent is hereby corrected as shown below:

In Column 1, Line 9, delete "tided" and insert -- titled --, therefor.

In Column 4, Line 8, delete "the a" and insert -- the --, therefor.

In Column 9, Line 54, delete "commands" and insert -- commands. --, therefor.

In Column 12, Line 24, delete "poer" and insert -- power --, therefor.

In Column 29, Line 4, delete "1231a" and insert -- 1231 a --, therefor.

In Column 35, Line 44, delete "MRInfeed" and insert -- MRINFEED --, therefor.

In Column 48, Line 54, delete "disovering" and insert -- discovering --, therefor.

In Column 52, Line 12, delete "Calcuated" and insert -- Calculated --, therefor.

In Column 57, Line 67, delete "REBOOTing," and insert -- REBOOTING, --, therefor.

In Column 67, Line 25, delete "poer" and insert -- power --, therefor.

In Column 67, Line 27, delete "the a" and insert -- the --, therefor.

In Column 69, Line 39, delete "command" and insert -- command. --, therefor.

Signed and Sealed this
First Day of May, 2018

Andrei Iancu
*Director of the United States Patent and Trademark Office*